US011880271B2

(12) United States Patent
Poghosyan et al.

(10) Patent No.: US 11,880,271 B2
(45) Date of Patent: *Jan. 23, 2024

(54) AUTOMATED METHODS AND SYSTEMS THAT FACILITATE ROOT CAUSE ANALYSIS OF DISTRIBUTED-APPLICATION OPERATIONAL PROBLEMS AND FAILURES

(71) Applicant: VMware LLC, Palo Alto, CA (US)

(72) Inventors: Arnak Poghosyan, Yerevan (AM); Ashot Nshan Harutyunyan, Yerevan (AM); Naira Movses Grigoryan, Yerevan (AM); Clement Pang, Palo Alto, CA (US); George Oganesyan, Yerevan (AM); Davit Baghdasaryan, Yerevan (AM)

(73) Assignee: VMware LLC, Palo Alto, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/491,967

(22) Filed: Oct. 1, 2021

(65) Prior Publication Data

US 2022/0058072 A1 Feb. 24, 2022

Related U.S. Application Data

(63) Continuation-in-part of application No. 17/119,462, filed on Dec. 11, 2020, now Pat. No. 11,416,364, (Continued)

(51) Int. Cl.

| | |
|---|---|
| ***G06F 11/07*** | (2006.01) |
| ***G06F 11/34*** | (2006.01) |
| ***G06F 18/243*** | (2023.01) |

(52) U.S. Cl.

CPC ........ *G06F 11/079* (2013.01); *G06F 11/0709* (2013.01); *G06F 11/3495* (2013.01); *G06F 18/24317* (2023.01)

(58) Field of Classification Search

None

See application file for complete search history.

(56) References Cited

U.S. PATENT DOCUMENTS

| | | | | |
|---|---|---|---|---|
| 9,904,587 | B1 * | 2/2018 | Potlapally | G06F 11/079 |
| 2009/0164980 | A1 * | 6/2009 | Rossmann | G06F 11/3404 717/128 |

(Continued)

*Primary Examiner* — Qing Chen

(74) *Attorney, Agent, or Firm* — Quarles & Brady LLP

(57) ABSTRACT

The current document is directed to methods and systems that employ call traces collected by one or more call-trace services to generate call-trace-classification rules to facilitate root-cause analysis of distributed-application operational problems and failures. In a described implementation, a set of automatically labeled call traces is partitioned by the generated call-trace-classification rules. Call-trace-classification-rule generation is constrained to produce relatively simple rules with greater-than-threshold confidences and coverages. The call-trace-classification rules may point to particular services and service failures, which provides useful information to distributed-application and distributed-computer-system managers and administrators attempting to diagnose operational problems and failures that arise during execution of distributed applications within distributed computer systems. Call-trace-classification rules that are useful in multiple diagnoses are maintained as diagnosis tools for future diagnoses.

20 Claims, 116 Drawing Sheets

Related U.S. Application Data which is a continuation-in-part of application No. 16/833,102, filed on Mar. 27, 2020, now Pat. No. 11,113,174.

(56) References Cited

U.S. PATENT DOCUMENTS

| | | | | |
|---|---|---|---|---|
| 2011/0276836 | A1* | 11/2011 | Kahana | G06Q 10/04 714/38.1 |
| 2015/0347214 | A1* | 12/2015 | Samuni | G06F 21/552 714/37 |
| 2016/0350173 | A1* | 12/2016 | Ahad | H04L 67/02 |
| 2017/0147417 | A1* | 5/2017 | Sasturkar | H04L 43/024 |
| 2017/0310556 | A1* | 10/2017 | Knowles | H04L 67/1097 |
| 2017/0339168 | A1* | 11/2017 | Balabine | G06F 16/951 |
| 2019/0294524 | A1* | 9/2019 | Gupta | G06F 11/364 |
| 2019/0391891 | A1* | 12/2019 | Gupta | G06N 3/043 |
| 2019/0391901 | A1* | 12/2019 | Gupta | G06N 3/08 |

* cited by examiner

2102

| att_id | attribute | type |
|---|---|---|
| 1 | os | discrete |
| ... | ... | ... |
| 151 | traffic_rating | integral |

Attributes

2103

| att_id | value | val_id |
|---|---|---|
| 1 | Android | 1 |
| 1 | MacOS | 2 |
| 1 | Linux | 3 |
| 1 | Unix | 4 |
| ... | ... | ... |
| 160 | NYC | 1672 |

Discrete_Attribute_Values

2104

| att_id | low | high |
|---|---|---|
| 4 | 1 | 10 |
| 16 | 0 | 99 |
| ... | ... | ... |
| 151 | -10 | 10 |

Integral_Attribute_Values

2106
```
getID(string a_name)
   SELECT att_id
   FROM Attributes
   WHERE attribute = a_name
```

2108
```
getType(string a_name)
   SELECT type
   FROM Attributes
   WHERE attribute = a_name
```

2110
```
getNum(string a_name)
   id = getID(a_name)
   type = getType(a_name)
   if (type == "discrete")
      SELECT COUNT (*)
      FROM Discrete_Attribute_Value
      WHERE att_id = id

   else
      low =  SELECT low
             FROM Integral_Attribute_Values
             WHERE att_id = id
      high = SELECT high
             FROM Integral_Attribute_Values
             WHERE att_id = id
      num = high – low + 1
```

| comp_id | comp_name | comp_type |
|---|---|---|
| 261 | front_end_3 | service_app |
| 1616 | DC2_server101 | server |
| 27610 | DC4_edge10 | edge_router |

Components

2122

| comp_1 | comp_2 | relationship |
|---|---|---|
| 3312 | 4476 | contains |
| 4476 | 3312 | containment_within |
| 16 | 3761 | contains |

Component_Relationships

2124

| comp_id | att_id | val |
|---|---|---|
| | | |
| | | |
| | | |
| | | |
| | | |
| | | |
| | | |
| | | |
| | | |
| | | |
| | | |

Component_Attributes

2126

| m_id | metric_name |
|---|---|
| | |
| | |

Metrics

2128

| comp_id | m_id | timpstamp | value |
|---|---|---|---|
| | | | |
| | | | |

Metric_Values

FIG. 21B

| A | | | C | | | E | | | F | | |
|---|---|---|---|---|---|---|---|---|---|---|---|
| host | geo | ver | host | conf | ver | host | conf | ver | host | conf | ver |
| $S_1$ | NE | 1.1 | $S_6$ | S | 2.4 | $S_{11}$ | M | 2.1 | $S_{17}$ | S | 3.5 |
| $S_2$ | S | 1.2 | $S_7$ | S | 2.4 | $S_{12}$ | M | 2.0 | $S_{18}$ | S | 3.6 |
| $S_5$ | NW | 2.1 | $S_{10}$ | F | 2.7 | $S_{15}$ | F | 2.2 | $S_{17}$ | S | 3.5 |
| $S_4$ | SW | 2.1 | $S_9$ | F | 3.0 | $S_{14}$ | S | 2.1 | $S_{21}$ | S | 3.5 |
| $S_1$ | S | 1.1 | $S_6$ | S | 2.4 | $S_{11}$ | M | 2.1 | $S_{18}$ | S | 3.6 |
| $S_5$ | NE | 2.1 | $S_{10}$ | F | 2.7 | $S_{15}$ | F | 2.2 | $S_{21}$ | S | 3.5 |
| $S_1$ | NE | 1.1 | $S_6$ | S | 2.4 | $S_{11}$ | M | 2.1 | $S_{17}$ | S | 3.5 |
| $S_2$ | MW | 1.2 | $S_7$ | S | 2.4 | $S_{12}$ | M | 2.0 | $S_{18}$ | S | 3.6 |
| $S_5$ | NW | 2.1 | $S_{10}$ | F | 2.7 | $S_{15}$ | F | 2.2 | $S_{21}$ | S | 3.5 |
| $S_2$ | S | 1.2 | $S_7$ | S | 2.4 | $S_{12}$ | M | 2.0 | $S_{18}$ | S | 3.6 |
| $S_1$ | S | 1.1 | $S_8$ | S | 2.4 | $S_{11}$ | M | 2.1 | $S_{17}$ | S | 3.5 |
| $S_5$ | NE | 2.1 | $S_{10}$ | F | 2.7 | $S_{15}$ | F | 2.2 | $S_{17}$ | S | 3.5 |
| $S_4$ | NW | 2.1 | $S_9$ | F | 3.0 | $S_{14}$ | S | 2.1 | $S_{21}$ | S | 3.5 |
| $S_1$ | NE | 1.1 | $S_6$ | S | 2.4 | $S_{11}$ | M | 2.1 | $S_{18}$ | S | 3.6 |
| $S_1$ | NE | 1.1 | $S_8$ | S | 2.4 | $S_{11}$ | M | 2.1 | $S_{17}$ | S | 3.5 |
| $S_5$ | NE | 2.1 | $S_{10}$ | F | 2.7 | $S_{15}$ | F | 2.2 | $S_{21}$ | S | 3.5 |
| $S_2$ | MW | 1.2 | $S_7$ | S | 2.4 | $S_{12}$ | M | 2.0 | $S_{18}$ | S | 3.6 |
| $S_1$ | S | 1.1 | $S_6$ | S | 2.4 | $S_{11}$ | M | 2.1 | $S_{17}$ | S | 3.5 |
| $S_5$ | NW | 2.1 | $S_{10}$ | F | 2.7 | $S_{15}$ | F | 2.2 | $S_{17}$ | S | 3.5 |
| $S_1$ | NE | 1.2 | $S_6$ | S | 2.4 | $S_{11}$ | M | 2.1 | $S_{18}$ | S | 3.6 |
| $S_4$ | SW | 2.1 | $S_8$ | F | 3.0 | $S_{14}$ | S | 2.1 | $S_{21}$ | S | 3.5 |
| $S_2$ | S | 1.2 | $S_7$ | S | 2.4 | $S_{12}$ | M | 2.0 | $S_{18}$ | S | 3.6 |
| … | … | … | … | … | … | … | … | … | … | … | … |
| $S_1$ | S | 1.1 | $S_6$ | S | 2.4 | $S_{11}$ | M | 2.1 | $S_{17}$ | S | 3.5 |
| $S_5$ | NE | 2.1 | $S_{10}$ | F | 2.7 | $S_{15}$ | F | 2.2 | $S_{21}$ | S | 3.5 |

FIG. 23F

| A | | | B | | | C | | | D | | | E | | | F | | |
|---|---|---|---|---|---|---|---|---|---|---|---|---|---|---|---|---|---|
| host | geo | ver | host | conf | ver | host | conf | ver | host | conf | ver | host | conf | ver | host | conf | ver |
| $S_3$ | MW | 1.2 | $S_8$ | S | 3.3 | | | | | | | | | | | | |
| $S_1$ | NE | 1.1 | | | | $S_6$ | S | 2.4 | | | | $S_{11}$ | | | | | |
| $S_3$ | SW | 1.2 | | | | $S_8$ | M | 2.7 | | | | $S_{13}$ | M | 2.1 | $S_{17}$ | S | 3.5 |
| $S_4$ | NW | 2.1 | | | | $S_9$ | F | 3.0 | $S_{14}$ | M | 3.8 | | S | 2.0 | $S_{20}$ | S | 4.1 |
| $S_2$ | S | 1.2 | | | | $S_7$ | S | 2.4 | | | | $S_{12}$ | | | | | |
| $S_1$ | NE | 1.1 | | | | $S_8$ | S | 2.4 | $S_{11}$ | S | 3.6 | | M | 2.0 | $S_{18}$ | S | 3.6 |
| $S_4$ | NW | 2.1 | $S_9$ | M | 3.1 | | | | | | | | | | | | |
| $S_2$ | S | 1.2 | | | | $S_7$ | S | 2.4 | $S_{12}$ | S | 3.6 | | | | | | |
| $S_5$ | NW | 2.1 | | | | $S_{10}$ | F | 2.7 | | | | $S_{15}$ | F | 2.2 | $S_{17}$ | S | 3.5 |
| $S_2$ | S | 1.2 | | | | $S_7$ | | | | | | | | | | | |
| $S_4$ | SW | 2.1 | | | | $S_9$ | F | 3.0 | | | | $S_{14}$ | S | 2.1 | $S_{21}$ | S | 3.5 |
| $S_3$ | MW | 1.2 | | | | $S_8$ | M | 2.7 | | | | $S_{13}$ | S | 2.0 | $S_{19}$ | S | 4.1 |
| $S_1$ | S | 1.1 | | | | $S_6$ | S | 2.4 | | | | $S_{11}$ | M | 2.1 | $S_{18}$ | S | 3.6 |
| $S_2$ | MW | 1.2 | | | | $S_7$ | S | 2.4 | | | | $S_{12}$ | M | 2.0 | $S_{18}$ | S | 3.6 |
| $S_5$ | NE | 2.1 | | | | $S_{10}$ | F | 2.7 | | | | $S_{15}$ | F | 2.2 | $S_{21}$ | S | 3.5 |
| $S_5$ | NE | 2.1 | $S_{10}$ | S | 3.1 | | | | | | | | | | | | |
| $S_4$ | SW | 2.1 | $S_9$ | M | 3.1 | | | | | | | | | | | | |
| $S_3$ | MW | 1.2 | | | | $S_8$ | M | 2.7 | $S_{13}$ | M | 3.8 | | | | | | |
| $S_1$ | NE | 1.1 | | | | $S_6$ | S | 2.4 | | | | $S_{11}$ | M | 2.1 | $S_{17}$ | S | 3.5 |
| $S_5$ | NW | 2.1 | | | | $S_{10}$ | F | 2.7 | $S_{15}$ | S | 3.7 | | | | | | |
| $S_2$ | S | 1.2 | $S_7$ | S | 3.1 | | | | | | | | | | | | |
| $S_2$ | MW | 1.2 | | | | $S_7$ | S | 2.4 | | | | $S_{12}$ | M | 2.0 | $S_{18}$ | S | 3.6 |
| $S_1$ | S | 1.1 | $S_6$ | F | 3.1 | | | | | | | | | | | | |
| $S_2$ | S | 1.2 | $S_7$ | S | 2.4 | $S_{12}$ | M | 2.0 | | | | | | | | | |
| $S_5$ | NW | 2.1 | | | | $S_{10}$ | F | 2.7 | | | | $S_{15}$ | F | 2.2 | $S_{17}$ | S | 3.5 |
| $S_3$ | SW | 1.2 | $S_8$ | S | 3.3 | | | | | | | | | | | | |
| $S_1$ | S | 1.1 | | | | $S_6$ | S | 2.4 | $S_{11}$ | M | 2.1 | | | | | | |
| $S_2$ | MW | 1.2 | $S_7$ | S | 3.1 | | | | | | | | | | | | |
| $S_4$ | SW | 2.1 | | | | $S_9$ | F | 3.0 | | | | $S_{14}$ | S | 2.1 | $S_{20}$ | S | 4.1 |
| $S_4$ | NW | 2.1 | | | | $S_9$ | F | 3.0 | | | | $S_{14}$ | S | 2.1 | $S_{21}$ | S | 3.5 |
| $S_5$ | NE | 2.1 | $S_{10}$ | S | 3.1 | | | | | | | | | | | | |

$$d_E = \sqrt{(7-3)^2 + (6-4)^2 + (2-6)^2} = \sqrt{16 + 4 + 6} = 6$$

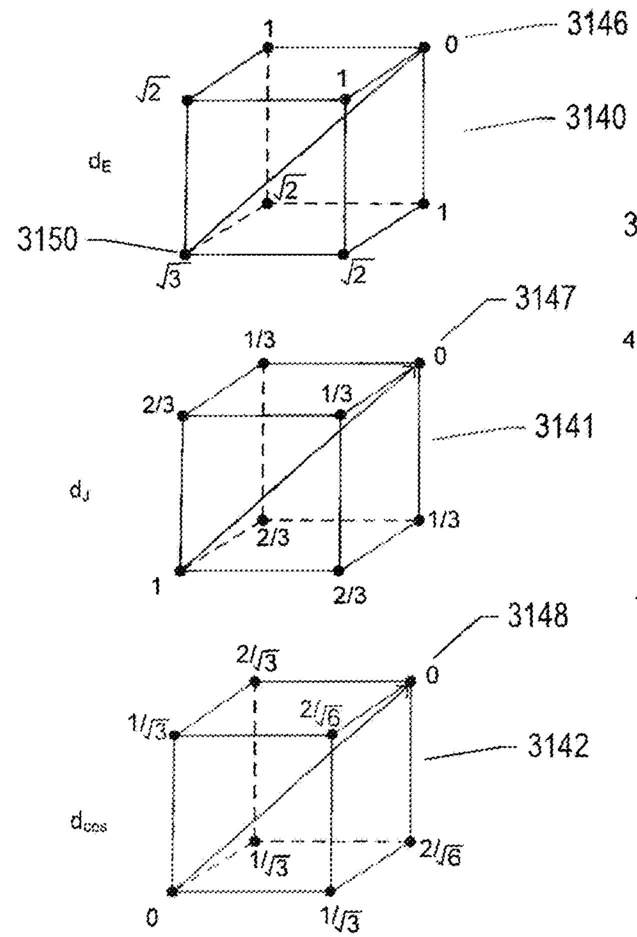

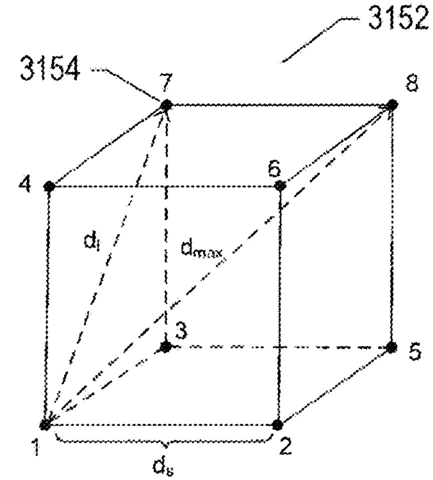

$d(V_1,V_2) = 0$ — 3164

$d(V_1,V_2) + d(V_2,V_3) \geq d(V_1,V_3)$ — 3166

$d(\,) = \alpha d_{cos}(\,) + \beta d_J(\,)$ — 3170

3168

| | $d_{min}$ | $d_{max}$ | $d_l$ | $d_s$ | $\frac{d_l}{d_{max}}$ | $\frac{d_s}{d_{max}}$ | $\frac{d_s}{d_l}$ |
|---|---|---|---|---|---|---|---|
| $d_E$ | 0 | $\sqrt{3}$ | $\sqrt{2}$ | 1 | .816 | .577 | .707 |
| $d_J$ | 0 | 1 | 2/3 | 1/3 | .667 | .333 | .5 |
| $d_{cos}$ | 0 | 1 | $2/\sqrt{6}$ | $1/\sqrt{3}$ | .816 | .577 | .707 |

FIG. 31D $d_E$ — 3160

| | 1 | 2 | 3 | 4 | 5 | 6 | 7 | 8 |
|---|---|---|---|---|---|---|---|---|
| 1 | 0 | 1 | 1 | 1 | $\sqrt{2}$ | $\sqrt{2}$ | $\sqrt{2}$ | $\sqrt{3}$ |
| 2 | 1 | 0 | $\sqrt{2}$ | $\sqrt{2}$ | 1 | 1 | $\sqrt{3}$ | $\sqrt{2}$ |
| 3 | 1 | $\sqrt{2}$ | 0 | $\sqrt{2}$ | 1 | $\sqrt{3}$ | 1 | $\sqrt{2}$ |
| 4 | 1 | $\sqrt{2}$ | $\sqrt{2}$ | 0 | $\sqrt{3}$ | 1 | 1 | $\sqrt{2}$ |
| 5 | $\sqrt{2}$ | 1 | 1 | $\sqrt{3}$ | 0 | $\sqrt{2}$ | $\sqrt{2}$ | 1 |
| 6 | $\sqrt{2}$ | 1 | $\sqrt{3}$ | 1 | $\sqrt{2}$ | 0 | $\sqrt{2}$ | 1 |
| 7 | $\sqrt{2}$ | $\sqrt{3}$ | 1 | 1 | $\sqrt{2}$ | $\sqrt{2}$ | 0 | 1 |
| 8 | $\sqrt{3}$ | $\sqrt{2}$ | $\sqrt{2}$ | $\sqrt{2}$ | 1 | 1 | 1 | 0 |

$d_J$ — 3161

| | 1 | 2 | 3 | 4 | 5 | 6 | 7 | 8 |
|---|---|---|---|---|---|---|---|---|
| 1 | 0 | 1/3 | 1/3 | 1/3 | 2/3 | 2/3 | 2/3 | 1 |
| 2 | 1/3 | 0 | 2/3 | 2/3 | 1/3 | 1/3 | 1 | 2/3 |
| 3 | 1/3 | 2/3 | 0 | 2/3 | 1/3 | 1 | 1/3 | 2/3 |
| 4 | 1/3 | 2/3 | 2/3 | 0 | 1 | 1/3 | 1/3 | 2/3 |
| 5 | 2/3 | 1/3 | 1/3 | 1 | 0 | 2/3 | 2/3 | 1/3 |
| 6 | 2/3 | 1/3 | 1 | 1/3 | 2/3 | 0 | 2/3 | 1/3 |
| 7 | 2/3 | 1 | 1/3 | 1/3 | 2/3 | 2/3 | 0 | 1/3 |
| 8 | 1 | 2/3 | 2/3 | 2/3 | 1/3 | 1/3 | 1/3 | 0 |

$d_{cos}$ — 3162

| | 1 | 2 | 3 | 4 | 5 | 6 | 7 | 8 |
|---|---|---|---|---|---|---|---|---|
| 1 | 0 | $1/\sqrt{3}$ | $1/\sqrt{3}$ | $1/\sqrt{3}$ | $2/\sqrt{6}$ | $2/\sqrt{6}$ | $2/\sqrt{6}$ | 1 |
| 2 | $1/\sqrt{3}$ | 0 | $2/\sqrt{6}$ | $2/\sqrt{6}$ | $1/\sqrt{3}$ | $1/\sqrt{3}$ | 1 | $2/\sqrt{6}$ |
| 3 | $1/\sqrt{3}$ | $2/\sqrt{6}$ | 0 | $2/\sqrt{6}$ | $1/\sqrt{3}$ | 1 | $1/\sqrt{3}$ | $2/\sqrt{6}$ |
| 4 | $1/\sqrt{3}$ | $2/\sqrt{6}$ | $2/\sqrt{6}$ | 0 | 1 | $1/\sqrt{3}$ | $1/\sqrt{3}$ | $2/\sqrt{6}$ |
| 5 | $2/\sqrt{6}$ | $1/\sqrt{3}$ | $1/\sqrt{3}$ | 1 | 0 | $2/\sqrt{6}$ | $2/\sqrt{6}$ | $1/\sqrt{3}$ |
| 6 | $2/\sqrt{6}$ | $1/\sqrt{3}$ | 1 | $1/\sqrt{3}$ | $2/\sqrt{6}$ | 0 | $2/\sqrt{6}$ | $1/\sqrt{3}$ |
| 7 | $2/\sqrt{6}$ | 1 | $1/\sqrt{3}$ | $1/\sqrt{3}$ | $2/\sqrt{6}$ | $2/\sqrt{6}$ | 0 | $1/\sqrt{3}$ |
| 8 | 1 | $2/\sqrt{6}$ | $2/\sqrt{6}$ | $2/\sqrt{6}$ | $1/\sqrt{3}$ | $1/\sqrt{3}$ | $1/\sqrt{3}$ | 0 |

4306 4307 4308 4309 4310 4311 4312 4313 4314

4304

4302

| A | B | C | D | E | F | G | H | label |
|---|---|---|---|---|---|---|---|---|
| 11 | j | 7 | 2 | 11.3 | x | c | 3 | 0 |
| 26 | k | 20 | 2 | 13.6 | x | b | 3 | 0 |
| 13 | m | 9 | 3 | 7.2 | x | a | 3 | 0 |
| 7 | b | 19 | 6 | 88.3 | w | d | 2 | 0 |
| 19 | c | 11 | 1 | 51.4 | y | a | 1 | 1 |
| 16 | z | 6 | 7 | 37.6 | z | b | 3 | 0 |
| 13 | q | 8 | 3 | 29.5 | x | a | 3 | 0 |
| 31 | l | 13 | 4 | 77.7 | z | a | 1 | 1 |
| 17 | b | 14 | 5 | 63.9 | z | d | 2 | 0 |
| 32 | g | 2 | 5 | 21.8 | y | c | 2 | 0 |
| 6 | s | 19 | 9 | 19.4 | y | c | 3 | 0 |
| 41 | u | 16 | 8 | 11.1 | w | d | 1 | 0 |
| 27 | t | 16 | 3 | 47.2 | w | a | 2 | 1 |
| 24 | h | 7 | 2 | 62.7 | z | b | 1 | 0 |
| 17 | a | 6 | 1 | 91.3 | x | a | 2 | 0 |
| 3 | k | 15 | 1 | 40.0 | z | a | 3 | 1 |
| 45 | j | 9 | 4 | 31.8 | y | b | 3 | 0 |
| 13 | n | 11 | 7 | 10.0 | z | d | 2 | 0 |
| 33 | w | 17 | 9 | 81.4 | y | a | 1 | 1 |
| 6 | y | 7 | 8 | 58.3 | x | a | 1 | 0 |
| 7 | d | 13 | 8 | 35.2 | w | b | 1 | 0 |
| 19 | z | 8 | 2 | 15.5 | z | c | 2 | 0 |
| 25 | f | 12 | 1 | 22.6 | z | a | 1 | 1 |
| 16 | q | 18 | 3 | 48.0 | y | d | 3 | 0 |
| 17 | e | 16 | 4 | 58.7 | w | c | 3 | 0 |
| 9 | x | 13 | 4 | 16.9 | x | b | 2 | 0 |
| 16 | l | 14 | 7 | 25.4 | w | a | 2 | 1 |

FIG. 43A 4324 4322

| A | B | C | D | E | F | G | H | label | | |
|---|---|---|---|---|---|---|---|---|---|---|
| 11 | j | 7 | 2 | 11.3 | x | c | 3 | 0 | N | G |
| 26 | k | 20 | 2 | 13.6 | x | b | 3 | 0 | N | G |
| 13 | m | 9 | 3 | 7.2 | x | a | 3 | 0 | N | Pr |
| 7 | b | 19 | 6 | 88.3 | w | d | 2 | 0 | N | G |
| 19 | c | 11 | 1 | 51.4 | y | a | 1 | 1 | P | Pr |
| 16 | z | 6 | 7 | 37.6 | z | b | 3 | 0 | N | Pr |
| 13 | q | 8 | 3 | 29.5 | x | a | 3 | 0 | N | G |
| 31 | l | 13 | 4 | 77.7 | z | a | 1 | 1 | P | G |
| 17 | b | 14 | 5 | 63.9 | z | d | 2 | 0 | N | Pr |
| 32 | g | 2 | 5 | 21.8 | y | c | 2 | 0 | N | G |
| 6 | s | 19 | 9 | 19.4 | y | c | 3 | 0 | N | G |
| 41 | u | 16 | 8 | 11.1 | w | d | 1 | 0 | N | G |
| 27 | t | 16 | 3 | 47.2 | w | a | 2 | 1 | P | G |
| 24 | h | 7 | 2 | 62.7 | z | b | 1 | 0 | N | Pr |
| 17 | a | 6 | 1 | 91.3 | x | a | 2 | 0 | N | G |
| 3 | k | 15 | 1 | 40.0 | z | a | 3 | 1 | P | Pr |
| 45 | j | 9 | 4 | 31.8 | y | b | 3 | 0 | N | G |
| 13 | n | 11 | 7 | 10.0 | z | d | 2 | 0 | N | G |
| 33 | w | 17 | 9 | 81.4 | y | a | 1 | 1 | P | G |
| 6 | y | 7 | 8 | 58.3 | x | a | 1 | 0 | N | Pr |
| 7 | d | 13 | 8 | 35.2 | w | b | 1 | 0 | N | G |
| 19 | z | 8 | 2 | 15.5 | z | c | 2 | 0 | N | G |
| 25 | f | 12 | 1 | 22.6 | z | a | 1 | 1 | P | G |
| 16 | q | 18 | 3 | 48.0 | y | d | 3 | 0 | N | G |
| 17 | e | 16 | 4 | 58.7 | w | c | 3 | 0 | N | Pr |
| 9 | x | 13 | 4 | 16.9 | x | b | 2 | 0 | N | G |
| 16 | l | 14 | 7 | 25.4 | w | a | 2 | 1 | P | G |

| A | B | C | D | E | F | G | H | label |
|---|---|---|---|---|---|---|---|---|
| 11 | j | 7 | 2 | 11.3 | x | c | 3 | 0 |
| 26 | k | 20 | 2 | 13.6 | x | b | 3 | 0 |
| 7 | b | 19 | 6 | 88.3 | w | d | 2 | 0 |
| 13 | q | 8 | 3 | 29.5 | x | a | 3 | 0 |
| 31 | l | 13 | 4 | 77.7 | z | a | 1 | 1 |
| 32 | g | 2 | 5 | 21.8 | y | c | 2 | 0 |
| 6 | s | 19 | 9 | 19.4 | y | c | 3 | 0 |
| 41 | u | 16 | 8 | 11.1 | w | d | 1 | 0 |
| 27 | t | 16 | 3 | 47.2 | w | a | 2 | 1 |
| 17 | a | 6 | 1 | 91.3 | x | a | 2 | 0 |
| 45 | j | 9 | 4 | 31.8 | y | b | 3 | 0 |
| 13 | n | 11 | 7 | 10.0 | z | d | 2 | 0 |
| 33 | w | 17 | 9 | 81.4 | y | a | 1 | 1 |
| 7 | d | 13 | 8 | 35.2 | w | b | 1 | 0 |
| 19 | z | 8 | 2 | 15.5 | z | c | 2 | 0 |
| 25 | f | 12 | 1 | 22.6 | z | a | 1 | 1 |
| 16 | q | 18 | 3 | 48.0 | y | d | 3 | 0 |
| 9 | x | 13 | 4 | 16.9 | x | b | 2 | 0 |
| 16 | l | 14 | 7 | 25.4 | w | a | 2 | 1 |

coverage = $\frac{p}{num\_positive}$ 4362 confidence = $\frac{p}{p+n}$ 4364 accuracy = $\frac{p + num\_negative - n}{num\_negative + num\_positive}$ 4366

G == a 4352 4354

| | | | | | | | | |
|---|---|---|---|---|---|---|---|---|
| 13 | q | 8 | 3 | 29.5 | x | a | 3 | 0 |
| 31 | l | 13 | 4 | 77.7 | z | a | 1 | 1 |
| 27 | t | 16 | 3 | 47.2 | w | a | 2 | 1 |
| 17 | a | 6 | 1 | 91.3 | x | a | 2 | 0 |
| 33 | w | 17 | 9 | 81.4 | y | a | 1 | 1 |
| 25 | f | 12 | 1 | 22.6 | z | a | 1 | 1 |
| 16 | q | 18 | 3 | 48.0 | y | d | 3 | 0 |

4355 coverage = $\frac{5}{5}$ = 1.0 confidence = $\frac{5}{7}$ = 0.714 accuracy = 0.89

G == a AND c >= 10

4360

| | | | | | | | | |
|---|---|---|---|---|---|---|---|---|
| 31 | l | 13 | 4 | 77.7 | z | a | 1 | 1 |
| 27 | t | 16 | 3 | 47.2 | w | a | 2 | 1 |
| 33 | w | 17 | 9 | 81.4 | y | a | 1 | 1 |
| 25 | f | 12 | 1 | 22.6 | z | a | 1 | 1 |
| 16 | q | 18 | 3 | 48.0 | y | d | 3 | 0 |

coverage = $\frac{5}{5}$ = 1.0 confidence = $\frac{5}{5+0}$ = 1.0 accuracy = 1.0

FIG. 43E

AUTOMATED METHODS AND SYSTEMS THAT FACILITATE ROOT CAUSE ANALYSIS OF DISTRIBUTED-APPLICATION OPERATIONAL PROBLEMS AND FAILURES

CROSS-REFERENCE TO RELATED APPLICATIONS

This application is a continuation-in-part of application Ser. No. 17/119,462, filed Dec. 11, 2020, U.S. Pat. No. 11,416,364, issued Aug. 16, 2022, which is a continuation-in-part of U.S. patent application Ser. No. 16/833,102, filed Mar. 27, 2020, U.S. Pat. No. 11,113,174, issued Sep. 7, 2021.

TECHNICAL FIELD

The current document is directed to distributed-computer-system and distributed-application administration and management and, in particular, to methods and systems that generate call-trace-classification rules to facilitate root-cause analysis of distributed-application operational problems and failures.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that employ call traces collected by one or more call-trace services to generate call-trace-classification rules to facilitate root-cause analysis of distributed-application operational problems and failures. In a described implementation, a set of automatically labeled call traces is partitioned by the generated call-trace-classification rules. Call-trace-classification-rule generation is constrained to produce relatively simple rules with greater-than-threshold confidences and coverages. The call-trace-classification rules may point to particular services and service failures, which provides useful information to distributed-application and distributed-computer-system managers and administrators attempting to diagnose operational problems and failures that arise during execution of distributed applications within distributed computer systems. Call-trace-classification rules that are useful in multiple diagnoses are maintained as diagnosis tools for future diagnoses.

BRIEF DESCRIPTION OF THE DRAWINGS

FIGS. 21A-B illustrate one of many different possible ways of storing attribute values for system components and metric values for system components generated from event messages or event records.

FIGS. 23A-K illustrate one example of the currently disclosed methods for determining root causes of, and attributes that are likely to be relevant to, detected anomalies within distributed heating systems.

FIGS. 31A-D illustrates several different types of metrics that can be used to determine the distance between two vectors.

FIGS. 43A-E illustrate an example of generating a simple rule from a call-trace dataset that explains positive and negative call-trace labels in terms of call-trace attributes.

DETAILED DESCRIPTION

Figure 1:
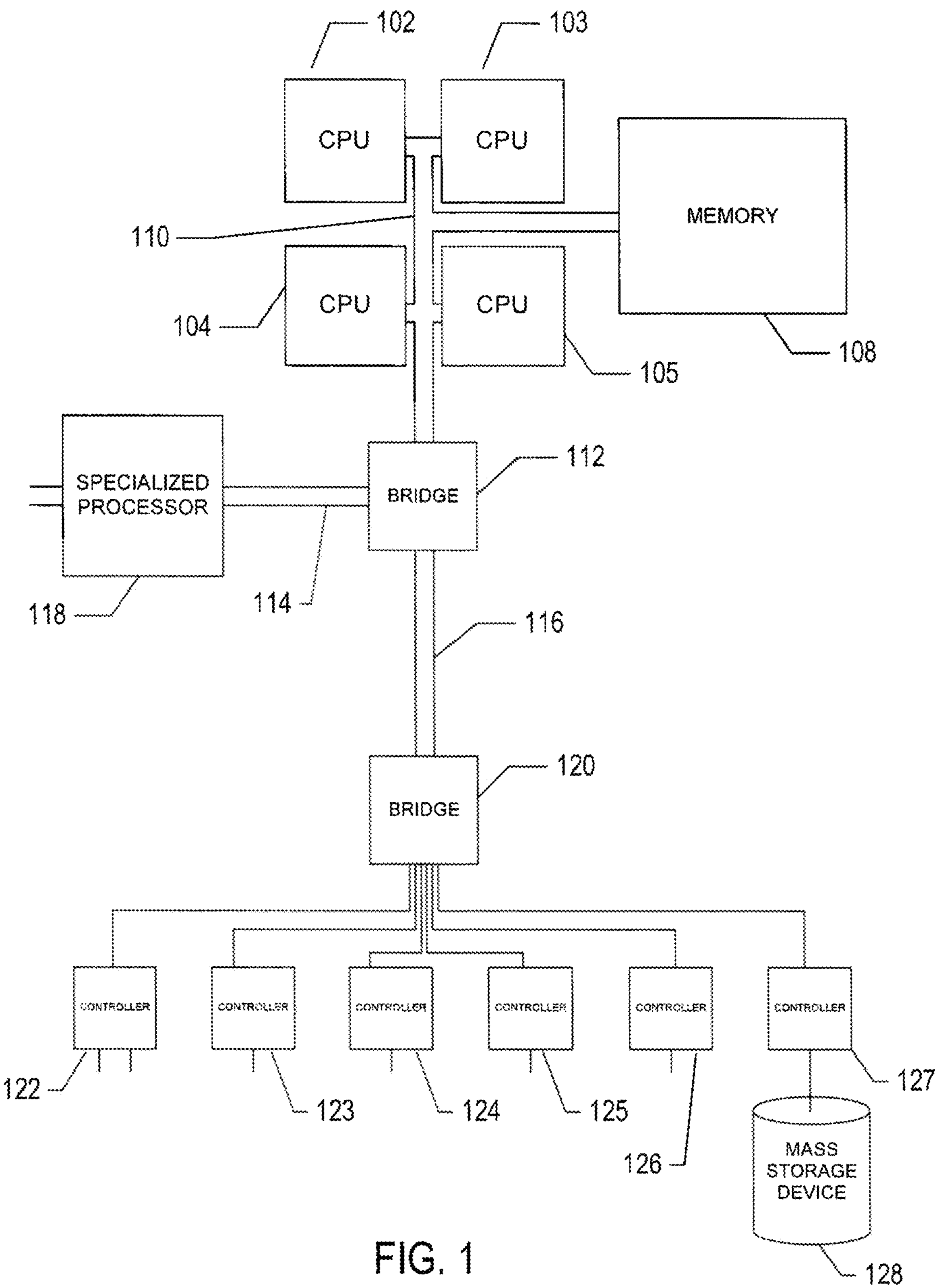
FIG. 1 provides a general architectural diagram for various types of computers.

The current document is directed to methods and systems that employ call traces collected by one or more call-trace services to generate call-trace-classification rules to facilitate root-cause analysis of distributed-application operational problems and failures. In a first subsection, below, a detailed description of computer hardware, complex computational systems, and virtualization is provided with reference to FIGS. 1-10. In a second subsection, distributed service-oriented applications, node attributes, call traces, and metric data are discussed, with reference to FIGS. 11-22B. A third subsection discusses dimensional-analysis methods and systems, with reference to FIGS. 23A-27H. A fourth subsection discloses call-trace-clustering methods and systems, with reference to FIGS. 28-38. A fifth subsection discusses the currently disclosed methods and systems, with reference to FIGS. 39-54B.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
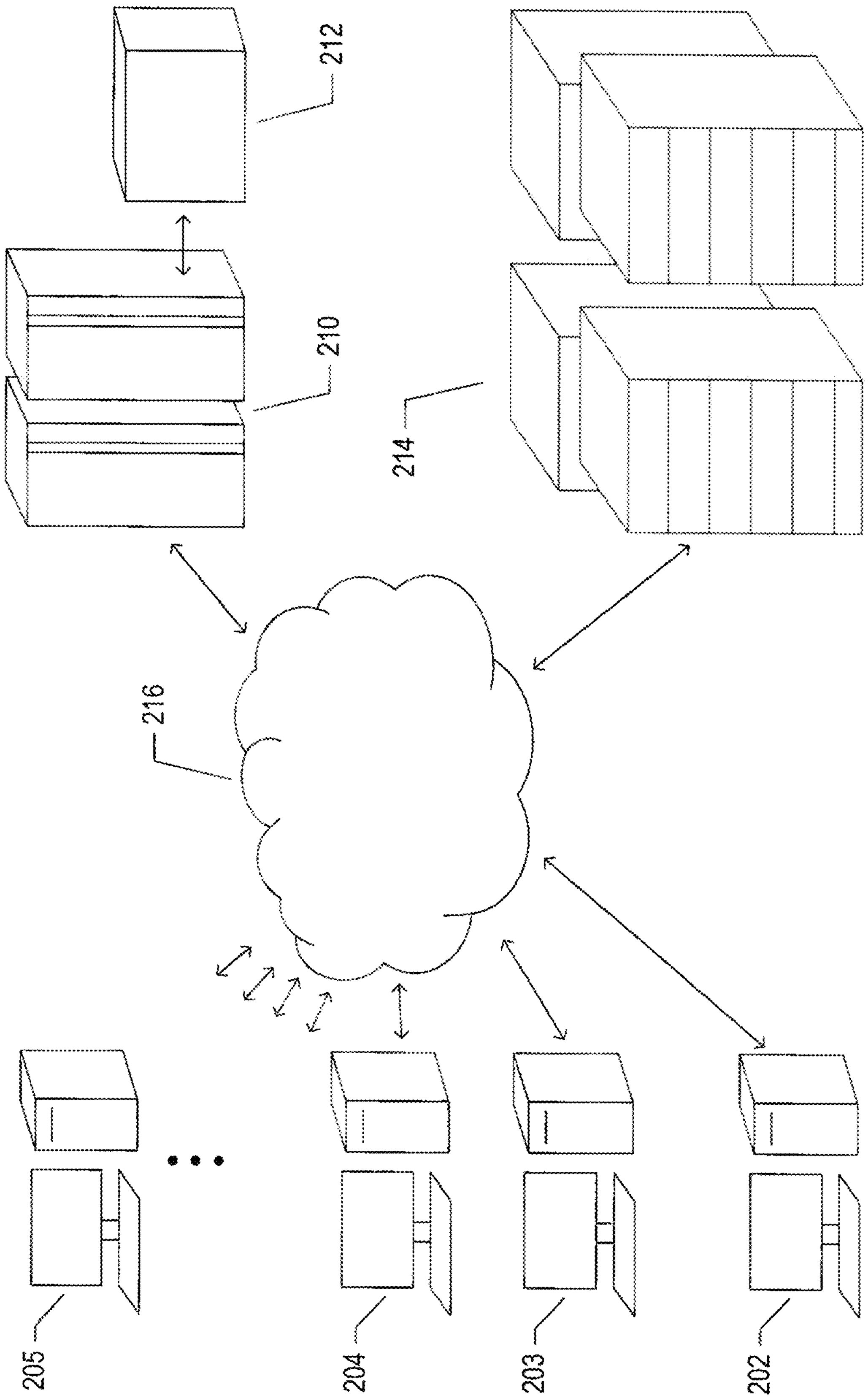
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
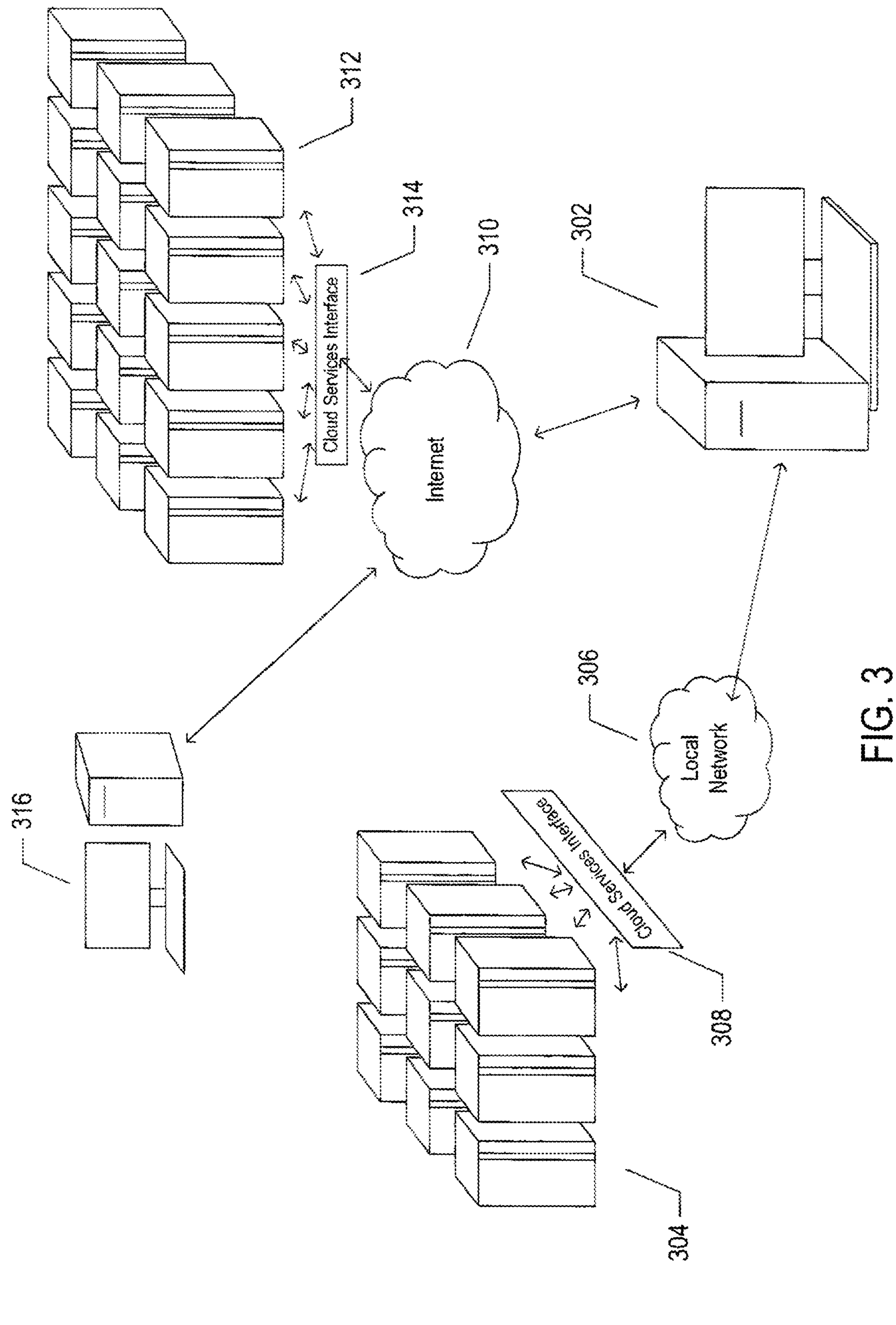
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
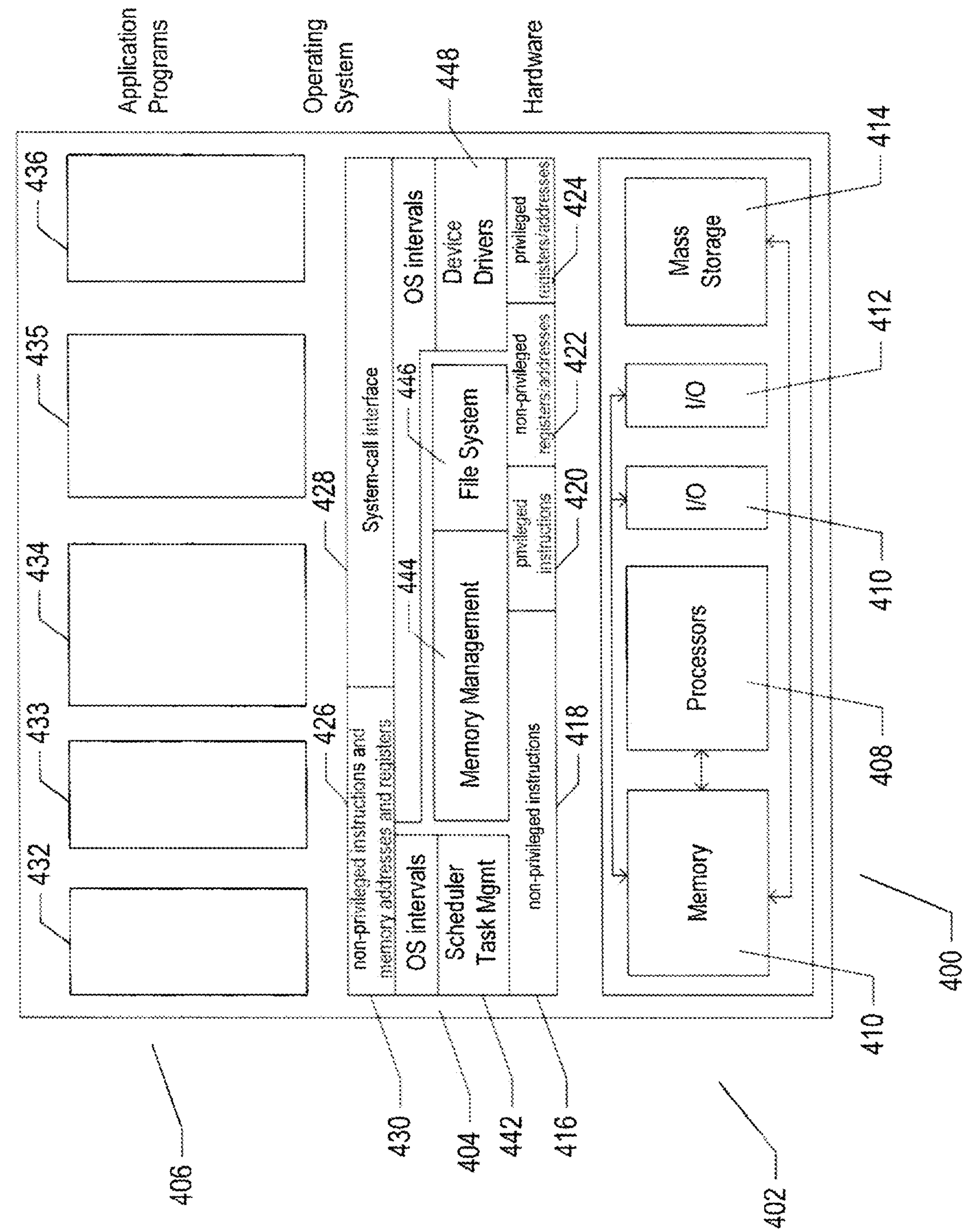
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
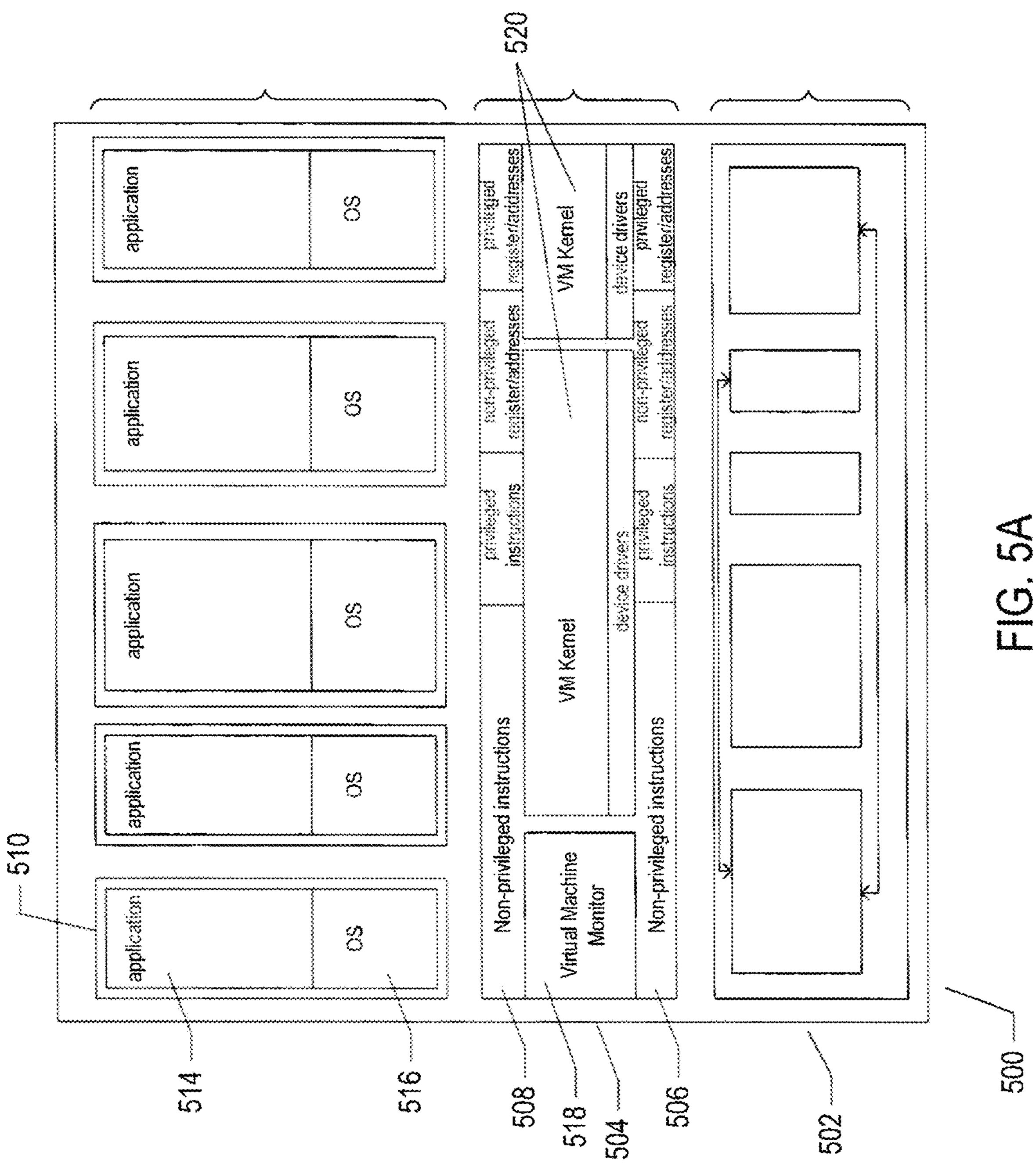
FIGS. 5A-D illustrate two types of virtual machine and virtual-machine execution environments.
Figure 5B:
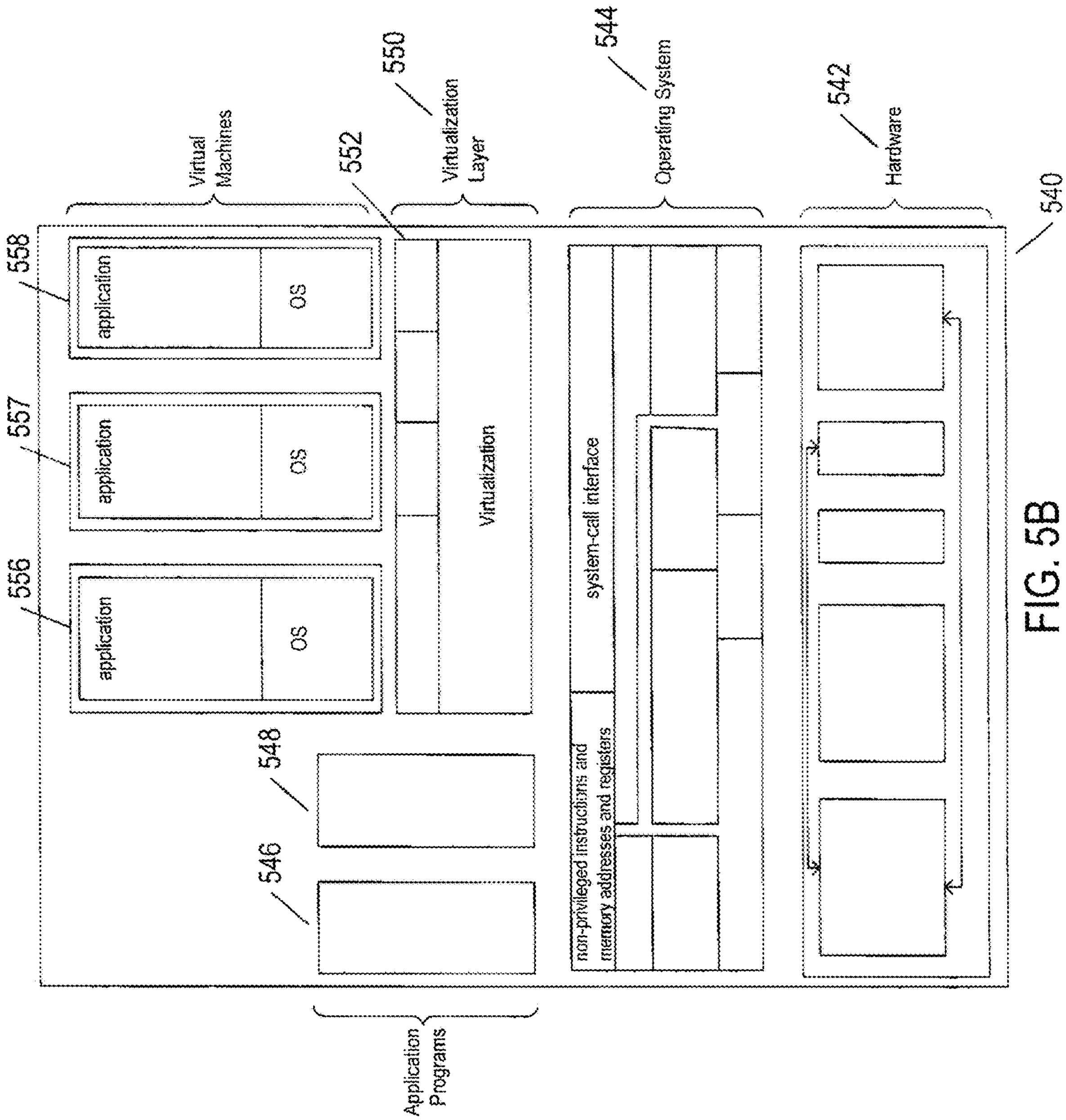

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
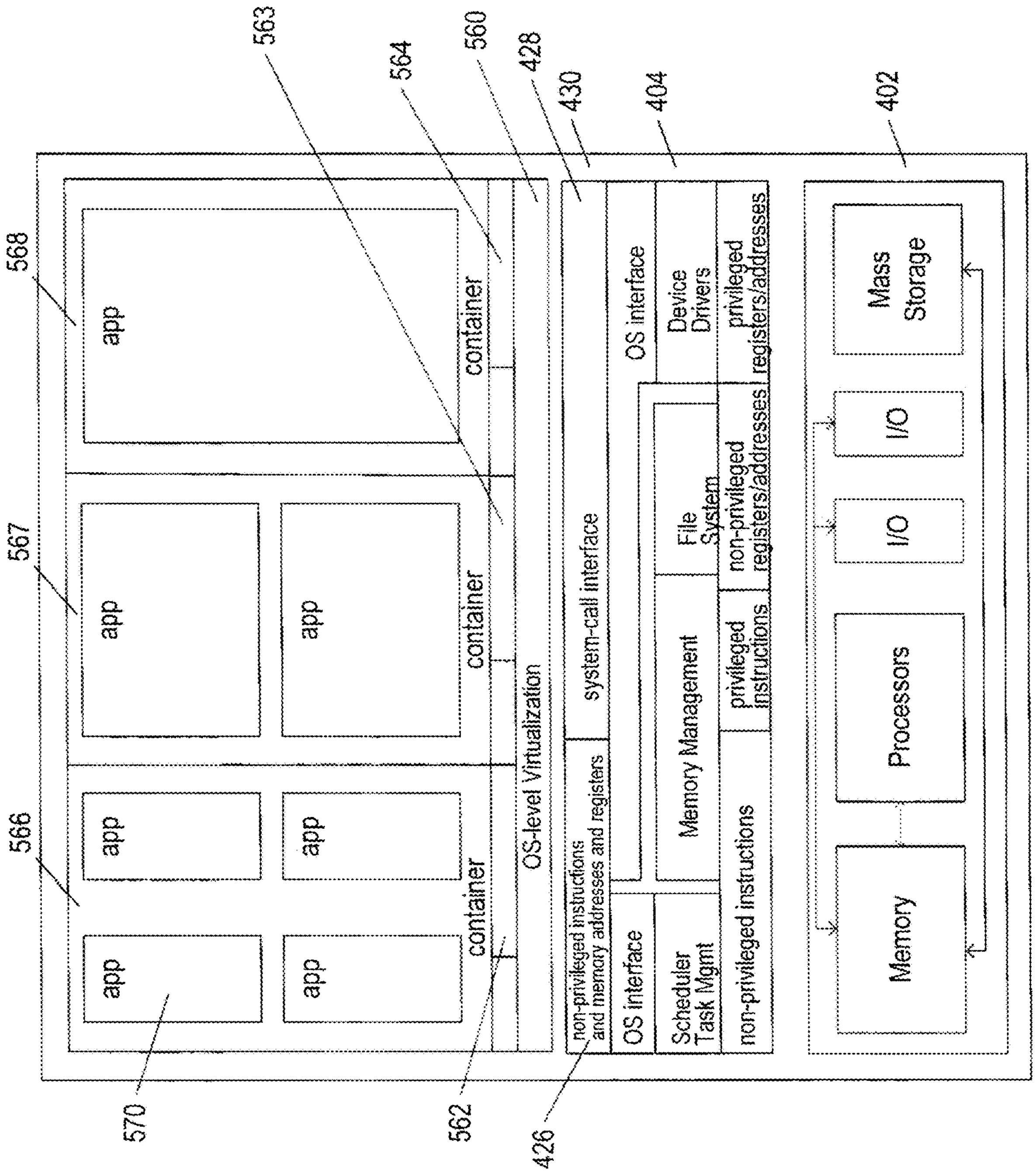

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example. OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
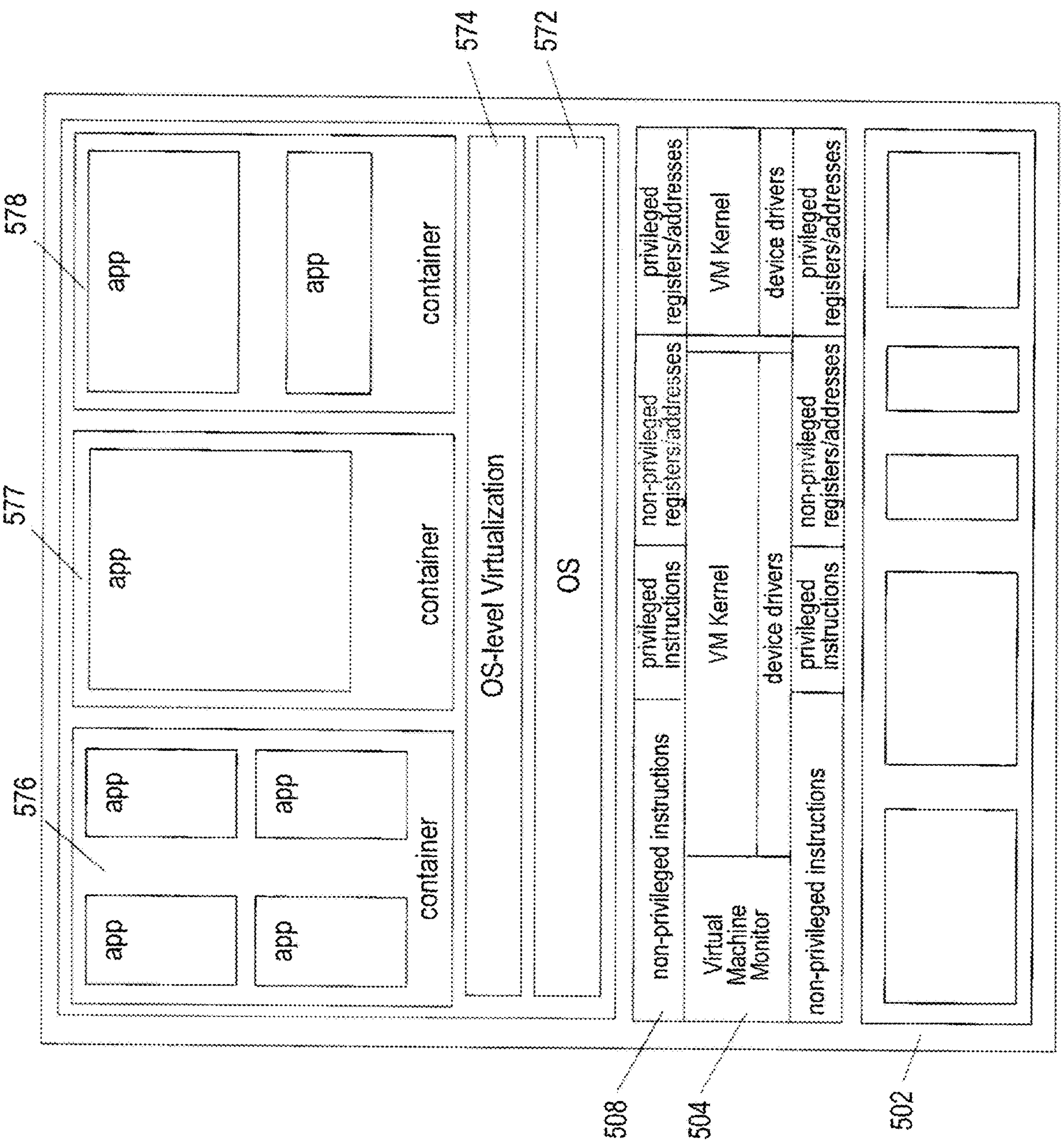

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
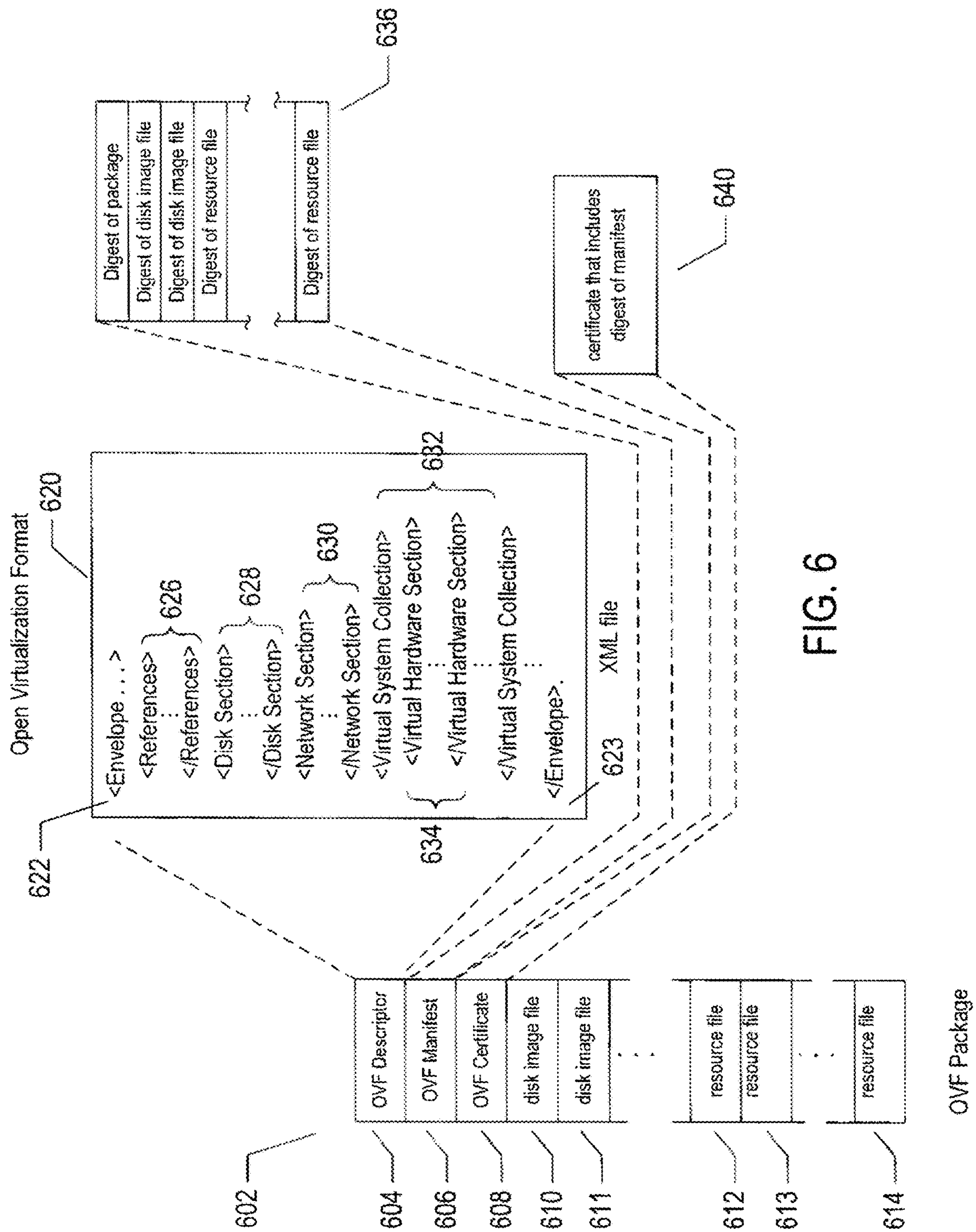
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
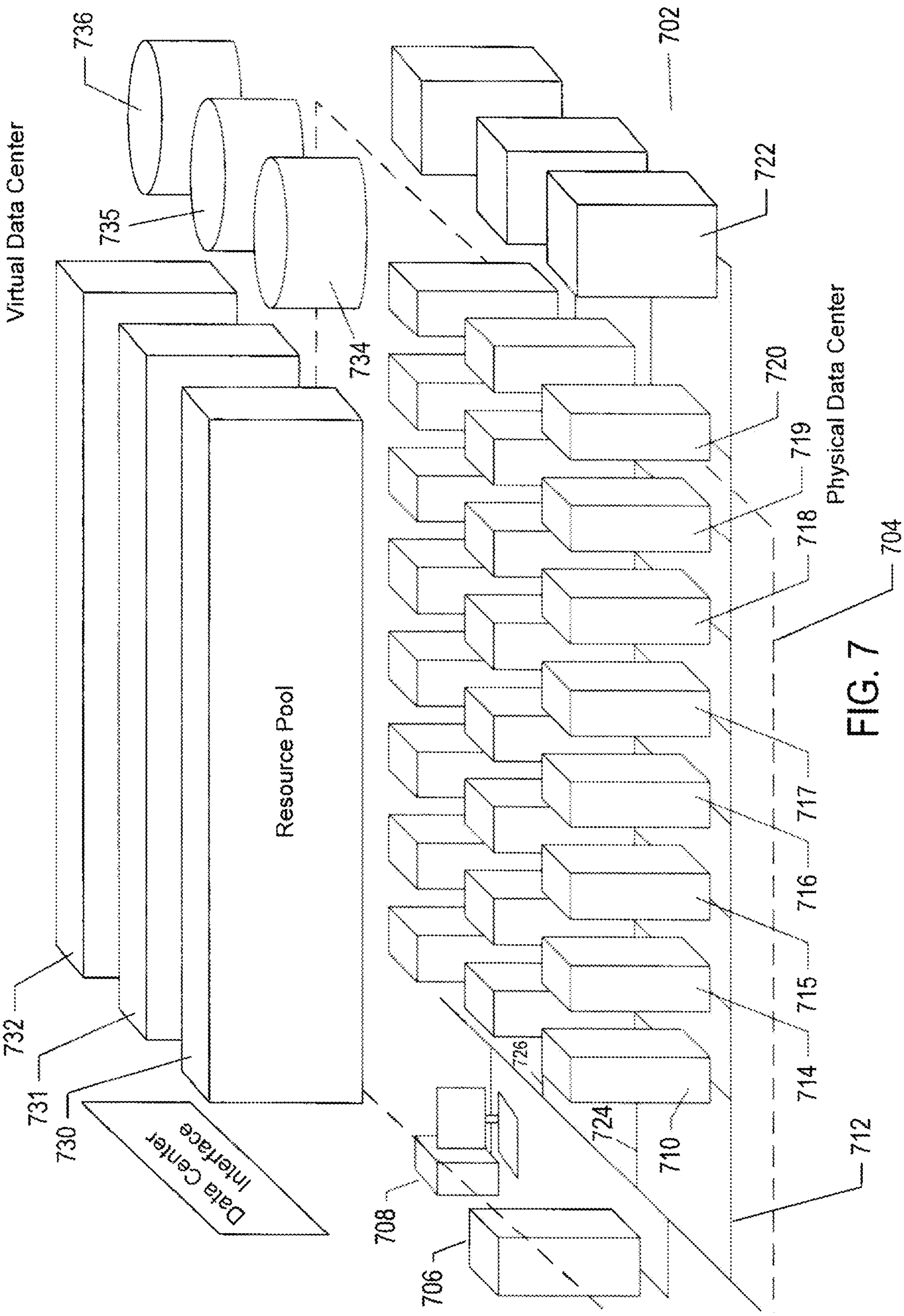
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
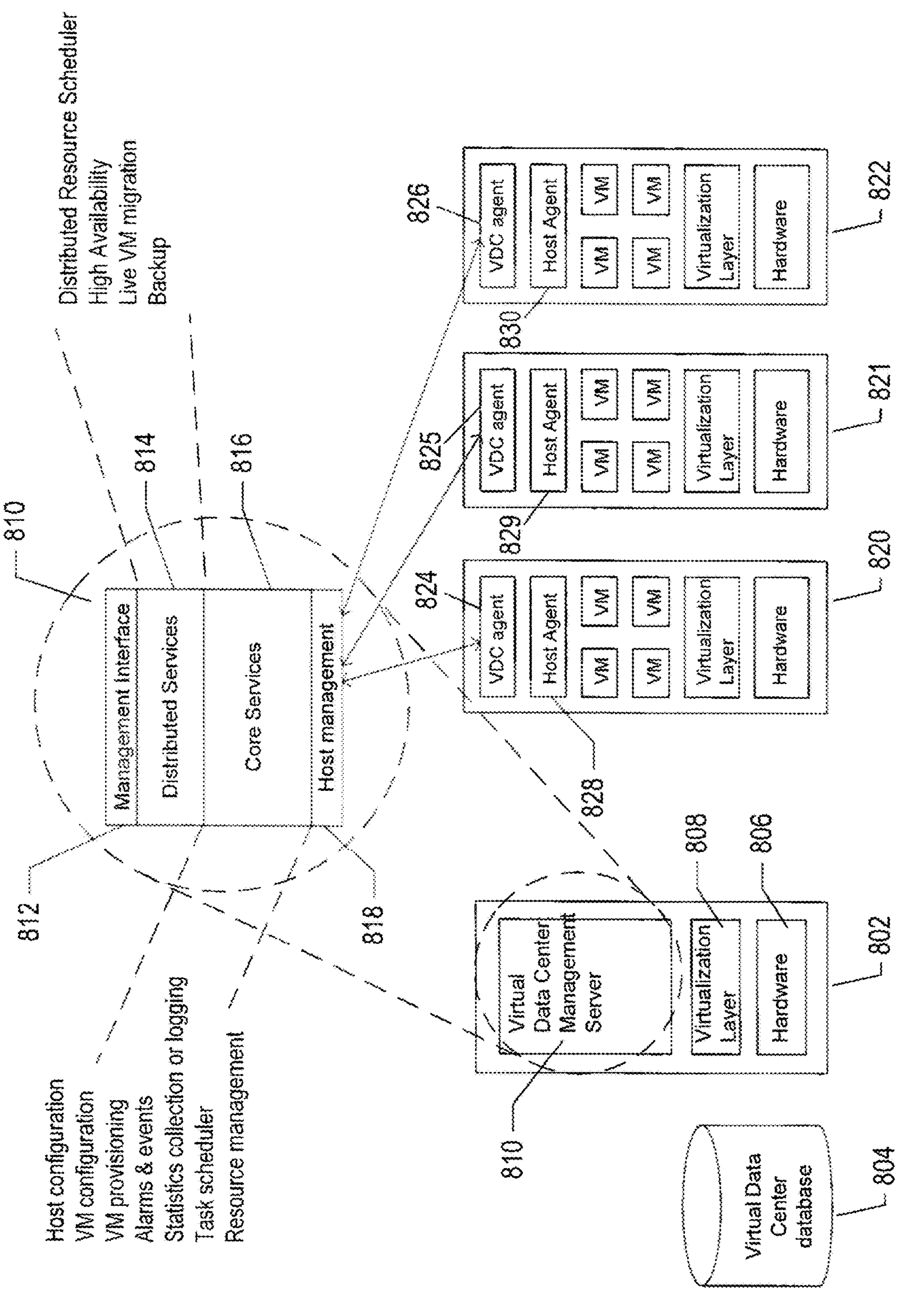
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
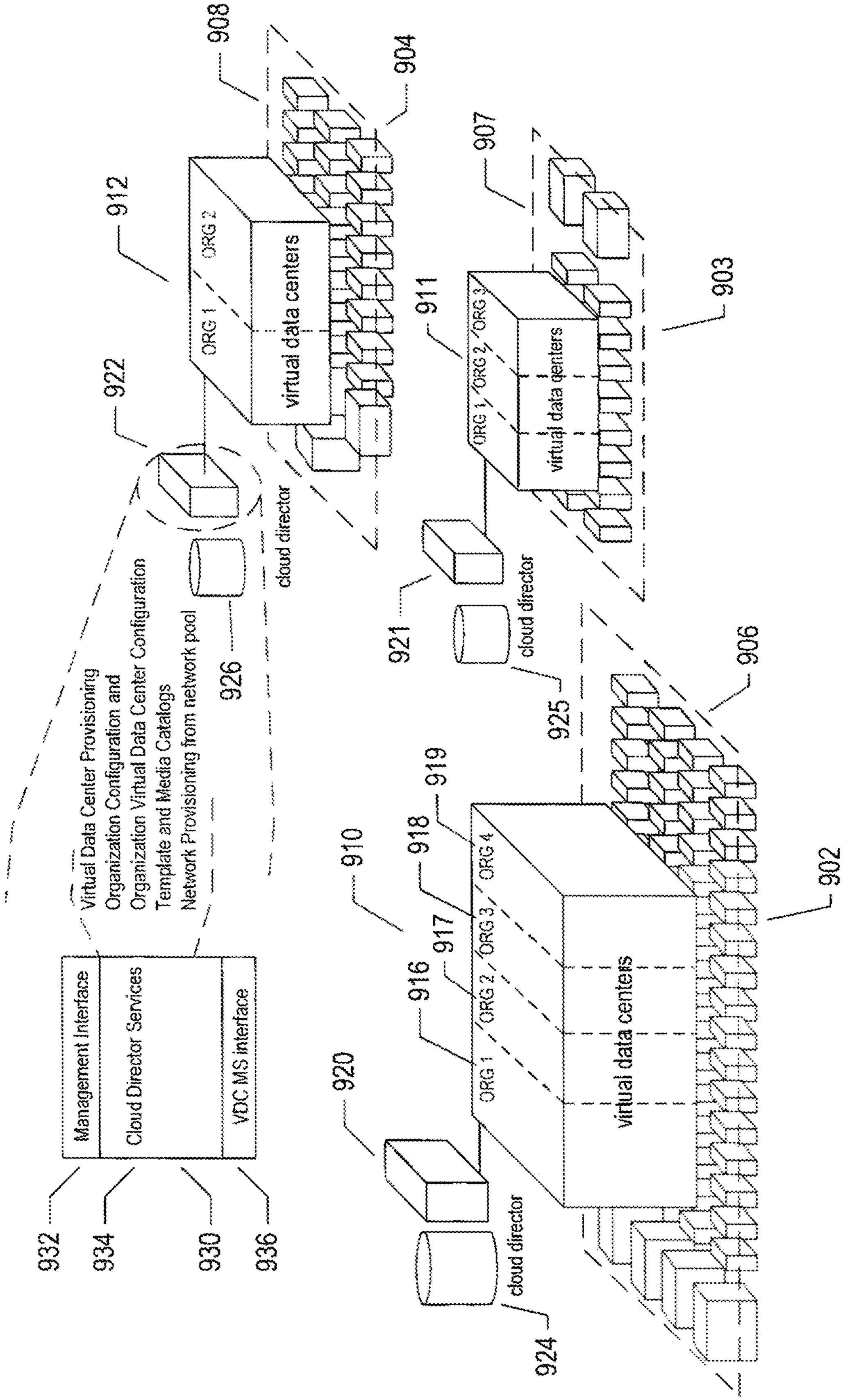
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
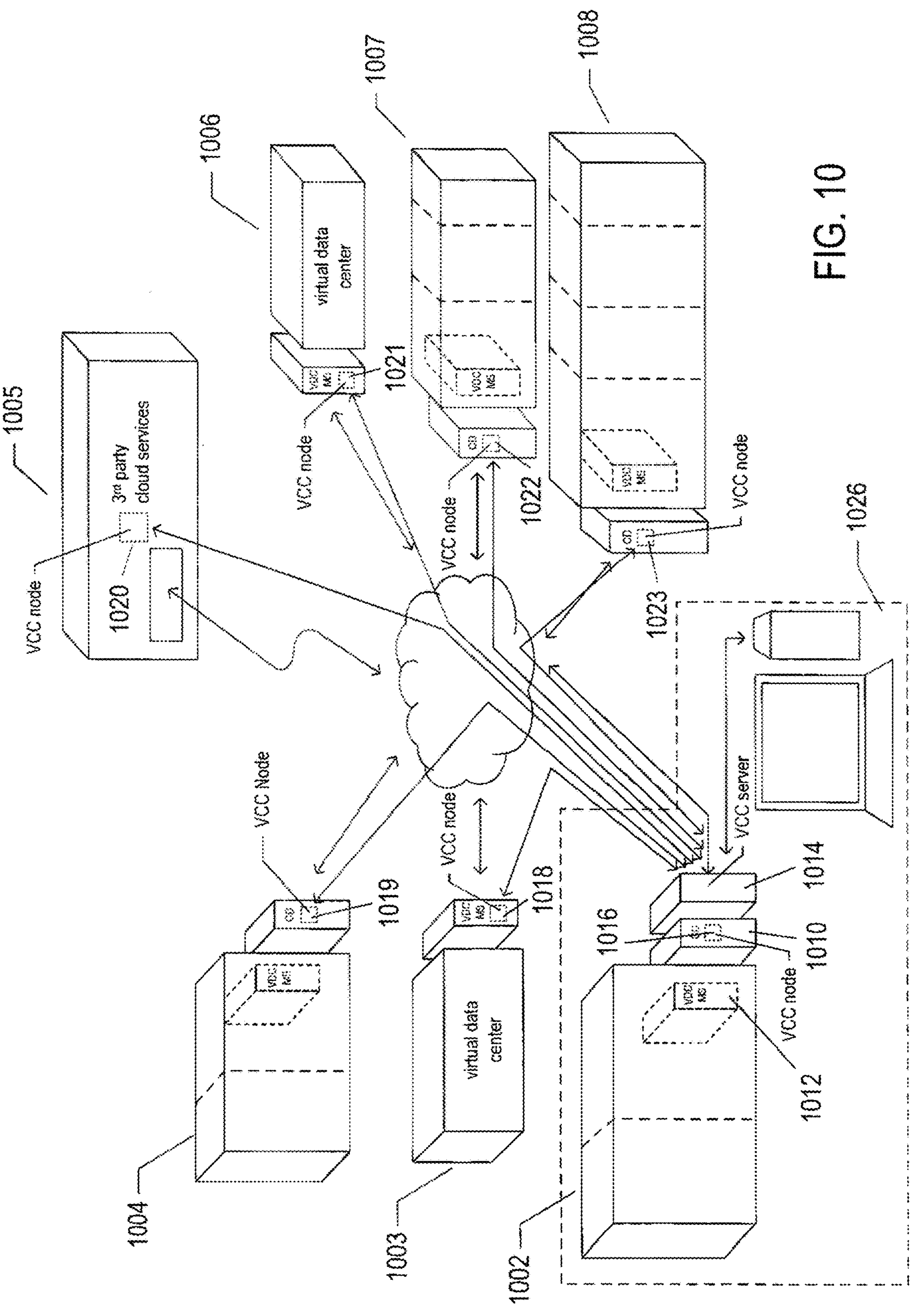
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal. PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
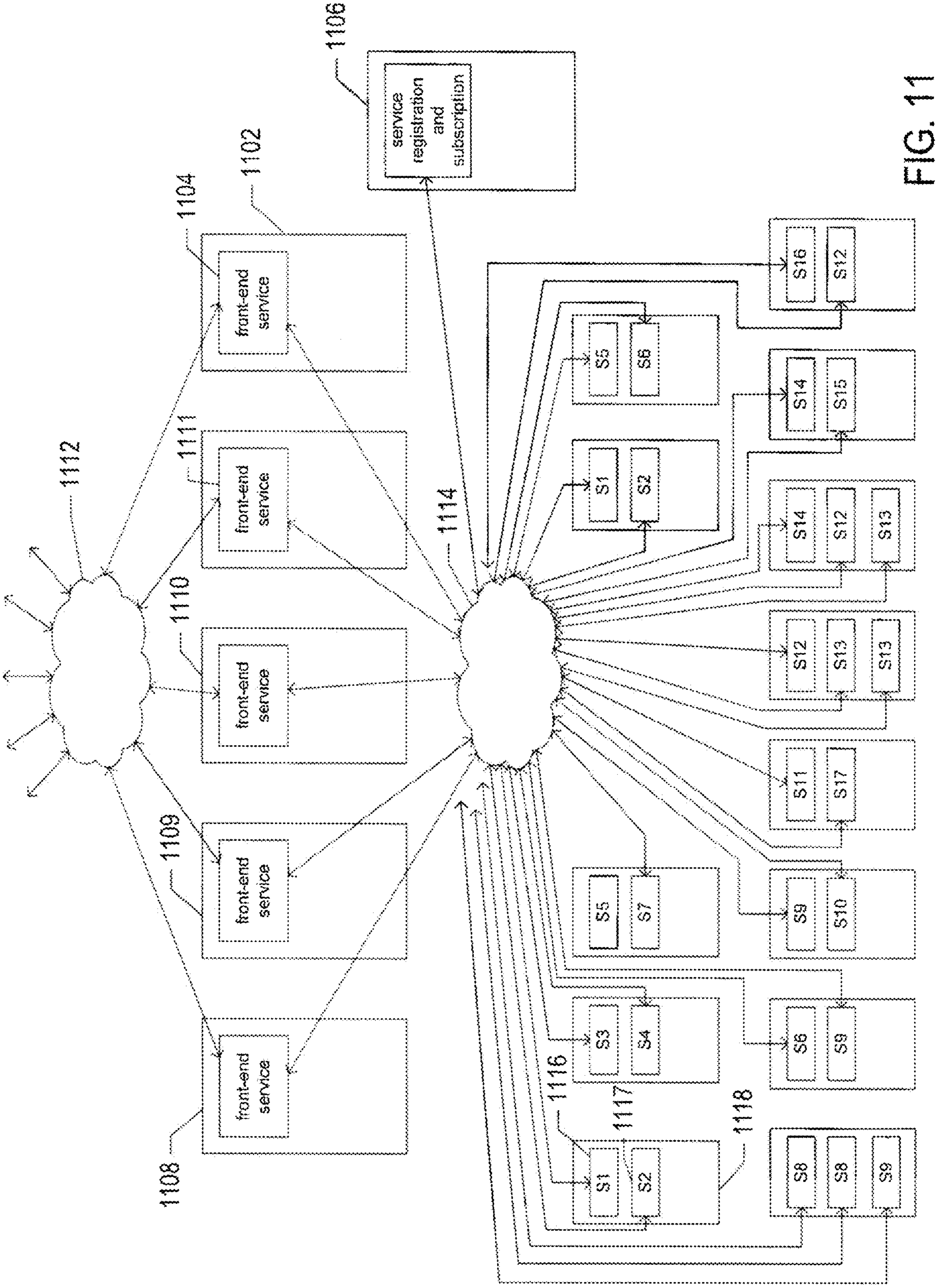
FIG. 11 illustrates a distributed service-oriented application.

Distributed Service-Oriented Applications, Node Attributes, Call Traces, and Metric Data FIG. 11 illustrates a distributed service-oriented application. In FIG. 11, a number of servers, such as server 1102, are shown within a distributed computer system. The servers run various different services, such as front-end service 1104. Services are executables that provide functionality to other computational entities through a service interface, such as a RESTful application programming interface ("API") accessed through network communications using REST-protocol requests, although many other communications protocols and programming interfaces can be used. A distributed service-oriented application can be considered to be a collection of various different services, running within virtual machines executing within servers of one or more distributed computer systems, that cooperate to implement a distributed application, although various different types of implementations are possible. The component services of the distributed application are often registered with a registration-and-subscription service 1106 to which other services can subscribe in order to receive updates with regard to the addition, removal, and changes to the array of available service components. In the example distributed service-oriented application illustrated in FIG. 11, a set of front-end-service instantiations 1104 and 1108-1111 communicate with remote clients and users through the Internet 1112 and communicate, via local-area networks and wide-area networks within the distributed computer system, with the many different service instantiations within the distributed computer system that together comprise the distributed service-oriented application, such as services 1116 and 1117 running within server 1118.

Figure 12A:
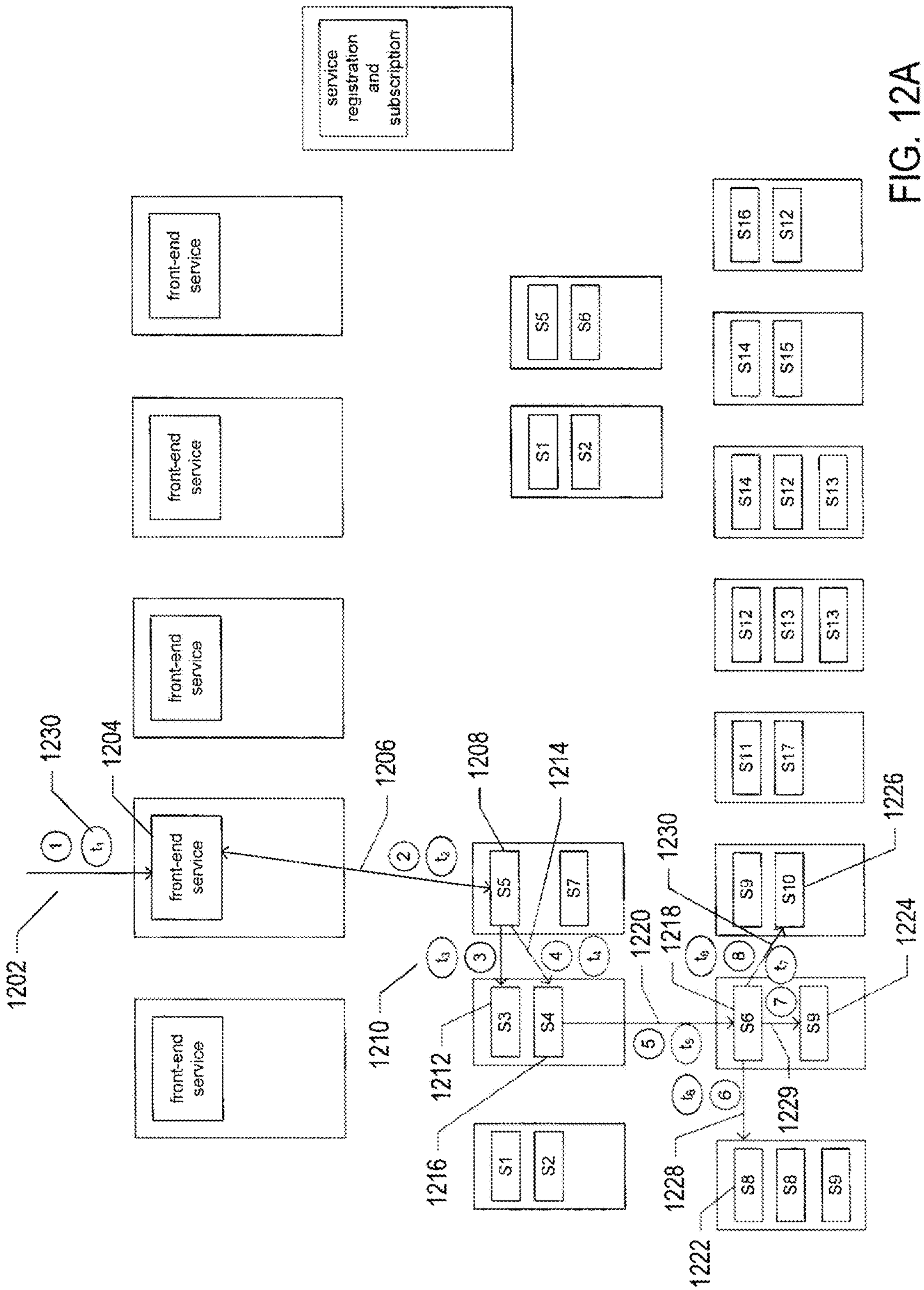
FIGS. 12A-B illustrate a sequence of service calls that implement a particular distributed-service-oriented-application API call or entrypoint.
Figure 12B:
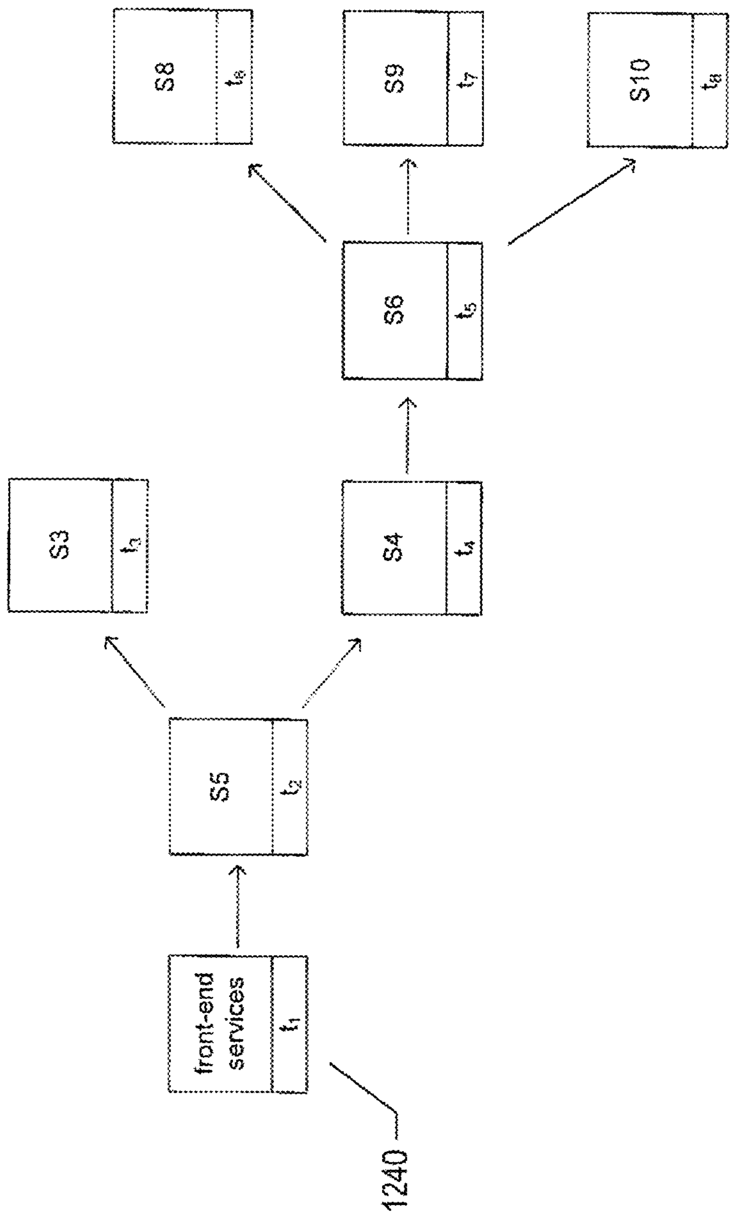

FIGS. 12A-B illustrate a sequence of service calls that implement a particular distributed-service-oriented-application API call or entrypoint. In a first step 1202, a remote user or client sends a request to the distributed service-oriented application, resulting in a call to one of the front-end-service instances 1204. The front-end-service instance, in a second step 1206, calls a component-service instance 1208 in order to launch execution of the distributed-service-oriented-application request-handling machinery for the received request. In FIG. 12A and in subsequent figures and discussions, the component services are referred to by alphanumeric labels, such as the label "S5" for the component service that includes the component-service instance 1208. In a third step 1210, component-service instance S5 calls component service S3 1212. In a fourth step 1214, component service S5 calls component-service instance S4 1216 which, in turn, calls component-service instance S6 1218 in a fifth step 1220. Component-service instance S6 then calls the additional component-service instances S8 1222, S9 1224, and S10 1226 in steps 1228, 1229, and 1230, respectively. Each of the various component services carry out certain tasks and functionalities that contribute to execution of the user or client request. For example, component-service instance S5 1208 may receive and queue the request, call component-service instance S3 1212 to authenticate and authorize the request, and then call component-service instance S4 1216 to parse and to carry out the requested task. Component-service instance S6 1218 may handle a particular type of task or set of tasks, and may call data-storage-and-retrieval component-service instance S8 1222, a data-analysis component-service instance S9 1224, and a linear-algebra-computation component-service instance S10 1226, as one example. Each component-service instance call shown in FIG. 12A is associated with a relative timestamp, such as relative timestamp 1230 associated with the initial call to the front-end service 1204.

FIG. 12B illustrates a directed graph that represents the service calls, shown in FIG. 12A, that together comprise implementation of the distributed-service-oriented application API call or entrypoint discussed with reference to FIG. 12A. In the case of the directed graph, or call trace, shown in FIG. 12B, the graph is generalized to represent calls made to services, rather than particular service instances. A service instance is a particular service executable running on a particular hardware device, while a service is the logical service, which may be implemented by one or more service instances. The instances that together comprise a particular service are referred to as a "node." For example, in FIG. 11, five different front-end-service instances together implement the front-end service, or front-end-service node. The root node of the directed graph 1240 represents the initial call to the front-end service 1204. Each remaining node in the directed graph represents a service component called by another service component of the distributed service-oriented application. Each node contains an indication of the service component as well as a relative timestamp for the initial call to the service component. The directed graph shown in FIG. 12B is a relatively simple directed graph. However, in more complex distributed-service-oriented application API-call implementations, the directed graph may contain cycles and a larger number of nodes. The relative timestamps indicate the time order of service calls.

Figure 13A:
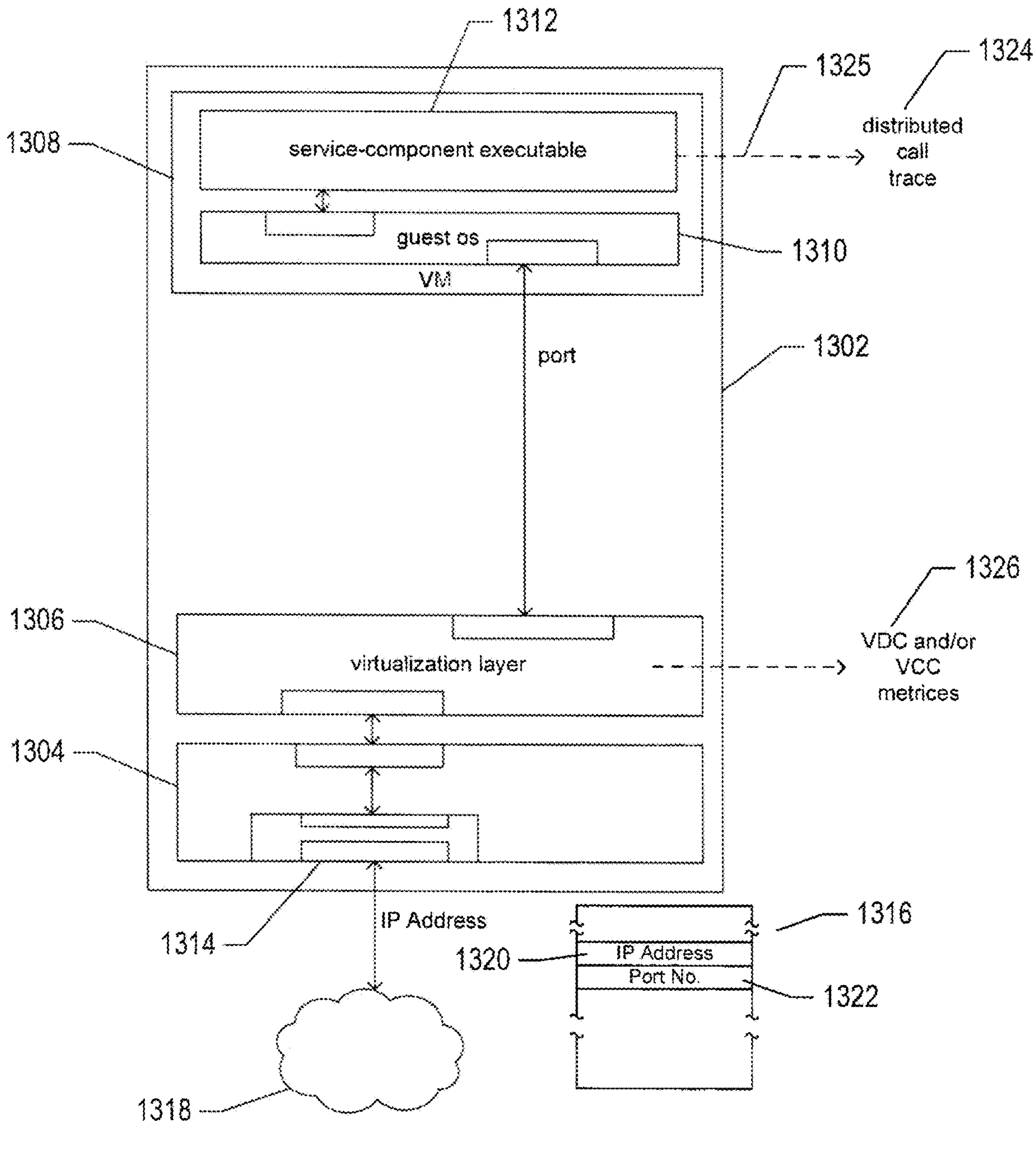
FIGS. 13A-B illustrate service components and service nodes.
Figure 13B:
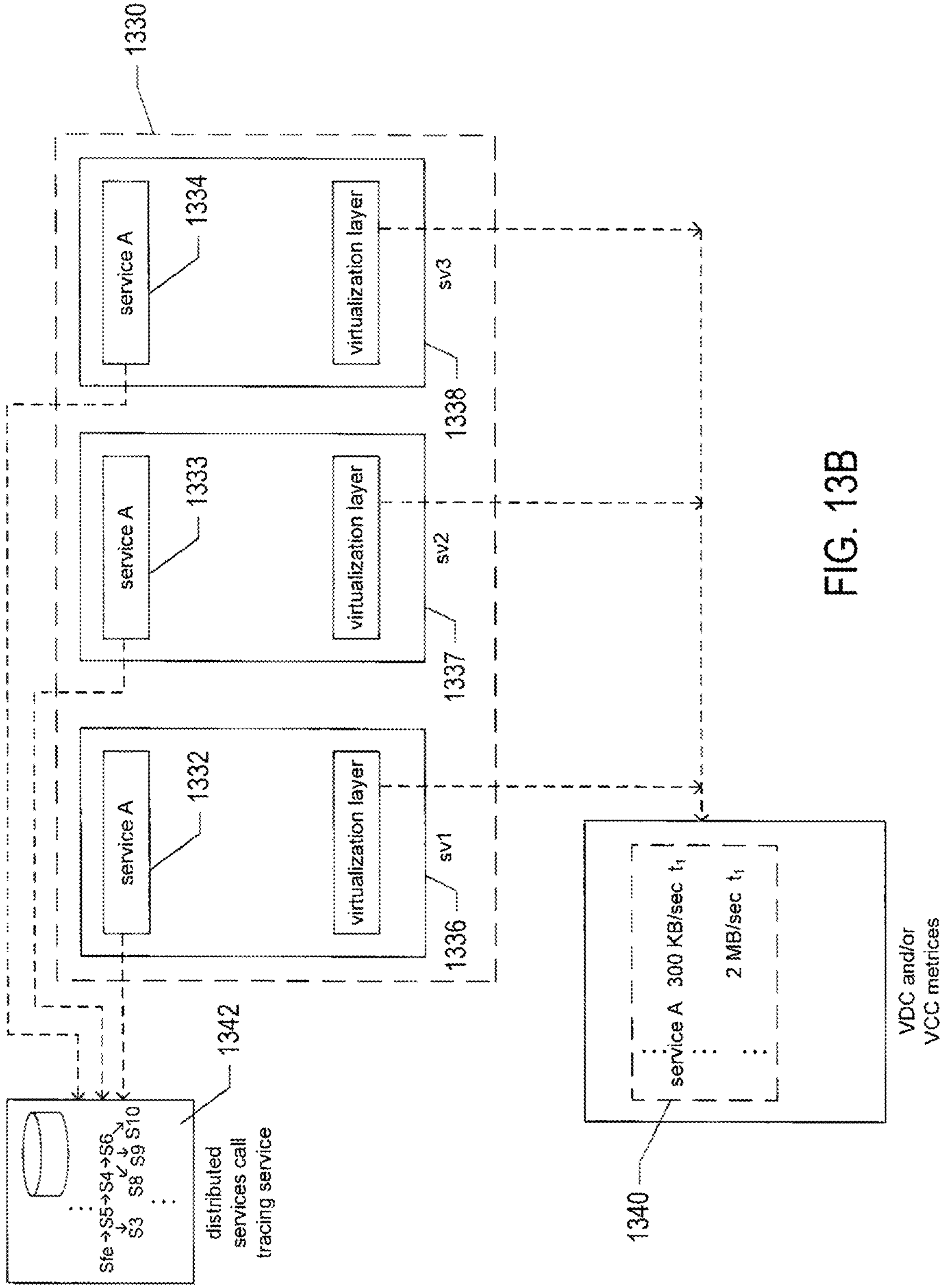

FIGS. 13A-B illustrate service components and service nodes. FIG. 13A illustrates a service component within a server of a distributed computing system. The server 1302 includes a hardware layer 1304, a virtualization layer 1306, and a virtual machine 1308, executing within the execution environment provided by the virtualization layer 1306. Of course, a server is a complex device that includes many thousands of hardware and computer-instruction-implemented components, not shown in high-level illustrations, such as FIG. 13A. Within the virtual machine, a guest operating system 1310 executes and provides an execution environment for a service-component executable 1312. The hardware layer 1304 includes one or more communications interfaces, such as communications interface 1314, through which the server computer exchanges messages, such as message 1316, with remote computational entities via one or more local networks 1318 and, in some cases, wide-area networks. Network messages, for commonly used communications hardware and protocols, generally include a target Internet-protocol address 1320, which routes the messages to the communications interface 1314, as well as a port number 1322, which routes the message through the virtualization layer and guest operating system to a particular application, such as the service-component executable 1312. The service-component executable can carry out communications with many different remote computational entities, including, as further discussed below, a distributed call-trace service 1324. Dashed arrow 1325 represents an exchange of messages via the many internal components of the server and many external components between the server and the hardware on which the distributed call-trace service executes. Similarly, the virtualization layer can carry out communications with many different remote computational entities, including a VDC or VCC management server and distributed metrics-collection services 1326.

FIG. 13B illustrates a service node. A service node within the distributed computer system is a collection of the instances of the particular service, including the portions of the underlying server that support execution of the service instances. For example, in FIG. 13B, service node 1330 includes three service-component executables 1332-1334 running on servers 1336-1338. The VDC or VCC management servers and/or distributed metrics collection service can collect aggregate metrics 1340 for the service node and the distributed call-tracing service may collect call traces 1342 for service nodes. A service node is often a dynamic entity, since service-node instances may be shut down and removed, for example, under low workload conditions, and new service-node instances may be launched and initialized, for example, when workloads increase past a reasonable aggregate load on the current service-node instances. The service node is logically like a labeled container that can hold arbitrary numbers of service-node instances.

Figure 14A:
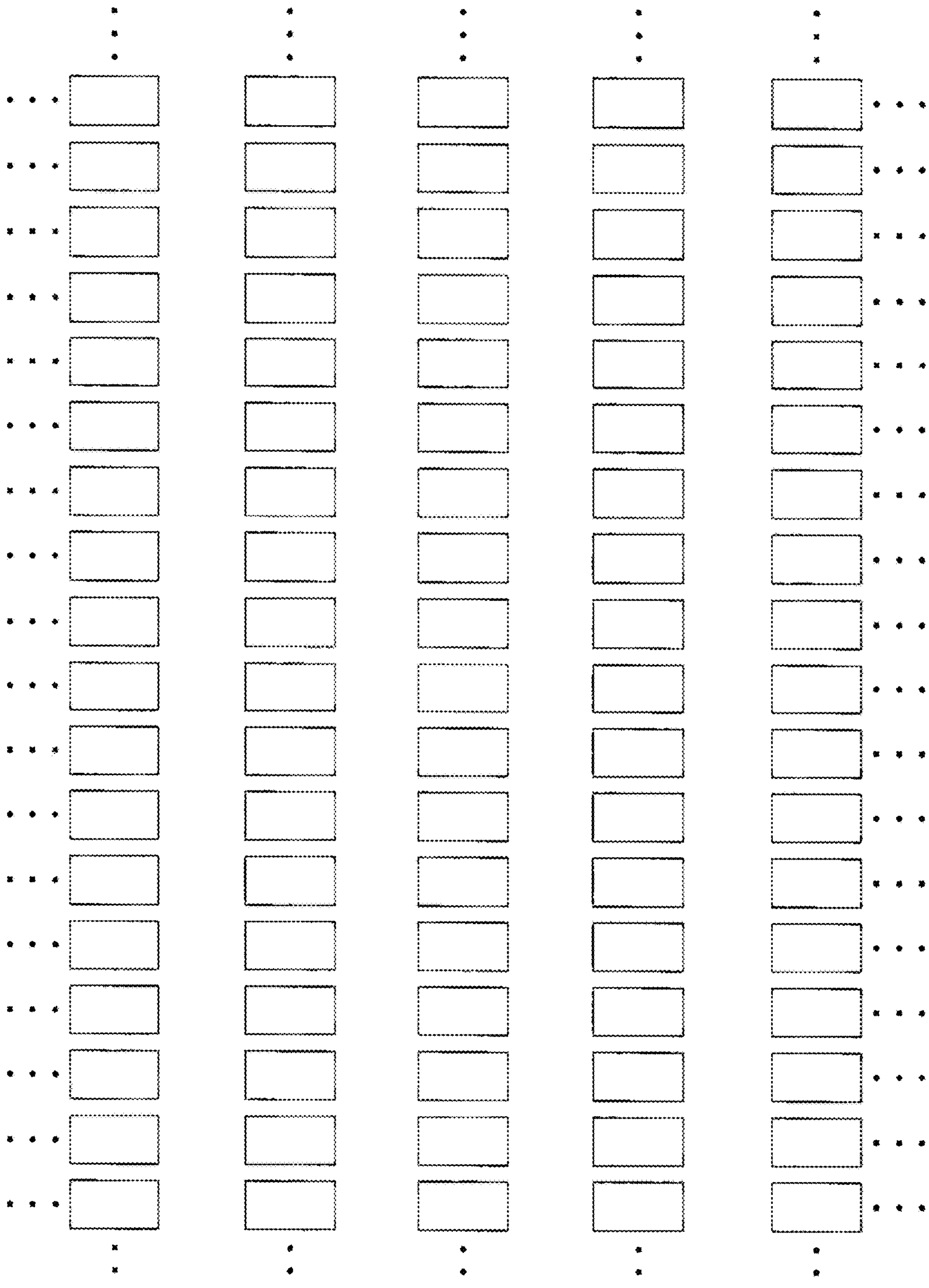
FIGS. 14A-C illustrate the scale of certain distributed-service-oriented-applications.
Figure 14B:
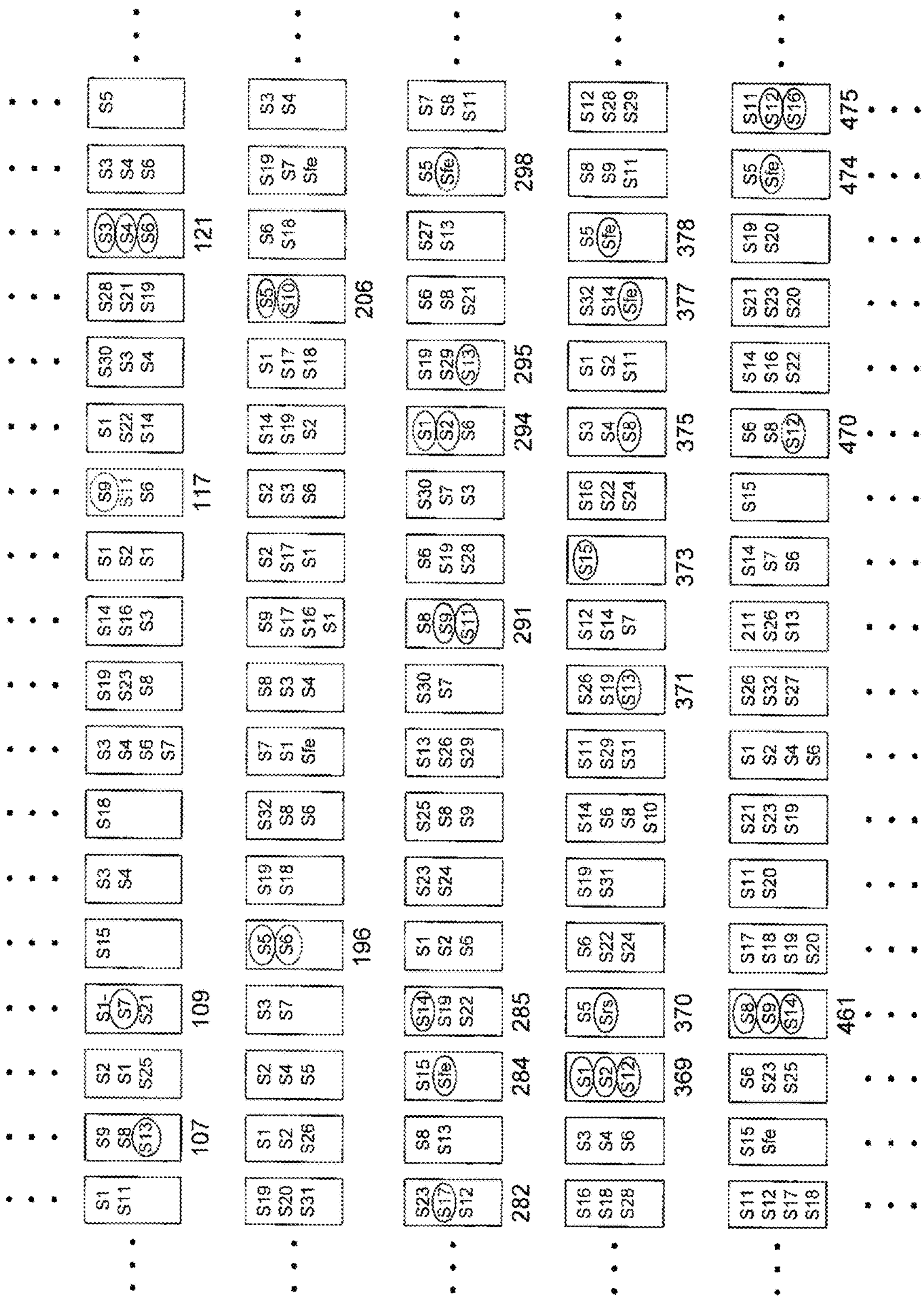
Figure 14C:
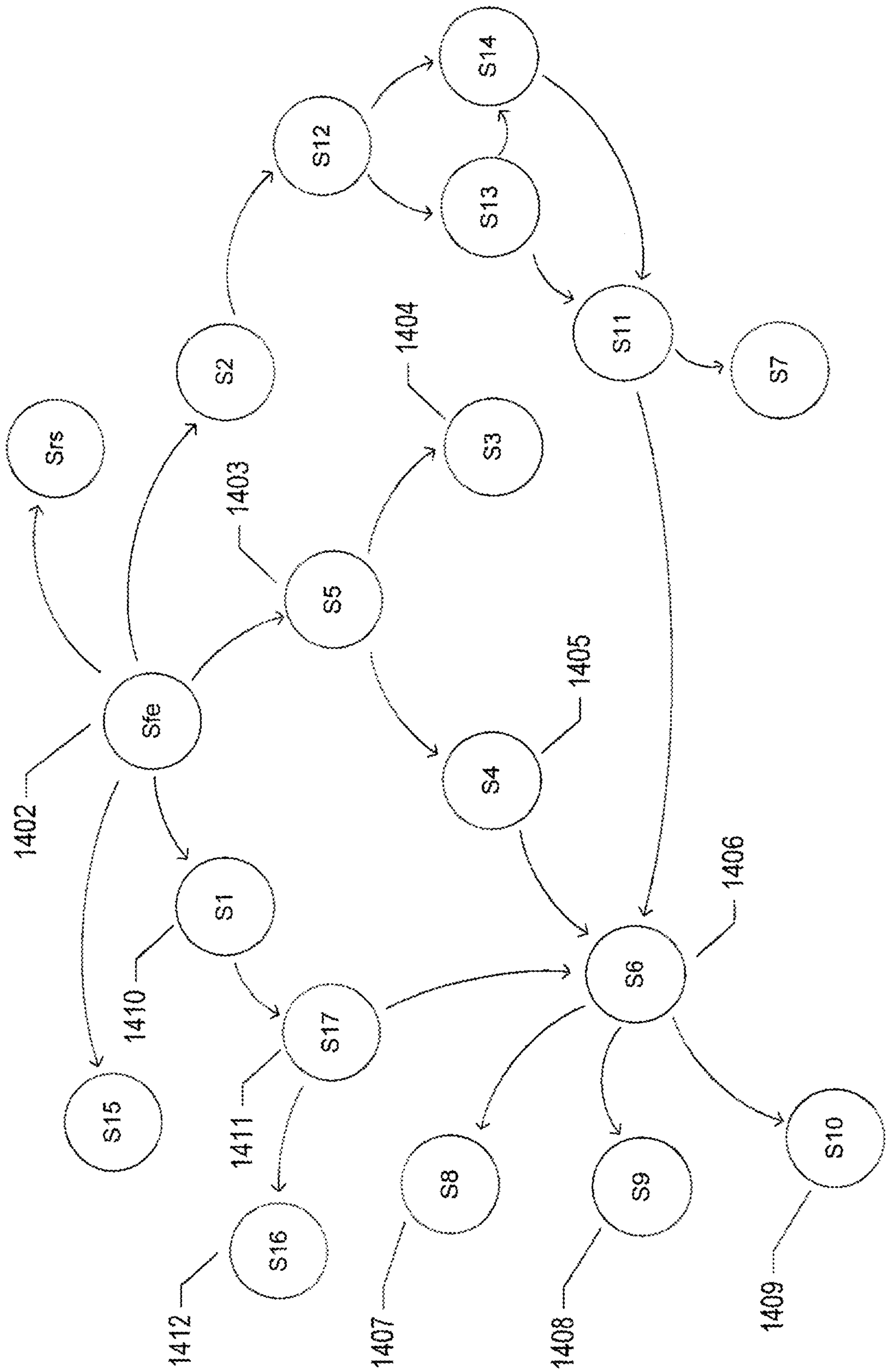

FIGS. 14A-C illustrate the scale of certain distributed-service-oriented-applications. In the simple example shown in FIG. 11, there are only a relatively small number of servers and component-service instances present. However, consider the more realistic computational environment inhabited by one or more distributed service-oriented applications shown in FIG. 14A. In a realistic distributed-computing-system environment, there may be literally hundreds or thousands of server computers supporting concurrent execution of tens, hundreds, or more different distributed service-oriented applications. As shown in FIG. 14B, the service-component instances for the distributed service-oriented application discussed with reference to FIG. 11 may be widely dispersed throughout hundreds or thousands of servers that include many additional instances of the same types of service components employed by the distributed service-oriented application used by other distributed service-oriented applications. It is even possible that multiple distributed service-oriented applications share particular instances of certain of the service components. The service-component instances associated with the distributed service-oriented application discussed with reference to FIG. 11 are marked with surrounding ellipses in FIG. 14B. It would be a challenging task to identify them, among hundreds or thousands of other instances of the same types of services, let alone figure out how they cooperate to provide the distributed-service-oriented-application API.

FIG. 14C illustrates an example directed graph representing the topology of a distributed service-oriented application. Each node in the graph corresponds to a service node and the arrows indicate calls made by service nodes to other service nodes. The directed graph may include many different subgraphs, such as a sub graph corresponding to the call trace shown in FIG. 12B, for the various different entrypoints of the distributed-services-oriented-application API. For example, the subgraph corresponding to the call trace shown in FIG. 12B consists of nodes 1402-1409. A different entrypoint might be implemented by the subgraph comprising nodes 1402 and 1410-1412. The problem domain to which the current document is directed is the problem of attempting to determine causes of, or subsets of the components of a distributed computer system relevant to, particular operational anomalies detected from metric data in complex distributed-computing environments, including distributed-computing environments supporting large, complex, distributed, service-oriented applications. Currently available diagnostic methods may be inefficient, provide unmanageably complex user interfaces, and may lack sufficiently focused, analytical approaches to providing productive suggestions for potential causes of anomalous operational behaviors of distributed-computer systems and distributed-computer-system components.

Figure 15A:
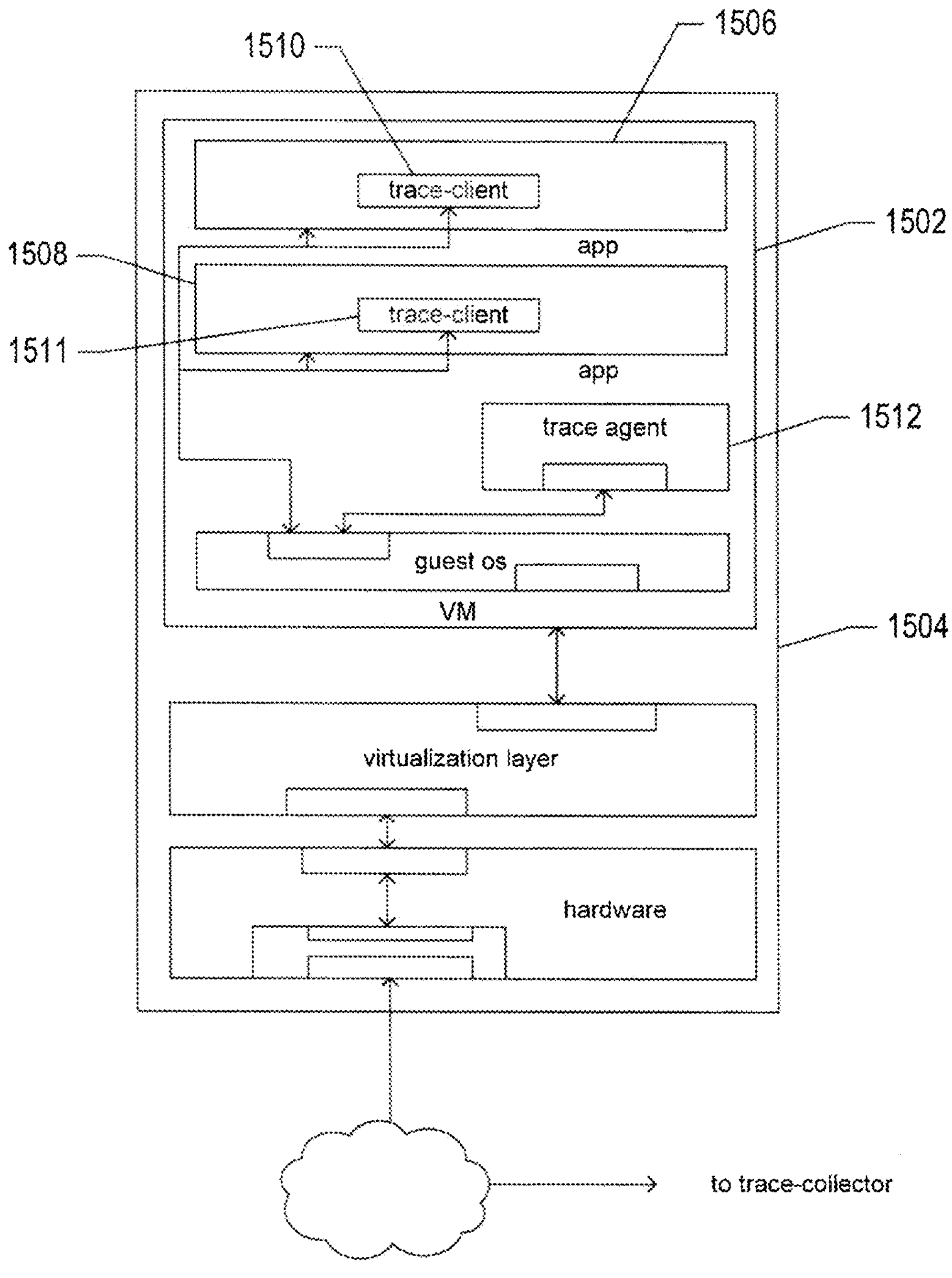
FIGS. 15A-B illustrate components of a call-tracing service.
Figure 15B:
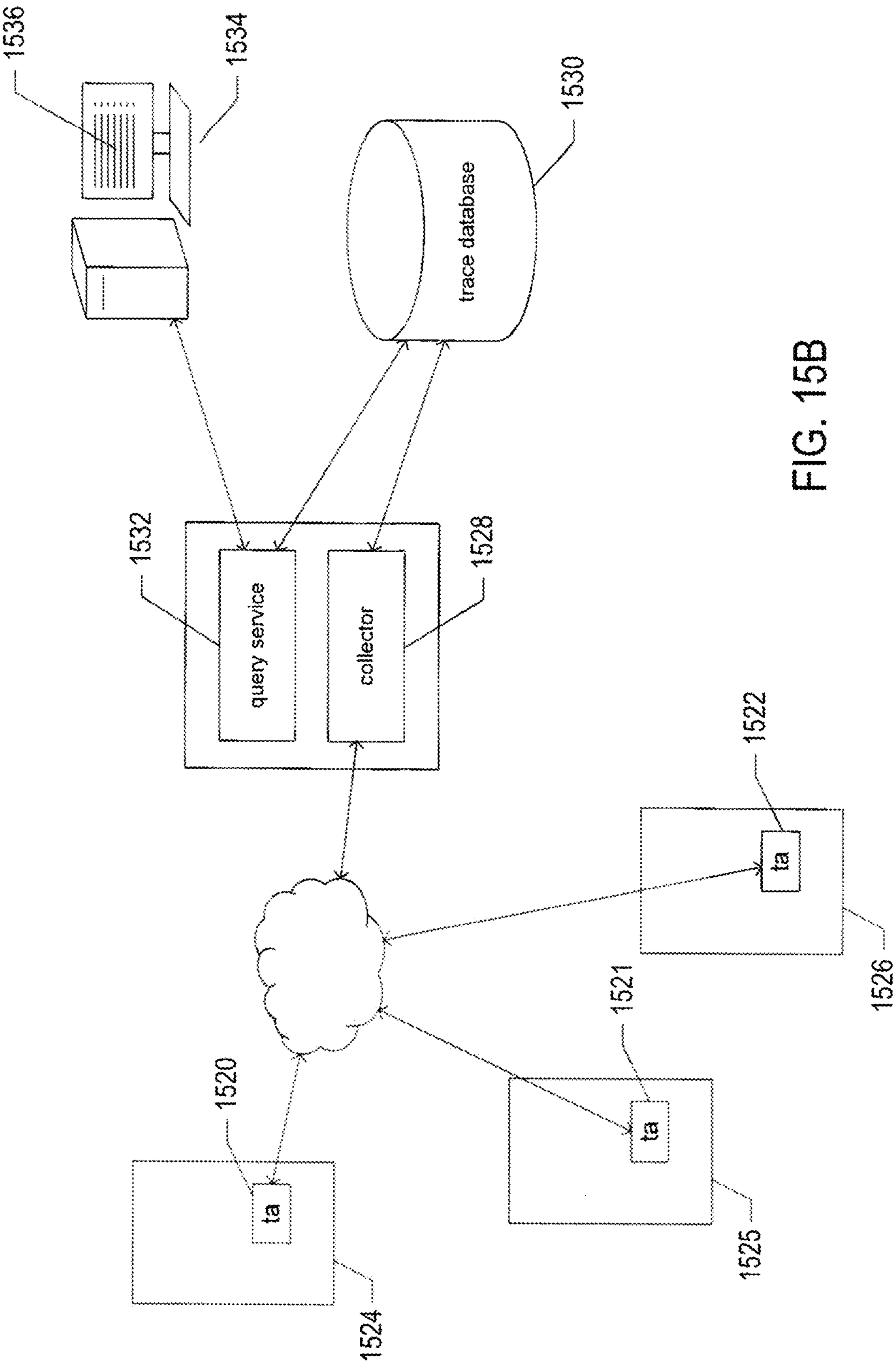

FIGS. 15A-B illustrate components of a call-tracing service. FIG. 15A illustrates, using the same illustration conventions used in FIG. 13A, the call-tracing components included in servers and other computational platforms supporting the execution of distributed-service-oriented-application components. Virtual machine 1502 within server 1504 supports execution of two different service instances 1506 and 1508. Each service instance, or service application, includes a trace client 1510-1511. The trace clients communicate with a trace agent 1512 that runs in the execution environment provided by the virtual machine 1502. The trace clients represent generally minimal instrumentation included in service applications to support call tracing. Many modern service applications are designed and developed to support call tracing, and include generalized trace clients that can communicate with a variety of different types of trace agents provided by different call-tracing services.

FIG. 15B illustrates additional components of a call-tracing service. The trace agents 1520-1522 in multiple servers 1524-1526 that support execution of a distributed service-oriented application communicate with a centralized trace collector 1528 that collects and processes trace data received from the trace agents and stores the processed data in a trace database 1530. The trace collector may be a single executable or may be a distributed application. A query service 1532 accesses the trace database on behalf of remote clients 1534 to display traces 1536 corresponding to the submitted queries. Thus, for example, a system administrator working to understand some type of operational anomaly detected within a distributed computer system may submit a query to the query service for particular subsets of the traces collected the tracing service that the system administrator believes to be relevant to the operational anomaly.

Figure 16A:
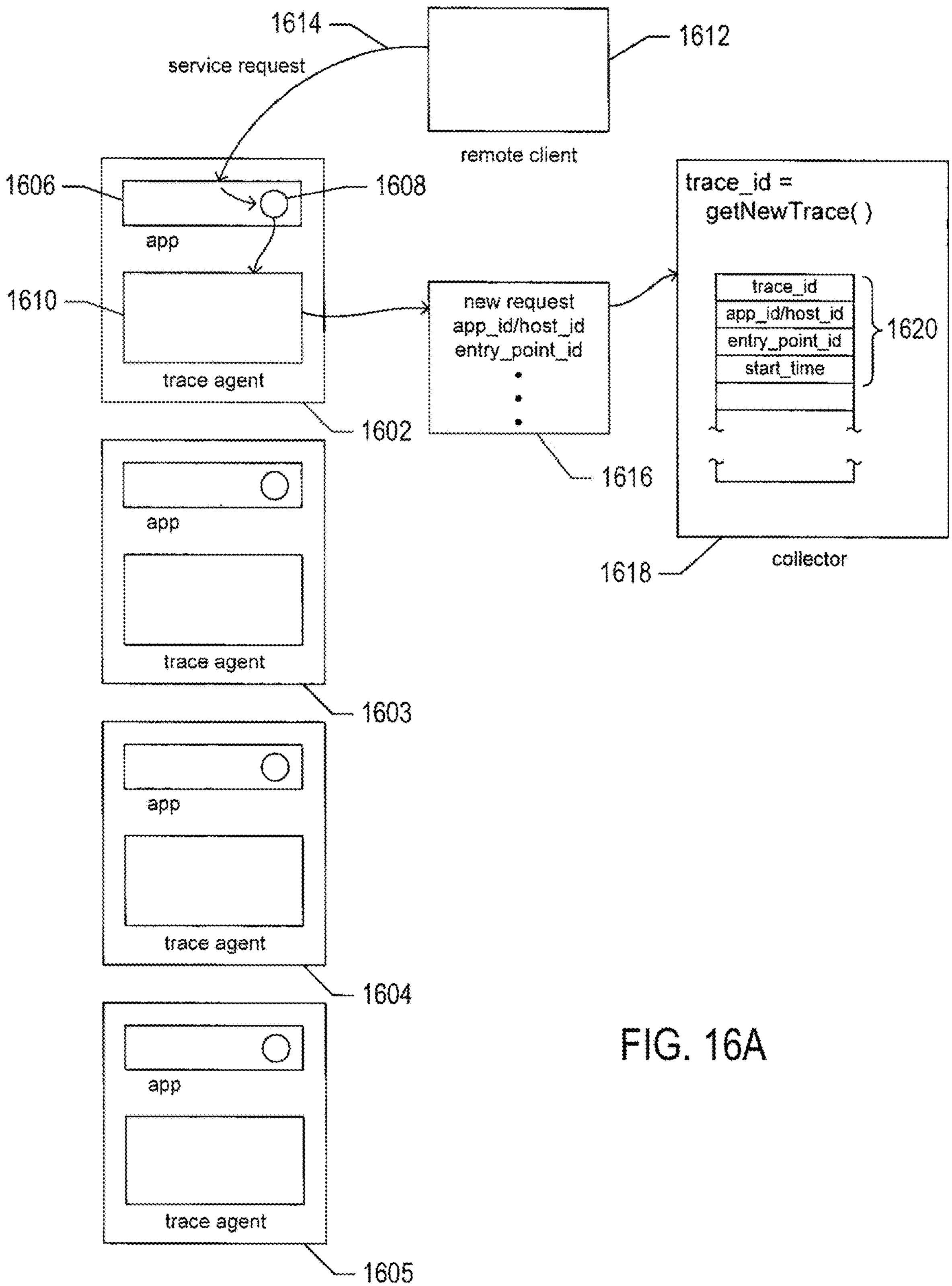
FIGS. 16A-H illustrate how the tracing service, discussed with reference to FIGS. 15A-B, collects a call trace.
Figure 16B:
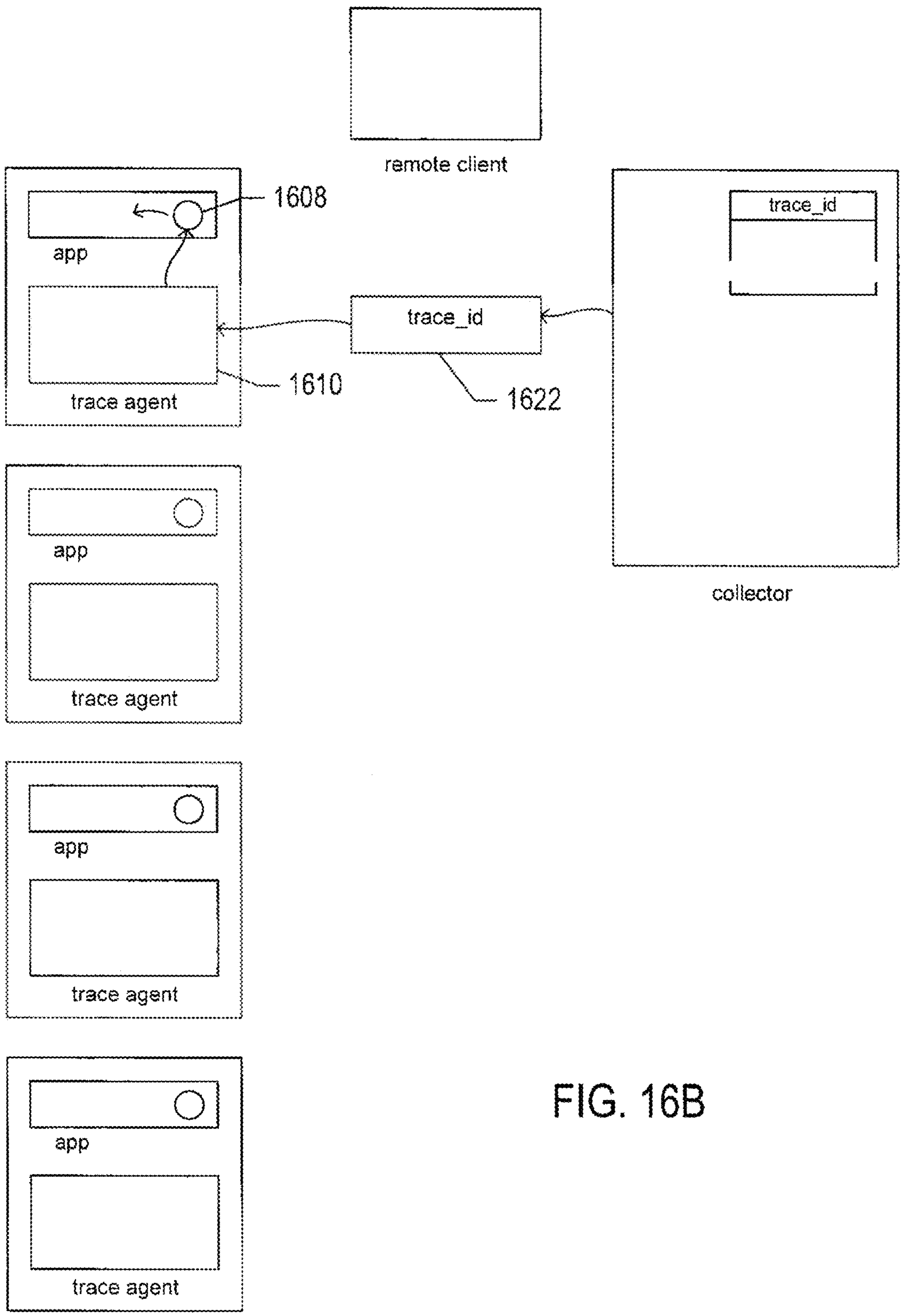

FIGS. 16A-H illustrate how the tracing service, discussed above with reference to FIGS. 15A-B, collects a call trace. FIGS. 16A-H all use the same illustration conventions, next described with respect to FIG. 16A. FIG. 16A shows four different servers 1602-1605 that each includes a service instance 1606 containing a trace client 1608 and a trace agent 1610. As shown in FIG. 16A, a remote client of a distributed service-oriented application 1612 requests a service, as represented by curved arrow 614. When the service instance 1606 receives the request, the service instance invokes the trace client 1608 to send tracing information related to the service request to the trace agent 1610. The trace agent packages the information into a new-request message 1616 that is transmitted to the trace collector 1618 of a call-tracing service. The new-request message may contain an indication that the message is a new-request message, identifiers for the service application, host server computer, and the called distributed-service-oriented-application entrypoint, a timestamp indicating the time that the service request was received, and whatever additional information is collected by the trace client and trace agent. The trace collector launches a new call trace, including generating a unique trace identifier for the new call trace, and stores information extracted from the new-request message into a first call-trace frame 1620 stored within memory, a persistent store, or both memory and a persistent store, depending on the implementation. As shown in FIG. 16B, the trace collector returns the trace identifier 1622 to the trace agent 1610 which, in certain implementations, returns the trace identifier to the trace client 1608 so that the trace identifier can be included in subsequent messages relevant to the trace sent by various trace agents within servers supporting execution of service instances of the distributed service-oriented application that cooperate to execute the service request on behalf of the remote client.

Figure 16C:
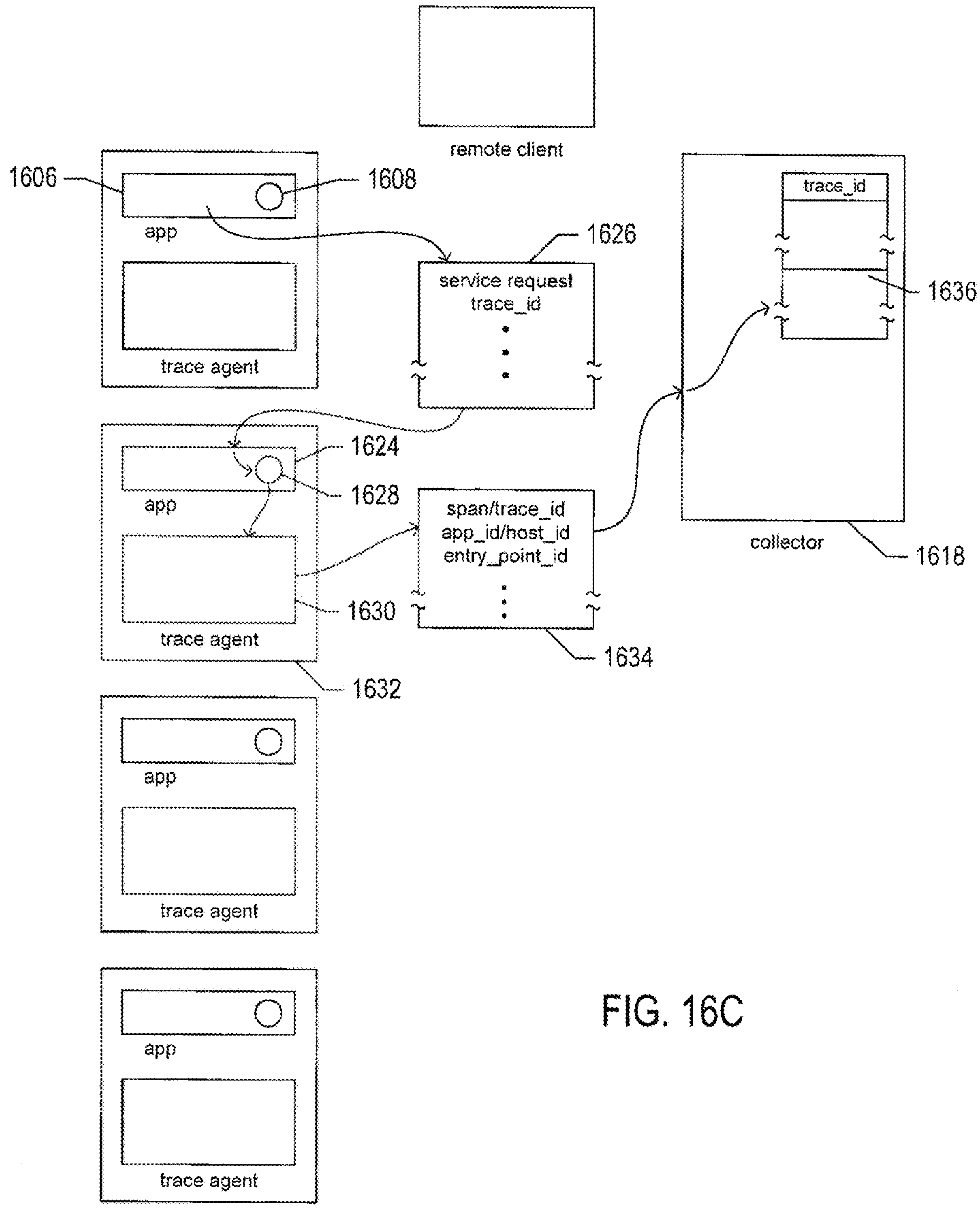
Figure 16D:
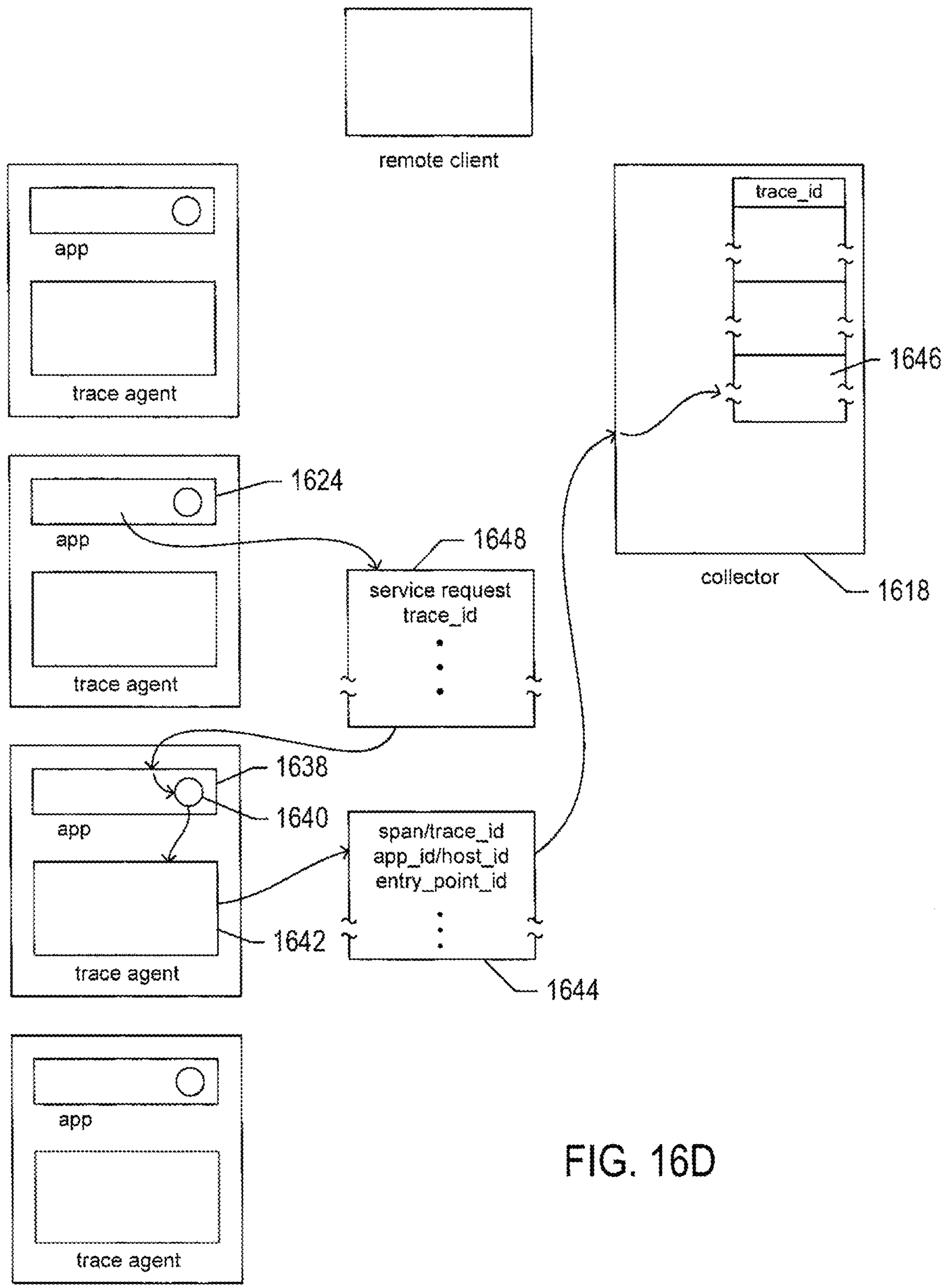
Figure 16E:
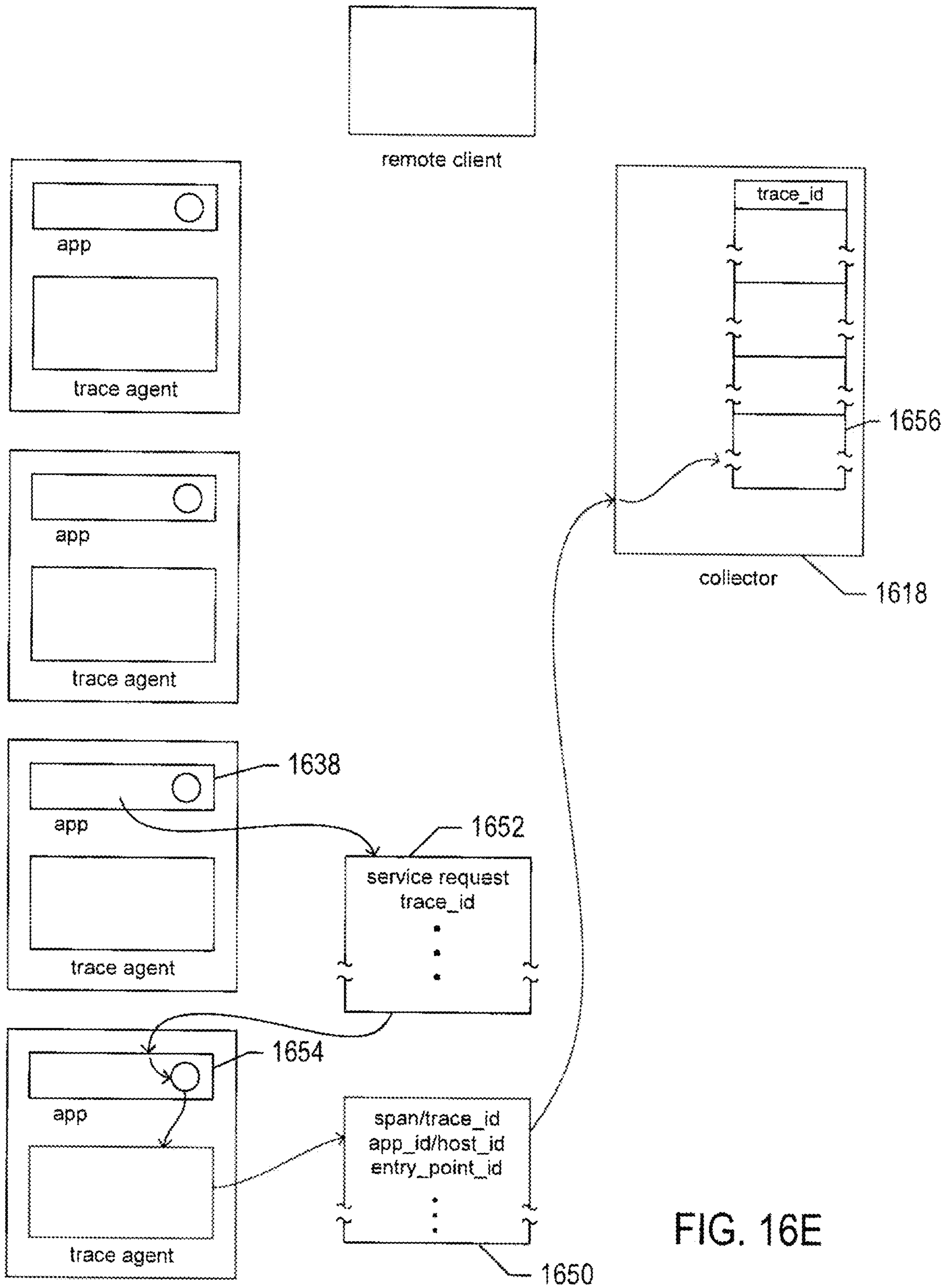

As shown in FIG. 16C, while executing the service request, service instance 1606 makes an internal service-request call to service instance 1624. When making this service request, service instance 1606 invokes the trace client 1608 to include the trace identifier for the service request in the request message 1626 sent to service instance 1624. When service instance 1624 receives the request message, the trace client 1628 within service instance 624 forwards relevant information about the service request to the trace agent 1630 within the server 1632 that hosts service instance 1624. The trace agent, in turn, forwards a span message 1634 to the trace collector 1618. The trace collector uses the trace identifier within the span message to locate the stored call trace and to add, to the stored call trace, a second call-trace frame 1636. As shown in FIG. 16D, when the service instance 1624 subsequently makes a service request to service instance 1638 during execution of the service request 1626 received from service instance 1606, service instance 1638 invokes the trace client 1642 to transmit service-request information to trace agent 1642, which, in turn, forwards a span message 1644 to the trace collector 1618. The trace collector uses information in the span message to add a third trace-call frame 1646 to the stored call trace corresponding to the trace identifier received in the service request 1648. FIG. 16E illustrates a final span message 1650 transmitted as a result of a service request 1652 made by the service instance 1638 to service instance 1654. The final span message 1650 is used to add a fourth call-trace frame 1656 to the stored call trace within the trace collector 1618.

Figure 16F:
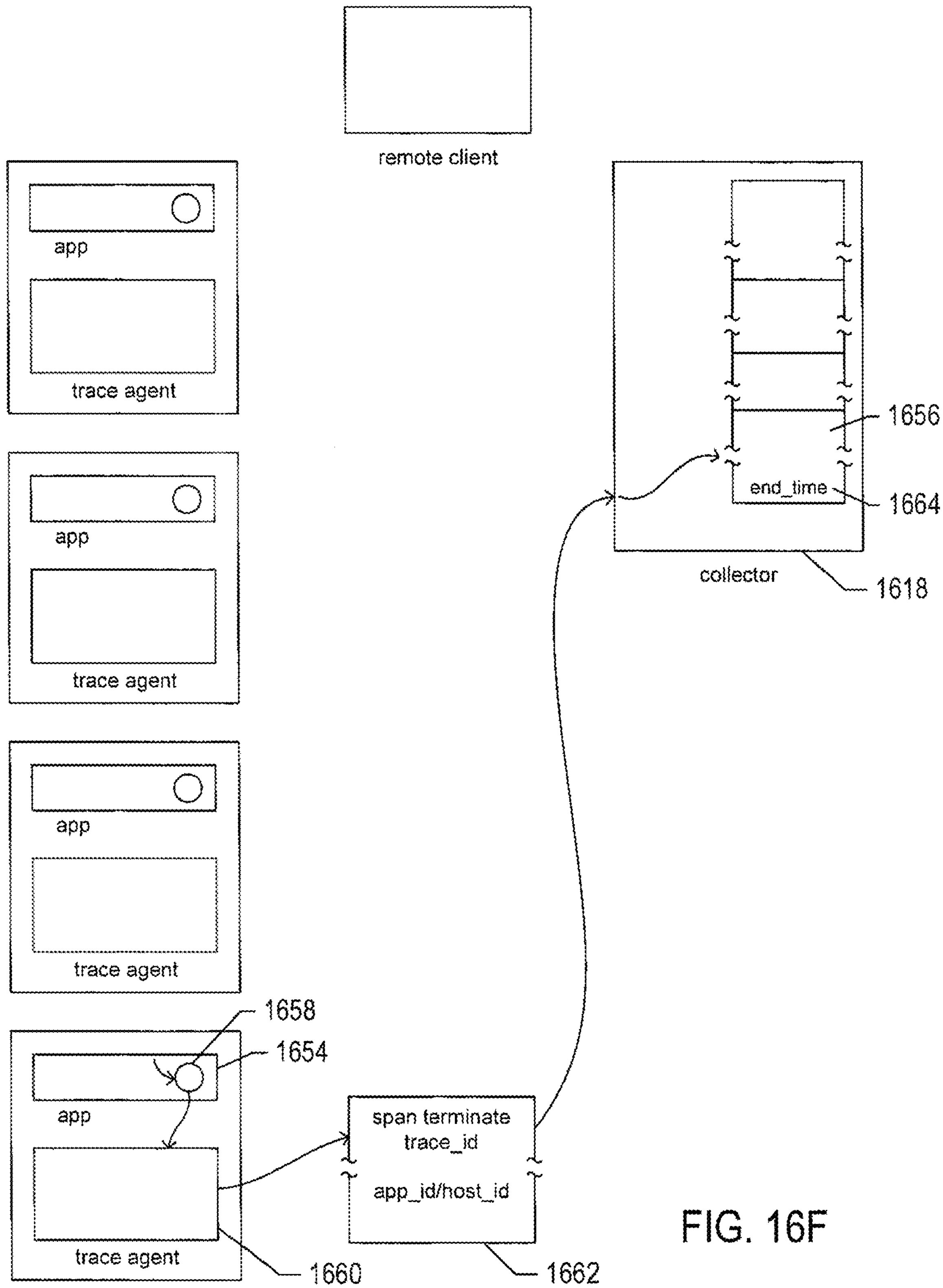
Figure 16G:
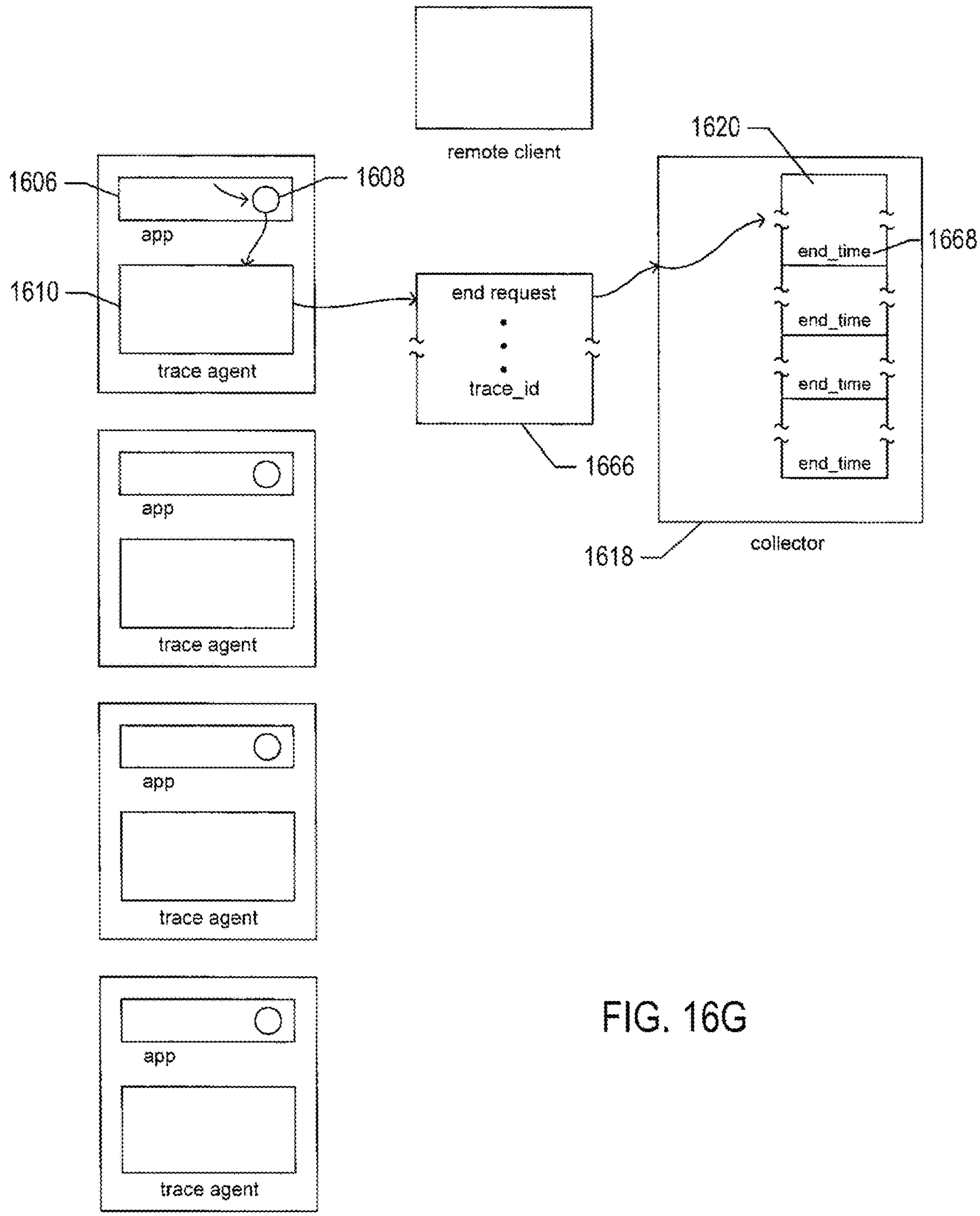
Figure 16H:
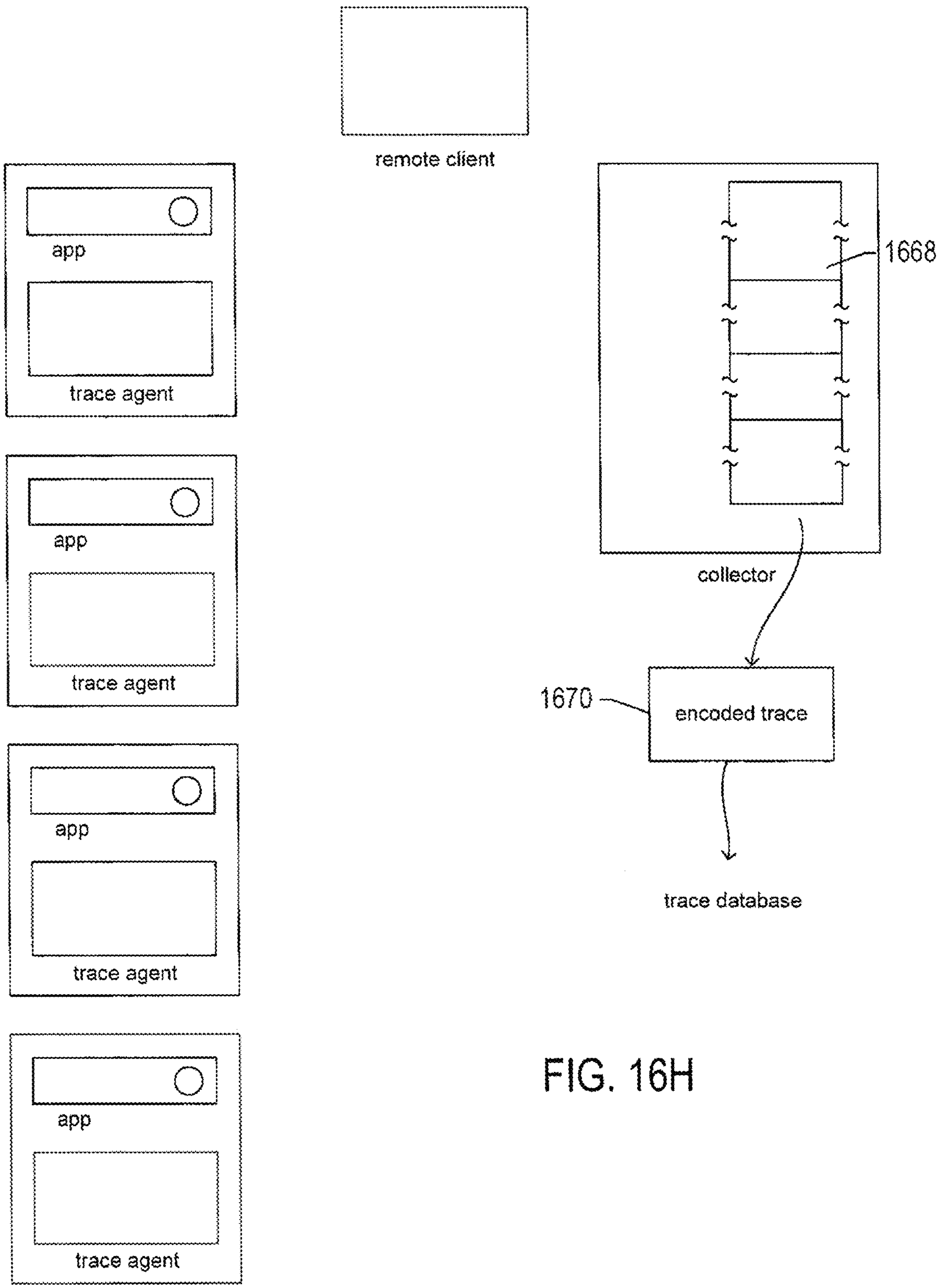

As shown in FIG. 16F, when service instance 1654 completes executing the service request, the trace client 1658 is invoked to communicate termination of the request to the trace agent 1660, which sends a span-terminate message 1662 to the trace collector 1618. The trace collector adds a completion or termination timestamp 1664 to the final call-trace frame 1656, thus completing the final call-trace frame. As each service instance in the stack of service instances contributing to execution of the original service request finishes its internal request, each service instance invokes its trace client to transmit information to the corresponding trace agent so that the trace agent forwards a span-terminate message to the trace collector 1618. FIG. 16G illustrates sending of a final message by the first service instance 1606 in the stack of service instances via the trace client 1608 and trace agent 1610. In this case, the trace agent sends an end-request message 1666, rather than a span-terminate message, to the trace collector 1618, which adds the final timestamp 1668 to the first call-trace frame 1620. Then, as shown in FIG. 16H, the trace collector encodes the completed call trace into an encoded-trace message 1670 which is forwarded to the trace database (1530 in FIG. 15B) for storage.

Of course, there are a variety of different ways to implement a call-tracing service. The above discussion with reference to FIGS. 15A-16H is intended to describe one of the many possible approaches.

Figure 17:
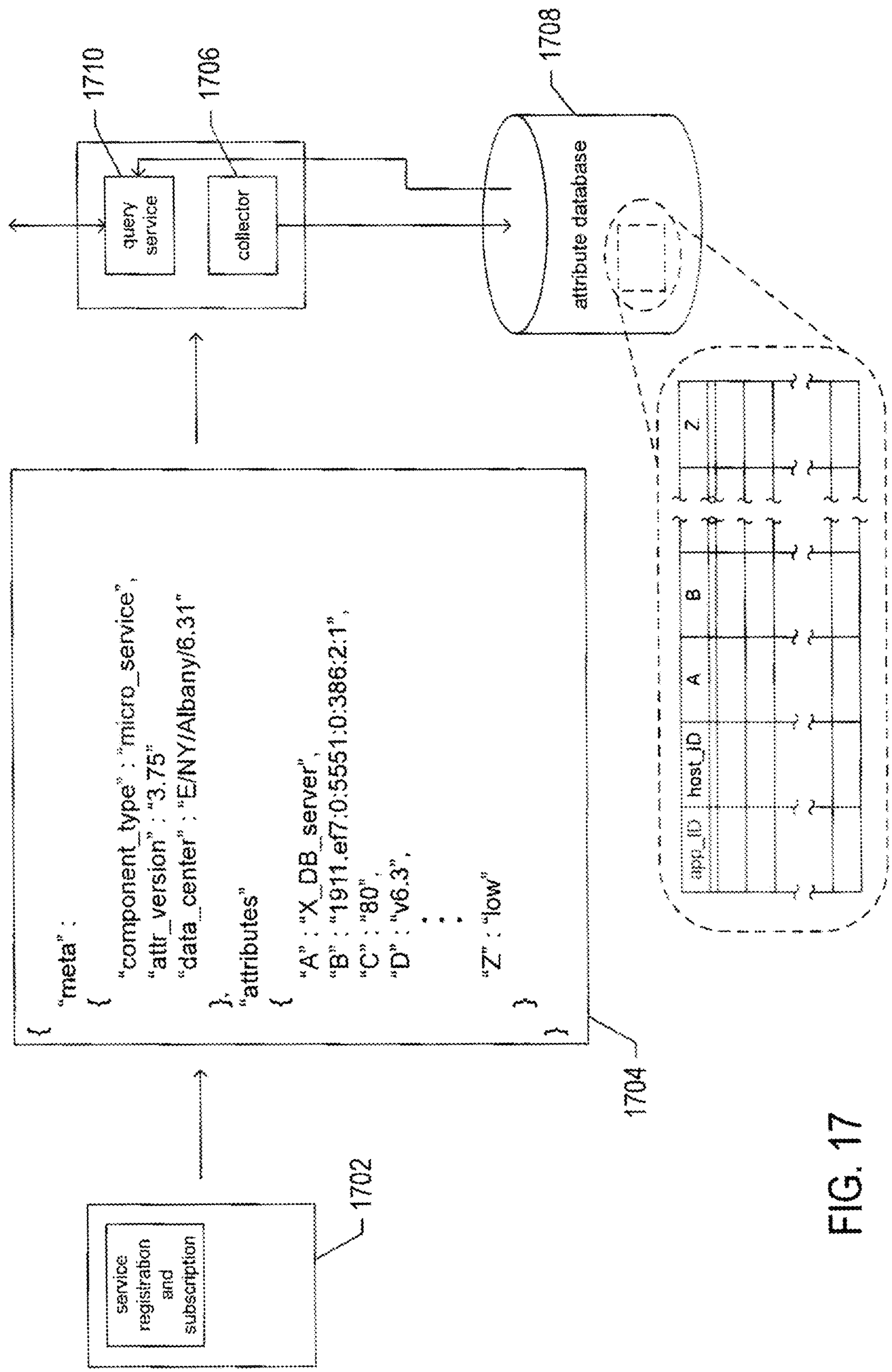
FIG. 17 illustrates distributed-computing-system-component attributes and attribute values.

FIG. 17 illustrates distributed-computing-system-component attributes and attribute values. In the example shown in FIG. 17, attribute values are associated with service instances. As mentioned above with reference to FIG. 11, in many modern distributed service-oriented applications, the service instances register with a service-instance registration-and-subscription service (1106 in FIG. 11). In the attribute-value-assignment system illustrated in FIG. 17, when a service instance registers with the service-instance registration-and-subscription service, the service instance includes formatted attribute/attribute-value pairs in the registration message sent to the service-instance registration-and-subscription service. The service-instance registration-and-subscription service 1702 then encodes the attribute attribute-value pairs in a formatted text message, such as a JSON encoding of the attribute/attribute-value pairs 1704, and transmits the text message to an attribute-value-collector component 1706 of an attribute service, which stores the attribute values in an attribute database 1708. The attribute service also provides an attribute-query service 1710 which allows system administrators and other privileged personnel to view the attribute values associated with one or more service instances. An attribute service may similarly provide attribute-value storage and query services for other types of distributed-computer-system components. Many alternate methods for attribute-value collection, storage, and retrieval are possible.

Figure 18:
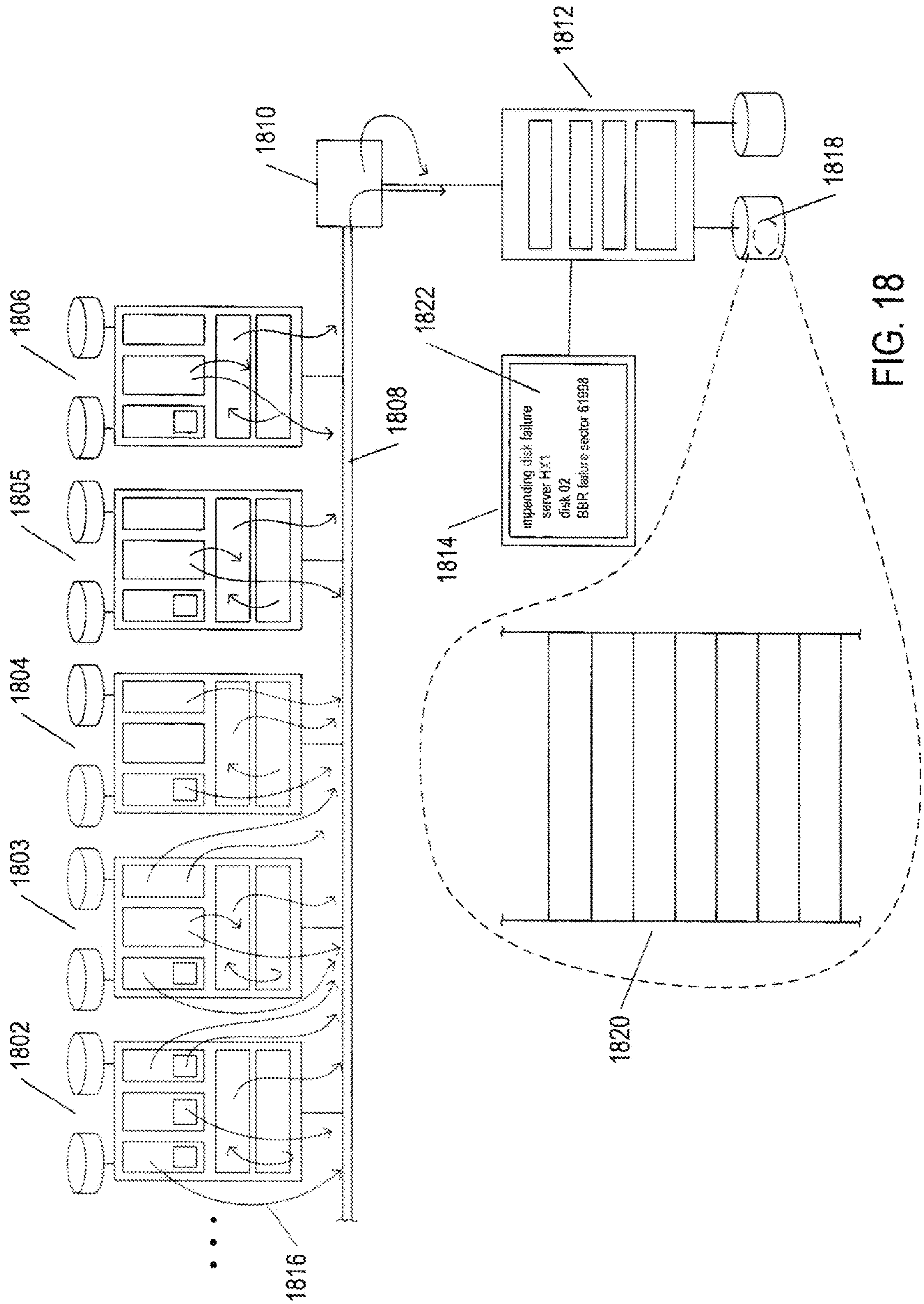
FIG. 18 illustrates a simple example of the generation and collection of status, informational, and error data by the distributed computing system.

FIG. 18 illustrates a simple example of the generation and collection of status, informational, and error data by the distributed computing system. In FIG. 18, a number of computer systems 1802-1806 within a distributed computing system are linked together by an electronic communications medium 1808 and additionally linked through a communications bridge/router 1810 to an administration computer system 1812 that includes an administrative console 1814. As indicated by curved arrows, such as curved arrow 1816, multiple components within each of the discrete computer systems 1802 and 1806 as well as the communications bridge/router 1810 generate various types of status, informational, and error data that is encoded within event messages which are ultimately transmitted to the administration computer 1812. Event messages are but one type of vehicle for conveying status, informational, and error data, generated by data sources within the distributed computer system, to a data sink, such as the administration computer system 1812. Data may be alternatively communicated through various types of hardware signal paths, packaged within formatted files transferred through local-area communications to the data sink, obtained by intermittent polling of data sources, or by many other means. The current example, the status, informational, and error data, however generated and collected within system subcomponents, is packaged in event messages that are transferred to the administration computer system 1812. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1812 may filter and analyze the received event messages, as they are received, in order to detect various operational anomalies and impending failure conditions. In addition, the administration computer collects and stores the received event messages in a data-storage device or appliance 1818 as large event-message log files 1820. Either through real-time analysis or through analysis of log files, the administration computer may detect operational anomalies and conditions for which the administration computer displays warnings and informational displays, such as the warning 1822 shown in FIG. 18 displayed on the administration-computer display device 1814.

Figure 19:
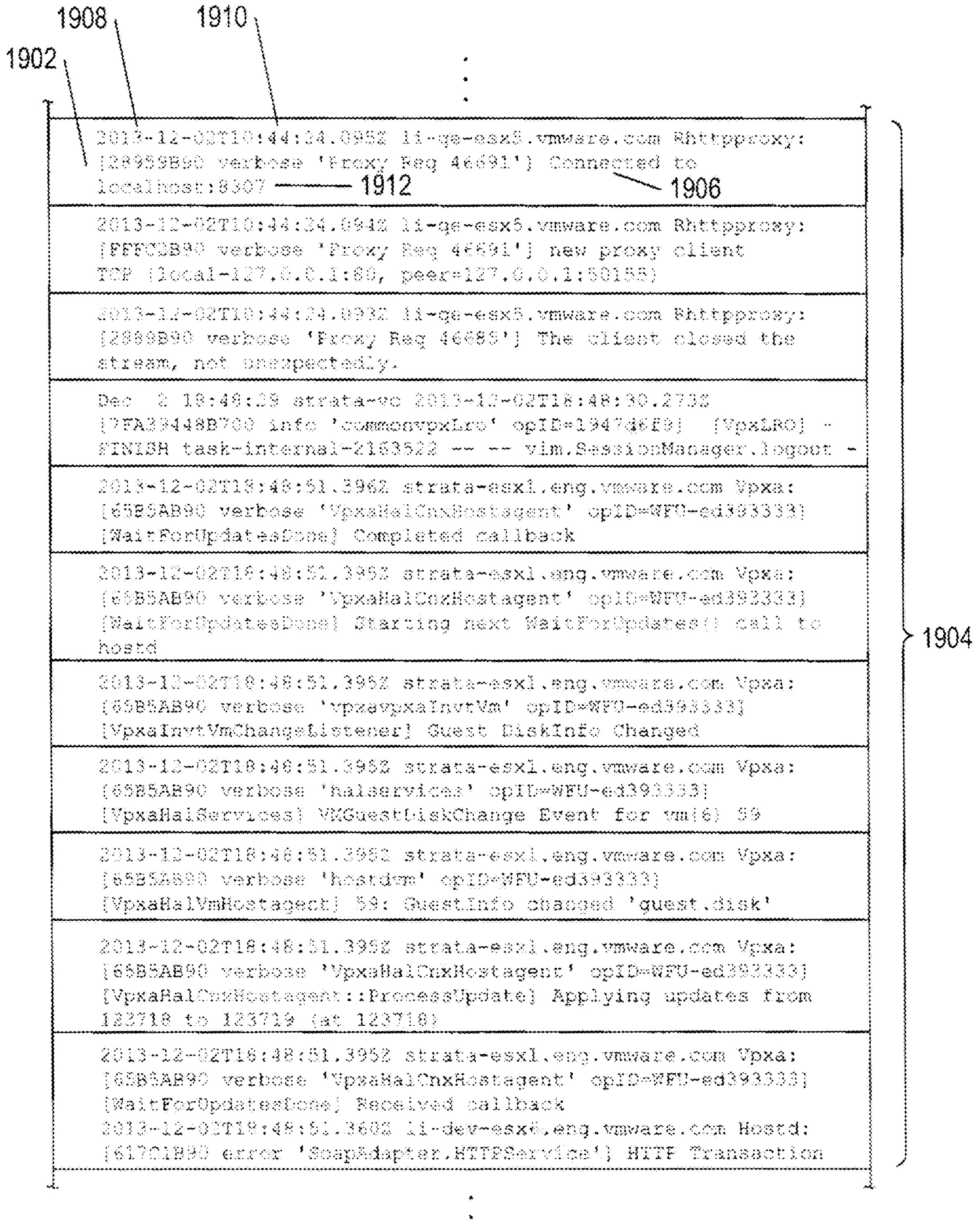
FIG. 19 shows a small, 11-entry portion of a log file from a distributed computer system.

FIG. 19 shows a small, 11-entry portion of a log file from a distributed computer system. In FIG. 19, each rectangular cell, such as rectangular cell 1902, of the portion of the log file 1904 represents a single stored event message. In general, event messages are relatively cryptic, including generally only one or two natural-language sentences or phrases as well as various types of file names, path names, and, perhaps most importantly, various alphanumeric parameters. For example, log entry 1902 includes a short natural-language phrase 1906, date 1908 and time 1910 parameters, as well as a numeric parameter 1912 which appears to identify a particular host computer.

Figure 20:
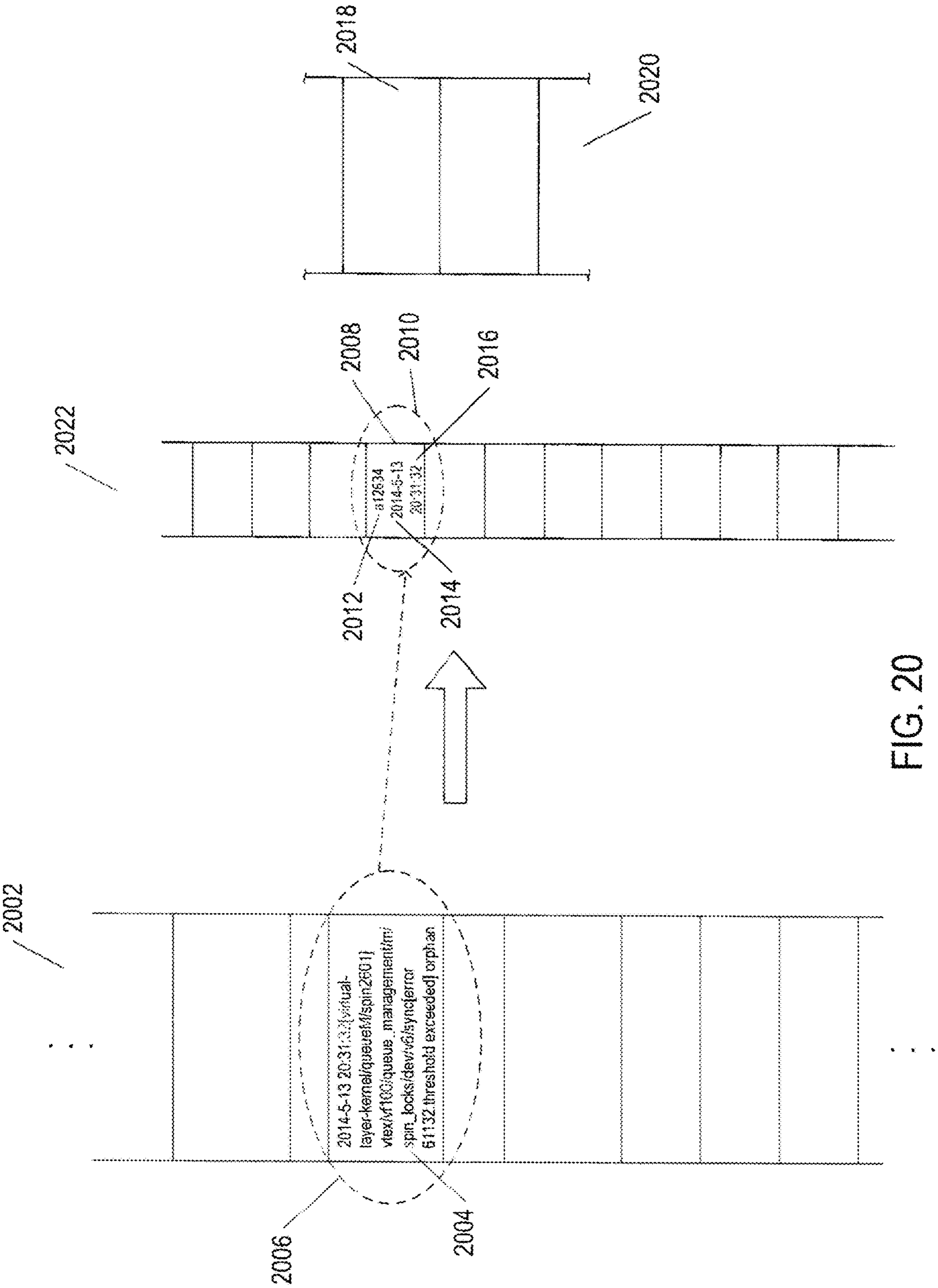
FIG. 20 illustrates one initial event-message-processing approach.

FIG. 20 illustrates one initial event-message-processing approach. In FIG. 20, a traditional event log 2002 is shown as a column of event messages, including the event message 2004 shown within inset 2006. Automated subsystems may process event messages, as they are received, in order to transform the received event messages into event records, such as event record 2008 shown within inset 2010. The event record 2008 includes a numeric event-type identifier 2012 as well as the values of parameters included in the original event message. In the example shown in FIG. 20, a date parameter 2014 and a time parameter 2015 are included in the event record 2008. The remaining portions of the event message, referred to as the "non-parameter portion of the event message." is separately stored in an entry in a table of non-parameter portions that includes an entry for each type of event message. For example, entry 2018 in table 2020 may contain an encoding of the non-parameter portion common to all event messages of type a12634 (2012 in FIG. 20). Thus, automated subsystems may transform traditional event logs, such as event log 2002, into stored event records, such as event-record log 2022, and a generally very small table 2020 with encoded non-parameter portions, or templates, for each different type of event message.

FIGS. 21A-B illustrate one of many different possible ways of storing attribute values for system components and metric values for system components generated from event messages or event records. FIG. 21A shows three simple relational-database tables 2102-2104 that are used to store attribute values for system components in one implementation of the attribute database discussed above with reference to FIG. 17. The table Attributes 2102 stores, for each attribute, an identifier, and alphanumeric name, and a type. In this example, attributes may have discrete values or integral values within a range of values. The table Discrete_Attribute_Values 2103 stores the possible discrete values for attributes of the discrete type and the table Integral_Attribute_Values 2104 stores the numeric range for attributes of the integral type. These tables may be accessed using structured query language ("SQL") queries or via programs with embedded SQL queries. Pseudocode examples for various data-access routines are provided in the lower left portion of FIG. 21A. The routine getID 2106 returns the identifier for an attribute corresponding to an attribute name furnished as an argument. The routine getType 2108 returns the type of an attribute corresponding to an attribute name furnished as an argument. The routine getNum 2110 returns a number of possible values for an attribute corresponding to an attribute name furnished as an argument.

FIG. 21B shows additional relational-database tables that can be used to store indications of the attributes associated with various system components and metric values collected for various system components within a distributed computer system. The table Components 2120 stores an identifier, a name, and a type or each of the system components. The table Component_Relationships 2122 stores relationships between pairs of components, with the relationships including contains and contained_within. The table Component_Attributes 2124 stores attribute values for the attributes of various system components. The table Metrics 2126 stores an identifier and name for each of the different metrics collected for system components and the table Metric_Values 2128 stores timestamped metric values collected from event messages or event records for system components. FIGS. 21A-B are intended to illustrate one possible approach to storing attribute values and metric values for the components of a distributed computer system, but many other approaches are possible.

Figure 22A:
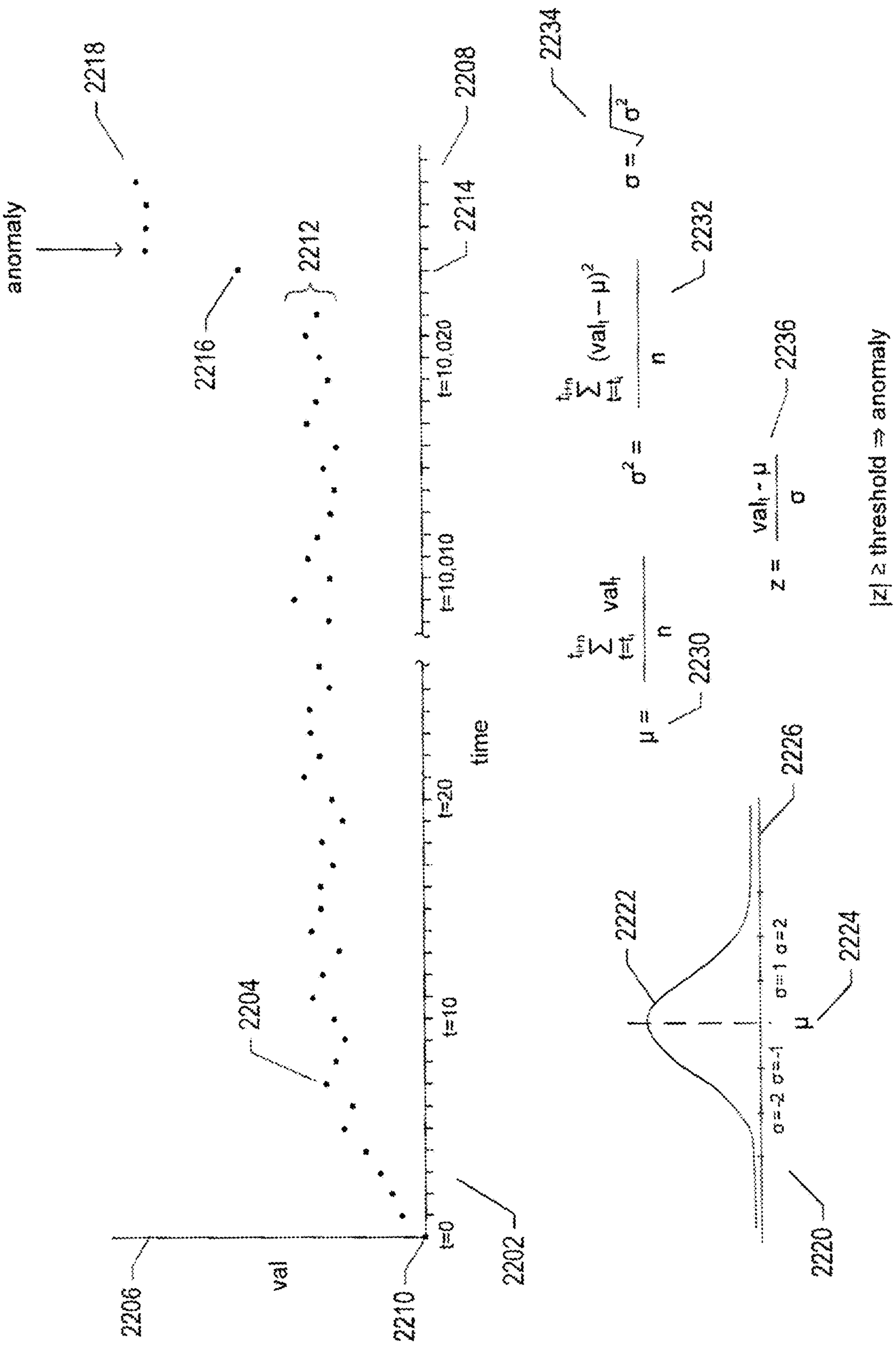
FIGS. 22A-B illustrates detection of the system-component operational anomalies using metric data.
Figure 22B:
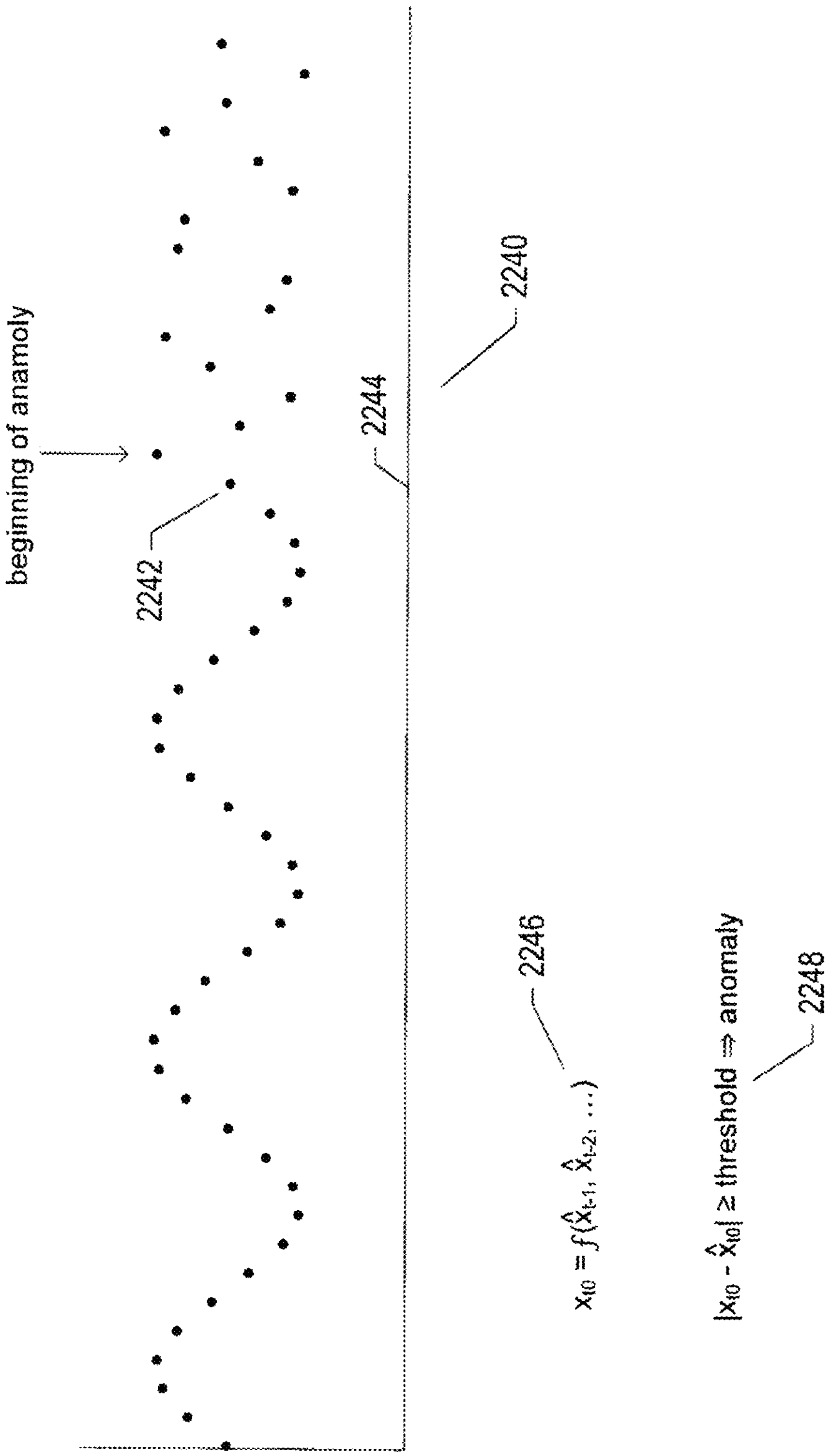

FIGS. 22A-B illustrates detection of the system-component operational anomalies using metric data. In the two-dimensional plot 2202 shown in FIG. 22A, each point, such as point 2204, represents a metric value collected at a particular point in time, with the vertical axis 2206 presenting metric values and the horizontal axis 2208 representing time. The metric values in this plot quickly rise from the origin 2210 to a stable metric-value range 2212 within which the metric values vary over time. However, at time point 2214, the value of the collected metric 2216 has risen above the stable value range and rises again to a series of higher values 2218 at subsequent time points. The sudden departure from a stable value range may be identified as an anomaly. Anomaly detection can be automatically carried out by computing various statistical quantities and looking for values of the statistical quantities that fall above or below particular threshold values. For example, the metric values may be normally distributed about a mean, as represented by the curve plotted in plot 2220 in the lower left portion of FIG. 22A. The curve 2222 represents the distribution of values about the mean 2224 and the horizontal axis 2226 is incremented in standard deviations. The mean is calculated from accumulated metric values as indicated by expression 2230, the variance is calculated via expression 2232, and the standard deviation is the square root of the variance, as indicated by expression 2234. A z-statistic 2236 represents the distance, in standard deviations, of a metric value from the mean. One method of detecting anomalies is to compute the z-statistic for metric values and identify metric values with absolute z-statistic values greater than or equal to some threshold value to be potentially anomalous. Of course, metric values may include a significant amount of noise, and additional considerations may be employed to separate likely anomalies from potentially anomalous metric values, including various computed statistics indicating the probability of encountering anomalous z-statistic values, the distributions of potentially anomalous values, co-occurrences of potentially anomalous values of one metric with potentially anomalous values of other metrics, trends in metric values over time, and many other considerations. FIG. 22B illustrates a different type of anomaly that may be automatically detected. Plot 2240 shows metric values plotted with respect to time, as in plot 202 in FIG. 22A. In this case, the metric values regularly oscillate up through the metric value 2242 recorded at time 2244. Thereafter, there is no apparent regular pattern to the distribution of metric values with respect to time. This type of anomaly may be detected by determining a prediction function that predicts the next metric value based on the metric values preceding that metric value, in time 2246. When the absolute value of the difference between the observed value and predicted value for a metric is greater than or equal to a threshold value, a potential anomaly is indicated 2248. The examples shown in FIGS. 22A-B are meant to provide illustrations of a few of the many different possible types of metric-value-anomaly indications and methods for automatically detecting these indications. There is a very large literature concerning time-series-data analysis and anomaly detection, with many sophisticated approaches to detecting many different types of anomalies are described in this literature.

Dimensional-Analysis Methods and Systems

In the previous subsection of this document, a number of components of the currently disclosed methods and systems have been described. Call-tracing services are currently commercially available. Event-message collection, logging, and analysis, and generation of metric data from collected and processed event messages, are also well known, with many currently commercially available data collection and analysis products used for administration and management of distributed computer systems. Although systems for associating attribute values with distributed-system components may not be currently commercially available, there are many different types of attributes-based and attribute-value-based systems and technologies used in computing, with standard methods of encoding attribute/attribute-value pairs, such as JSON, well known in modern technology. The currently disclosed methods and systems employ metric data, call traces, and attribute values associated with system components in order to identify likely root causes or likely relevant attribute dimensions for identified anomalies in the operational behavior of one or more components of a distributed computer system and, in particular, to identify root causes and likely relevant attribute dimensions for the service-oriented-application components of distributed service-oriented applications. While analysis of metric data and call traces have been employed separately and in combination for attempting to determine the causes of anomalous operational behaviors of system components of distributed computer systems, the currently disclosed methods and systems use metric data, call traces, and component-associated attributes, along with efficient analytical methods, to efficiently and reliably identify root causes of, and likely attribute dimensions relevant to, various types of anomalies within distributed computer systems.

Figure 23A:
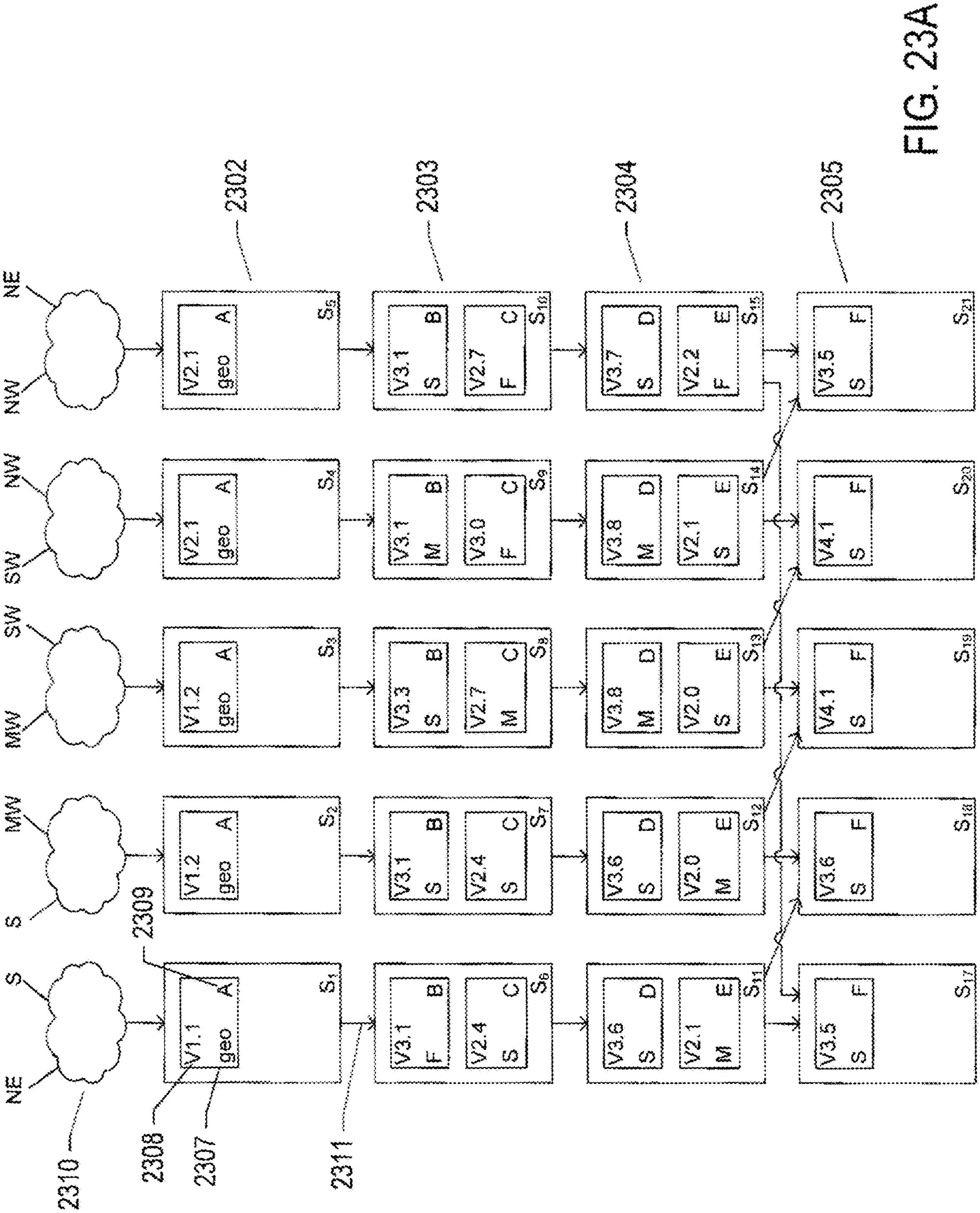

FIGS. 23A-K illustrate one example of the currently disclosed methods for determining root causes of, and attribute dimensions that are likely to be relevant to, detected anomalies within distributed heating systems. In this example, as shown in FIG. 23A, a relatively small, simple distributed computer system includes four levels of server computers 2302-2305. The server computers in the first level 2302, such as server computer 2306, each includes a service instance of a service node A, such as service instance 2307 in server computer 2306. Attribute values for three attributes are maintained by an attribute service and via call traces for each of the service-A-node instances. The three attributes include: (1) version, the version number for the service-instance implementation; (2) geo, the geographical region from which service requests are received by the service-A-node instances: and (3) server, or host, the identity of the server or host on which the service-A-node instance runs. Each service-A-node instance is associated with a version-attribute value, a geo-attribute value, and a server attribute value. For example, for service-A-node instance 2307 and server 2306, the version-attribute value is "1.1" 2308, the label "geo" indicates that the requests received by the service-A-node instances are associated with geographical-region values, and the service-A-node instance 2307 runs on a server "$s_1$," as indicated by the label "$s_1$." The label "A" 2309 indicates the service-oriented-application type, or node, to which the service instance 2307 belongs and the label "$s_1$" is an identifier for server 2306. In this example, there are five different geographical regions: NW, SW, MW, NE, and S. Cloud 2310 indicates that server 2306 receives service requests from the NE and S geographical regions. The servers in layer 2303 each contains a service instance of a service-B node and a service instance of a service-C node. The servers in layer 2304 each contains a service instance of the service-D node and a service instance of the service-E node. The servers in layer 2305 each contains a service instance of the service-F node. Each instance of the services B, C, D, E, and F is associated with a version attribute, as described above for the instances of service A, a configuration attribute that has values S, M, and F indicating a minimal, standard, or full configuration with respect to allocated memory, networking, and processor-bandwidth resources, and a server attribute, as discussed above with reference to instances of service A. Arrows, such as arrow 2311, indicate networking links or paths that connect remote service-requesting entities to first-level servers that internally connect servers of one level to servers of another level. Although single-headed arrows are used for the links, the links are all, of course, bi-directional.

Figure 23B:
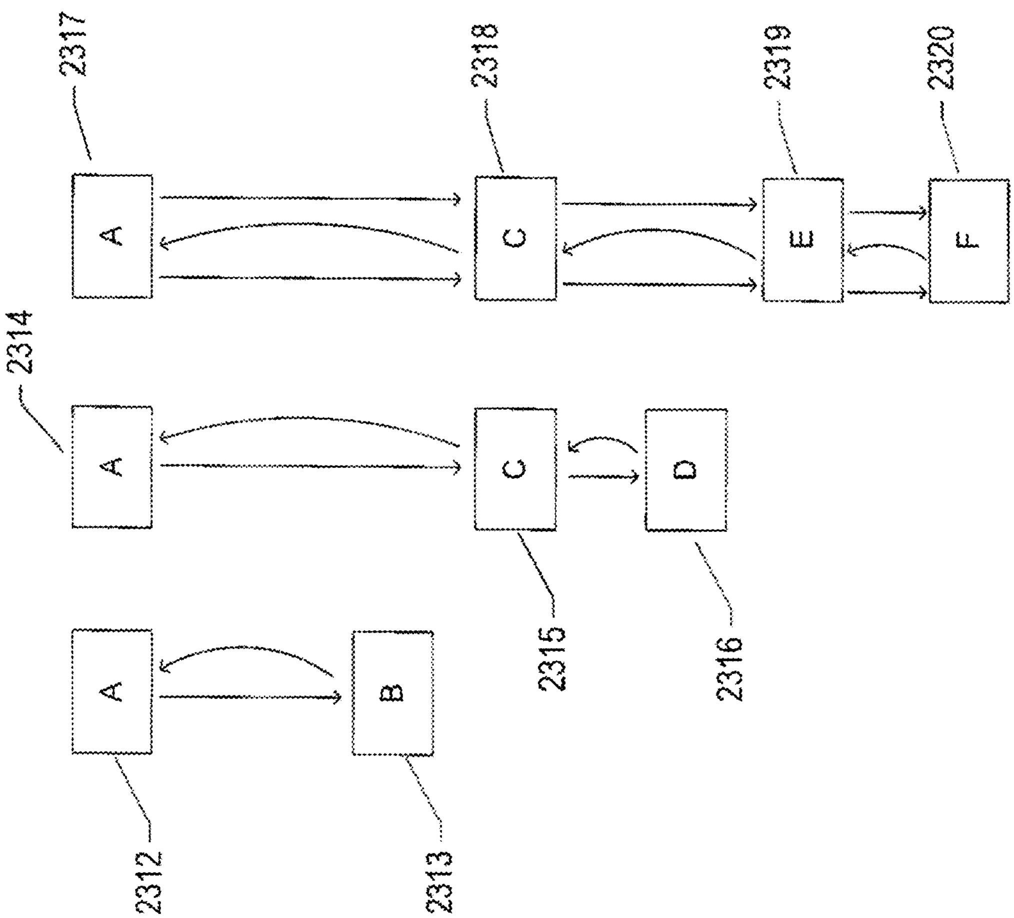

FIG. 23B shows three different call-trace patterns corresponding to three different types of service requests that are received and executed by the distributed service-oriented application comprising instances of nodes A, B, C, D, E, and F. For the first type of service request, the service request is received by an instance of node A 2312 which, in turn, requests an internal service from an instance of node 13 2313. When that internal service request completes, the result is returned to the instance of node A 2312. For the second type of service request, the service request is received by an instance of node A 2314 which, in turn, requests an internal service from an instance of application service C 2315 which, in turn, requests an internal service from an instance of application service D 2316. The third type of service request is received by an instance of node A and executed by successive internal requests to nodes C 2318, E 2319, and F 2320. In this example, node F is a persistent-storage service that stores data in a database. In an initial series of internal requests, among other things, the data is passed to an instance of node F, which prepares the database for a commit operation. In a second series of internal requests, the node F receives a confirmation indication allowing the commit operation to proceed so that the data is persistently stored as part of an atomic transaction.

Figure 23C:
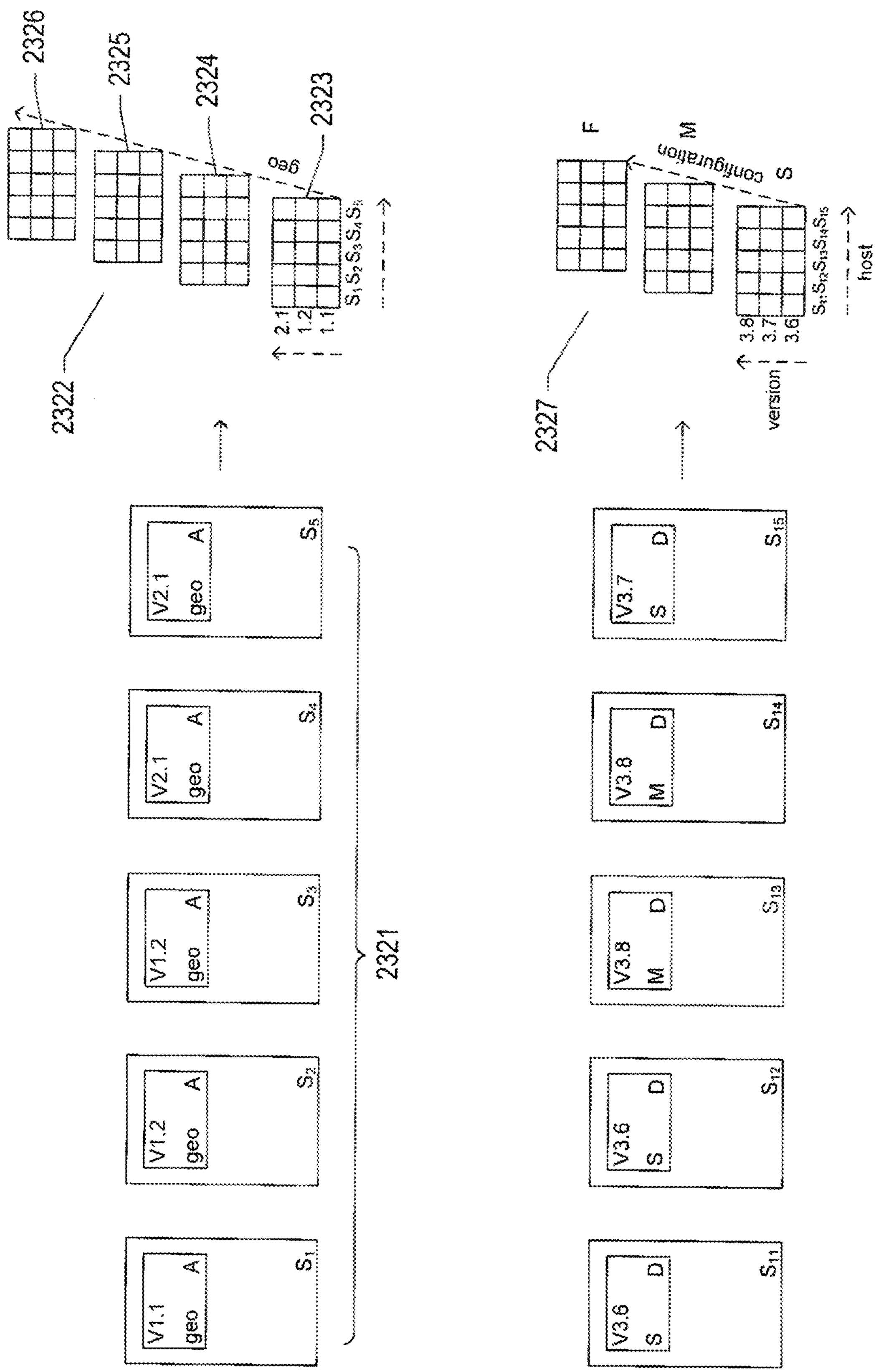

As shown in FIG. 23C, the attributes associated with the node instances can be thought of as dimensions of a three-dimensional attribute-value space associated with the node. The attribute-value space is represented by a series of two-dimensional sections. For example, node A comprises five node instances 2321 and is represented by a three-dimensional attribute-value space 2322 comprising five two-dimensional sections, four of which 2323-2326 are shown in FIG. 23C, each corresponding to a different geographical region. Each two-dimensional section, such as two-dimensional section 2323, includes rows corresponding to version-attribute values and columns corresponding to server-attribute values. A similar representation of a three-dimensional attribute-value space 2327 includes two-dimensional sections, each corresponding to a configuration-attribute value, with each two-dimensional section including rows corresponding to version-attribute values and columns corresponding to server-attribute values.

Figure 23D:
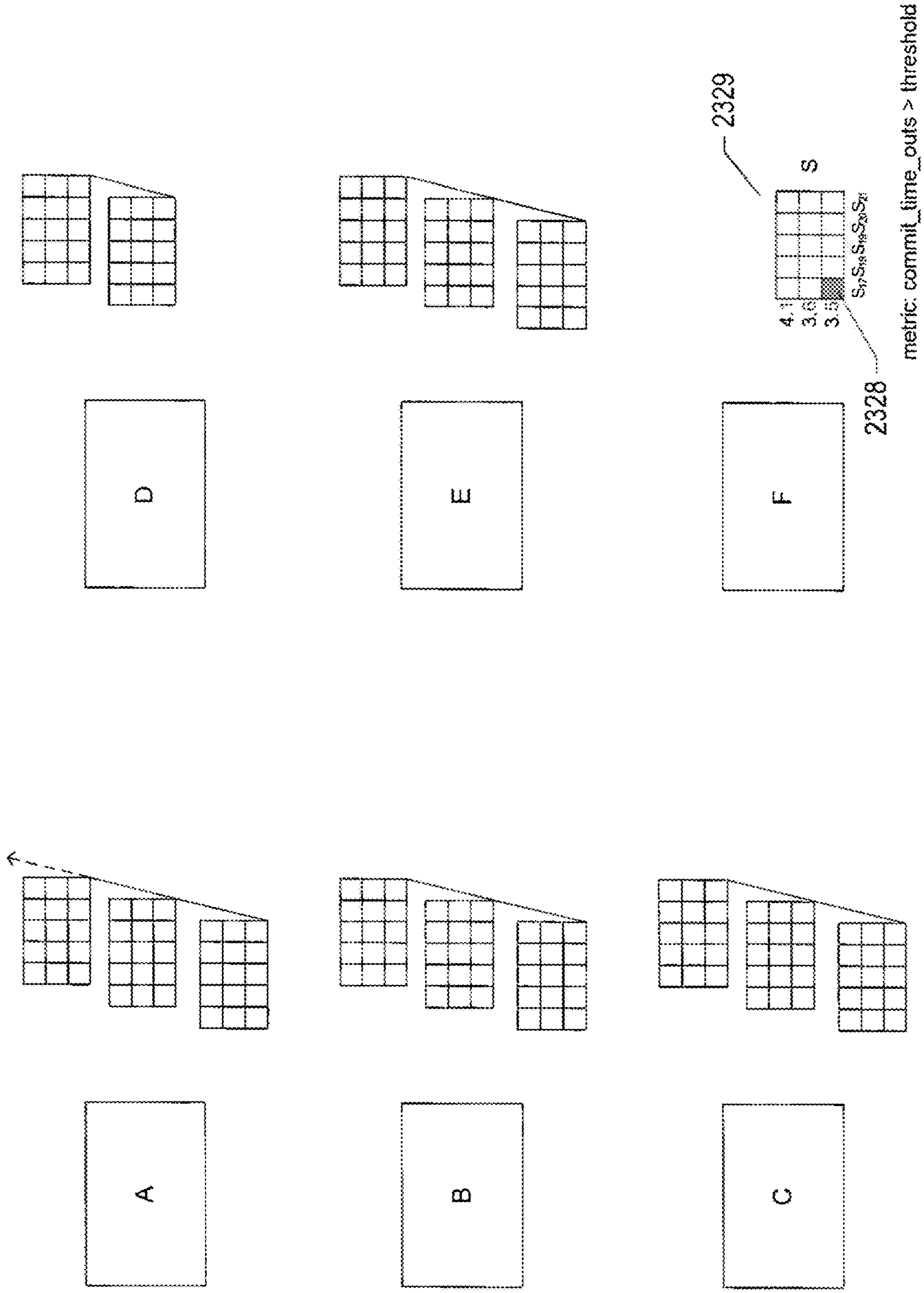

FIG. 23D illustrates an initial detection of an operational anomaly within the distributed service-oriented application and distributed computer system discussed above with reference to FIGS. 23A-C. As shown in FIG. 23D, the node-F instance running on server $s_{17}$ has exhibited anomalous operational behavior as a result of a commit_time_outs metric value that exceeds a threshold value. This metric value represents the number of commit timeouts in a recent time interval due to failures to receive confirmations from service-A nodes allowing persistent storage of received data within the database. The darkened cell 2328 in the representation of the attribute-value space 2329 indicates the detected anomalous operational behavior of the node-F instance running on server $s_{17}$. Of course, the initial indication of a problem with a single node-F instance provides little information about the ultimate cause of the failure. The failure may represent a hardware problem with server $s_{17}$, a problem with the database used by node F for storing transaction data, problems with any of the intermediate nodes in forwarding confirmation messages from node A to node F, various types of networking problems, or many other more complex problems.

Figure 23E:
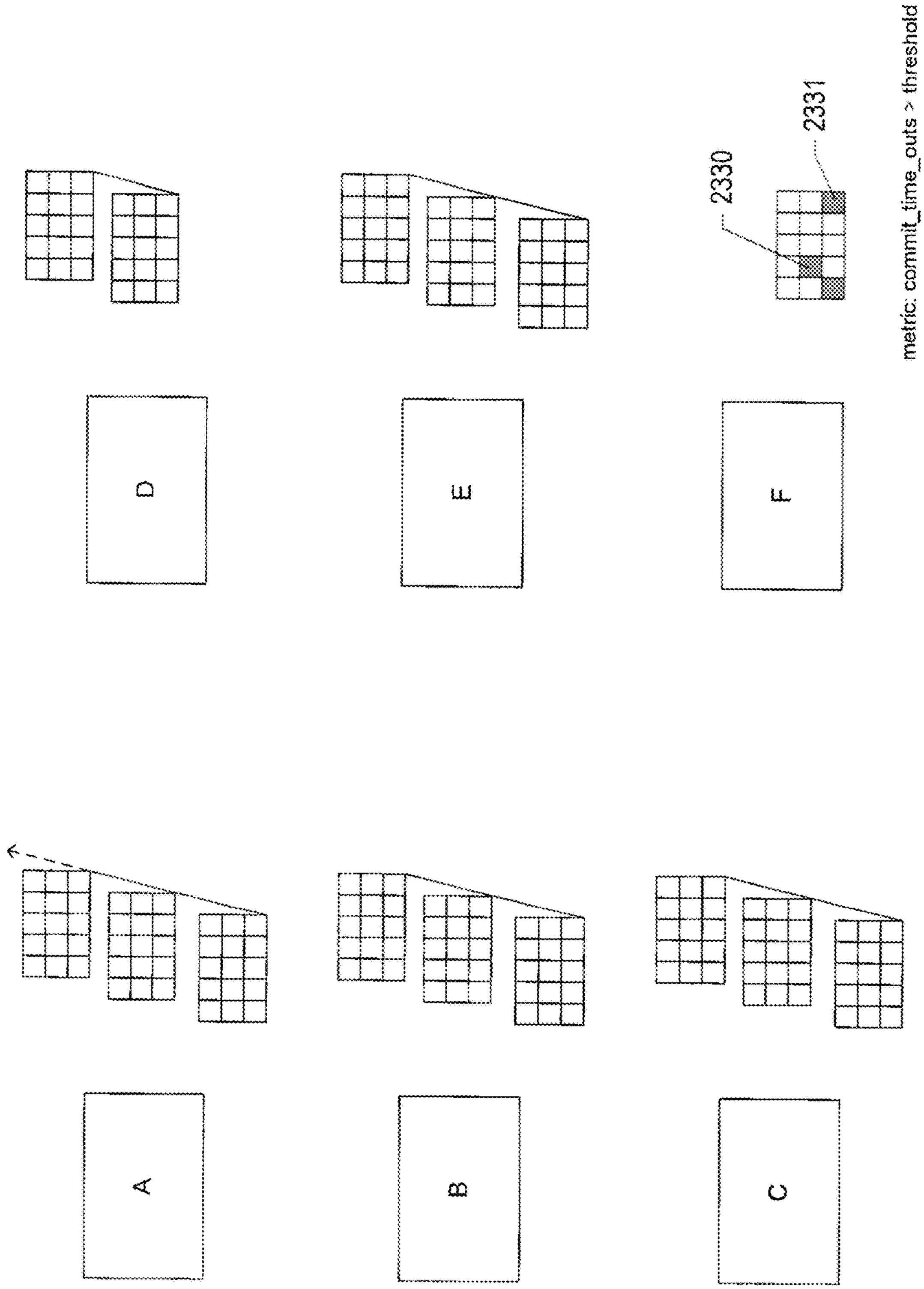

Next, as shown in FIG. 23E, additional anomalous operational behavior is detected in node-F instances 2330 and 2331. At this point in time, it is clear that a serious problem may be developing within the distributed service-oriented application. The problem is not specific to any single server, since the problem-associated node-F instances are distributed across the server-attribute dimension. Similarly, because the problem-associated node-F instances are distributed across the version-attribute dimension, the problem has not arisen as a result of a single-version implementation bug. No other anomalous behaviors have been detected in any of the other nodes, so there is very little information available to a system administrator or automated management system with regard to what may be causing the increasingly serious anomalous operational behavior within the distributed service-oriented application.

FIG. 23F illustrates the recent call traces that had been collected by the call-trace service which include spans touching one of the three failing node-F instances running on servers $s_{27}$, $s_{18}$, and $s_{21}$. As mentioned above, the query service provided by the call-tracing service allows a system administrator, other professional, or an automated management system to retrieve collected call traces defined by one or more query parameters. The call traces are abbreviated to only the initial downward path of service requests and internal service requests that include nodes A, C, E, and F. One approach to attempting to analyze the anomalous operational behavior of the distributed service-oriented application is to use the relevant call traces, shown in FIG. 23F, to annotate the dimensional representations of the other nodes observed in the call traces. The other nodes that occur in call traces ending with the three failing node-F instances running on servers $s_{17}$, $s_{18}$, and $s_{21}$ may be, in some way, related to the observed anomalous operational behaviors of these failing node-F instances.

Figure 23G:
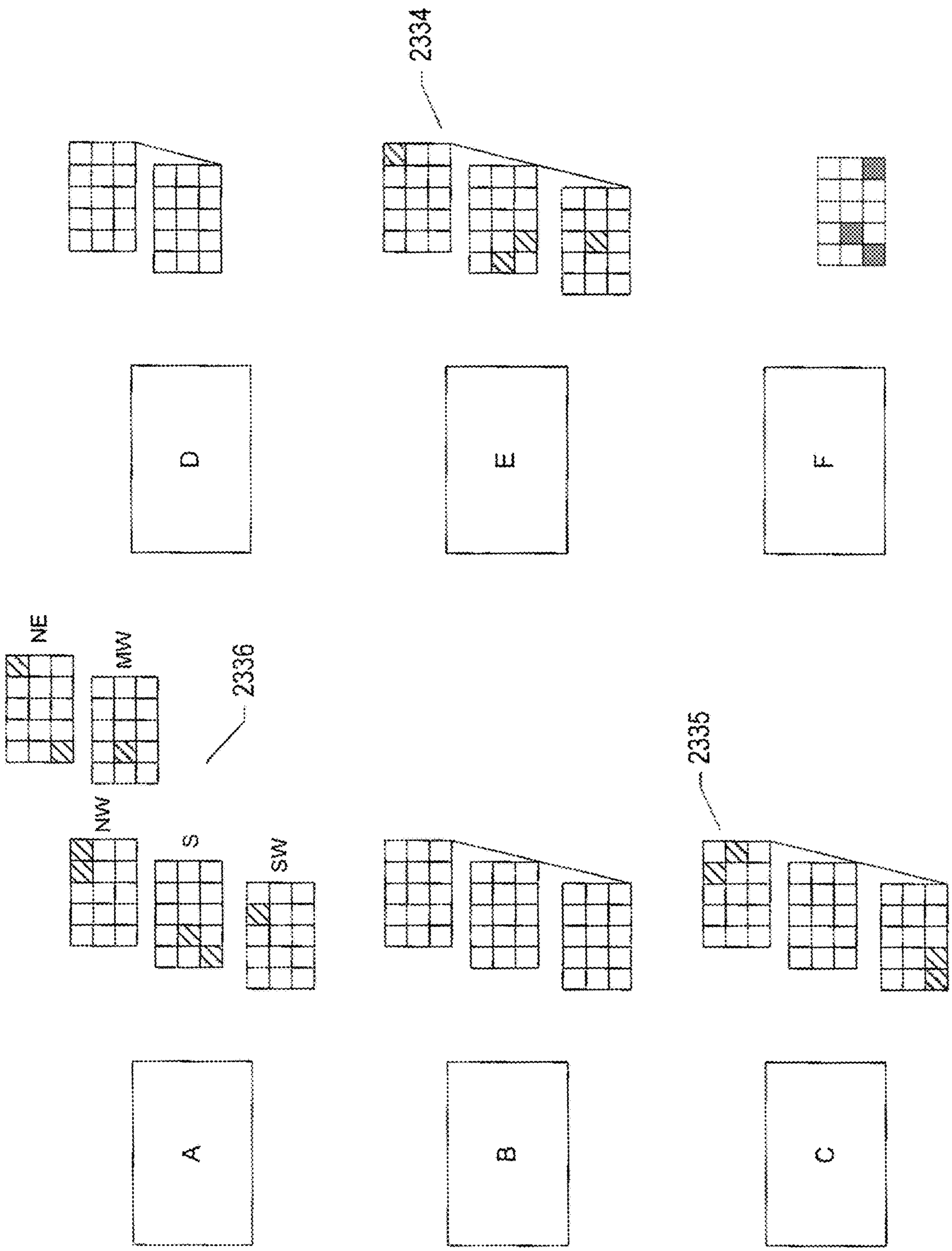

FIG. 23G shows, using cross hatching, the other node instances of the call traces shown in FIG. 23F. The cross-hatched cells of the representations of the three-dimensional attribute-value space associated with the other nodes correspond to these other node-instances observed in the call traces. First, consider the three-dimensional attribute-value space 2334 for node E. The node-F instances that occur in the call traces are clearly distributed across the server-attribute dimension, the version-attribute dimension, and the configuration-attribute dimension. There is no indication, in the pattern of marked cells within the representation of the three-dimensional attribute-value space 2334 for node E, that any particular subset of the node E instances might be responsible for the failures observed in the three failing node-F instances. Similar comments apply to the cross-hatched cells in the three-dimensional attribute-value space 2335 for node C and even more clearly apply to the crosshatched cells in the three-dimensional attribute-value space 2336 for node A. Thus, the subset of recently collected traces that include spans touching the three failing node-F instances, shown in FIG. 23F, fail to provide useful information with respect to the root cause of the anomalous operational behavior.

Figure 23I:
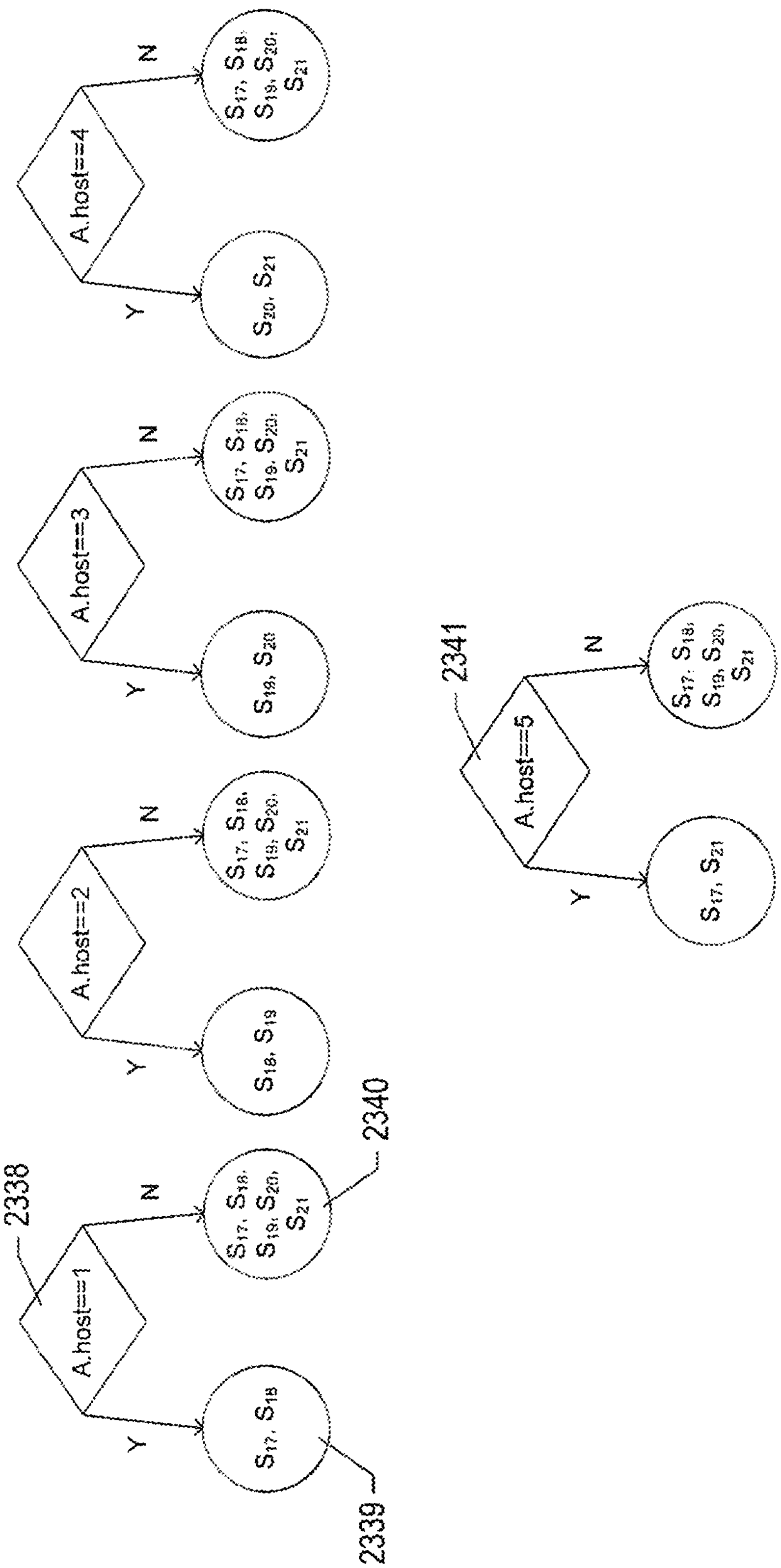
Figure 23J:
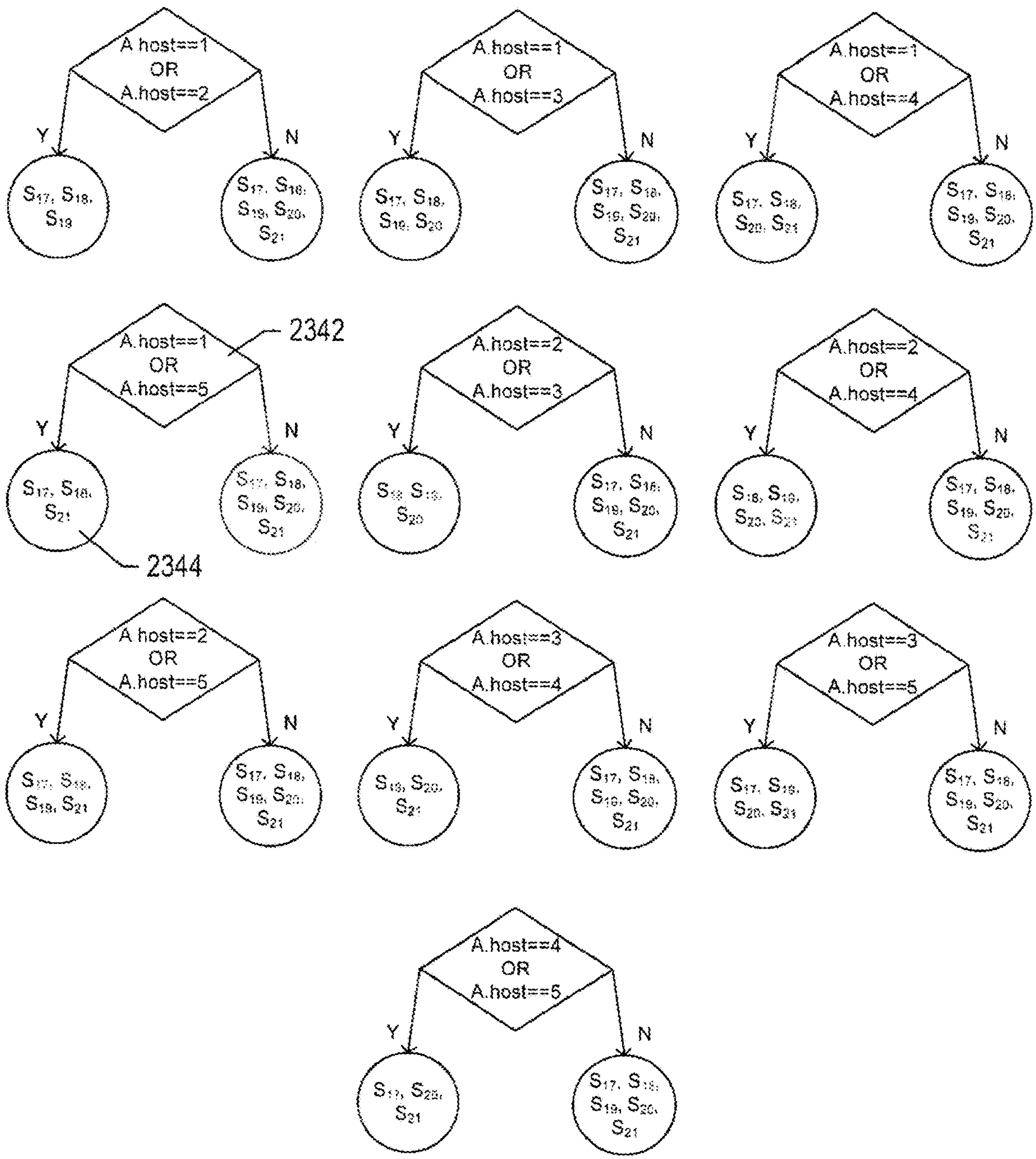

FIG. 23H shows a representation of the full set of the most recent collected call traces for the distributed service-oriented application. The call traces shown in FIG. 23F are a subset of the full set of the most recent collected call traces. At this point, a decision-tree-like analysis may be attempted on the set of call traces shown in FIG. 23H in order to identify attribute dimensions that may explain the three failing node-F instances. In this approach, each of the different node dimensions is considered in order to find a decision-tree-node expression that will partition the full set of call traces into a set of call traces that includes only the three failing node-F instances. Consideration of the first node dimension, which is the host attribute for node A, is shown in FIG. 23I. First, the expression "A.host=1" is used in the first node 2338 of a decision tree. When the expression evaluates to TRUE for a call trace, the node-F instance in the call trace, if there is a node-F instance in the call trace, is placed in a left-hand set 2339. When the expression evaluates to FALSE for a call trace, if there is a node-F instance in the call trace, the node-F instance in the call trace is placed in a right-hand set 2340. As can be seen in FIG. 231, the expression "A.host=1" in the first node of the decision tree does not produce the set of servers $s_{17}$, $s_{18}$, and $s_{21}$ in the left-hand set. It does produce the set of servers $s_{17}$ and $s_{18}$, which means that the expression "A.host=1" may be, in part, relevant to the explanation of the failing of the three node-F instances, but is not the whole story. When the other single-value expressions for the server attribute of node A are tried for the expression in the root node of the decision tree, only the expression "A.host=5" 2341 produces a left-hand set that includes failing node-F instances, but like the expression "A.host=1," the expression "A.host=5" fails to produce the full set of failing node-F instances. FIG. 23J illustrates first nodes of possible decision trees that include expressions containing multiple values for the first attribute dimension. Not surprisingly, only the expression "A.host=1 OR A.host=5" 2342 leads to the desired left-hand set 2344. This is an indication that the failure of the three node-F instances may be related to the node-A instances running on servers $s_1$ and $s^5$.

Figure 23K:
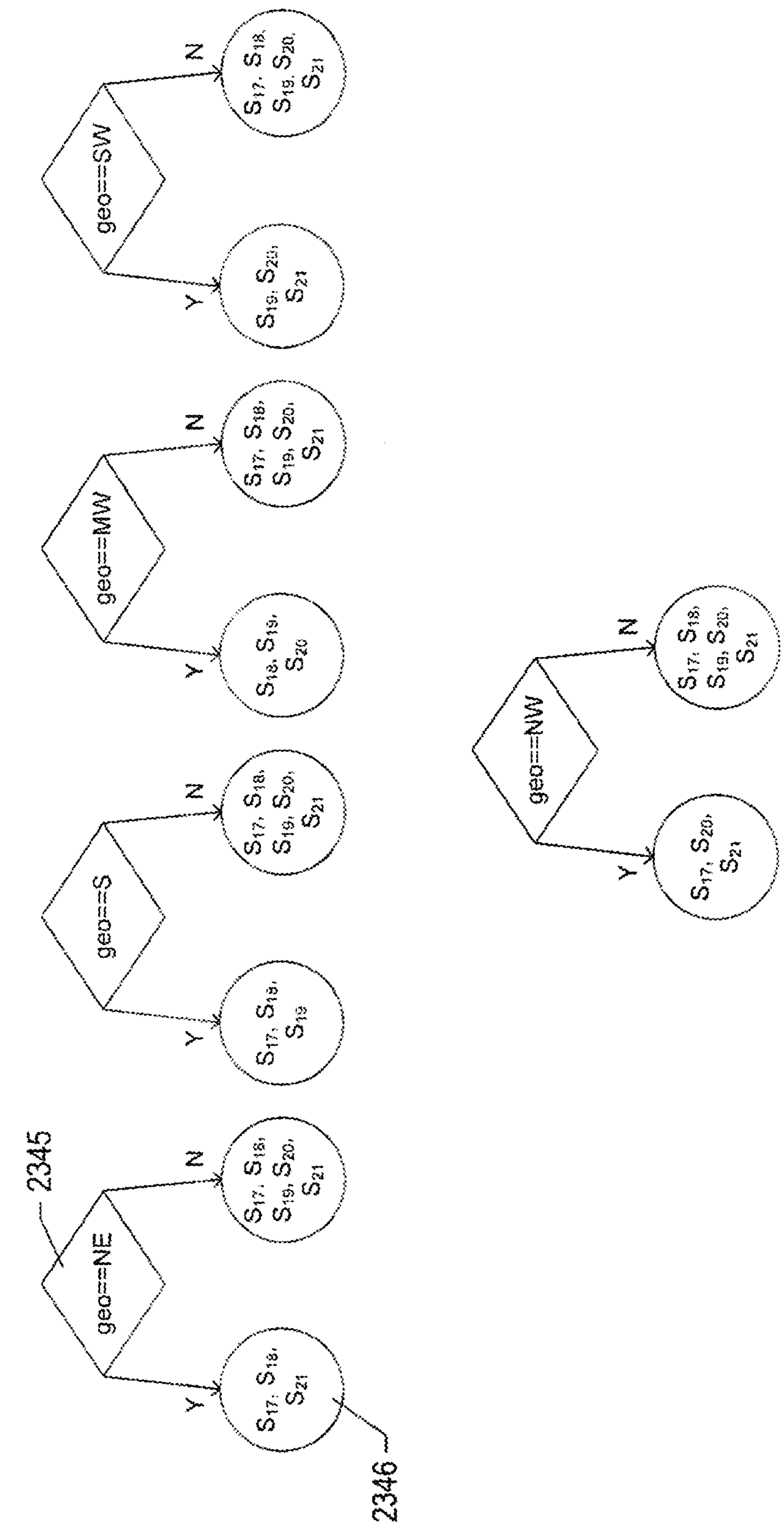

FIG. 23K illustrates the decision-tree-like analysis using the second node dimension geo. A decision tree 2345 with a first node including the expression "geo=NE" produces the desired set of node-F instances 2346. The expression "geo=NE" is simpler than the expression "A.host=1 AND A.host=5," and thus may constitute more relevant information with regard to the cause of the observed node F-instance failures. The analysis carried out by the currently disclosed methods and systems seeks simple and powerful dimensional explanations of the observed pattern of operational-behavior anomalies. In the current example, the expression "geo=NE" is, in fact, the best clue, or indication, of the root cause of the three failing node F nodes, which is correlated with the geo dimension.

In this example, the underlying cause of the commit failures in the three node F-instances running on servers $s_{17}$, $s_{18}$, and $s_{21}$ is a problem with network transmissions from the region NE. 10% of the messages sent from remote clients in the NE region to the node-A instances running on servers $s_1$ and $s_5$ are lost or dropped. These are the only servers that receive messages from the NE region. Messages that are lost and dropped during back-end-fourth communications within transactions are handled by the node-A instances resending messages for which responses were expected. Since 90% of these resent messages receive responses, only 1% of the response messages fail repeatedly. Because only repeatedly failing response messages result in commit timeouts, only the node-F instance running on server $s_{17}$ initially experienced a sufficient number of commit timeouts to exceed the warning-level metric, as shown in FIG. 23D. This is because roughly half of the internal service requests received by the node-F instance running on server $s_{17}$ are made as a result of remote-client requests from region NE arriving at the node-A instances running on servers $s_1$ and $s_5$. Eventually, the node-F instances running on servers $s_{18}$ and $s_{21}$, for each of which roughly a quarter of the received internal service requests are made as a result of remote-client requests from region NE, experienced a sufficient number of commit timeouts to exceed the warning-level metric, as shown in FIG. 23E. Since the failing node-F instances running on servers $s_{17}$, $s_{18}$, and $s_{21}$ all receive internal requests made as a result of remote-client requests from regions other than region NE, there was no discernible pattern in the attribute dimensions of the node-A instances, as shown in FIG. 23G. Of course, had the attribute dimensions for the node-A instances included a message-retry-above-threshold attribute collected by the call-tracing service, an indicative pattern in that dimension may have been observed, as a result of which a likely relevant dimension would have been identified from the call-trace subset shown in FIG. 23F. However, because there was no such attribute dimension for the node-A instances, the likely relevant geo dimension was only identified from the full set of call traces, shown in FIG. 23H, and the decision-tree-based analysis discussed with reference to FIGS. 23I-K. This example shows that dimensional patterns may emerge in nodes that are not adjacent to nodes identified as exhibiting anomalous operational behavior in the collected call traces, and even quite far removed from the problem nodes. In this example, no anomalous operational behaviors were identified in intermediate nodes C and E, and no dimensional patterns were evident in these nodes.

Figure 24A:
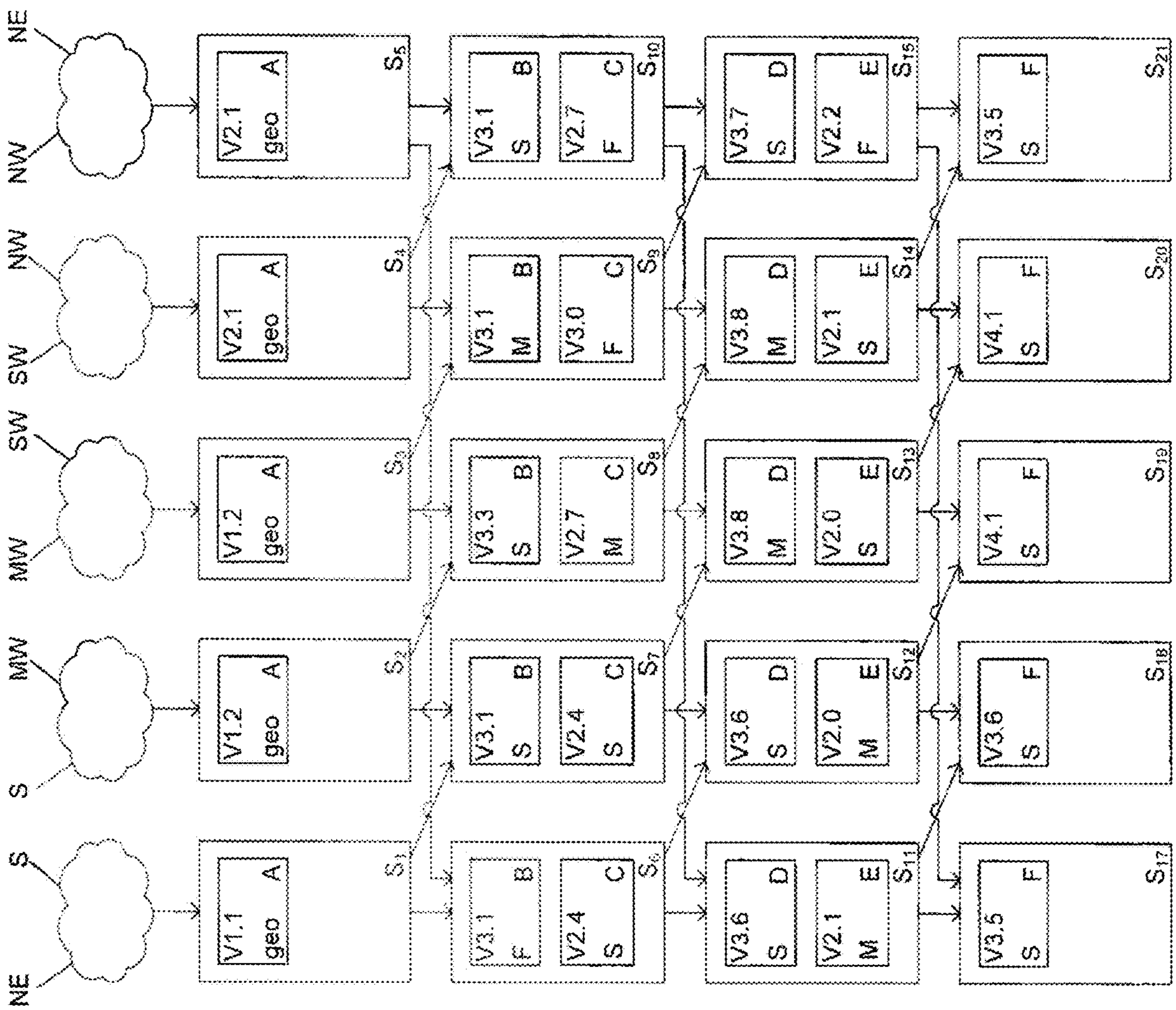
FIGS. 24A-B illustrate a second example of application of the currently disclosed methods for determining root causes of, and attributes that are likely to be relevant to, detected anomalies within distributed heating systems.
Figure 24B:
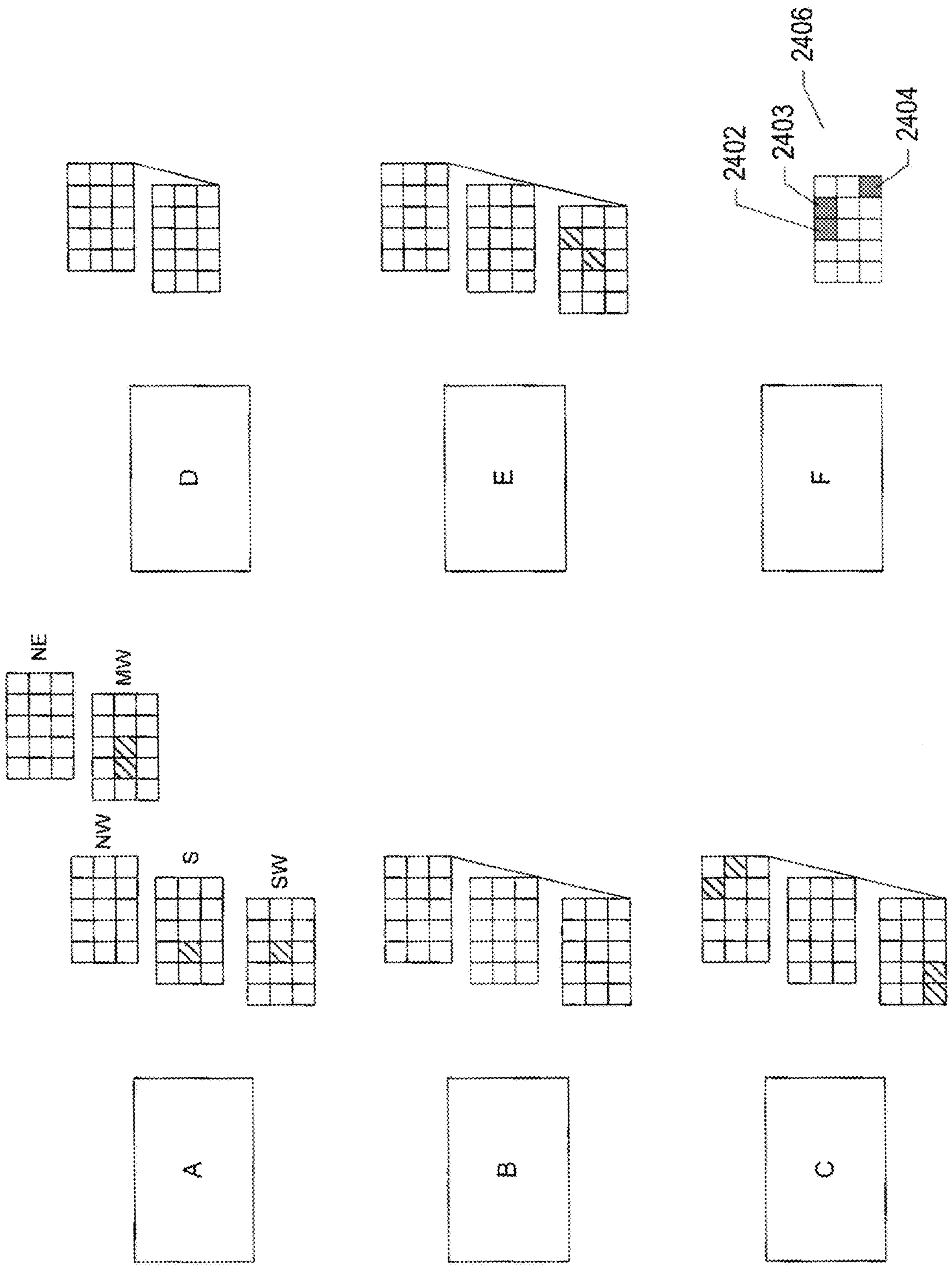

FIGS. 24A-B illustrate a second example of application of the currently disclosed methods for determining root causes of, and attributes that are likely to be relevant to, detected anomalies within distributed heating systems. The distributed service-oriented application shown in FIG. 24A is similar to that shown in FIG. 23A, with the exception that the servers at each level are more densely connected with servers at adjacent levels. As shown in FIG. 24B, commit_time_outs warnings are observed for the node-F instances running on servers $s_{19}$, $s_{20}$, and $s_{21}$, as indicated by the shaded cells 2402-2404 in the representation of the attribute-value space 2406 for node F. Using only the recent collected call traces that include the node-F instances running on servers $s_{18}$, $s_{19}$, and $s_{20}$, as shown for the first example in FIG. 23F, cross hatching is used to mark the instances of nodes E, C, and A observed in the recent collected call traces that include the node-F instances running on servers $s_{19}$, $s_{20}$, and $s_{21}$. As can be seen in FIG. 24B, the marked instances of node A are distributed across the geo-attribute dimension, but are relatively spatially confined in the version-attribute and server-attribute dimensions. This pattern would suggest that the node-A instances running on servers $s_2$ and $s_3$ may be related to the failures of the node-F instances running on servers $s_{18}$, $s_{19}$, and $s_{20}$. There is only one marked instance of node C, which strongly indicates that the node C instance running on server $s_8$ may be correlated with the failures of the node-F instances running on servers $s_{28}$, $s_{19}$, and $s_{20}$. The marked node E instances are clustered across two different servers and two different versions, again showing indications that the node E instances running on servers $s_{13}$ and $s_{14}$ may be related to the failures of the node-F instances running on servers $s_{18}$, $s_{19}$, and $s_{20}$. In this case, the highly localized marked subspace in the attribute-value space for node C, in fact, is consistent with the actual source of the errors—a failing hardware network-interface controller in server $s_8$. Thus, when call-trace analysis reveals a subspace of the attribute-value space corresponding to a single node instance, the analysis strongly points to a single-server root cause. In more complex, but similar cases, relevant nodes and node instances are revealed by a decision-tree-like analysis which seeks the simplest explanation for partitioning a set of call traces into a first set of call traces that include the problematic node instances and a second set of call traces that either includes only non-problematic node instances or includes both the problematic node instances as well as additional node instances.

Figure 25A:
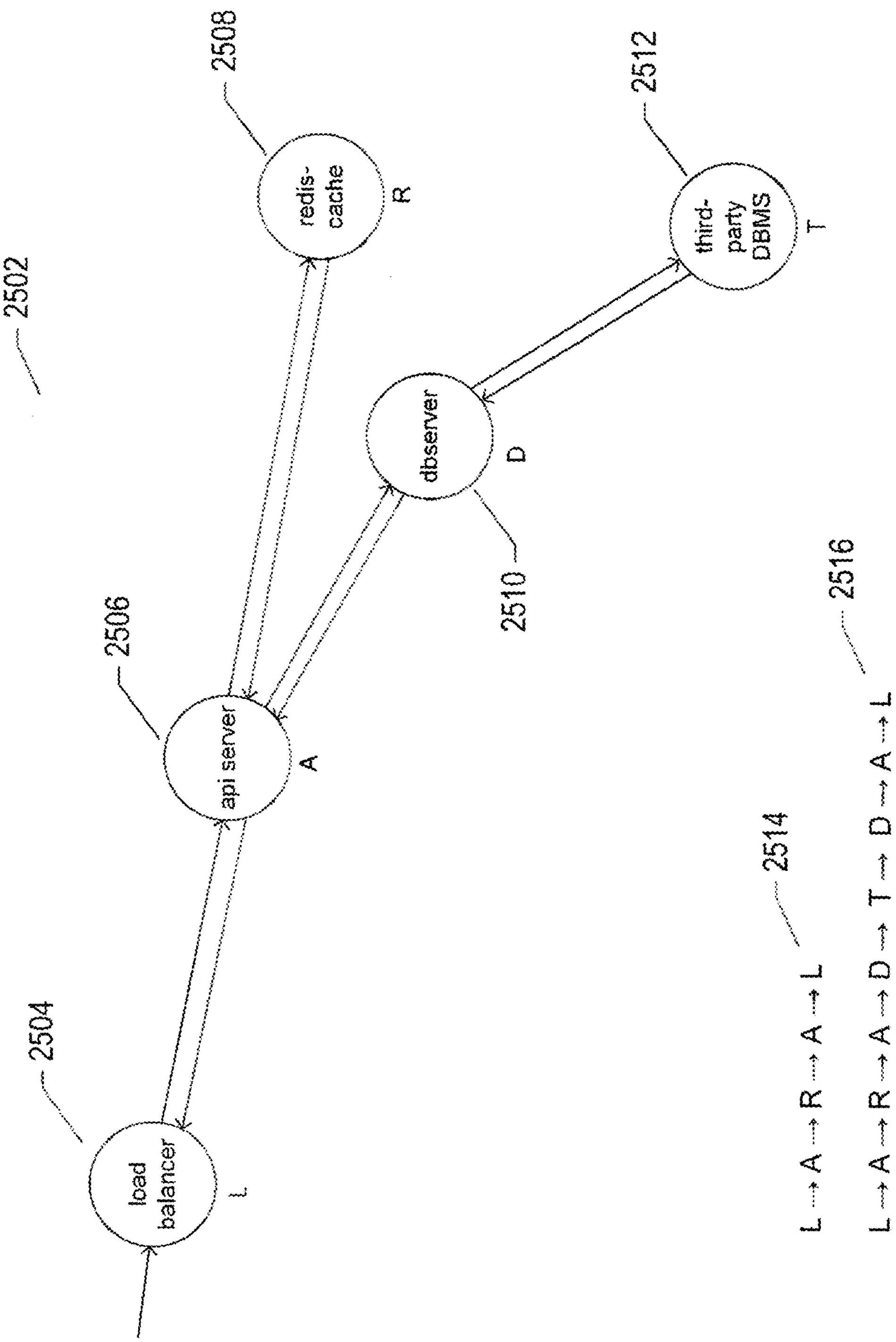
FIGS. 25A-D provide additional examples of identifying relevant dimensions with respect to problem-associated components within a distributed computing system.

FIGS. 25A-D provide additional examples of identifying relevant dimensions with respect to problem-associated components within a distributed computing system. As shown in FIG. 25A, a simple distributed service-oriented application 2502 includes five types of service nodes: (1) a load-balancer node 2504; (2) an API-server node 2506; (3) a redis-cache node 2508; (4) a dbserver node 2510: and (5) a third-party DBMS node 2512. As with the previous examples, each of these service nodes includes multiple instances, and the service-node instances are associated with attribute values. There are two different types of call traces produced by service-request calls to the distributed service-oriented application as indicated by arrows in the distributed-service-oriented-application diagram 2502 and indicated by the call trace representations 2514 and 2516. Note that the different sen ice nodes are represented by single-character abbreviations, or labels, shown below the disk-shaped representations of the nodes in the distributed-service-oriented-application diagram 2502.

Figure 25B:
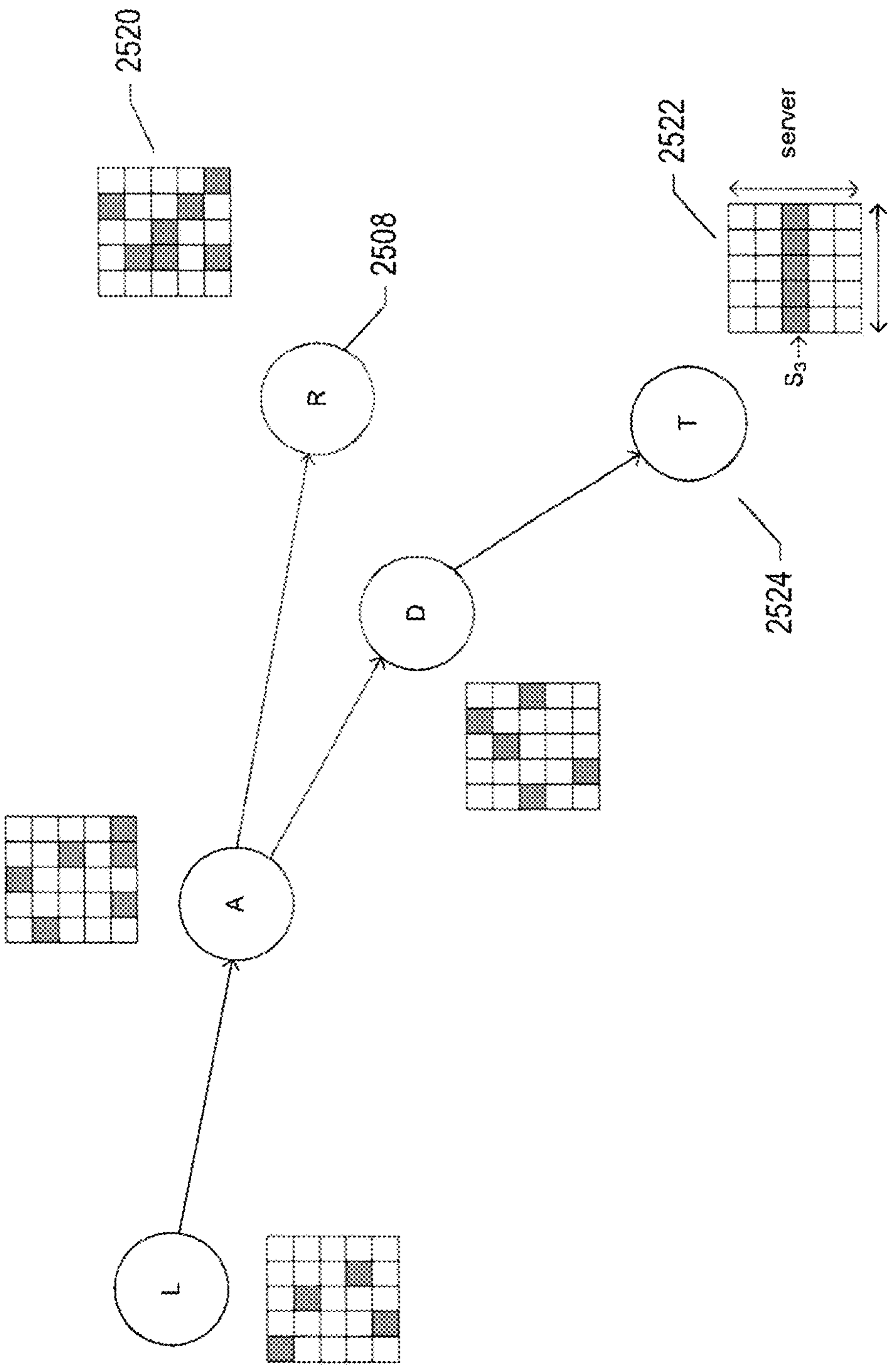

FIG. 25B illustrates a first example of a dimensional analysis of detected problems in the distributed service-oriented application discussed above with reference to FIG. 25A. In FIG. 25B, as with FIGS. 25C-D, discussed below, a portion of the attribute-value space associated with each service node is represented by a two-dimensional section, such as two-dimensional section 2520 shown associated with the redis-cache node 2508. In the two-dimensional section 2522 associated with the third-party-DBMS node 2524, all of the cells corresponding to a particular server are marked to indicate that the third-party-DBMS node instances associated with the particular server are have been determined, by metric analysis, to be exhibiting some type of problem or failure. The remaining service nodes are all associated with two-dimensional sections of the attribute-value space in which the marked attribute values that occur in the call traces that include the problem instances of the third-party-DBMS node are distributed across both of the dimensions, revealing no particularly relevant pattern with respect to the problem-associated third-party-DBMS node instances. In this case, the relevant server-attribute dimension associated with the problem-associated third-party-DBMS node instances is indicative of a problem, such as an overloaded CPU, on a particular server.

Figure 25C:
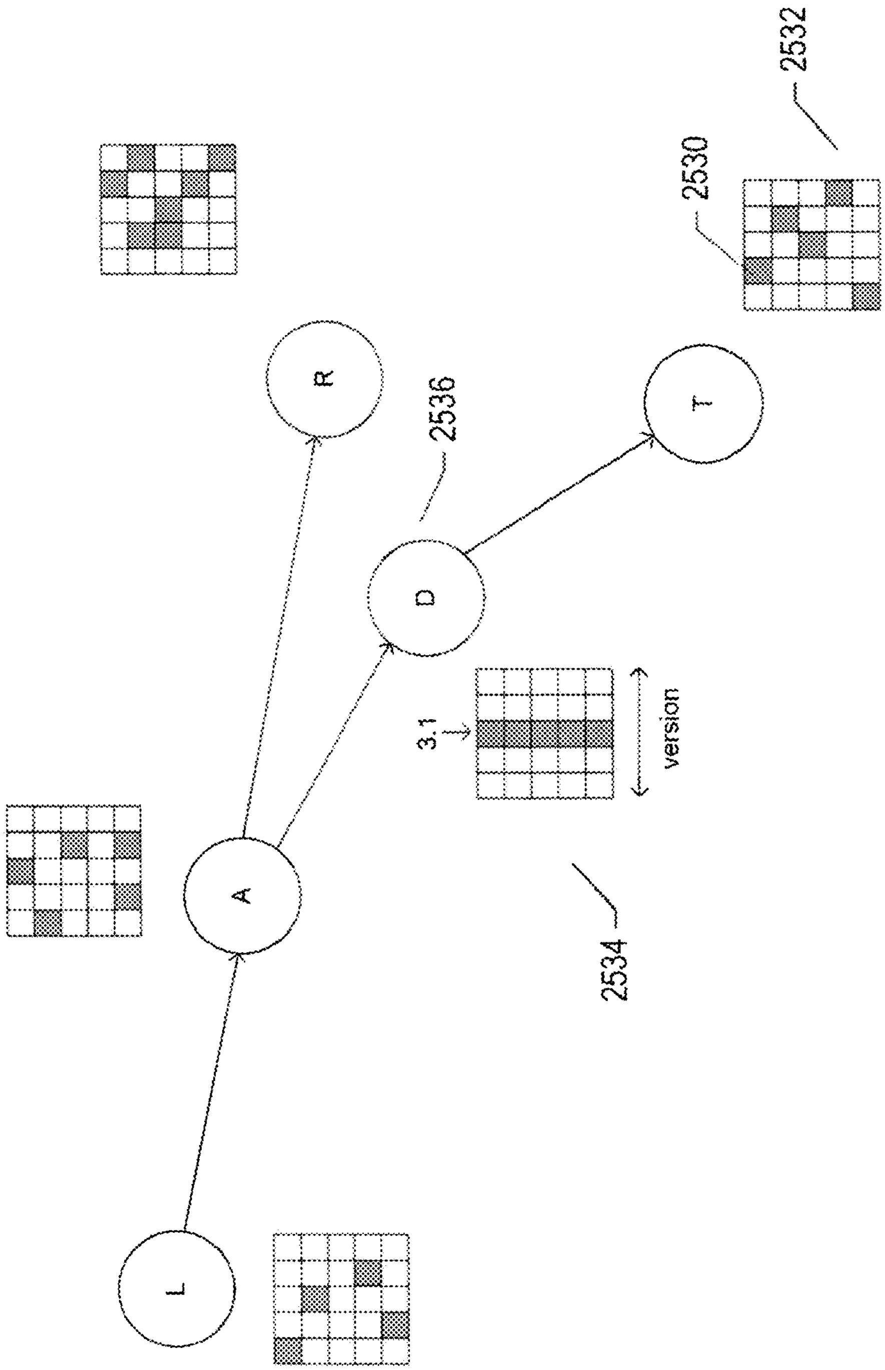

FIG. 25C illustrates a second example of a dimensional analysis of detected problems in the distributed service-oriented application discussed above with reference to FIG. 25A. In this example, numerous instances of the third-party-DBMS node have been determined to be exhibiting anomalous operational behavior via metric analysis. However, the shaded cells, such as cell 2530, in the two-dimensional section of the attribute-value space 2532 associated with the third-party-DBMS node are distributed across both dimensions, revealing no particular pattern or locality within the attribute-value space. When the recently collected call traces that include the problem-associated instances of the third-party-DBMS node are analyzed, and the attribute values of the other service-node instances that appear in these call traces are marked by cross hatching in the remaining two-dimensional sections associated with the other service nodes, the two-dimensional section 2534 associated with the dbserver service node 2536 indicates that only version 3.1 dbserver instances occur in the call traces. This is a strong indication that there is a problem with version 3.1 dbserver instances that is the root cause of the observed third-party-DBMS-node instance failures. No such pattern is evident in the two-dimensional sections associated with the remaining service nodes. In this case, the root cause arises from generation of malformed SQL queries by the version 3.1 dbserver instances.

Figure 25D:
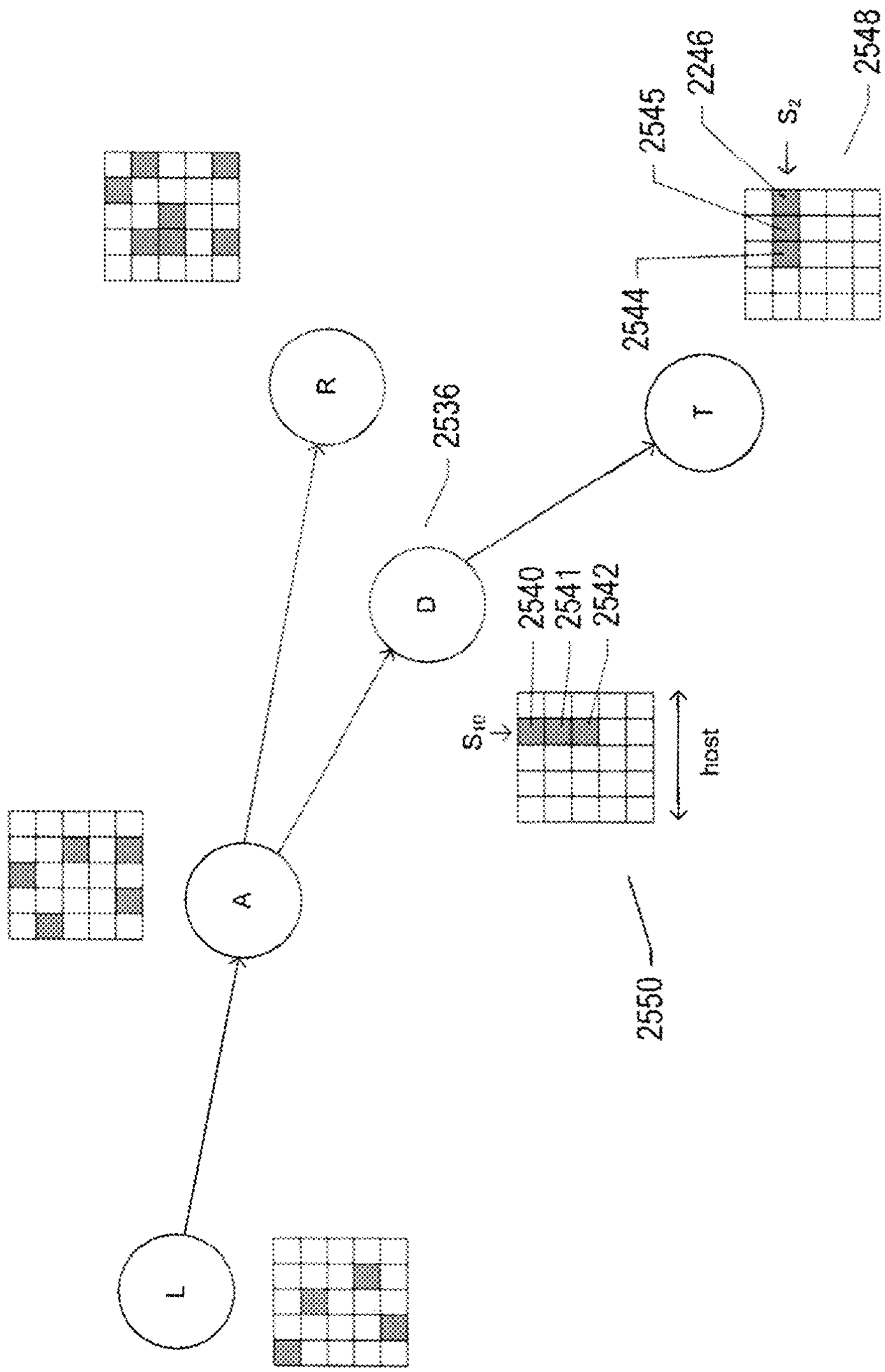

FIG. 25D illustrates a third example of a dimensional analysis of detected problems in the distributed service-oriented application discussed above with reference to FIG. 25A. In this example, a portion of the dbserver service-node instances associated with a particular server have been identified as exhibiting anomalous operational behavior, as indicated by shading of cells 2548-2542. When the attribute values associated with other service-node instances that appear in the call traces that include the dbserver service-node instances exhibiting anomalous operational behavior, instances of the third-party-DBMS node associated with a particular server, as indicated by the crosshatched cells 2544-2546 along a single server-attribute dimension, are observed. In this case, the observed pattern of relevant attribute values along the two server-attribute dimensions for instances of the dbserver and for instances of the third-party-DBMS node indicate a problem involving the two servers corresponding to the two relevant server-attribute dimensions. In fact, in this case, the problem arises from a failing network connection between these two servers. Not all of the cells in each of the two relevant dimensions are marked, indicating that dbserver service-node instances associated with the relevant server-attribute dimension are able to communicate with other third-party-DBMS-node instances and third-party-DBMS-node instances associated with the relevant server-attribute dimension in the two-dimensional section 2548 receive internal service requests from dbserver service-node instances associated with servers other than the server corresponding to the relevant dimension in the two-dimensional section 2550.

In order to analyze metric-data, attribute-value data, and call-trace data, decision-tree-based analyses are used, as mentioned above. It is not necessary, in general, to construct an entire decision tree, nor is it necessary to even construct partial tree-like data structures. Instead, all of the relevant dimensions associated with all of the relevant service nodes may be considered, in turn, to determine whether or not a small number of logical decision-tree nodes could be used to partition relevant call traces into call traces associated with some localized subregion of the attribute-value space associated with one or more service nodes of a distributed service-oriented application. This same technique can be extended to analyze other types of distributed-computing-system components, in addition to distributed service nodes. However, the current examples are based on distributed service nodes as examples of distributed-computer-system components because call-tracing services have been developed to trace service requests through a distributed service-oriented application. Similar types of tracing services may be developed for other types of distributed-computer-system components, in which case the currently disclosed methods would be applicable to dimensional analysis with respect to the other types of distributed-computer-system components. A decision-tree-based analysis can be employed in order to determine whether a localized region of the attribute-value space of service nodes that appear in call traces that include problem-associated service-node instances can be found, such as the case discussed with reference to FIG. 25C, in which all of the version 3.1 instances of the dbserver node, and only the version 3.1 instances of the dbserver node, appear in the call traces that include the problem-associated third-party-DBMS-node instances. A decision-tree-based analysis can also be employed in the example discussed above with reference to FIGS. 23A-K, where an attribute-value-based partitioning was found for partitioning all of the recently collected call traces into call traces that include only the problematic service-node instances. The two types of decision-tree-based analyses are slightly different, and dimension-based analysis of collected data to find attribute dimensions related to detected problems may use both types of decision-tree based analyses as well as additional types of decision-tree based analyses. In all cases, the currently disclosed methods seek relatively simple explanations corresponding to locality of relevant-node-instance attributes within the attribute-value space associated with the service nodes and corresponding to only a few decision-tree nodes with relatively simple partitioning expressions, as further discussed below.

Figure 26A:
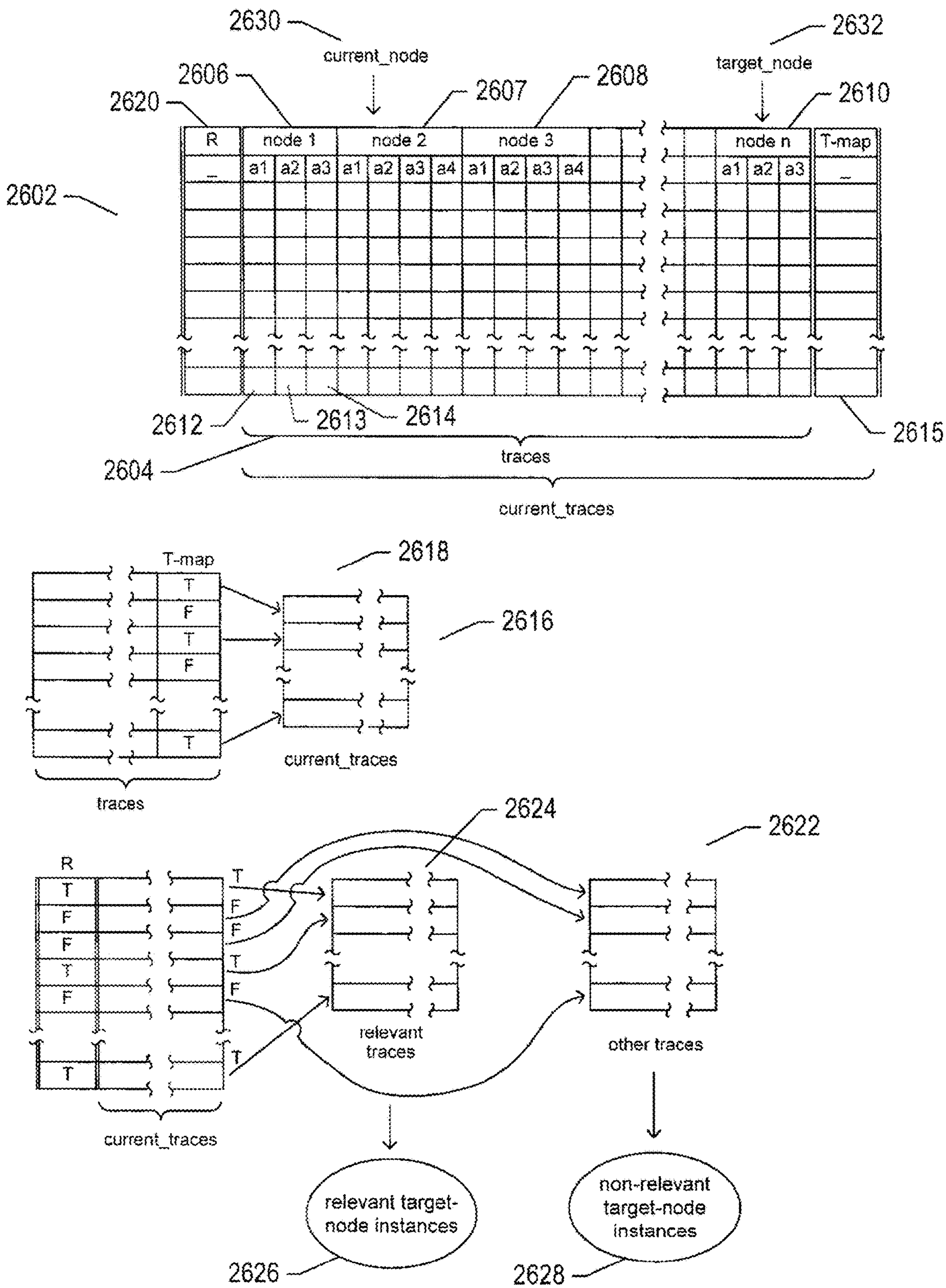
FIGS. 26A-B illustrate data structures and analytical approaches used in the control-flow diagrams provided in FIGS. 27A-F to illustrate the decision-tree-based methods for identifying attribute dimensions relevant to observed anomalies in the operational behaviors of distributed-computer-system components.
Figure 26B:
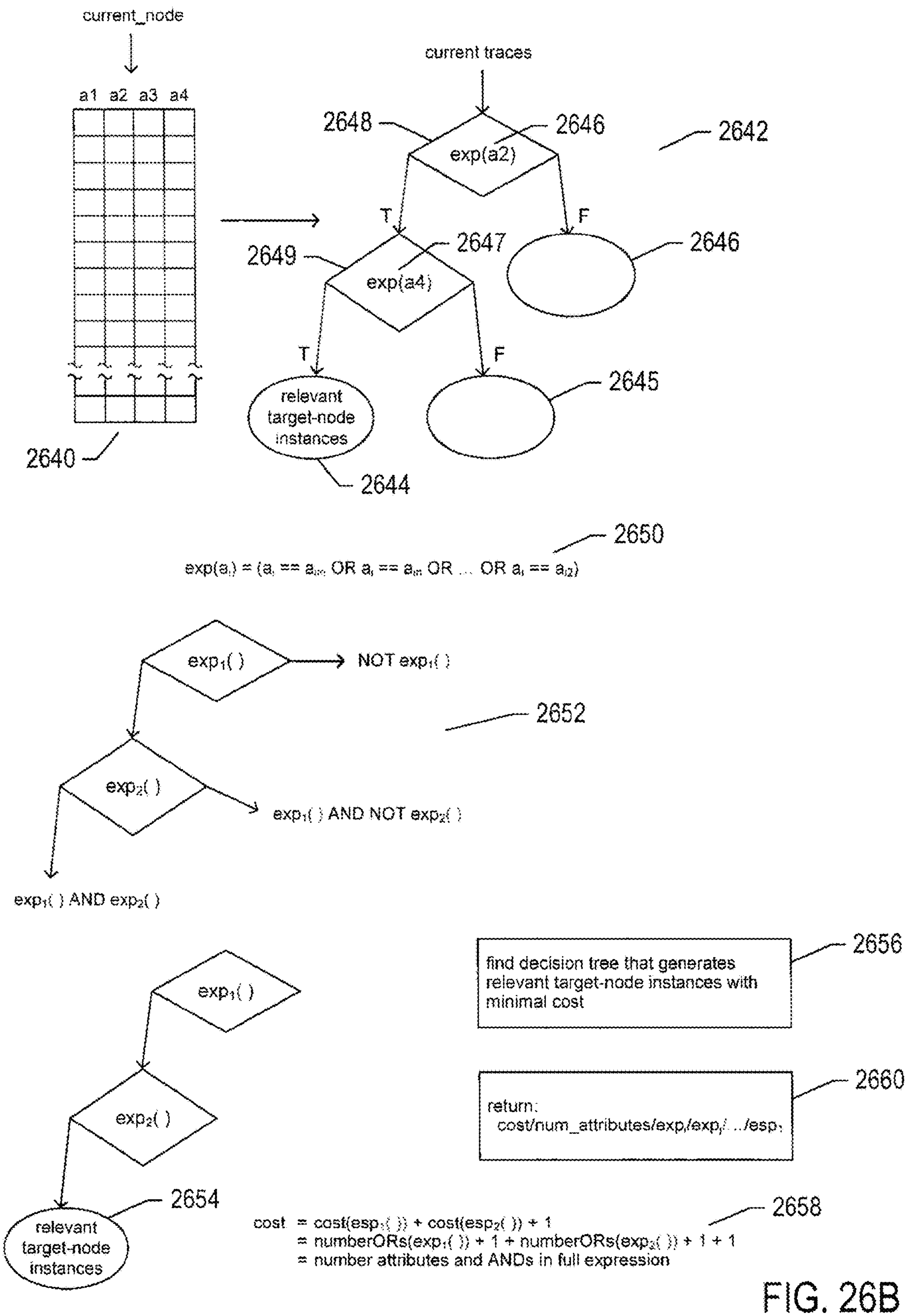

FIGS. 26A-B illustrate data structures and analytical approaches used in the control-flow diagrams provided in FIGS. 27A-F, discussed below, to illustrate decision-tree-based methods for identifying attribute dimensions relevant to observed anomalies in the operational behaviors of distributed-computer-system components. FIG. 26A shows a data structure that stores call traces combined with attribute values, including attribute values obtained directly from call traces as well as attribute values maintained by an attribute service, as discussed above. The traces data structure 2602 includes a full set of recently received call traces 2604, with each call trace represented by a row in the tabular data structure. The service nodes in each call trace are represented by higher-level columns 2606-2610, each of which contains multiple lower-level columns, each lower-level column representing the value for an attribute maintained for the service node. For example, higher-level column 2606 represents a first service node and the lower-level columns 2612, 2613, and 2614 store values for attributes a1, a2, and a3 for the first service-oriented-application. FIG. 23H provides an example of a tabular data structure storing recently collected call traces. The column T-map 2615 contains Boolean values indicating whether or not each call trace of the recently received call traces 2604 is to be considered during the current decision-tree-based analysis. Thus, this column is used to select the set of call traces to be used for a particular analysis. In the above-discussed examples, one such subset that is commonly used is the subset of call traces that include problem-associated service-node instances. Thus, as shown in diagram 2616 in FIG. 26A, the T-map column is used to select the current traces 2618, or current subset of the full set of traces, for an analysis. The column R 2620 is used to identify the relevant call traces for a decision-tree-based partitioning of the current call traces. For example, the relevant call traces may be call traces that include particular service-node instances identified as exhibiting anomalous operational behaviors. The decision-tree-based partitioning seeks to find several decision-tree nodes containing relatively simple partitioning expressions that will partition the current nodes into a set containing the relevant traces, and only the relevant traces, and another set that, depending on the particular type of decision-tree analysis, may contain only the non-relevant traces or may contain both relevant and non-relevant traces. As indicated by diagram 2622, the Boolean values in the column R select a subset of the current traces 2624, and a function is applied to those selected traces to produce a set of relevant target-node instances 2626, such as the particular service-node instances identified as exhibiting anomalous operational behaviors. Thus, decision-tree-based partitioning attempts to partition all of the service-node instances associated with current traces into the set of relevant target-node instances 2626 and another set 2628 that includes non-relevant target-node instances as well as, in some cases, relevant target-node instances. Finally, the data structure includes a current_node pointer 2630 and a target_node pointer 2632. The target_node pointer points to the service node that contains instances considered to be target instances for partition 2626 and the current_node pointer points to the service node associated with the attribute dimensions that are to be used in the decision-tree-based analysis in an attempt to partition the target-node instances. In certain cases, the current_node pointer and the target_node pointer may point to the same service node.

FIG. 26B illustrates the decision-tree-based analysis used in currently disclosed methods. The analysis considers the attribute values associated with instances of the service node referenced by the current_node pointer 2640. The analysis attempts to build a small decision tree 2642 that can be used to partition the current traces into a set of relevant target-node instances 2644 and other sets 2645-2646 containing non-relevant target-node instances. In the case of an analysis where the current_node pointer and the target_node pointer point to the same service node, the relevant target-node instances may often occur in all of the current call traces and the non-relevant target-node-instance sets would be empty at the lowest level of the decision tree. Each node of the decision tree includes a Boolean expression, such as expressions 2646-2647 in decision-tree nodes 2648 and 2649, respectively. A Boolean expression 2650 includes one or more terms, with multiple terms separated by Boolean OR operators. Each term indicates that a particular attribute a, of the current node has a particular value, such as the attribute value $a_m$. The traces input to the node are partitioned by the node into traces for which the expression returns a TRUE result and traces for which the expression returns a FALSE result, as indicated by diagram 2652. When the decision-tree-based analysis succeeds, the leftmost leaf set of the decision tree 2654 contains all of the relevant target-node instances and only the relevant target-node instances. The goal of the analysis 2656 is to find a portion of a decision tree that generates the relevant target-node instances with minimal cost, where the cost 2658 is equal to the number of attribute values in all of the expressions along a path of nodes leading to the relevant target-node instances summed with the depth of the decision tree minus one. En other words, the analysis seeks the simplest explanation that partitions the current traces into a set of traces corresponding to the relevant target-node instances. The product result produced by the analysis 2660 is one or more decision-tree synopses indicating the cost of the decision tree, the number of attributes or nodes in the path of the relevant target-node instances, and the expressions in each of those nodes. These decision-tree synopses can be sorted by cost to produce an ordered set of likely relevant attribute dimensions related to a set of target service-node instances. There are many well-known decision-tree methods, including ID3 and J48/C4.5. Many specific approaches to decision-tree analysis may be employed in the currently disclosed methods.

Figure 27A:
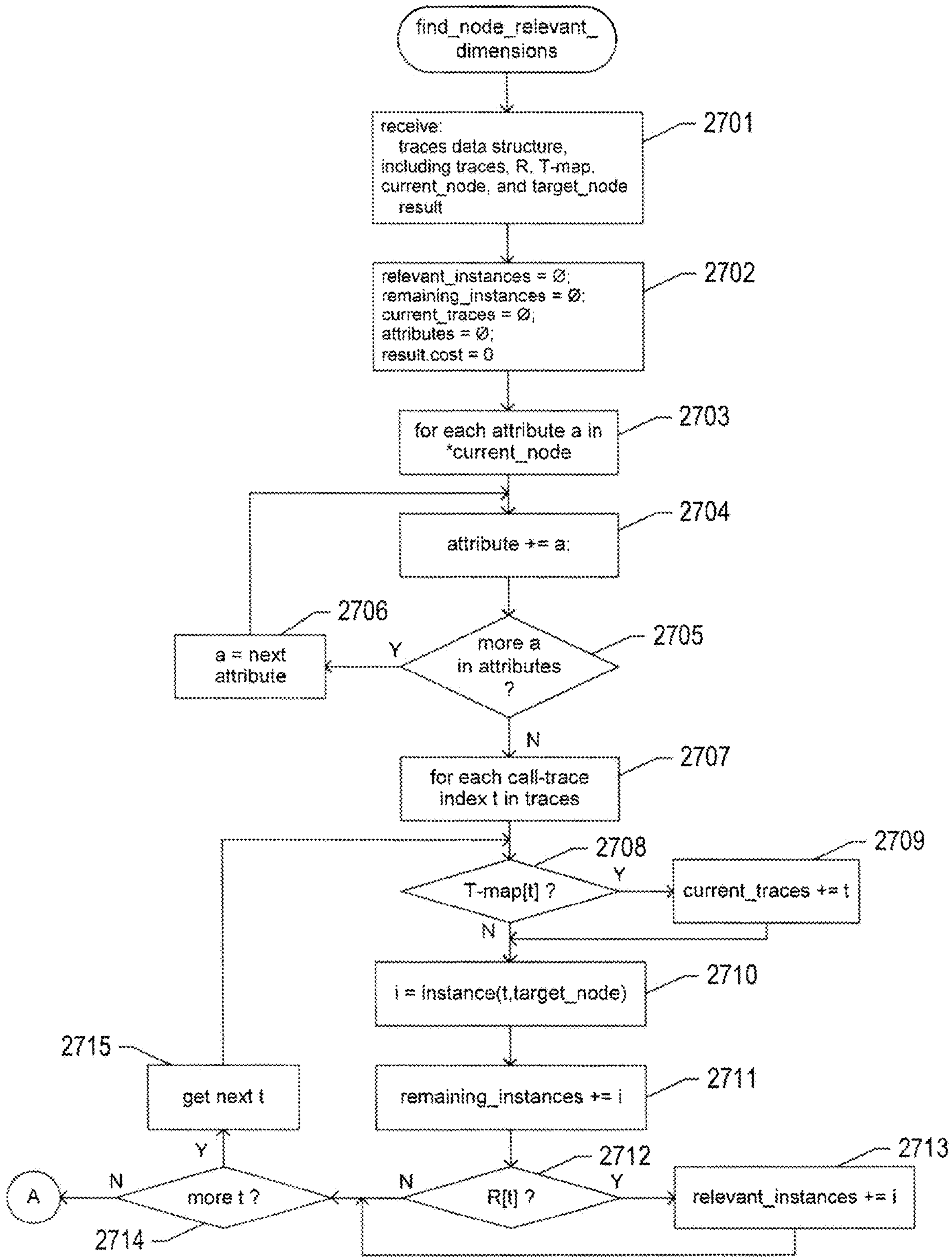
FIGS. 27A-H provide control-flow diagrams that illustrate one implementation of the decision-tree-based analysis used by currently disclosed methods and systems for determining attribute dimensions of the distributed-computer-system components relevant to particular anomalous operational behaviors observed for one or more distributed-computer-system components.
Figure 27B:
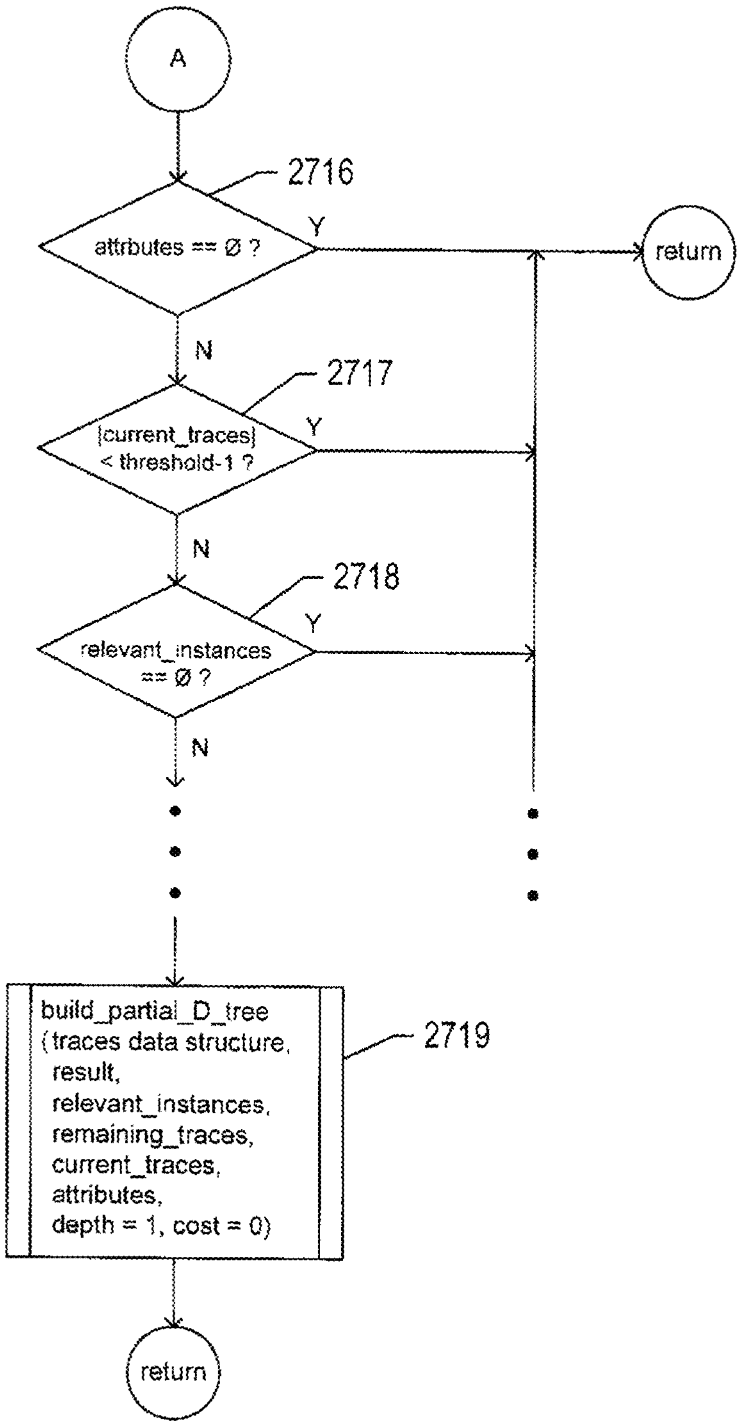

FIGS. 27A-H provide control-flow diagrams that illustrate one implementation of the decision-tree-based analysis used by currently disclosed methods and systems for determining attribute dimensions of the distributed-computer-system components relevant to particular anomalous operational behaviors observed for one or more distributed-computer-system components. FIGS. 27A-B provides a control-flow diagram for a routine find_node_relative_dimensions that processes call traces in the logical traces data structure 2602 described above with reference to FIG. 26A to find a best decision tree, or portion of a decision tree, to partition target-node instances based on attribute values for the node referenced by current_node. In step 2701, the routine find_node_relative_dimensions receives the traces data structure and a reference to a memory location for storing a result. In step 2702, the local set variables relevant_instances, remaining_instances, current_traces, and attributes are initialized to contain no entries. Set variables operate like mathematical sets, and contain only a single entry for any particular value. In addition, the cost field of the result referenced by the reference result is set to 0, a value indicating that the dimensional analysis has failed. In the for-loop of steps 2703-2706, the attributes associated with the node referenced by current node are placed into the set attributes. In the for-loop of steps 2707-2715, each trace in the traces data structure is considered, with t representing the index of a trace. Those traces indicated to be members of the current traces by the T-map are placed into the set variable current traces in step 2709. In step 2710, a function instance is used to obtain an identifier for the target-node instance corresponding to the currently considered trace. The function returns a non-instance-identifying value when the target-node instance does not appear in the current trace. The determined target-node-instance identifier, if it has a target-node instance-identifying value, is placed in the set variable remaining_instances and, when the instance is indicated in the R column of the traces data structure to be a relevant target-node instance, as determined in step 2712, the determined target-node-instance identifier is placed into the set variable relevant_instances in step 2713. Moving to FIG. 27B, in a series of conditional steps 2716-2718, the routine find_node_relative_dimensions determines whether or not there is sufficient data in the traces data structure for dimensional analysis. For example, when there are no attributes associated with the current node, when the number of current traces is below a threshold value, or when the set variable relevant_instances is empty, indicating that there are no relevant target nodes for the analysis, routine find_node_relative_dimensions returns. Otherwise, in step 2719, routine find_node_relative_dimensions calls the routine build_partial_D_tree to attempt to logically generate a portion of the left-hand edge of a decision tree that would select the relevant target nodes and only the relevant target nodes from the current call traces.

Figure 27C:
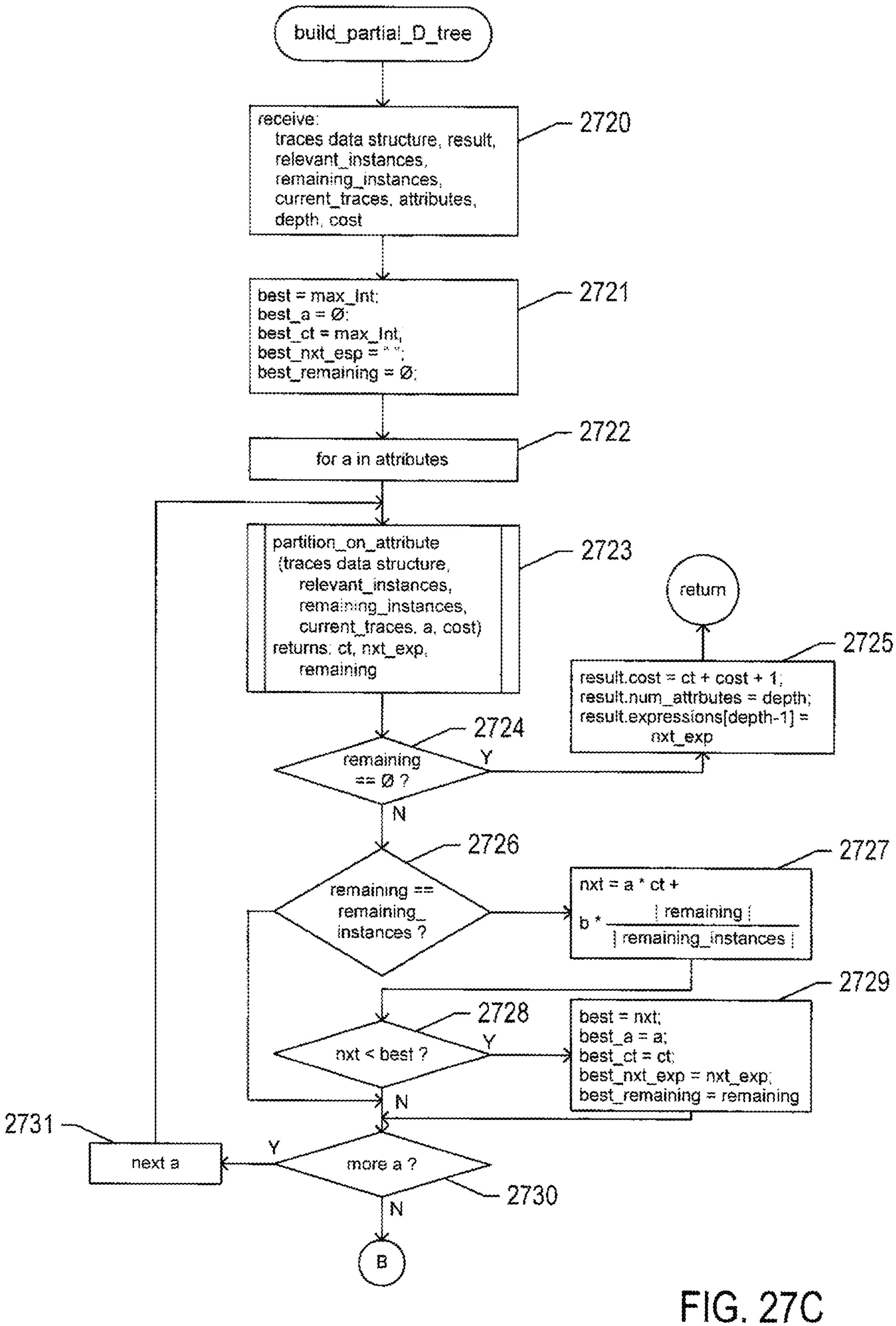
Figure 27D:
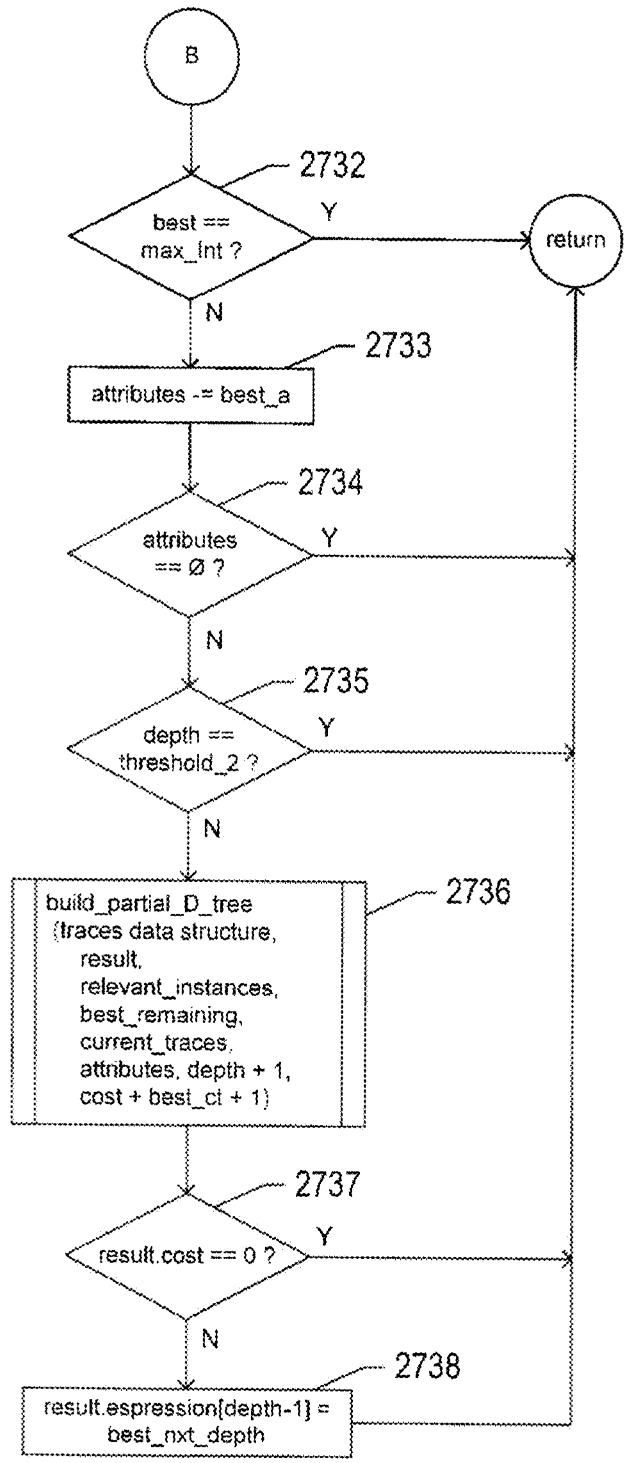

FIGS. 27C-D provide control-flow diagrams for the routine build_partial D_tree, called in step 2719 of FIG. 27B. In step 2720, the routine build partial D_tree receives the trace data structure 2602 along with the reference result, the set variables relevant_instances, remaining_instances, current_traces and attributes, a variable depth containing the currently considered level of the decision tree, a variable cost containing the current cost of the decision tree. In step 2721, local variable best is initialized to a large integer value, local variable best_a is initialized to contain no attribute, local variable best_ct is initialized to contain a large integer value, local variable best_nxt_exp is initialized to contain the empty string, and the local set variable best_remaining is initialized to the empty set. In the for-loop of steps 2722-2731, each attribute a in the set attributes is considered for being the attribute in a next node of the partial decision tree. In step 2723, a routine partition_on_attribute is called to logically create a node corresponding to the currently considered attribute a, returning the cost of the expression in the node ct, the expression for the node nxt_exp, and the set of target-node instances remaining that remain after the expression in the node and in any higher-level nodes are applied to the current traces. When the routine partition_on_attribute returns an empty set remaining, as determined in step 2724, the partial decision trees complete, and the dimensional analysis has identified a set of relevant dimensions to explain the relevant target nodes. In this case, in step 2725, values are entered into the cost and num_attributes fields of the result and the current node expression is entered into the subfield of the expressions field corresponding to the depth of the node generated by the routine partition_on_attribute. When the set remaining returned by the routine partition on_attribute is equal to the set remaining_instances, as determined in step 2726, the routine partition_on_attribute failed to find an attribute that would further decrease the number of target-node instances, as a result of which control flows to step 2730, where the routine build_partial D_tree determines whether to continue iterating the for-loop of steps 2722-2731. Otherwise, in step 2727, a total cost function is used to determine a cost metric for the node that would be associated with the currently considered attribute a and, when this cost metric is lower than the contents of the local variable best, as determines in step 2728, the parameters for the node that would be associated with the currently considered attribute are stored in the local variables in step 2729. Continuing in FIG. 27D, in a series of conditionals, the routine build_partial D_tree determines whether or not to continue the dimensional analysis. When no attribute was found for association with a new node by the routine partition_on_attribute, as determined in step 2732, the analysis has failed and the routine build_partial D_tree returns. In step 2733, the attribute best_a is removed from the set attributes. When the set attributes is not empty, as determined in step 2734, there is no point continuing the dimensional analysis and so the routine build_partial D_tree returns. When the current depth of the decision tree is equal to a threshold value, as determined in step 2735, the partial decision tree is already too complex and costly to represent a valid relevant-dimension determination, and therefore the routine build_partial D_tree returns. In other words, as the depth of the tree grows, the complexity of the decision-tree-analysis-generated explanation for the partitioning of the current traces into a set of traces corresponding to the relevant target-node instances increases, and a point may be reached where the explanation has no relevance to the higher-level dimensional analysis of observed anomalies. A more comprehensive determination that considers the entropy of the remaining partitioning task may be undertaken to determine when to short-circuit the dimensional analysis, in alternative implementations. Otherwise, in step 2736, the routine build_partial D_tree is recursively called to attempt to generate an additional node along the left edge of the partial decision tree. When that call fails, as determined in step 2737, the routine build_partial D_tree returns. Otherwise, in step 2738, the expression for the node created by the build_partial D_tree is entered into the proper position within the subfield of the expressions field of the result.

Figure 27E:
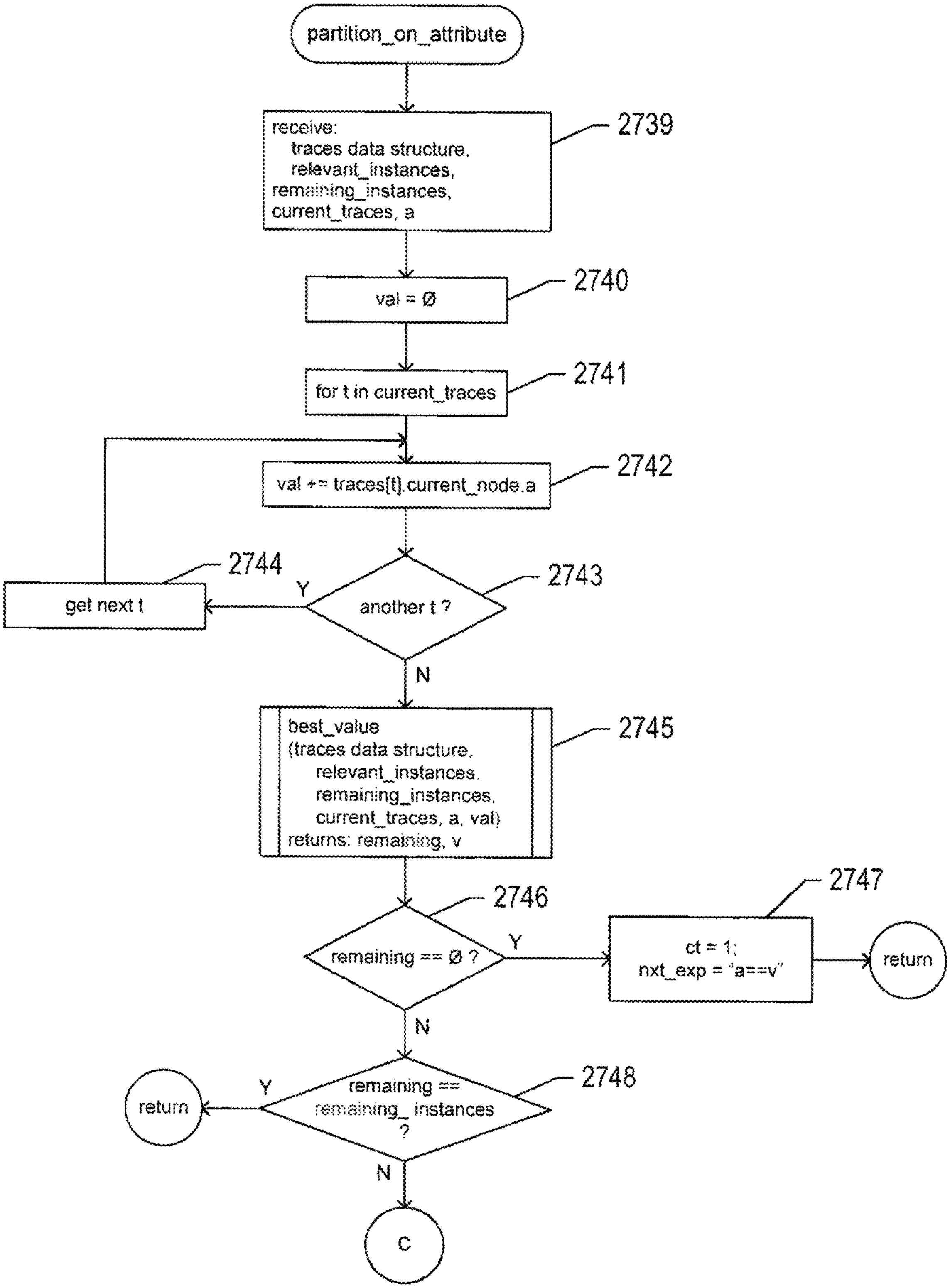
Figure 27F:
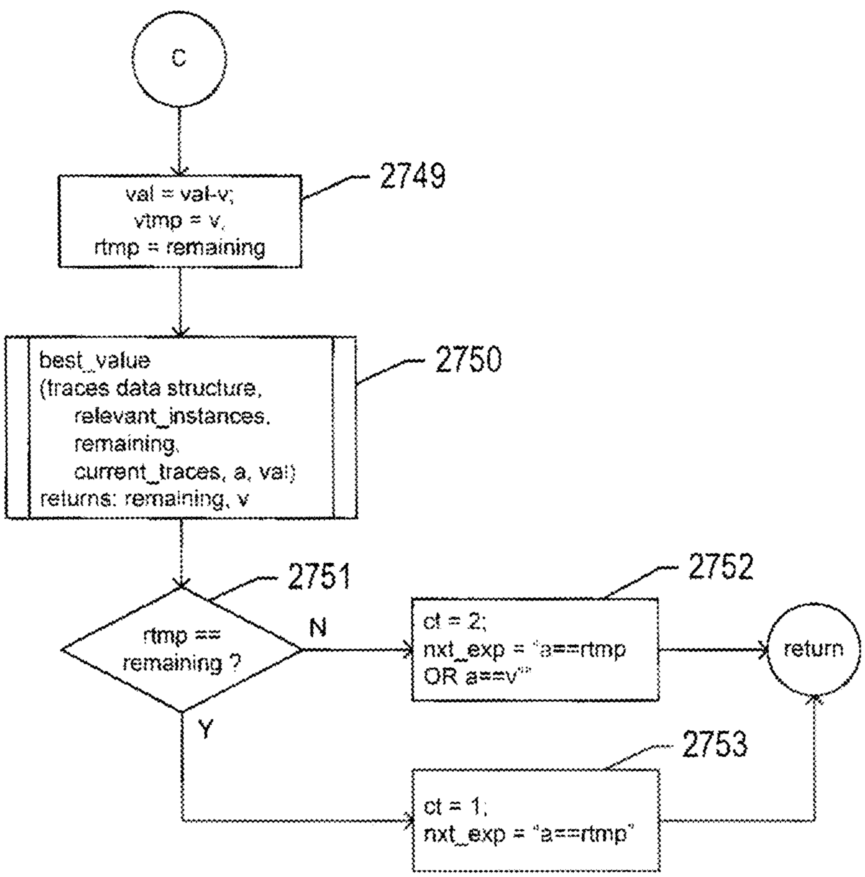

FIGS. 27E-F provides a control-flow diagram for the routine partition_on_attribute, called in step 2723 of FIG. 27C. In step 2739, the routine partition_on_attribute receives the traces data structure, the set variables relevant_instances, remaining_instances, and current_traces, and the attribute a. In step 2740, a local set variable val is initialized to the empty set. In the for-loop of steps 2741-2744, all of the current traces are considered in order to determine the set of different values for attribute a, which are stored in set variable val. In step 2745, the routine best value is called to further partition the target-node instances in the set variable remaining instances, returning the left-hand resultant partition, remaining, for a decision-tree node based on a value v selected from the value stored in the set variable vals. When the set remaining is empty, as determined in step 2746, the node containing an expression including the attribute value v is sufficient for a partitioning that generates the relevant target-node instances, and therefore the routine partition_on_attribute returns, in step 2747, an expression for the node as well as a cost of 1 in the return value et. When the set remaining is equal to the set remaining_instances, as determined in step 2748, the routine best_value failed to find a value that provided additional partitioning of the target-node instances in the set remaining instances. In this case, the routine partition_on_attribute returns, with the failure detected in the calling routine build_partial D_tree. Continuing in FIG. 27F, since the set remaining still includes target-node instances that need to be filtered, the value v is removed from the set val in step 2749 and the routine best_value is again called in step 2750. If another attribute value is found by the routine best_value, and if this attribute value further partitions the target-node instances of the set remaining, as determined in step 2751, then, in step 2752, the routine partition_on_attribute returns a note expression that includes both the previously identified attribute value in the attribute value determined in step 2750 as well as a cost of 2. Otherwise, when the second call to the routine best_value did not provide a value that further partitioned the target-node instances, as determined in step 2751, an expression containing only the initial identified value, identified in step 2745, and a cost of 1 is returned in step 2753. In the implementation shown in FIGS. 27A-G, node expressions with more than two attribute values are not considered, since once more than two attribute values are needed to produce a partitioning, the likelihood that the attribute is a significant and relevant dimension is considered to be below a threshold probability. In other words, in the illustrated and described implementation, the dimensional analysis is looking for attribute dimensions with highly localized value subsets that might explain the observed problem-associated, or relevant target-node instances.

Figure 27G:
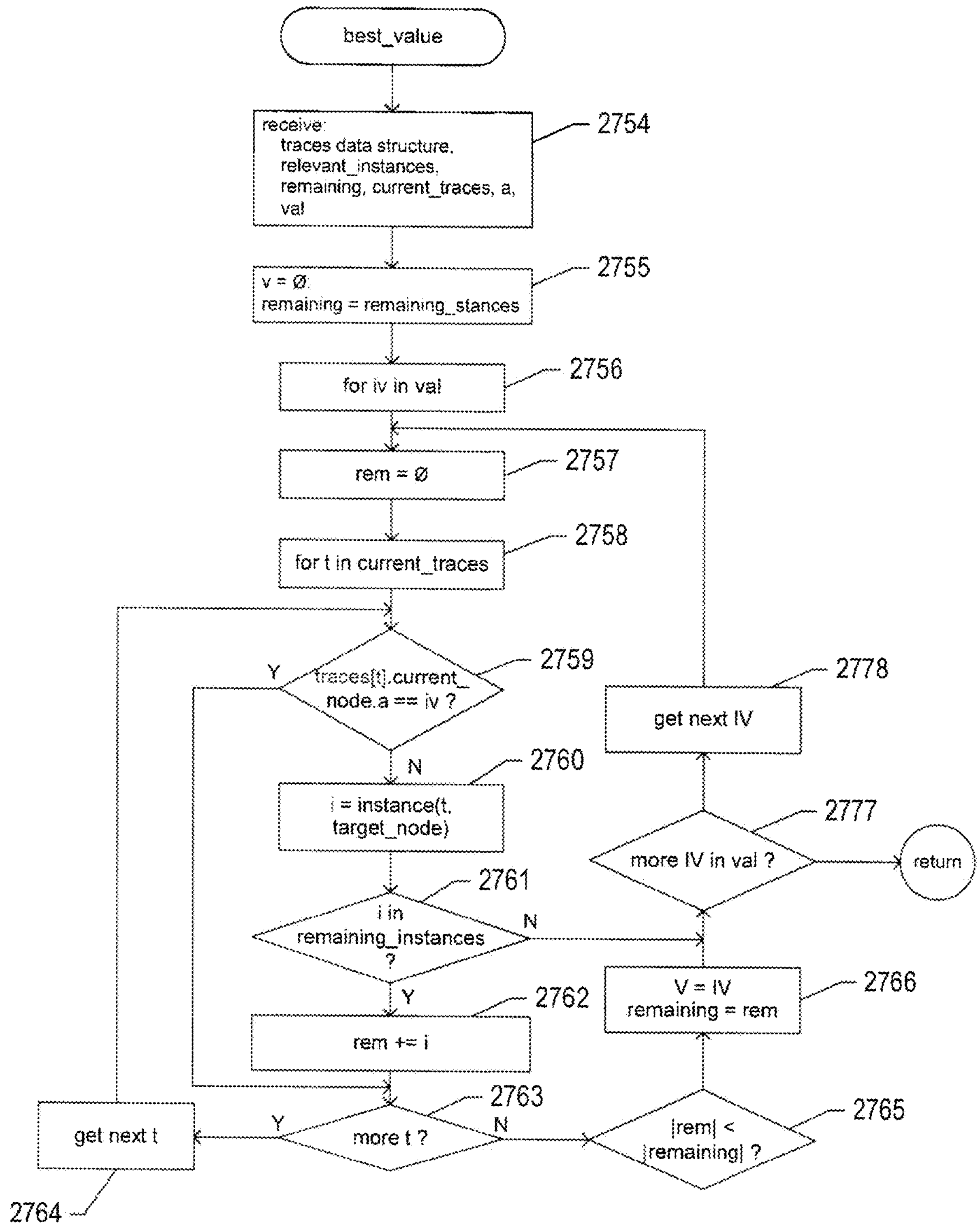

FIG. 27G provides a control-flow diagram for the routine best_value, called in step 2745 in FIG. 27E and in step 2750 in FIG. 27F. The routine best_value attempts to select a best attribute value from the attribute values in the set val for partitioning the target-node instances in the set remaining_instances to produce a resultant set as close as possible to the relevant target-node instances. In step 2754, the routine best_value receives the traces data structure, the sets relevant_instances, remaining_instances, current_traces, and val, and the currently considered attribute a. In step 2755, local variable v is set to a non-attribute-value value and local set remaining is set to contain the same target-node instances as contained in the set remaining_instances. In the outer for-loop of steps 2756-2778, each attribute value iv in the set val is considered. For each considered attribute value iv, the local set rem set to the empty set, in step 2757 and, in the for-loop of steps 2758-2764, a partitioning of the target-node instances in the set remaining is carried out based on currently considered attribute value iv. In the for-loop of steps 2758-2764, each trace in the current traces is considered. When the currently considered trace has a value for attribute a equal to the currently considered attribute value iv, as determined in step 2759, the instance i for the target-node instance contained in the currently considered trace is determined by a call to a function instance, in step 2760. The function instance returns a node identifier in the case that the target node does not appear in the currently considered trace. When the instance i is not contained in the set remaining instances, as determined in step 2761, the for-loop of steps 2759-2764 is terminated, because the partitioning carried out by the for-loop of steps 2759-2064 should not add any non-relevant target-node instances to the left-hand partition produced by the decision-tree node that includes an expression containing the currently considered attribute value. Otherwise, the instance i is added to the set rem, in step 2762. Upon completion of the for-loop of steps 2759-2064, the routine best_value determines, in step 2065, whether the number of target-node instances in the set rem is less than the number of target-node instances in the set remaining. If so, the local variable v is set to the currently considered attribute value iv and the set remaining is set to contain the contents of the set rem, in step 2766, since the partitioning produced by the currently considered attribute value iv is better than that produced by any previously considered attribute values during execution of the for-loop of steps 2758-2064. At the completion of the for-loop of steps 2756-2778, all of the attribute values in the set val have been considered, and the routine best_value returns.

Figure 27H:
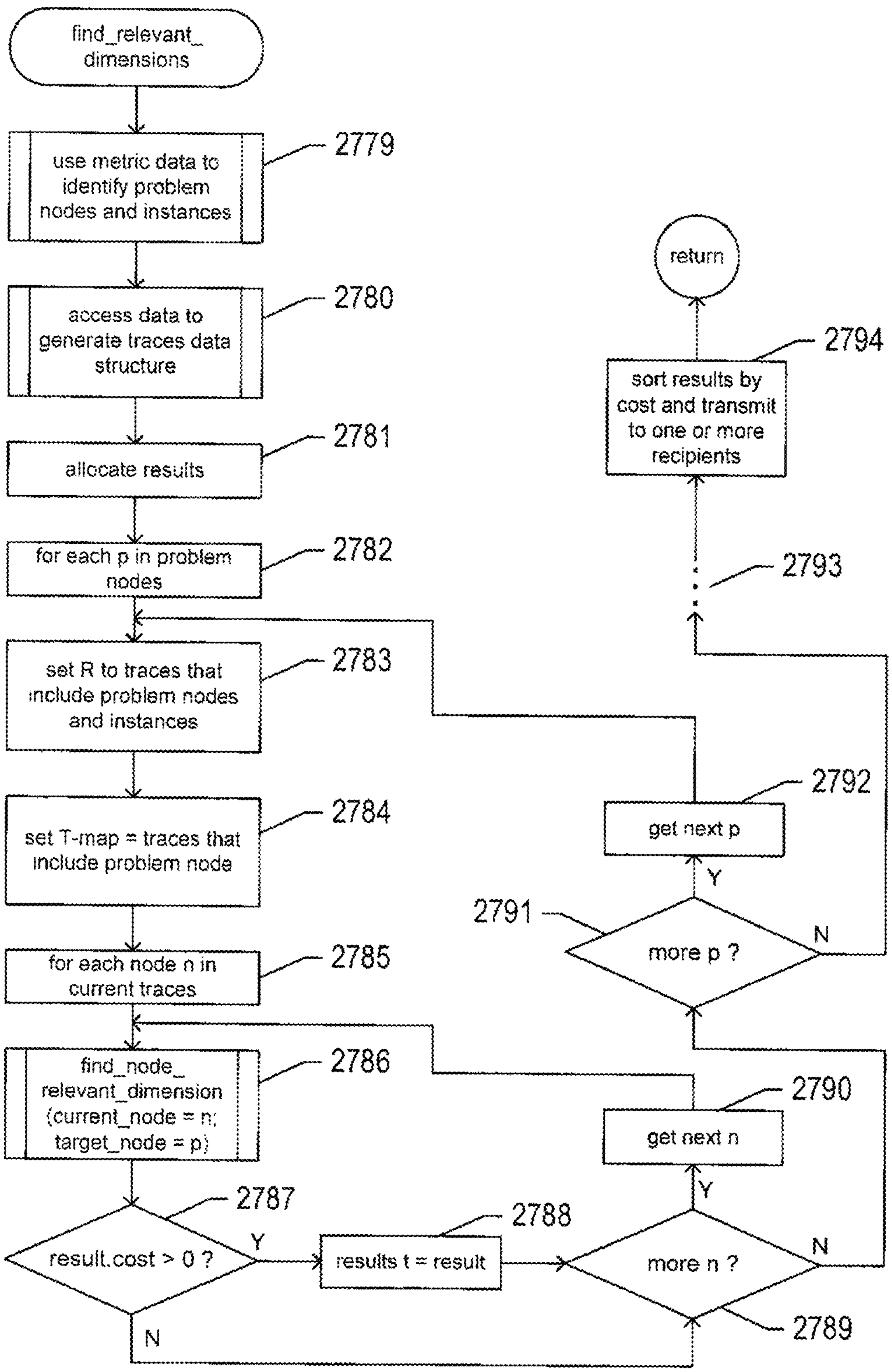

FIG. 27H provides an indication of how the above-described decision-tree-based dimensional analysis is incorporated into an overall dimensional analysis based on metric values, attribute values, and call traces. FIG. 27H provides a control-flow diagram for a routine find_relevant_dimensions, which illustrates a family of approaches to the dimensional analysis disclosed in the current document. In step 2779, metric data is used to identify problem nodes and problem-node instances, as discussed above with reference to FIGS. 22A-B. In step 2780, attribute-value data and call-trace data are used, together, to generate collected call-trace-and-attribute-value data, such as the data stored in the traces data structure discussed above with reference to FIG. 26A. In step 2781, an array of results is allocated to hold results such as the result 2660 discussed above with reference to FIG. 26B. In the for-loop of steps 2782-2792, each identified problem node p is considered. In step 2783, the column R of the traces data structure is set to identify traces that include problem-associated instances of the currently considered problem node p. In step 2784, the T-map column of the traces data structure is set to identify call traces that include the currently considered problem node p. In the inner for-loop of steps 2785-2790, each of the different nodes n in the current traces identified by the T-map column are considered. In step 2786, the currently considered node n and currently considered target node p are input to the routine find_node_relevant_dimensions, discussed above with reference to FIGS. 27A-F. When the routine find_node_relevant_dimensions produces a result with a cost greater than 0, as determined in step 2787, the result is added to the set results in step 2788. Thus, for each identified problem node, relevant attribute dimensions for the nodes in the call traces that include the problem node are identified in the nested for-loops of steps 2782-2792. As indicated by ellipses 2793, many other dimensional analyses may be carried out, by including considerations of larger sets of call traces, and by varying other parameters provided to the routine find_node_relevant_dimensions. Furthermore, other approaches to identifying relevant attribute dimensions, in addition to those embodied in the routine find_node_relevant_dimensions, may be employed in additional dimensional analyses. Finally, all of the results collected in the set results may be sorted by cost and then encoded for transmission to one or more recipients, in step 2794.

Call-Trace Clustering Methods and Systems

Figure 28:
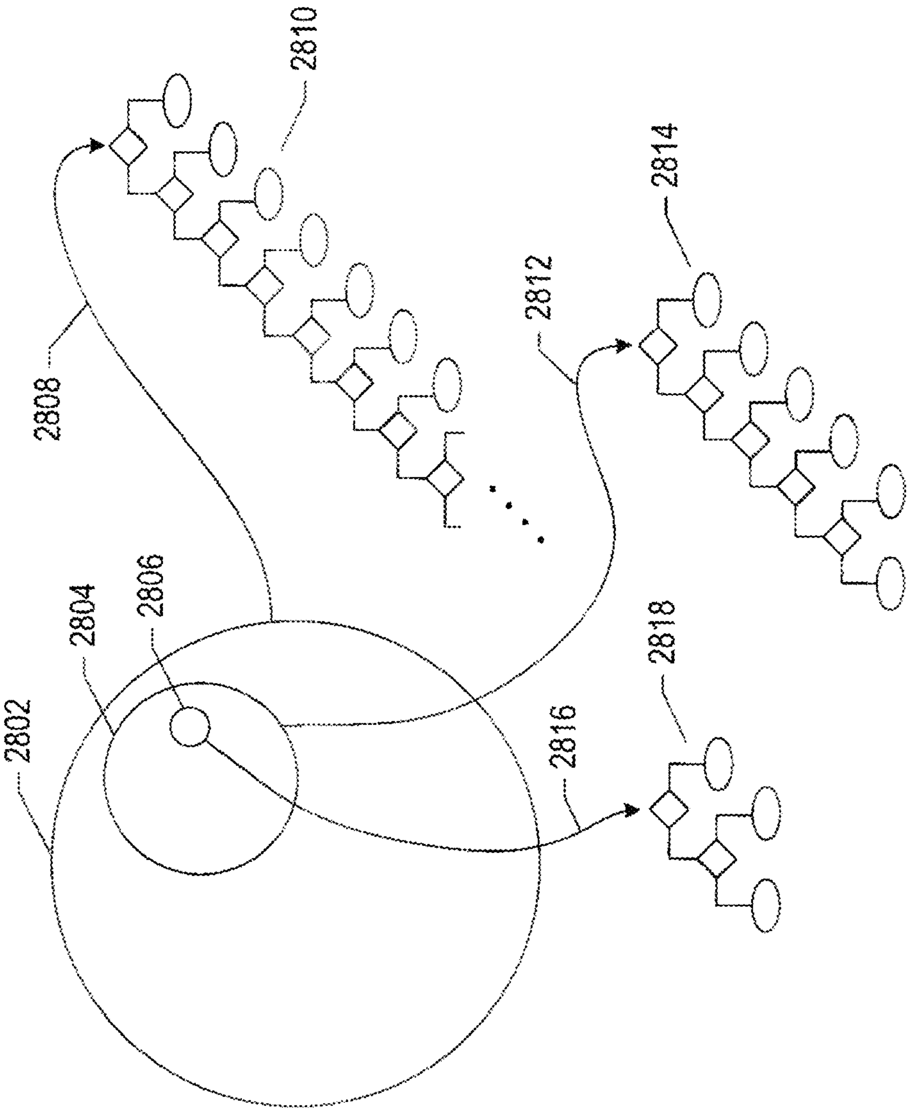
FIG. 28 illustrates a problem with applying dimensional analysis to very large sets of call traces.

FIG. 28 illustrates a problem with applying the above-discussed dimensional analysis to very large sets of call traces. In many cases, and often at early stages of anomalous operational behaviors within distributed computer systems, only a small percentage of the collected call traces are relevant to, or contain information useful for identifying, an emerging anomalous operational behavior. As an emerging problem cascades within a distributed computer system, a generally larger, increasing percentage of the call traces becomes relevant, but even in the latter stages, only a fraction of the total collected call traces contain information relevant to the cascading anomalous operational behaviors. In FIG. 28, a large circular area 2802 represents the total collected call traces and smaller circular areas 2804 and 2806 represent increasingly smaller subsets of the total collected call traces. When the above-discussed decision-tree-based dimensional analysis is applied to the total collected call traces, as represented by curved arrow 2808, the resulting decision tree 2810 may be large and complex, since complex logic may be needed to differentiate the small fraction of relevant call traces from the much larger fraction of non-relevant call traces in the total set of collected call traces. It may even be possible, in certain cases, that the above-discussed decision-tree-based dimensional analysis may fail to provide a decision tree that fully partitions the relevant call traces from the total set of call traces. When the above-discussed decision-tree-based dimensional analysis is applied to the smaller subset 2804 of the collected call traces, as represented by curved arrow 2812, it is often the case that the resulting decision tree 2814 may be more compact and less complex, since fewer non-relevant call traces may need to be filtered out during dimensional analysis. When the above-discussed decision-tree-based dimensional analysis is applied to the smallest subset 2806 of the collected call traces, as represented by curved arrow 2816, the resulting decision tree 2818 may be even more compact and less complex. The complexity and size of the decision tree produced by dimensional analysis is often inversely proportional to the utility of the decision tree for identifying attribute dimensions relevant to anomalous operational behavior within the distributed computer system. However, simply selecting a small subset of the call traces to which to apply the above-discussed dimensional analysis does not provide a workable solution to this problem, since, as discussed above, call traces that initially appear to be non-relevant may, in fact, be necessary for identifying root causes of anomalous operational behaviors. A full set of call traces therefore generally needs to be analyzed, since it cannot be predicted, in advance of determining a root cause for an anomalous operational behavior or error condition, which subset of the collected call traces is relevant to identifying the root cause.

One approach to addressing the problem discussed in the preceding paragraph is to use a clustering method to partition the total set of collected call traces into smaller subsets of related call traces, each subset of related traces representing a particular trace type. The disclosed approach involves vectorization of call traces, selection of a first distance metric for call-trace vectors and a second distance metric for call-trace-vector clusters, clustering call-trace vectors using the selected distance metrics, and application of the above-discussed decision-tree-based dimensional analysis to each cluster of call traces. Each of these steps are next discussed with reference to illustrations.

Figure 29:
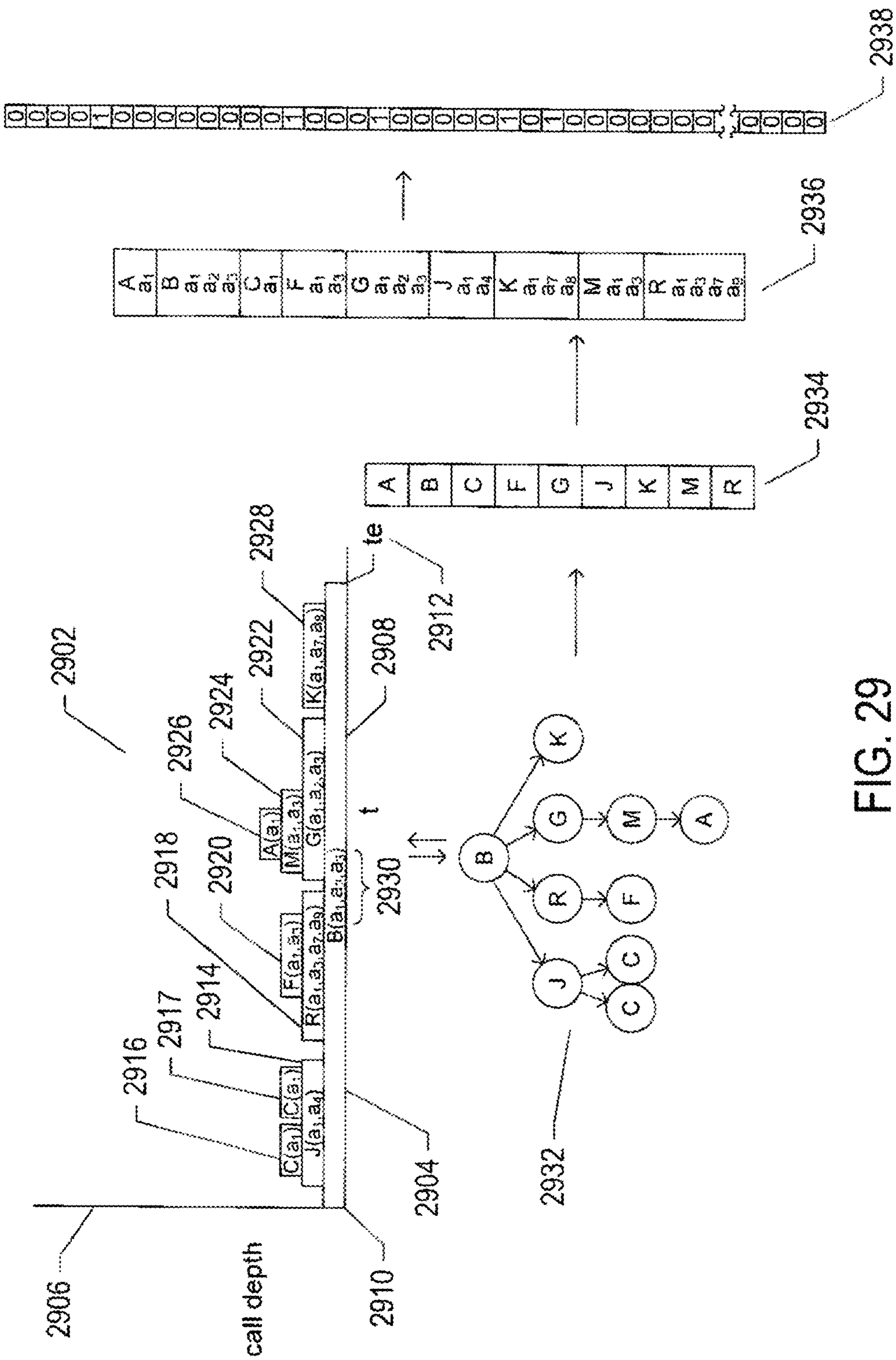
FIG. 29 illustrates one approach to vectorizing call traces.

FIG. 29 illustrates one approach to vectorizing call traces. Plot 2902 illustrates the time sequence of service calls that together implement a distributed-application entrypoint, with a horizontal time axis 2904 and a vertical call-depth axis 2906. A call to the distributed-application entrypoint begins with execution of the first service call B 2908. This service call, in an example distributed application, is active from time $t_0$ 2910, when the entrypoint call is received by the distributed application, to time $t_e$ 2912, when the call to the distributed-application entrypoint finishes. Service B first calls service J 2914, which twice calls service C 2916-2917. Service B then calls service R 2918, which calls service F 2920. Service B next calls service G 2922, which then calls service M 2924, which, in turn, calls service A 2926. Finally, service B calls service K 2928. The attributes associated with each service instance that executes in order to carry out the entrypoint call are shown in the plot in parentheses, such as attributes $a_1$, $a_2$, and $a_3$ 2930 associated with an instance of service B. A call trace is collected for the sequence of service calls, as discussed above, and can be represented as graph 2932. The call trace, in one vectorization approach, is vectorized by generating a vector with elements corresponding to the unique service calls in the call trace and ordered according to a service-ordering method 2934. Attribute values for the service calls are then included within expanded elements of an expanded-elements vector 2936. In many implementations, a final binary vector 2938 corresponding to vector 2936 is generated. In alternative approaches, a final vector with real-valued or integer-valued elements may be instead generated. A binary final vector is assumed in much of the following discussion.

Figure 30A:
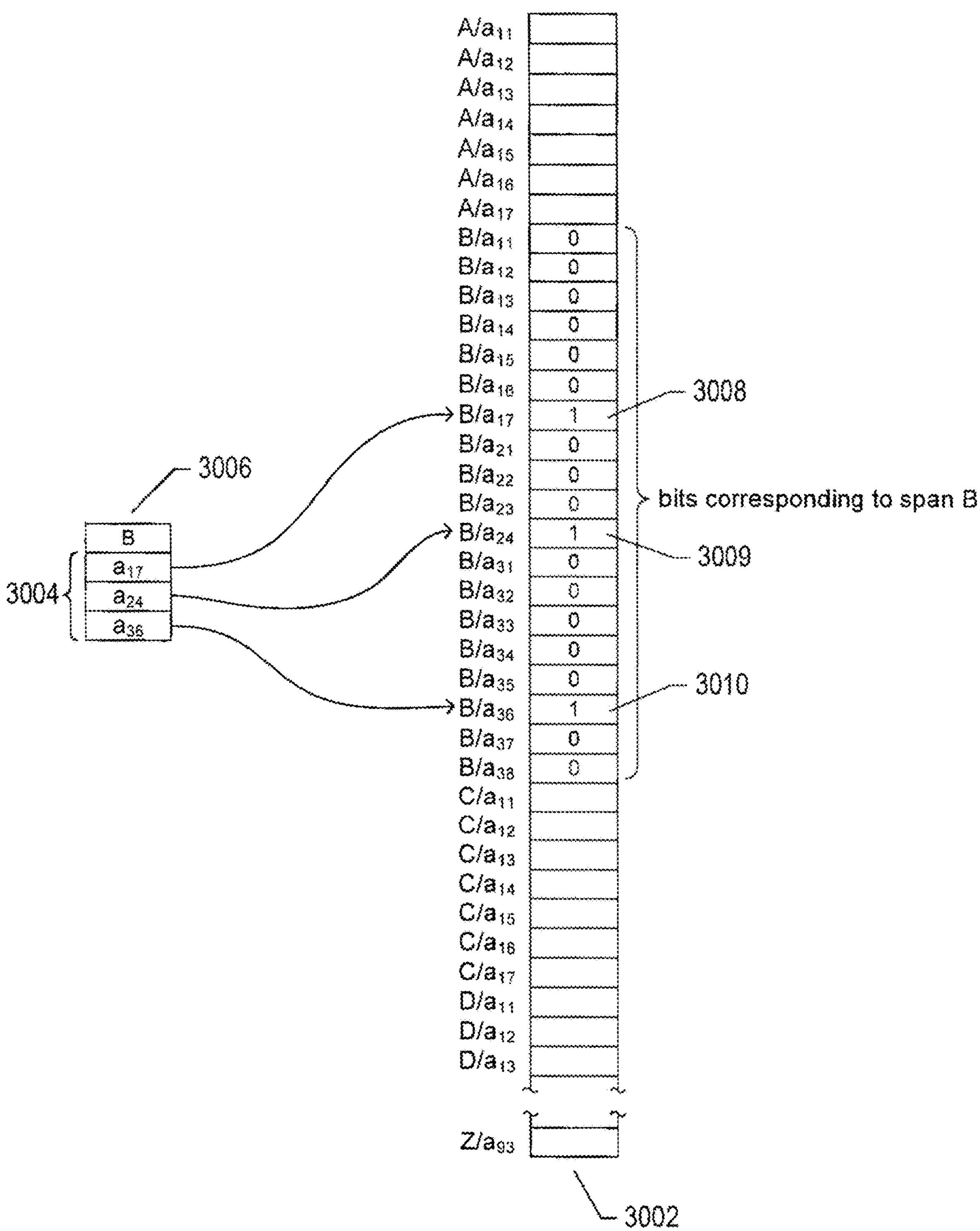
FIGS. 30A-C illustrate several approaches to generating a final vector from the expanded-elements vector 2936 shown in FIG. 29.
Figure 30B:
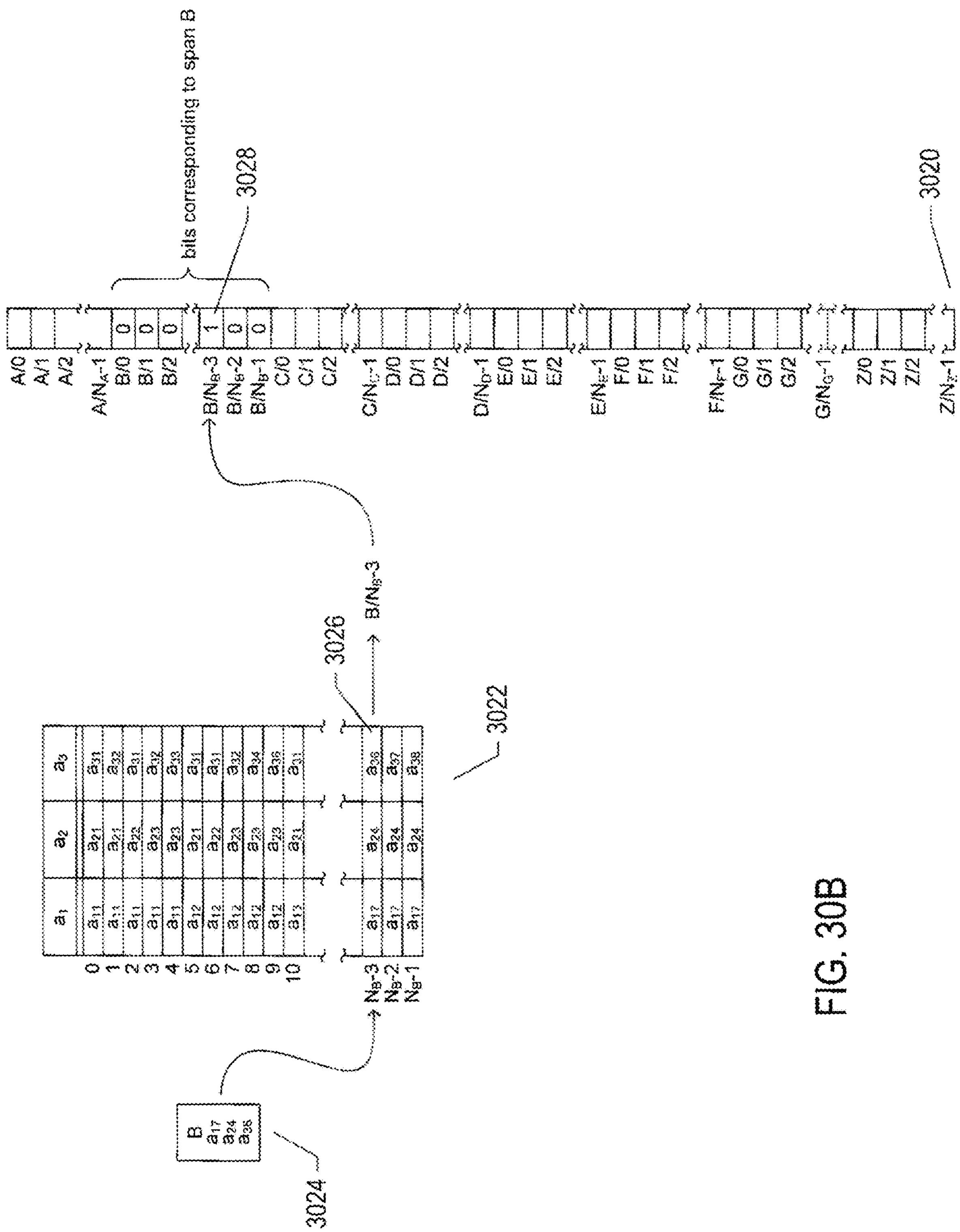
Figure 30C:
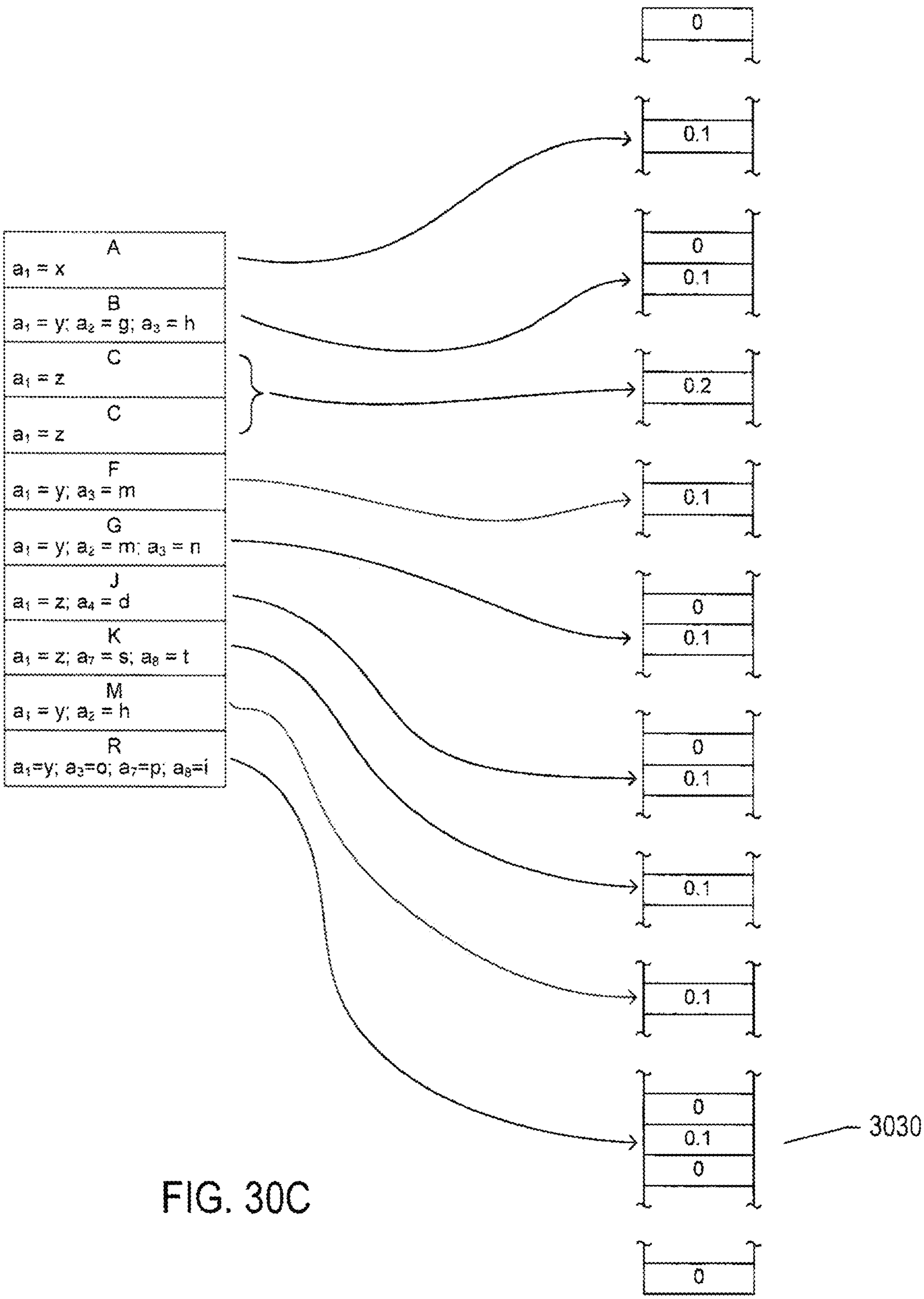

FIGS. 30A-C illustrate several approaches to generating a final vector from the expanded-elements vector 2936 shown in FIG. 29. In a first approach, shown in FIG. 30A, the final bit vector 3002 includes a bit for each possible service-call/attribute-value pair observed in a set of collected call traces. In FIG. 30A, the three attribute values 3004 recorded for the call to an instance of service B 3006 are shown, with each attribute value including a first index indicating the attribute and a second index indicating a particular value of the indicated attribute. The three observed attribute values 3004 are mapped to the particular bits 3008-3010 corresponding to the service-call/attribute-value pairs, and those bits are set to 1 while the remaining bits associated with the service B are set to 0. In this approach, had there been multiple calls to service B with different attribute values, then all of the attribute values observed in the multiple calls would have corresponding bits set to 1. Similar mappings of service-call/attribute-value pairs for the other called services produce a final binary vector for the call trace.

FIG. 30B illustrates an alternative approach to generating a final vector from the expanded-elements vector 2936 shown in FIG. 29. In this approach, an index is assigned to each possible combination of attribute values for each service, and the final bit vector 3020 includes a separate bit for each index. A table 3022 is shown in FIG. 30B that contains all possible attribute-value combinations for service B. Each row in the table represents a different possible combination of attribute values. The index of a row serves as a single-integer representation of a particular combination of attribute values. In this case, the set of attribute values for the instances of service B 3024 in call trace 2932 shown in FIG. 29 is mapped to row 3026 and table 3022, and the index of that row is used to identify the bit 3028 in the final bit vector 3020 corresponding to the set of attribute values 3024. That bit is set to 1 and all the other bits associated with service B are set to 0, when generating the final bit vector for call trace 2932. Here again, had multiple calls been made to a particular service in a call trace, the bits in the final bit vector corresponding to the cumulative set of attribute values for the multiple calls would be set to 1.

FIG. 30C illustrates a third approach to generating a final vector from the expanded-elements vector 2936 shown in FIG. 29. In this approach, similar to the approach discussed with reference to FIG. 30B, each service-call/attribute-value-set pair is mapped to a particular element in the final vector 3030. However, the final vector contains real values, rather than bit values. The real values represent a fraction of service calls in the call trace corresponding to a particular service-call/attribute-value-set pair. There are, of course, many alternative possibilities for vectorizing call traces. In all cases, the vectorization process is designed to produce different vectors for different types of call traces so that, as discussed below, a metric can be devised to produce distances from pairs of vectors that reflect the degree of dissimilarity between the call traces represented by the vectors.

Figure 31A:
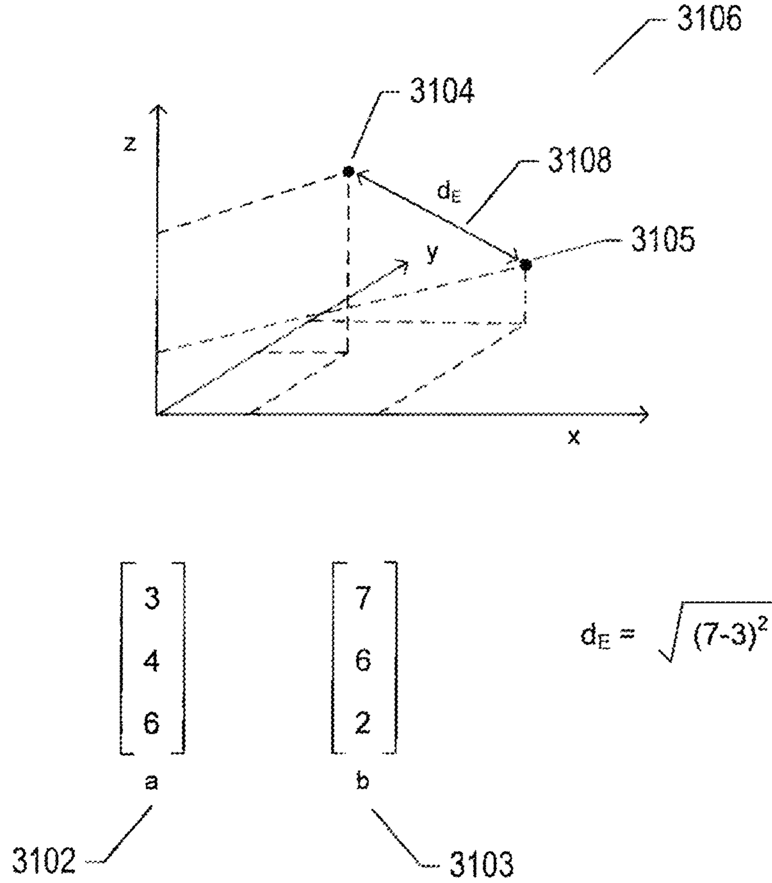

FIGS. 31A-D illustrates several different types of metrics that can be used to determine the distance between two vectors. FIG. 31A illustrates the Euclidean distance metric. Two three-dimensional vectors a and b 3102-3103 are plotted as points 3104 and 3105, respectively, in a three-dimensional plot 3106. The Euclidean distance $d_E$ 3108 between the two vectors is equal to the magnitude of the vector obtained by subtracting one vector from the other, which can be computed 3110 as the square root of the squared sums of the differences between the coordinates of the two vectors. The Euclidean distance $d_E$ is the common physical distance associated with three-dimensional real-world spaces. The Euclidean distance $d_E$ is generally real valued and can be computed for vectors with real-valued, integer-valued, and bit-valued elements. The Euclidean distance between vectors 3102 and 3103 is 6.

Figure 31B:
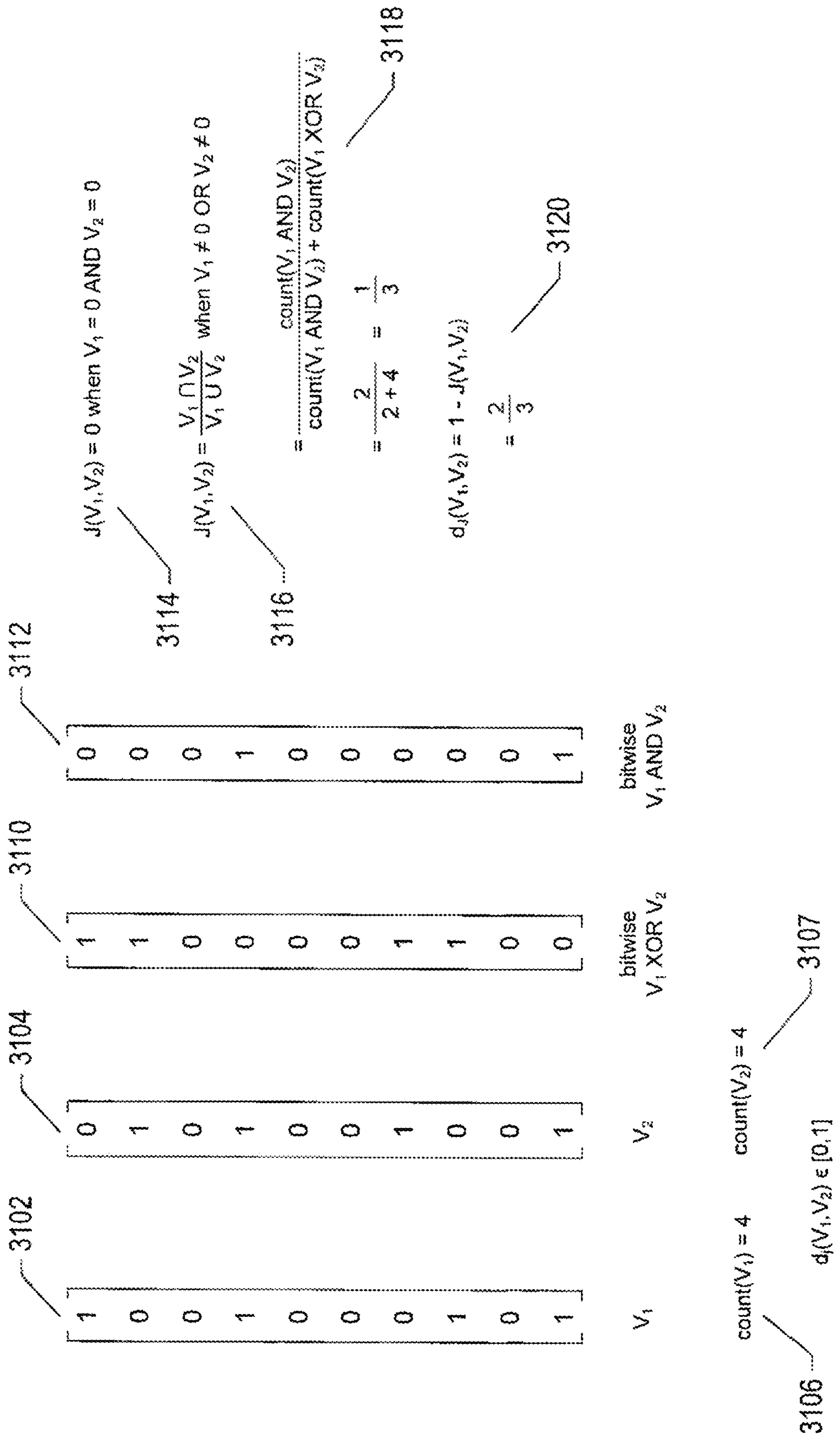

FIG. 31B illustrates the Jaccard distance metric. The Jaccard distance metric $d_J$ is a set-based distance metric that produces a real value in the range [0, 1]. A bit vector can be considered to represent a set by considering the elements of the vector as possible members of the set and considering those elements with value 1 as the members of the set. Two bit vectors $v_1$ 3102 and $v_2$ 3104 are shown on the left-hand side of FIG. 31B. The function count( ) computes the number of 1-valued elements in a bit vector supplied as an argument to the function 3106-3107. The bitwise exclusive-OR operator generates vector 3110 from vectors $v_1$ 3102 and $v_2$ 3104. Each element in the resultant vector 3110 is the value of a binary XOR operation applied to the corresponding elements of the two vector operands. The bitwise AND operator generates vector 3112 from vectors $v_1$ 3102 and $v_2$ 3104. Each element in the resultant vector 311 2 is the value of a binary AND operation applied to the corresponding elements of the two vector operands. When both vectors are 0, the Jaccard coefficient J is 0 (3114 in FIG. 31B). Otherwise, the coefficient J is equal to the number of elements in the intersection of the two sets represented by vectors $v_1$ 3102 and $v_2$ 3104 divided by the number of elements in the union 3116 of the two sets represented by vectors $v_1$ and $v^2$, which can be calculated 3118, from bit vectors, using the above-described count function and bitwise logical operators. The Jaccard distance metric $d_J$ is computed as 1-J (3120 in FIG. 31B). When both vectors are identical, the Jaccard distance metric $d_J$ is 0. When both vectors represent two sets without any common elements, the Jaccard distance metric $d_J$ is 1. The Jaccard distance $d_1$ between bit vectors $v_1$ 3102 and $v_2$ 3104 is ⅔.

Figure 31C:
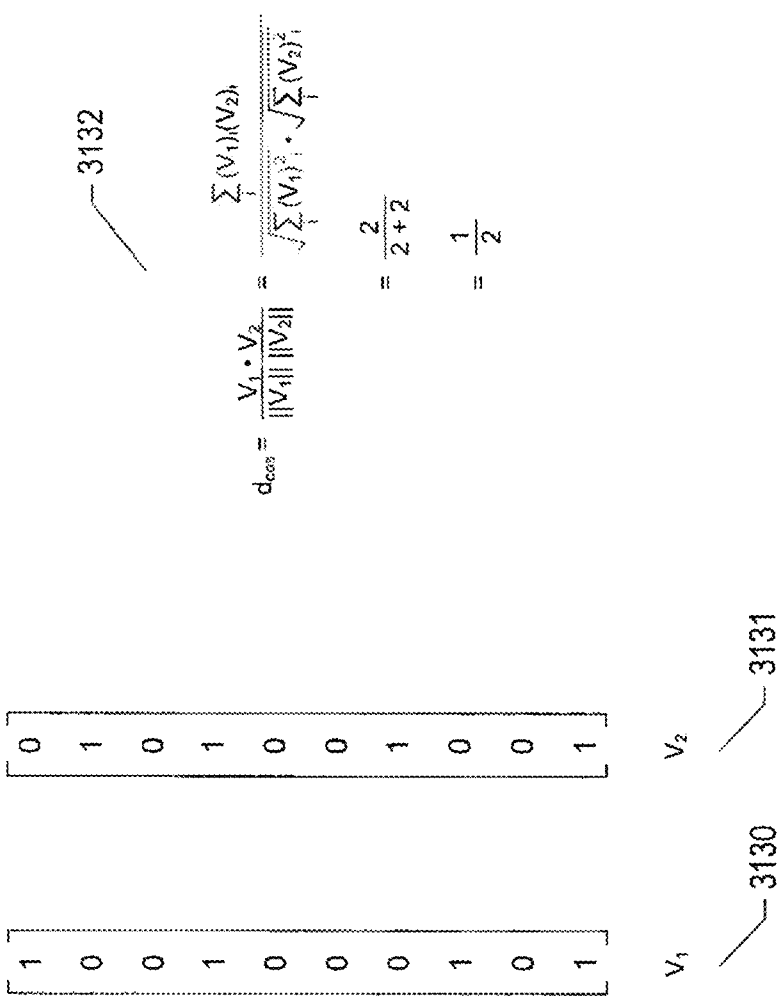

FIG. 31C illustrates the cosine-similarity distance metric $d_{cos}$. FIG. 31C shows the same two vectors 3130-3131 shown as bit vectors $v_1$ 3102 and $v_2$ 3104 in FIG. 31B. The cosine of the angle between two vectors is equal to the dot product of the two vectors divided by the product of the length of the two vectors 3132. The cosine-similarity distance metric $d_{cos}$ is the cosine of the angle between two input vectors and is a real number in the range [0, 1].

FIG. 31D illustrates the three different distance metrics discussed above with reference to FIGS. 31A-C. On the left-hand side of FIG. 31D, the different metric distances between a diagonal vector and the other vectors with integral-valued elements in a unit cube are shown for unit cubes 3140-3142. Each vertex in the unit cube corresponds to a different vector with integer-valued elements. The diagonal body vector 3144 has coordinates (1, 1, 1). The distance between this vector and itself is 0, as indicated by numeric labels 0 3146-3148. The distance between each of the other vectors and the diagonal body vector are shown next to the point corresponding to the other vectors. For example, the Euclidean distance $d_E$ between the vector (0, 0, 0) and the vector (1, 1, 1) is $\sqrt{3}$. The value $\sqrt{3}$ appears next to the point 3150 corresponding to vector (0, 0, 0).

A unit cube 3152 is shown in the center of FIG. 31D, with each vertex assigned a numeric label, such as the numeric label "7" assigned to vertex 3154. The three matrices 3160-3162 show the distances between each pair of vertices in the unit cube. Matrix 3160 shows the Euclidean distances, matrix 3161 shows the Jaccard distances, and matrix 3162 shows the cosine-similarity distances. Comparison of the matrices reveals that they all have the same general form. There are only four different distances between vectors in the unit-cube example: (1) 0, or $d_{mm}$, the minimum distance which is the distance between a vector and itself; (2) $d_{max}$, the distance between vectors corresponding to vertices connected by a body diagonal; (3) $d_1$, the distance between vectors corresponding to vectors connected by a face diagonal; and (4) $d_s$, the distance between vectors connected by an edge. Were the numeric values in the three matrices replaced by $d_{min}$, $d_{max}$, $d_1$, and $d_s$, they would be identical. The requirement for a distance metric is that the distance between a vector and itself is 0, as expressed by the equation 3164, and that the triangle inequality holds for all pairs of vectors, as expressed by equation 3166. As can be seen in table 3168, the numerical values and ratios between the numerical values for the unit-cube distances vary among the three different distance metrics. It is possible to define additional distance metrics as linear combinations of the Jaccard distance and one of the other metrics, as expressed by equation 3170. The above-discussed distance metrics, and other types of distance metrics, can be used during the clustering of call traces, discussed below.

Figure 32:
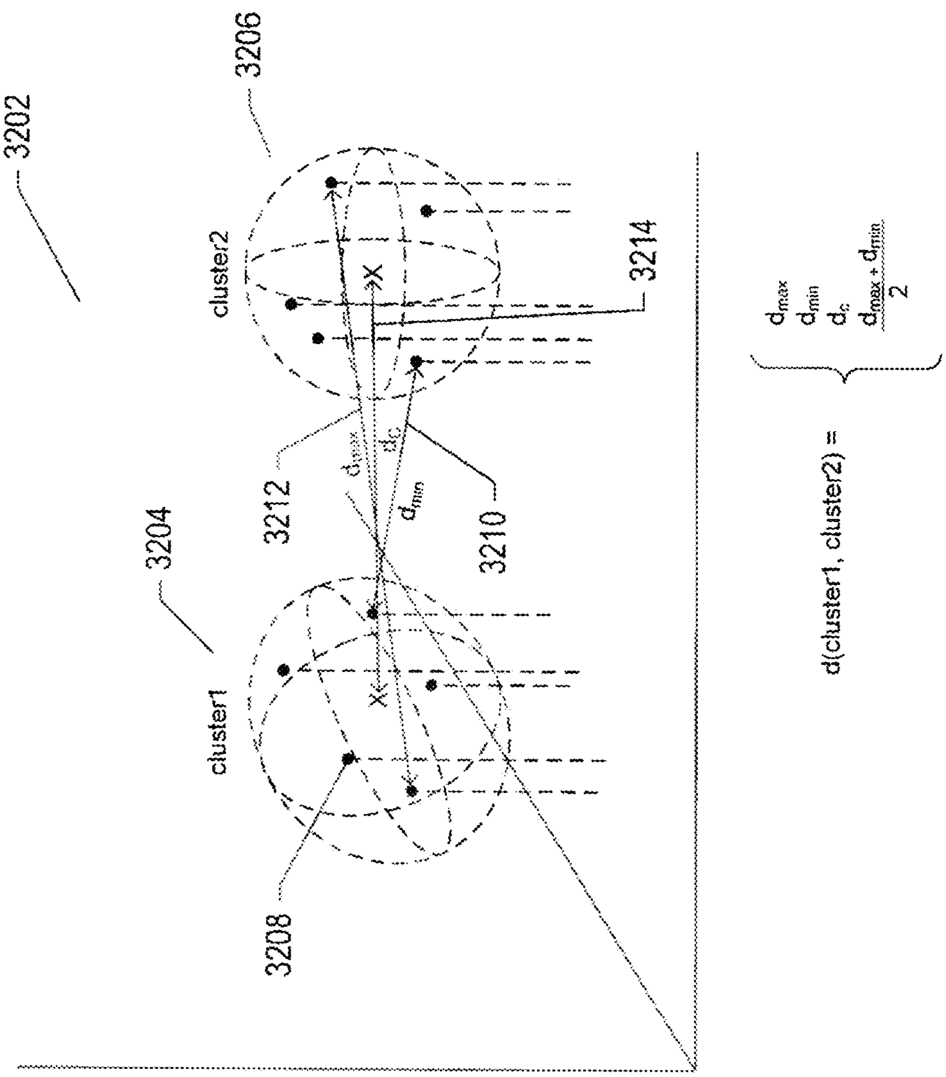
FIG. 32 illustrates various different distance metrics for clusters.

FIG. 32 illustrates various different distance metrics for clusters. The three-dimensional plot 3202 in FIG. 32 shows two different clusters 3204 and 3206, each containing points, such as point 3208, corresponding to vectors. The two different clusters represent a partitioning of the entire set of points into two groups based on distance. Each point in a cluster is closer to the other points of the cluster than to any point in the external, different cluster. Clustering of vectors representing call traces represent a partitioning of the call traces into sets of related call traces. Clustering involves use of distance metrics that represent distances between clusters, and these cluster-distance metrics are based on vector-distance metrics, such as the vector-distance metrics discussed above with reference to FIGS. 31A-D. One cluster-distance metric, $d_{min}$, is the minimum distance between a pair of points, one point in the pair selected from the first cluster and the other point in the pair selected from the second cluster. Double-headed arrow 3210 represents the $d_{min}$ distance between the two clusters shown in FIG. 32. Another cluster-distance metric, $d_{max}$, is the maximum distance between any two points selected from the two clusters. Double-headed arrow 3212 shows the $d_{max}$ distance between clusters 3204 and 3206. Yet another cluster-distance metric, $d_c$, is the distance between the centers of the two clusters, represented by double-headed arrow 3214. Any of these three distance metrics can be used for clustering. Various other cluster-distance metrics can also be used.

Figure 33A:
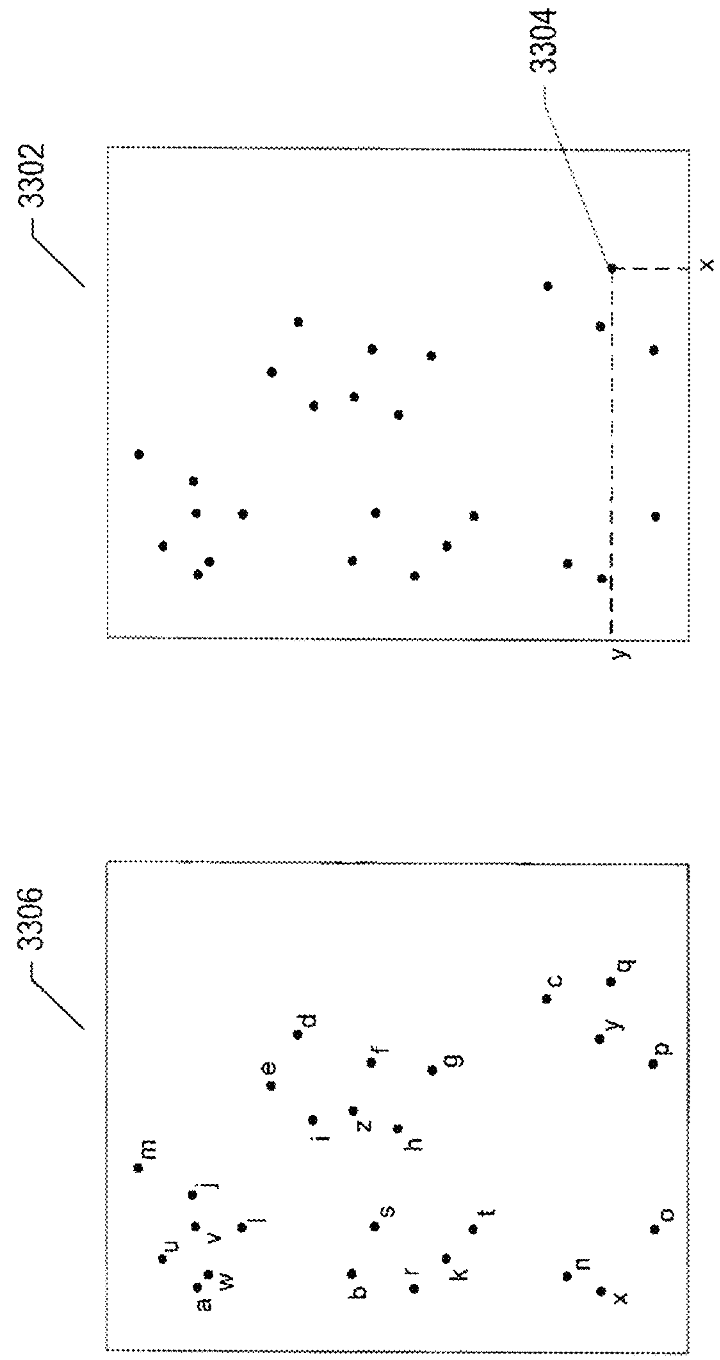
FIGS. 33A-E illustrate one approach to clustering vectors within the class of clustering methods referred to as "agglomerative" or "bottom-up."
Figure 33B:
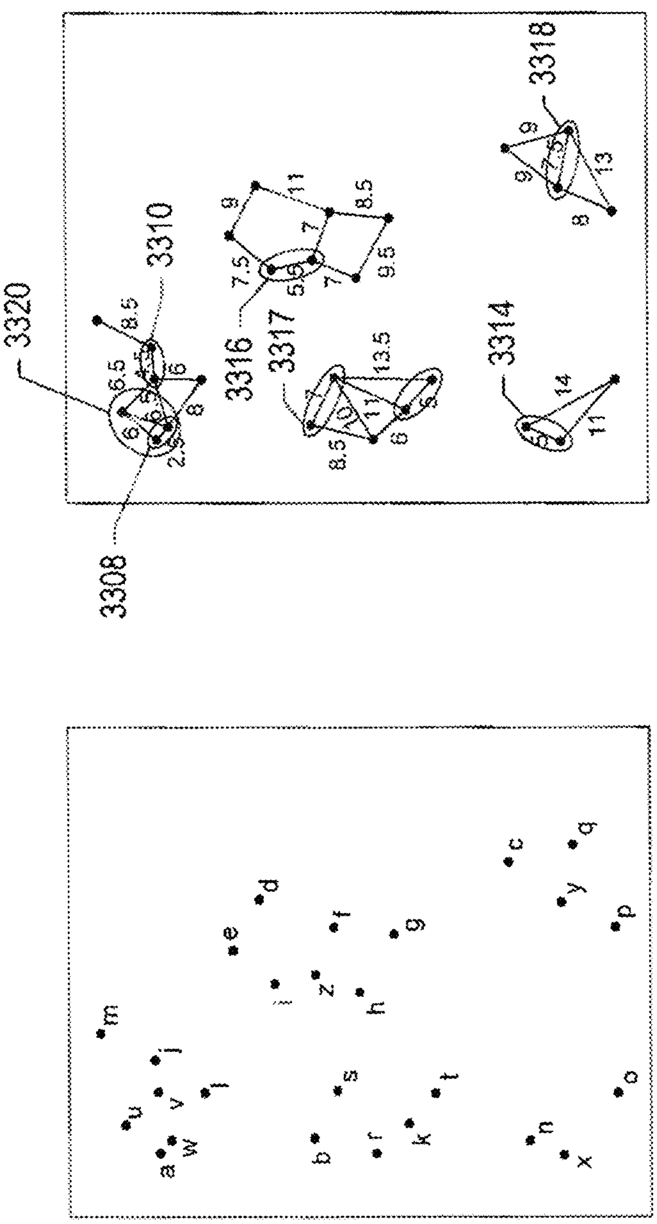
Figure 33C:
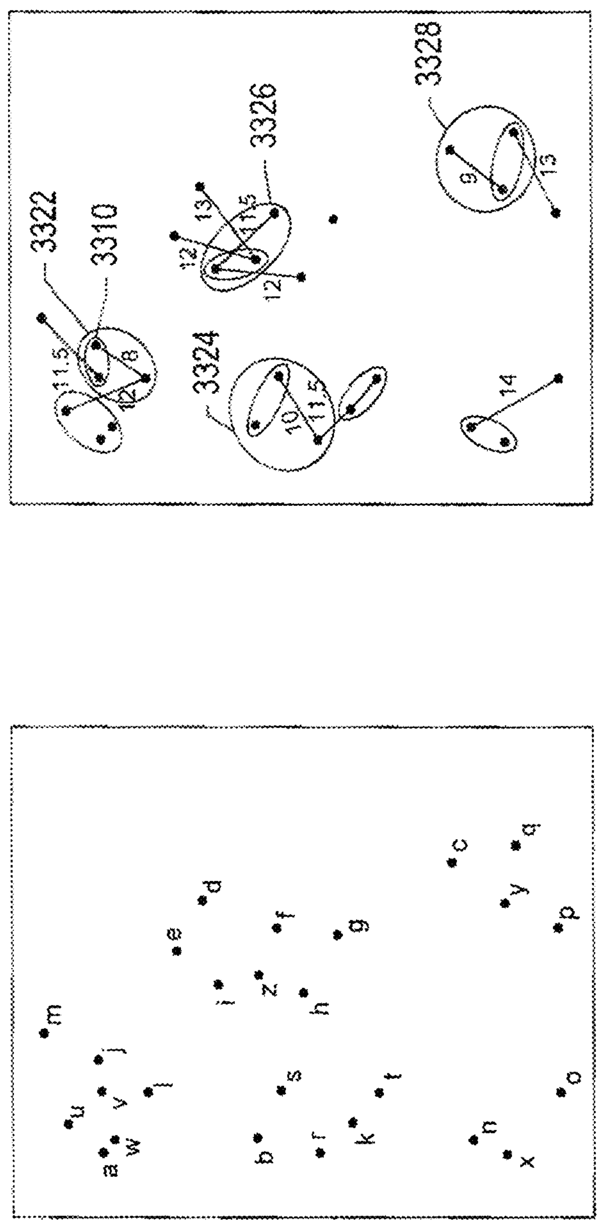
Figure 33D:
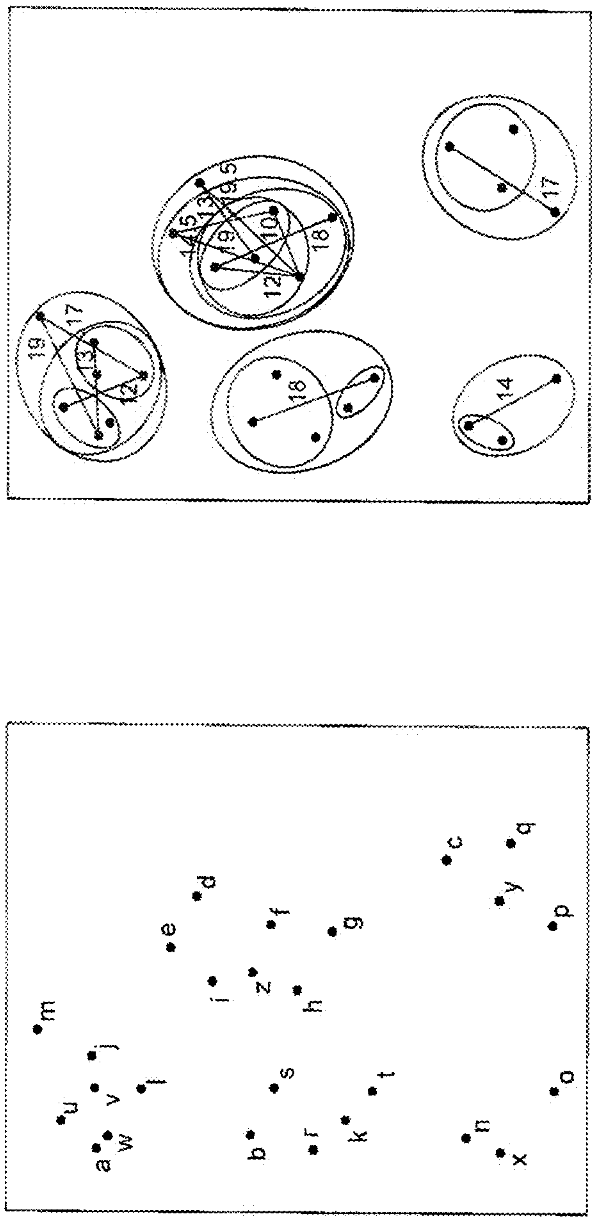
Figure 33E:
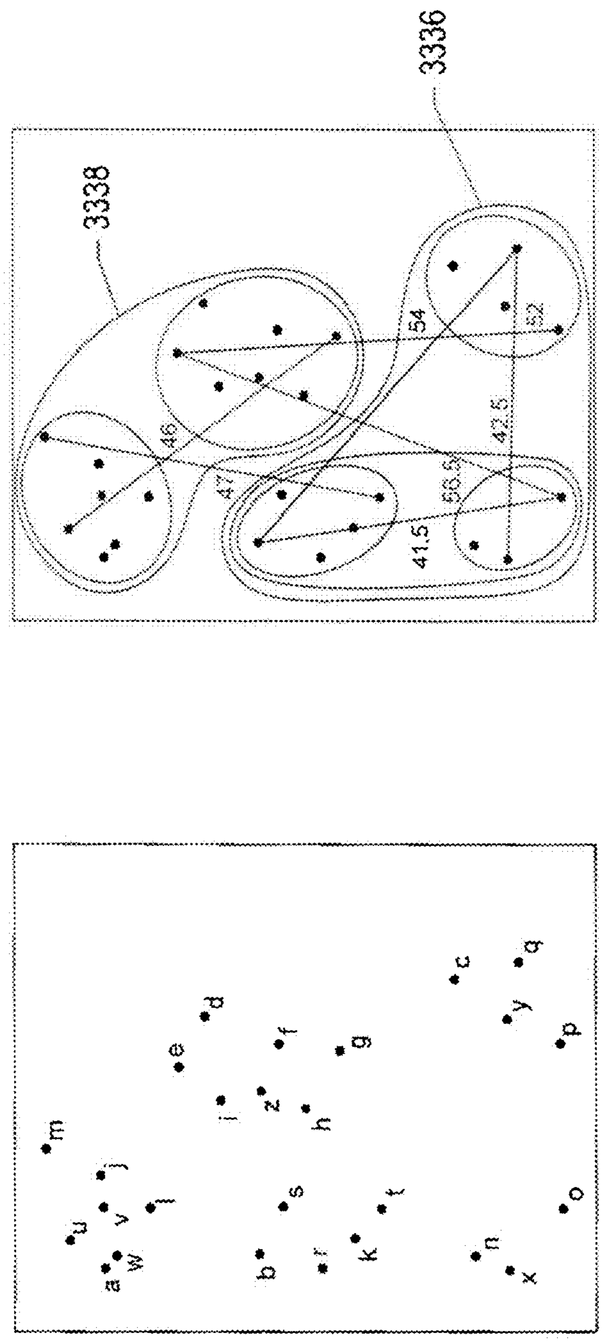
Figure 34A:
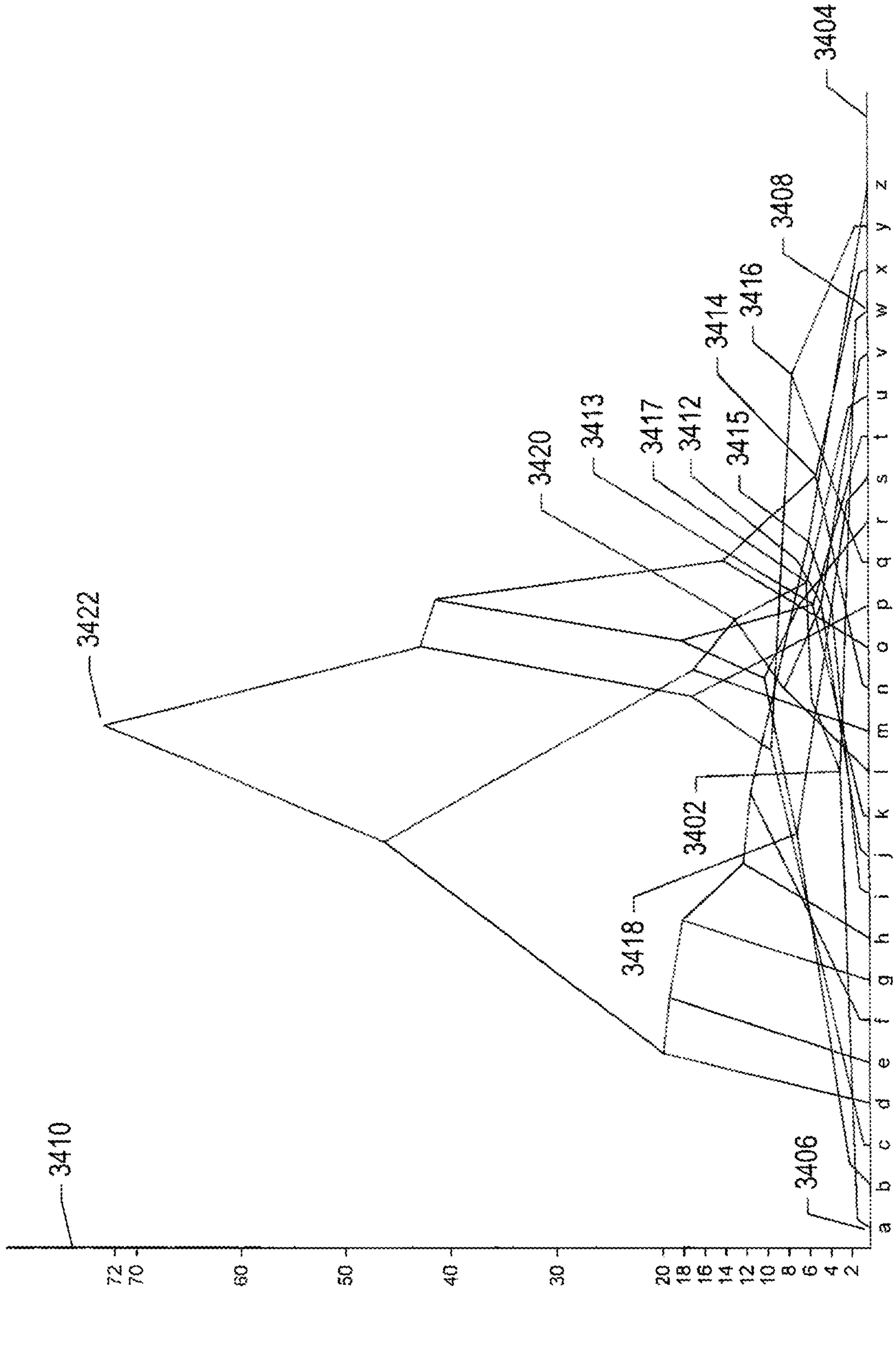
FIGS. 34A-B show two versions of a dendrogram generated during the vector clustering illustrated in FIGS. 33A-E.
Figure 34B:
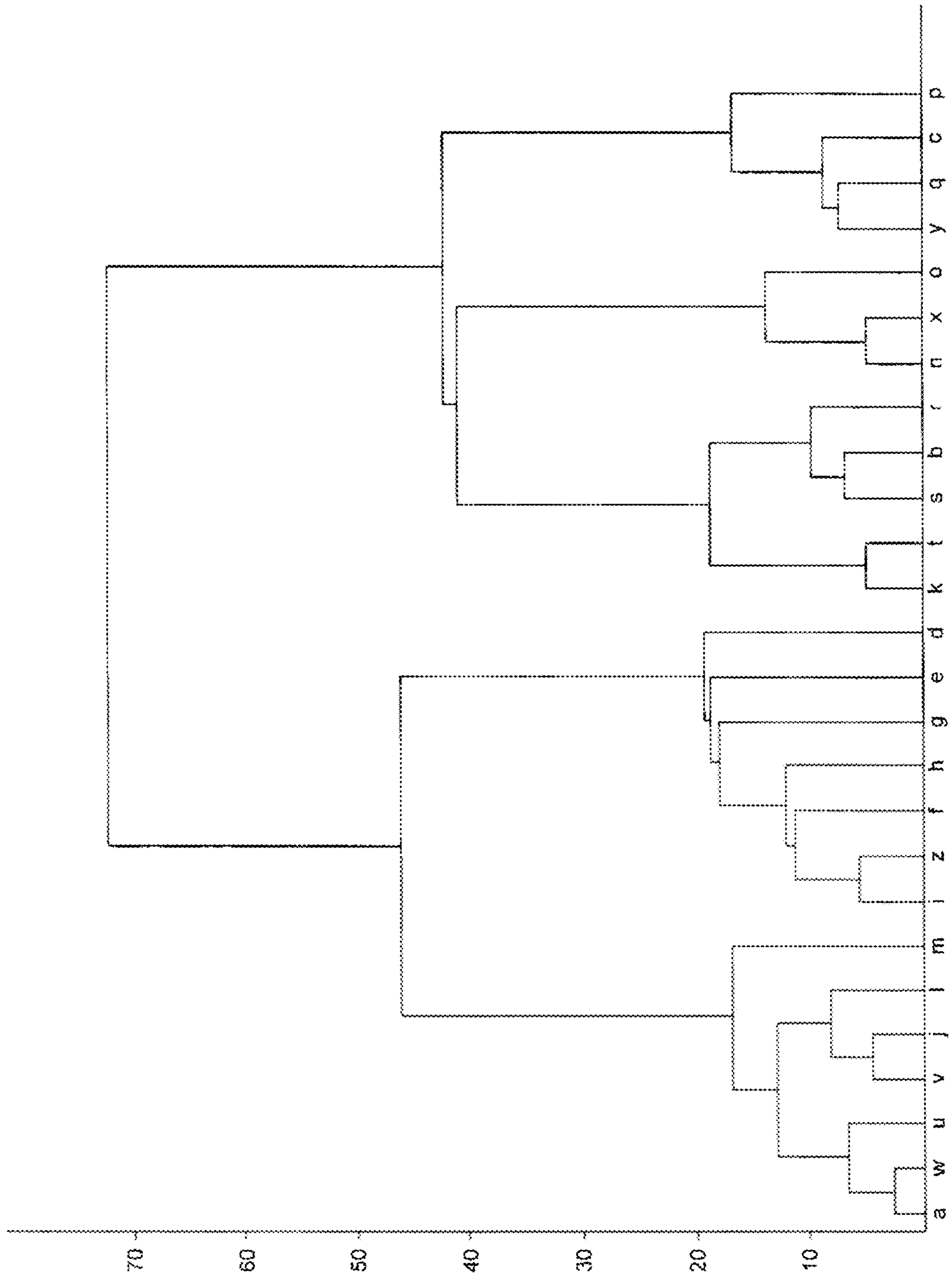

FIGS. 33A-E illustrate one approach to clustering vectors within the class of clustering methods referred to as "agglomerative" or "bottom-up." FIGS. 34A-B show two versions of a dendrogram generated during the vector clustering illustrated in FIGS. 33A-E. FIGS. 33A-E show a two-dimensional clustering example and these figures are discussed, below, in parallel with FIG. 34A.

A two-dimensional set of vectors, each vector represented by a point in a two-dimensional space or surface, is shown in rectangle 3302 in FIG. 33A. Each point, such as point 3304, represents a two-dimensional vector that can be alternatively represented by a set of coordinates (x, y). The same set of vectors is shown in rectangle 3306, with each vector-representing point associated with a lower-case-letter label. Two-dimensional vectors are used in this example because they are easy to incorporate in illustrations. Call-trace vectors normally are of much larger dimension, from tens to hundreds of elements. Clustering involves assigning each vector to its own, initial single-vector cluster and then iteratively merging the two closest-in-distance clusters to produce a merged cluster with a greater number of members than either of the two clusters from which the merged cluster is produced. In FIG. 33B, distances between various different vector-representing points are shown. The single-vector clusters corresponding to vectors a and w are the first two single-vector clusters to be merged. This initial merger is indicated by the small enclosing ellipse 3308. The distance between these two vectors is 2.5, as shown by the numeric label associated with the line segment connecting them. Turning to FIG. 34A, a first point representing the first cluster merger 3402 is placed at a vertical distance of 2.5 above the horizontal axis 3404 with curves drawn from this point to positions on the horizontal axis corresponding to vector a 3406 and vector w 3408. Each of the vectors in the set of vectors is represented by a unique position along the horizontal axis of the dendrogram. The vertical axis 3410 of the dendrogram represents distances between clusters. Any of the cluster-distance metrics, discussed above, based on any of the vector-distance metrics, also discussed above, can be used for clustering.

As also shown in FIG. 33B, the initial merger in the sequence of mergers carried out during clustering includes the merger of single-vector clusters containing vectors v and j, represented by ellipsis 3310, vectors k and t, represented by ellipse 3312, vectors n and x, represented by ellipse 3314, vectors i and z, represented by ellipse 3316, vectors b and s, represented by ellipse 3317, and vectors y and q, represented by ellipse 3318. In addition, the two-vector cluster represented by ellipse 3308 is merged with the single-vector cluster containing vector u, as represented by ellipse 3320. The 8 mergers represented by ellipses in FIG. 33B are represented by points 3402 and 3412-3418 in the dendrogram shown in FIG. 34A. As shown in FIG. 33C, a next merger, represented by ellipse 3322, mergers the two-vector cluster inscribed within ellipse 3310 with the single-vector cluster containing vector 1. This merger is represented by point 3420 in the dendrogram shown in FIG. 34A. Because the mergers are carried out in ascending distance order, the points corresponding to the mergers occur further and further above the horizontal axis in the dendrogram. Additional mergers are represented in FIG. 33C by ellipses 3324, 3326, and 3328. The clustering process continues to create larger and larger clusters, as shown in FIGS. 33D-E. The final point 3422 in the dendrogram shown in FIG. 34A represents the merger of the cluster represented by ellipse 3336 and the cluster represented by ellipse 3338 in FIG. 33E. FIG. 34B shows an alternative representation of the dendrogram shown in FIG. 34A, produced by rearranging the order of the vector positions along the horizontal axis. This is a classical representation of a dendrogram and clearly shows the sequence of cluster mergers illustrated in FIGS. 33B-E.

Figure 35A:
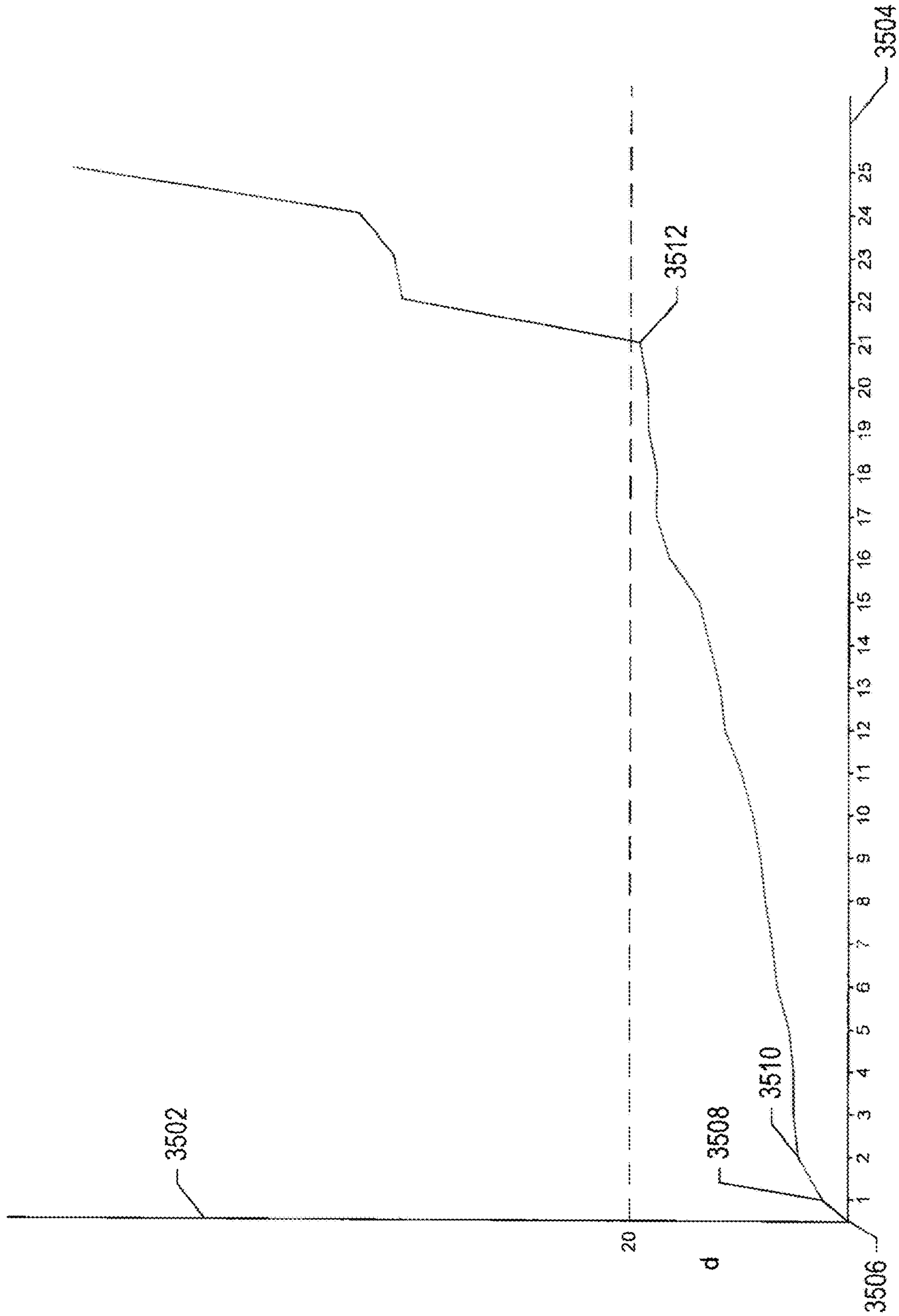
FIGS. 35A-C illustrates cluster selection.
Figure 35B:
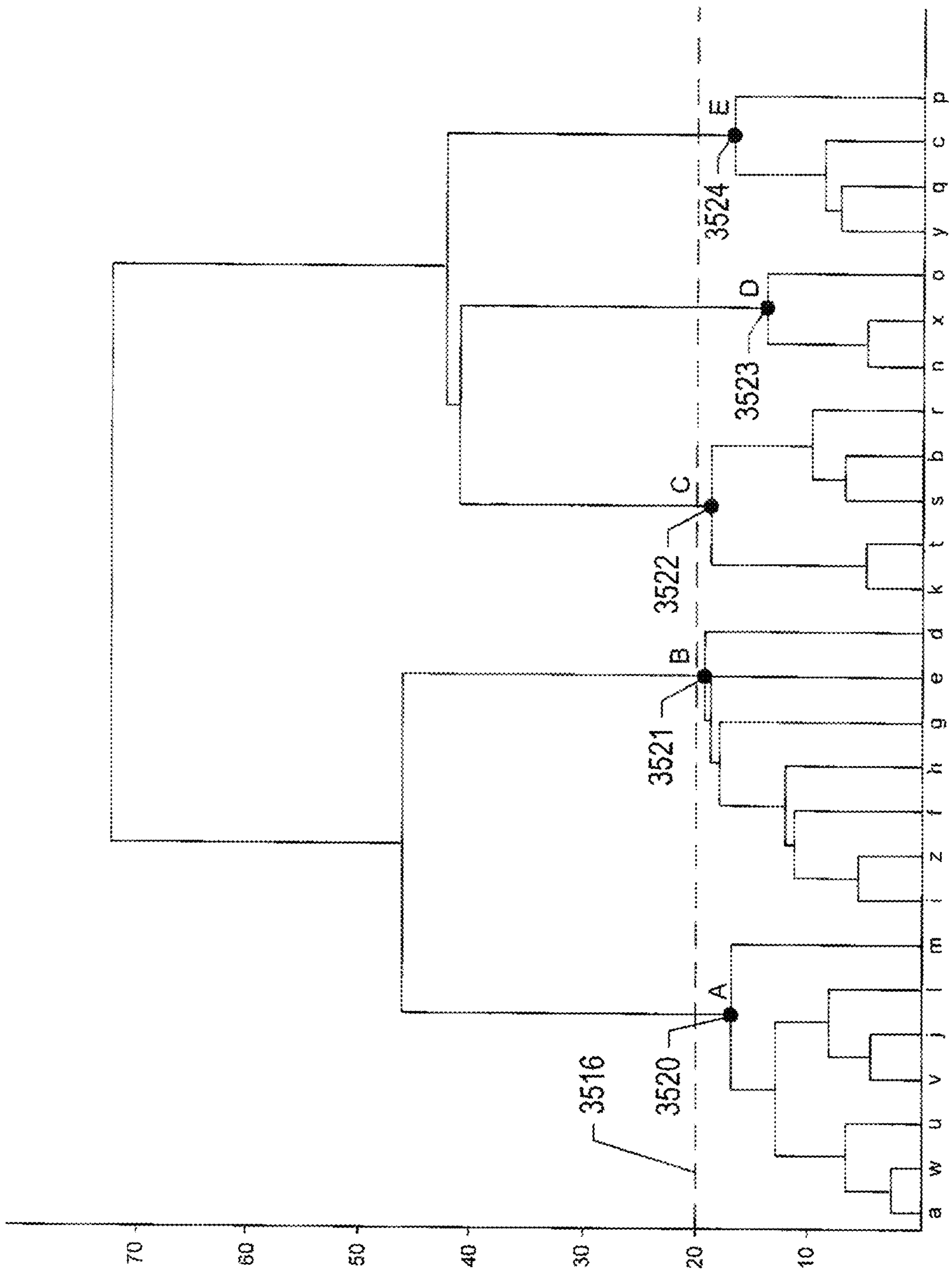
Figure 35C:
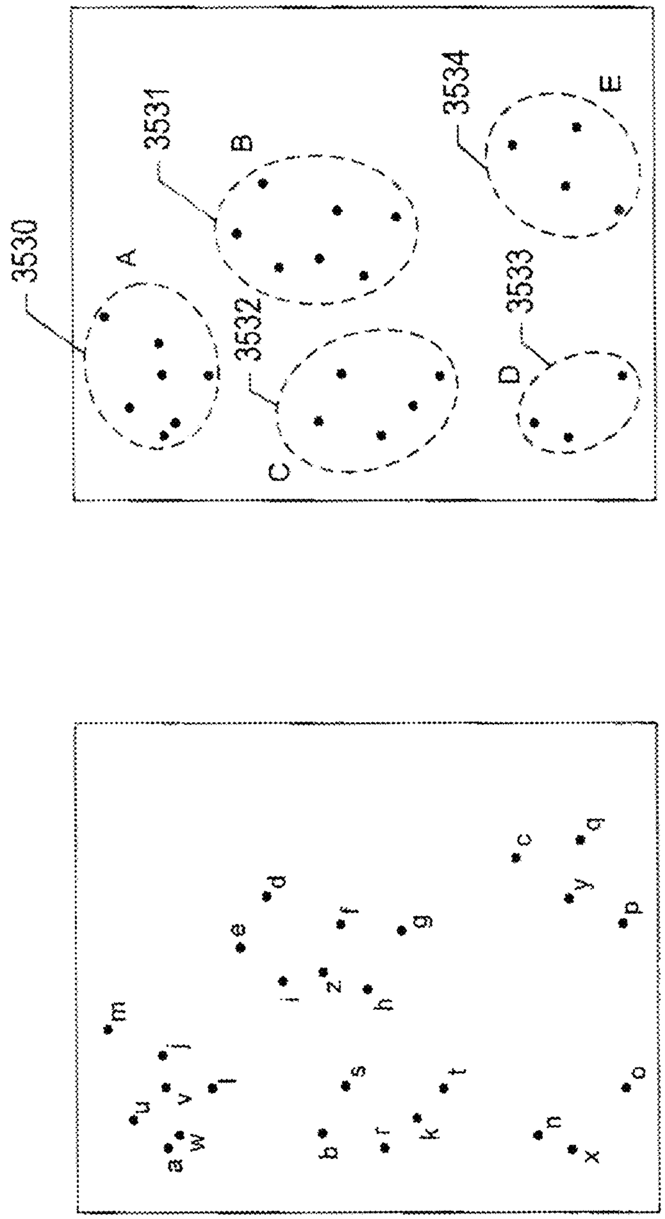

FIGS. 35A-C illustrates cluster selection. Following the clustering of the vectors in the example of FIGS. 33A-E and generation of the dendrogram shown in FIG. 34B, a group of clusters needs to be selected. The clustering process results in one single cluster represented by the highest point in the dendrogram, but that single cluster, of course, has no analytical value since it does not represent a partitioning of the vectors into related groups. Similarly, the single-vector clusters that represent the initial starting point for clustering have no analytical value, since they also fail to represent a partitioning of vectors into related groups. Instead, a set of clusters at some intermediate height above the horizontal axis in the dendrogram need to be selected as an optimal or near-optimal clustering of the vectors into related groups.

One approach to selecting an optimal clustering involves analysis of a cluster-distance-versus-clustering-sequence graph. This graph can be generated from the dendrogram. FIG. 35A shows the cluster-distance-versus-clustering-sequence graph for the dendrogram shown in FIG. 34B. The vertical axis 3502 represents cluster distance and the horizontal axis 3504 represents the sequence of cluster mergers generated during the clustering process. The graph starts at the origin 3506. A first point on the graft 3508 corresponds to the initial merger of single-vector clusters containing vectors a and w, which were closest of all single-vector clusters, at a distance of 2.5. The next point 3510 represents merging of the single-vector clusters containing vectors v and j, at a distance of 4.5. These points are connected by straight-line segments to give the impression of a continuous curve, but the curve is, in fact, discrete. The slope of the curve is relatively shallow up to the point 3512 representing the 21$^{st}$ cluster merger. The slope then greatly steepens. Point 3512 is thus the most prominent knee or elbow of the curve. In one approach to finding an optimal clustering, a clustering distance just above the prominent knee point, in the example of FIGS. 33A-35A at a height of 20 above the horizontal axis, is chosen as the cutoff cluster distance. Then, as shown in FIG. 35B, a horizontal line at the cutoff distance from the horizontal axis 3516 is drawn across the dendrogram. Any vertical lines passing through this horizontal line are followed back to the closest merger point, and the clusters represented by these merger points are selected as an optimal clustering. In the current case, the merger points 3520-3524 are associated with upper-case-letter symbols A-E corresponding to the vector clusters A-E 3530-3534, respectively, shown in FIG. 35C.

Figure 36:
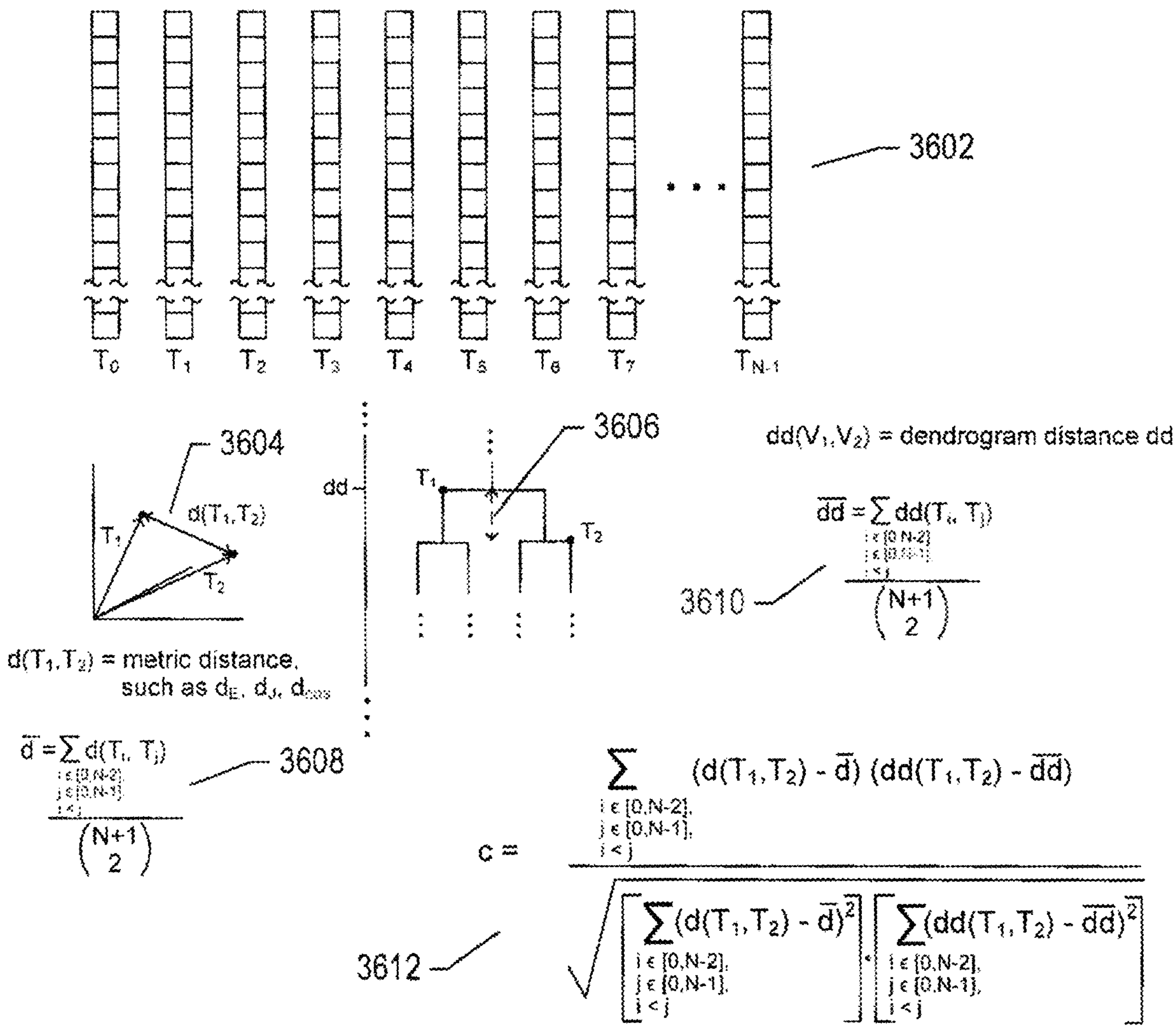
FIG. 36 illustrates the cophenetic correlation.

FIG. 36 illustrates the cophenetic correlation. The cophenetic correlation provides a numerical indication of how well the clustering distances produced during a clustering of vectors correspond to the distances between the vectors. A set of N vectors 3602 is shown at the top of FIG. 36. The distance d between a pair of the vectors 3604 is one of the above-discussed metric distances. The clustering distance between the two vectors, or dendrogram distance dd, is the distance 3606 between the highest level, in the dendrogram, of a merger path that connects the two vectors. An average distanced $\overline{d}$ and an average dendrogram difference can be computed from the distances and dendrogram distances for all pairs of vectors, as indicated by expressions 3608 and 3610, respectively. Finally, the cophenetic coefficient c is computed as indicated by expression 3612. It is the ratio of the sum of the products of distance-displacements and dendrogram-distance displacements for all possible vector pairs to the product of the sums of the squared distance displacements and dendrogram-distance displacements for all possible vector pairs. The cophenetic coefficient is a real value in the range [0, 1]. The closer the cophenetic coefficient to 1, the closer the vector distances are to the dendrogram distances for the vector pairs. Thus, when the cophenetic coefficient has a value greater than a threshold value, the clustering can be considered to be a faithful clustering based on underlying vector differences.

Figure 37A:
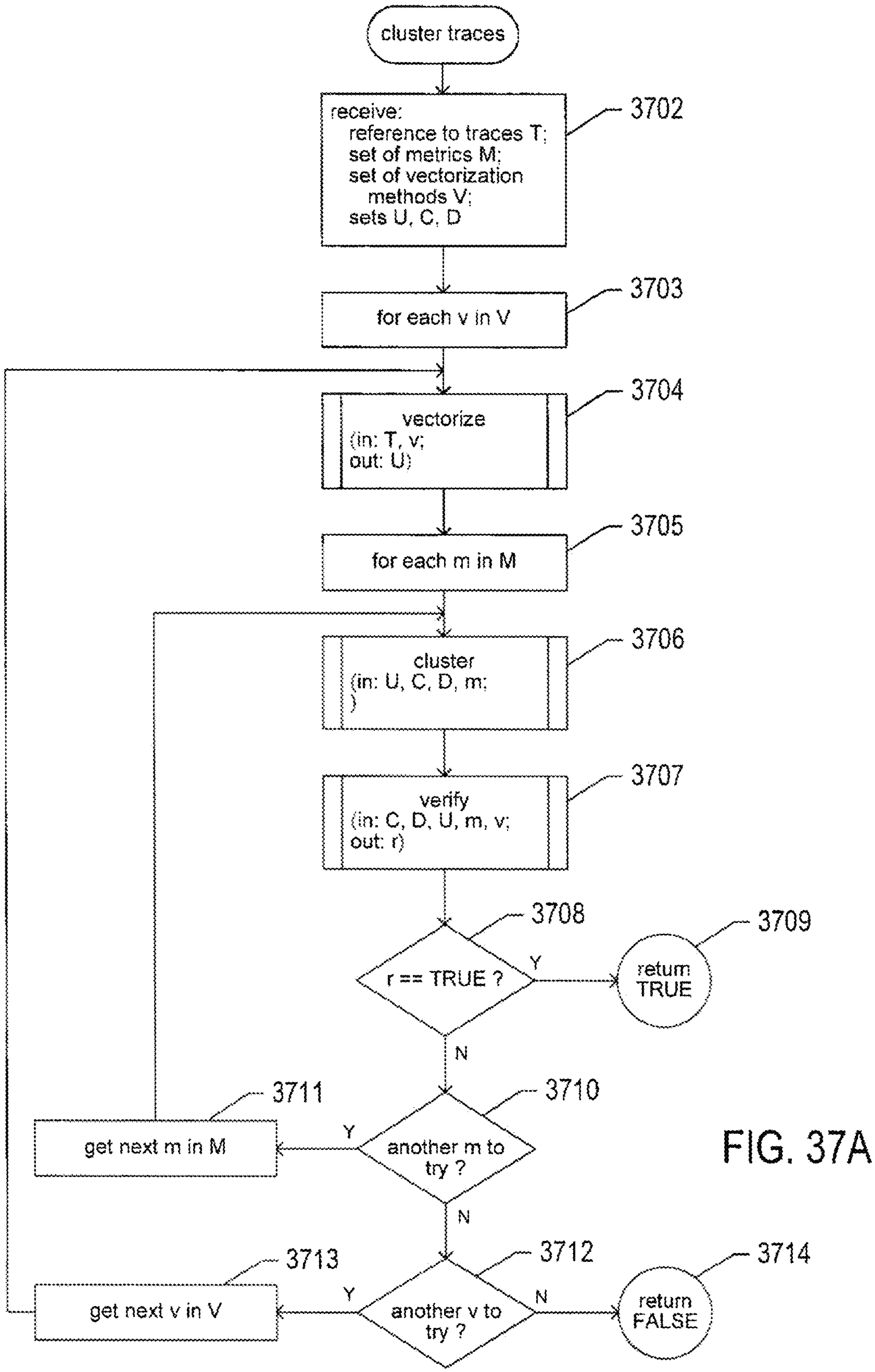
FIGS. 37A-D provide control-flow diagrams for a routine "trace types," and additional routines called by the routine "trace types," that together partition a set of call traces into a number of subsets of related traces, each subset representing a different trace type.

FIGS. 37A-D provide control-flow diagrams for a routine "trace types," and additional routines called by the routine "trace types," that together partition a set of call traces into a number of subsets of related traces, each subset representing a different trace type. FIG. 37A provides a control-flow diagram for the routine "trace types." In step 3702, the routine "trace types" receives a references to a set of call traces T, a set of cluster-distance metrics M, a set of vectorization methods V, and references to memory locations for storing a set of vectors U, a set of clusters C, and a dendrogram D. In an outer for-loop of steps 3703-3713, each vectorization method v in the set of vectorization methods V is considered. In an inner for-loop of steps 3705-3711, each cluster-distance metric m in the set of cluster-distance metrics M is considered. In step 3704, the call traces in the set of call traces T are vectorized to produce a set of call-trace vectors U using the currently considered vectorization method v. In step 3706, the call-trace vectors U are clustered using the currently considered cluster-distance metric m from the set of cluster-distance metrics M to produce a set of clusters stored in memory location C and a corresponding dendrogram stored in memory location D. In step 3707, a routine "verify" is called to determine whether or not the current clustering meets various clustering requirements, discussed below. If so, the routine "verify" returns the Boolean value TRUE along with a final clustering in memory location C and, otherwise, the routine "verify" returns the Boolean value FALSE. When the routine "verify" returns the Boolean value TRUE, as determined in step 3708, the routine "trace types" returns, in step 3709, the value TRUE, with the clustering stored in the memory location C. Otherwise, when there is another clustering-distance metric in the set of clustering-distance metrics V to try, as determined in step 3110, a next clustering-distance metric in is retrieved from the set M and control returns to step 3706, for a next iteration of the inner for-loop of steps 3705-3711. Otherwise, when there is another vectorization method v in the set of vectorization methods V to try, as determined in step 3712, a next vectorization method v is retrieved from the set V and control returns to step 3704 for a next iteration of the outer for-loop of steps 3703-3711. When all possible vectorization methods and cluster-distance metrics have been tried in an attempt to produce a satisfactory clustering, but no satisfactory clustering is obtained, the routine "trace types" returns the value FALSE in step 3714.

Figure 37B:
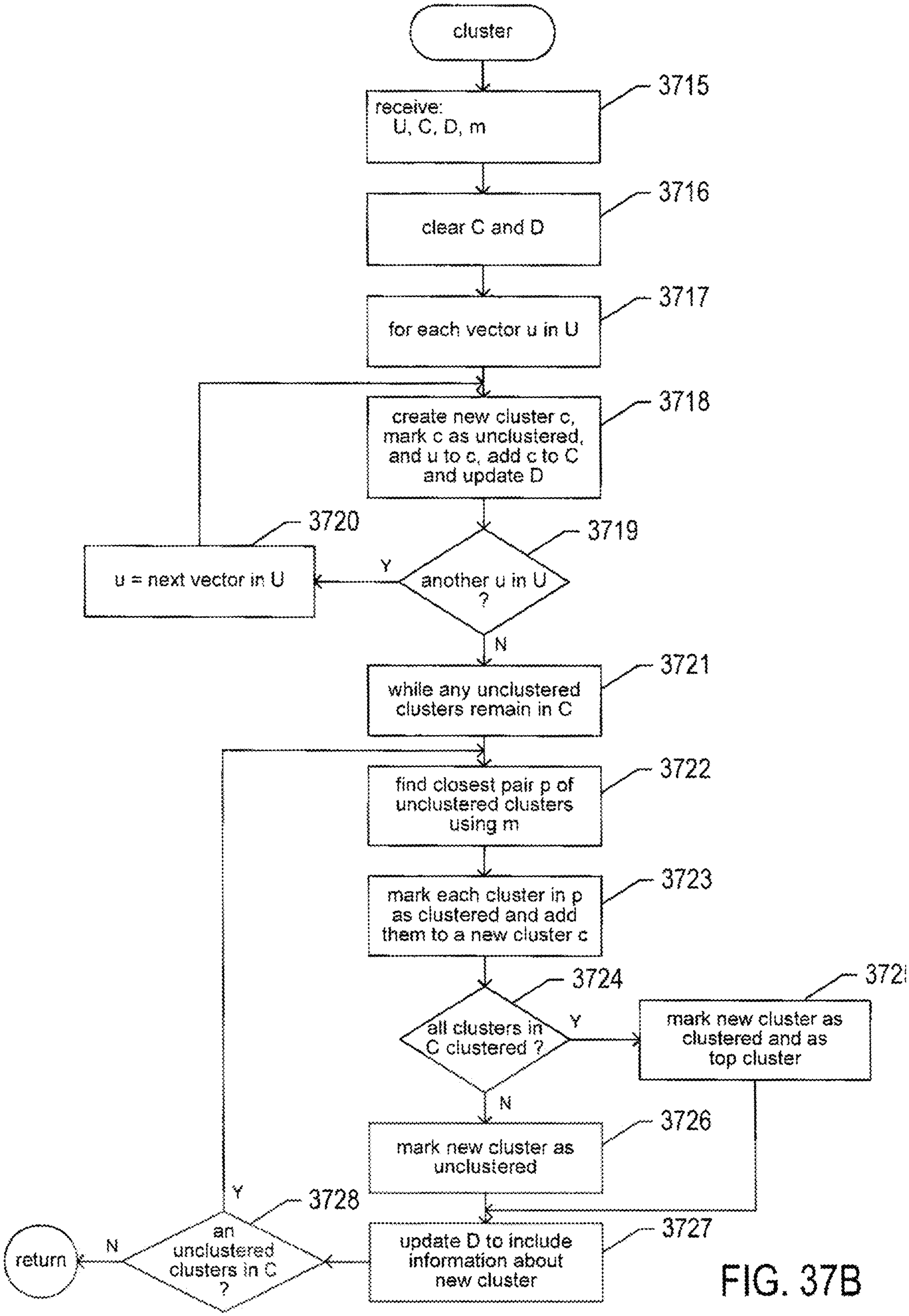

FIG. 37B provides a control-flow diagram for the routine "cluster," called in step 3706 of FIG. 37A. In step 3715, the routine "cluster" receives references to the set of vectors U, memory locations C and D, and a cluster-distance metric in. In step 3716, the routine "cluster" clears the memory buffers referenced by C and D. In the for-loop of steps 3717-3720, a new cluster is created for each vector u in the set of vectors U and added to the set of clusters stored in the memory referenced by C. Each new single-vector cluster c is marked as "unclustered" and the dendrogram stored in the memory location referenced by D is updated to include a point corresponding to each single-vector cluster c. Then, in each iteration of the while-loop of steps 3721-3728, the closest pair of unclustered clusters is merged into a new cluster, in steps 3722-3723, and each cluster of the pair is marked as "clustered.". When all of the current clusters are marked as "clustered," as determined in step 3724, the new cluster is marked as "clustered," in step 3725. Otherwise, the new cluster is marked as "unclustered," in step 3726. The dendrogram is updated to include information about the new cluster in step 3727. The while-loop of steps 3721-3728 continues until there are no more unclustered clusters in C.

Figure 37C:
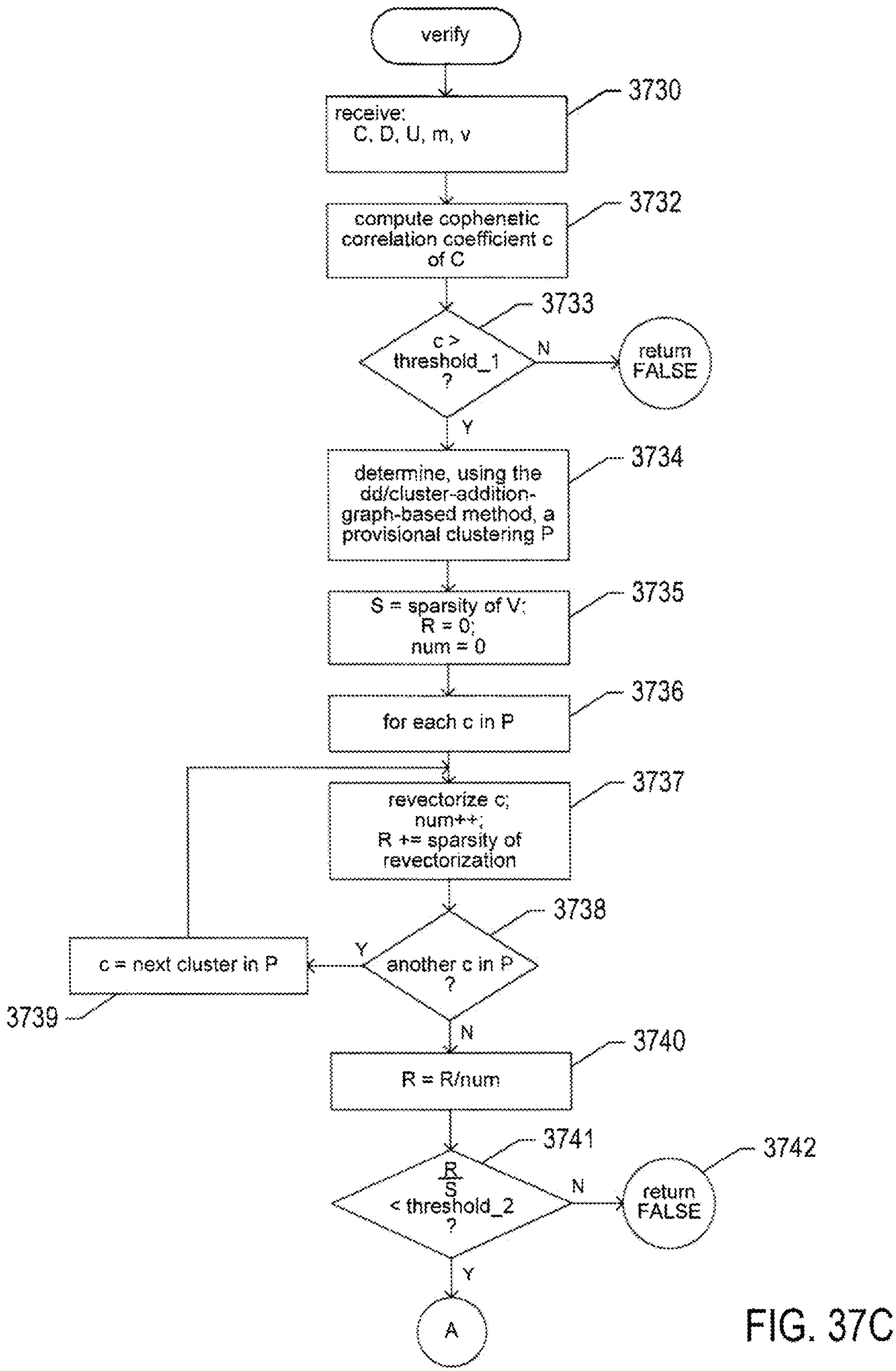
Figure 37D:
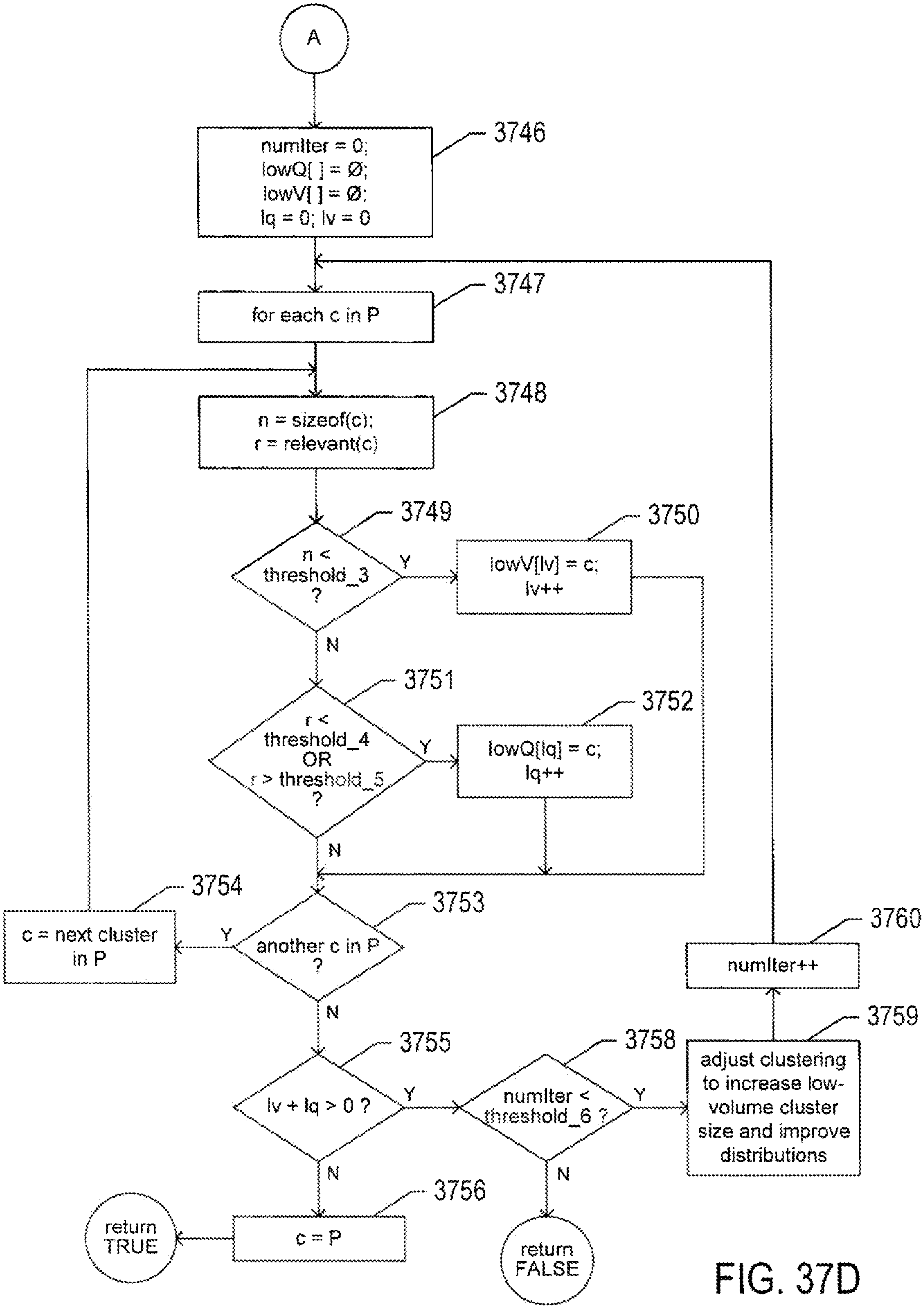

FIG. 37C-D provide control-floor diagrams for the routine "verify," called in step 3707 of FIG. 37A. In step 3730, the routine "verify" receives references to memory locations C and D, the set of vectors U, and the cluster-distance metric m and the vectorization-method v. In step 3732, the routine "verify" computes the cophenetic coefficient for the clustering, as discussed above with reference to FIG. 36. When the computed cophenetic coefficient has a value less than a first threshold value, as determined in step 3733, the routine "verify" returns the Boolean value FALSE to indicate that the clustering in the memory location C does not adequately reflect the pairwise call-trace-vector distances. In step 3734, the routine "verify" determines a provisional optimal clustering P using the cluster-distance-versus-clustering-sequence-graph-based method discussed above with reference to FIGS. 35A-C.

The sparsity of a bit vector is the percentage of bits with the value 0 in the vector. Because the bit vectors representing call traces include bits for each possible attribute value or combination of attribute values for all of the service calls related to a distributed application, the call-trace bit vectors tend to be quite sparse. Following partitioning of the set of call traces into subsets of related call traces, via clustering, a re-vectorization of the call traces in each subset should produce vectors that are significantly less sparse than the original call-trace vectors, since the related call traces would be expected to have fewer different attribute values and/or attribute-value combinations. In step 3735, the routine "verify" determines an average sparsity S for the original call-trace vectors in the set U. In addition, local variables R and num are set to 0. In the for-loop of steps 3736-3739, the vectors in each cluster in the provisional clustering P are re-vectorized and the sparsities of the groups of re-vectorized vectors are accumulated in local variable R. Local variable num his incremented to count the number of clusters in the provisional clustering. Following the completion of the for-loop of steps 3736-3739, local variable R is divided by local variable num to produce an average sparsity for the re-vectorized call traces, in step 3740. When the ratio of R to S is greater than or equal to a second threshold, as determined in step 3741, the routine "verify" returns the Boolean value FALSE, in step 3742, because the clustering has not substantially reduced sparsity of the call-trace vectors and is therefore judged to be ineffective.

Turning to FIG. 37D, in step 3746, the routine "verify" sets a local variable numIter to 0, sets local set variables lowQ and lowV to the empty set, and sets local variables lq and lv to 0. In the for-loop of steps 3747-3754, each cluster c in the provisional clustering P is considered. In step 3748, local variable n is set to the size of the currently considered cluster and local variable r is set to the percent of the call traces in the currently considered cluster that are considered relevant to an error or other anomalous operational behavior that is being analyzed. When n is less than a third threshold, as determined in step 3749, the currently considered cluster is deemed to be too small for statistical purposes and is therefore entered into the set lowV, in step 3750. Otherwise, when the percentage of relevant call traces in the currently considered cluster is less than a fourth threshold or greater than a fifth threshold, the currently considered cluster is considered to have low quality, and is therefore placed in the set lowQ, in step 3752. When the for-loop of steps 3747-3754 completes, and when no clusters were found to be too small or of low-quality, as determined in step 3755, the current provisional clustering is stored in the memory location referenced by C, in step 3756, and the routine "verify" returns the value TRUE. Otherwise, when the number of iterations stored in local variable numIter is greater than or equal to a sixth threshold, as determined in step 3758, the routine "verify" returns the value FALSE, since the clustering is considered to be ineffective. Otherwise, in step 3759, the provisional clustering is adjusted to increase the size of low-volume clusters and to improve the distributions of relevant and non-relevant call traces in the clusters. The adjustments may involve merging clusters, redistributing call traces between clusters, and other such adjustments.

Figure 38:
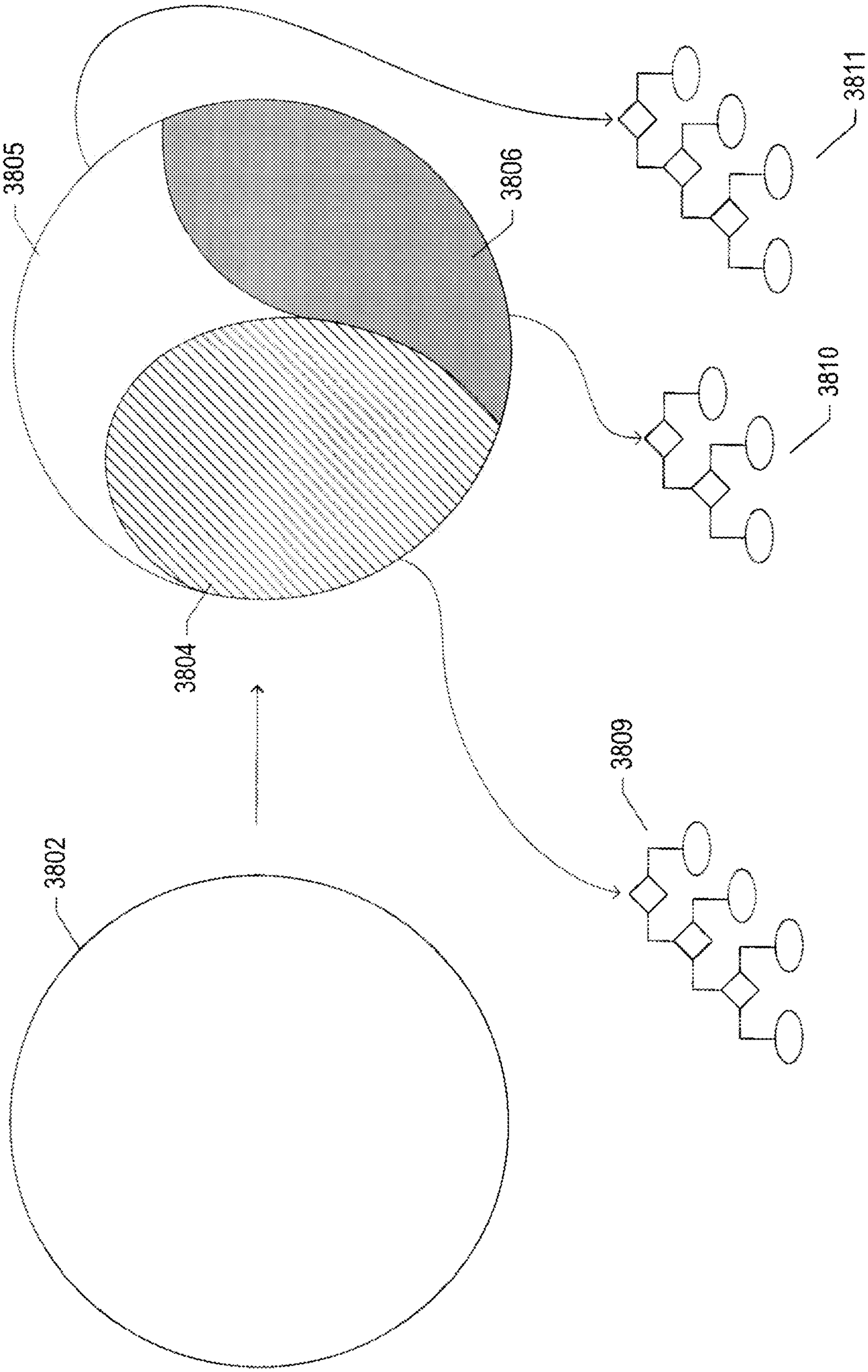
FIG. 38 summarizes the currently disclosed clustering method for partitioning a set of call traces into subsets for dimensional analysis.

FIG. 38 summarizes the currently disclosed clustering method for partitioning a set of call traces into subsets for dimensional analysis. The large disk representing the full set of call traces 3802 is partitioned by clustering into three subsets 3804-3806. Dimensional analysis is applied to each subset of call traces to produce relatively concise decision trees 3809-3811. Each decision tree can then be analyzed in order to ascertain the attribute dimensions relevant to a particular type of error in, or anomalous operational behavior of, a distributed computer system. This approach solves the problem associated with applying dimensional analysis to a large set of collected call traces, discussed above with reference to FIG. 28, while nonetheless analyzing all of the original call traces. The small, relatively simple decision trees generally produced by this method provide greater explanatory power than an overly complex and large decision tree that may instead be produced by applying dimensional analysis to the full set of call traces. Moreover, in those cases in which dimensional analysis of the full set of call traces does not produce a usable decision tree, the currently disclosed clustering method may provide decision trees that can be used to identify relevant attribute dimensions.

Currently Disclosed Methods and Systems

In the preceding subsections of this document, a variety of sophisticated, machine-learning approaches are described for providing, among other things, dimensional analysis that can be used during diagnosis of operational problems and failures in distributed applications. In many practical situations, however, simpler tools that are readily understood by human administrators and managers may provide additional useful insights into the potential root causes of the operational problems and failures, and may be employed as an initial approach to diagnosis of operational problems and failures. The currently disclosed methods and systems are related to generating such comparatively simple and readily understood tools.

Figure 39:
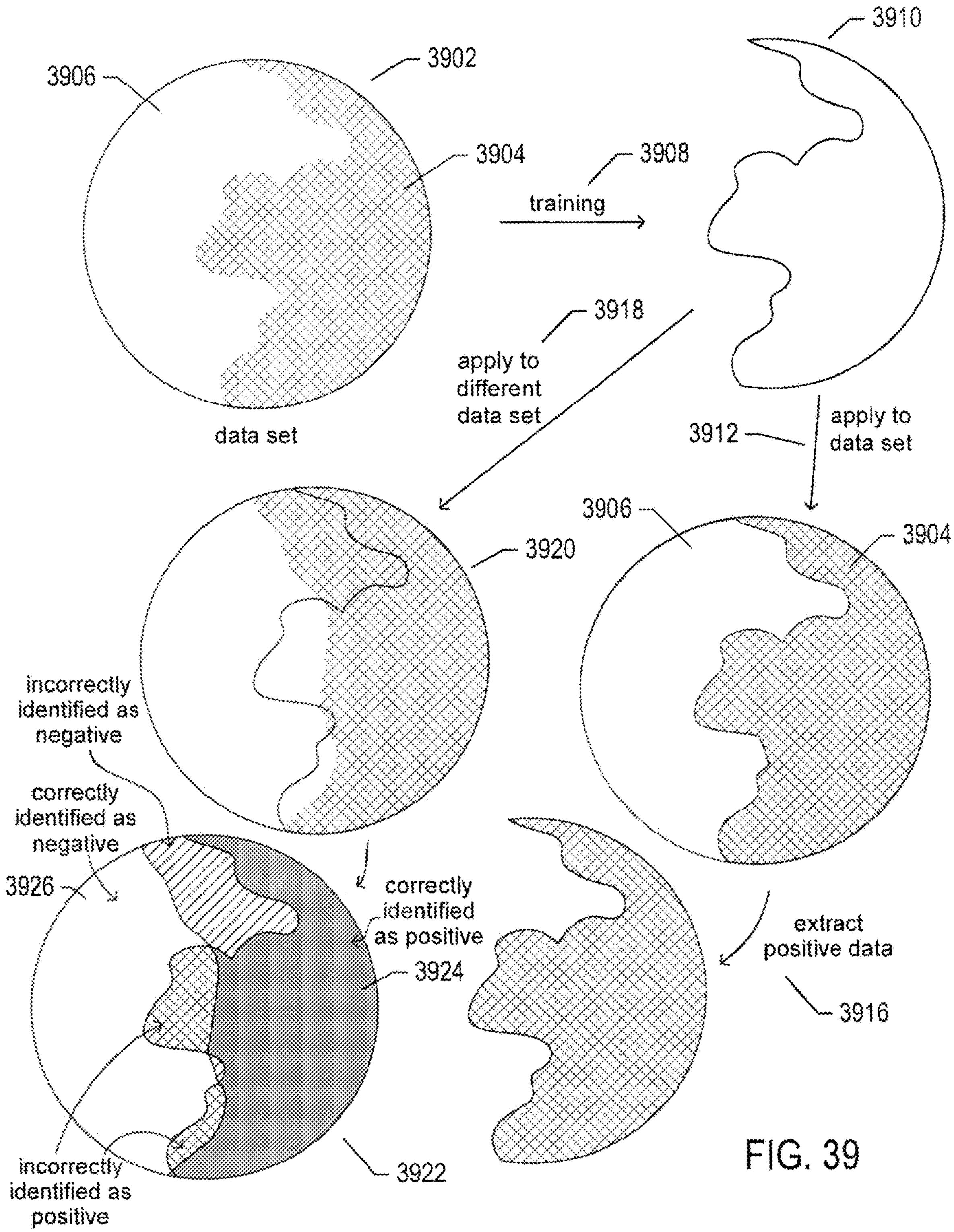
FIG. 39 illustrates the problem of overfitting often encountered in machine-learning and mathematical approaches to data analysis.

FIG. 39 illustrates the problem of overfitting often encountered in machine-learning and mathematical approaches to analysis of data for identifying operational problems and failures of systems. A dataset 3902 comprising multiple entries is represented by a Venn-diagram-like illustration, in FIG. 39, in which the outer circle contains the entire dataset. The dataset may contain, as one example, call traces generated by a call-trace service for a distributed application. The cross-hatched portion 3904 of the disk circumscribed by the outer circle corresponds to problematic or problem-associated entries in the dataset and the other portion 3906 of the disk circumscribed by the outer circle corresponds to data entries representative of normal operation of some type of system. The dataset 3902 is used as training data 3908 for generation of a machine-learning-based tool 3910, or discriminator, that, when applied to the dataset 3912, differentiates the problem-associated entries in the dataset 3908 from the data entries representative of normal operation 3906. The machine-learning-based tool can be used to accurately extract the problem-associated data entries 3916 from the dataset 3902. In this example, the machine-learning-based tool 3910 is depicted somewhat like a cookie-cutter that is superimposed over the Venn-diagramlike representation of a dataset and that partitions the entries in the dataset into two subsets. Of course, in actual datasets, neither problem-associated entries nor entries that are not associated with a particular problem are grouped together, but, in a Venn-diagram illustration, they are considered to be so grouped for illustration purposes. In general, machine-learning-based tool generation 3908 involves labeling data entries as either problem-associated or normal, and the problem-associated-labeled data entries are referred to as "positive" data entries while the normal data entries are referred to as "negative" data entries. Unsurprisingly, the machine-learning-based tool, having been trained on dataset 3902, very accurately partitions the entries of the dataset into problematic entries and normal-operation entries. However, when the machine-learning-based tool is applied to a different dataset 3918 than the dataset used for training, the machine-learning-based-tool partitioning 3920 is not accurate. As indicated in Venn-diagram-like illustration 3922, a portion of the positive entries in the different dataset 3924 are correctly identified by the machine-learning-based tool and a portion of the negative entries in the different dataset 3926 are also correctly identified by the machine-learning-based tool. However, a portion of the entries in the different dataset, shown with striping in representation 3922, are incorrectly identified as negative entries and another portion of the entries in the different dataset, shown with cross hatching and representation 3922, or incorrectly identified as positive. This problem is referred to as "overfitting." The machine-learning-based tool, or discriminator 3910, is trained to exactly partition the entries in the training dataset 3902. As shown in FIG. 39, the cookie-cutter-like machine-learning-based tool has a complex curved shape that mirrors the complex curve that separates the differently labeled portions of the training dataset. However, the different dataset has a different partitioning curve which does not correspond to the complex partitioning curve mirrored in the machine-learning-based tool. This type of overfitting is observed, for example, when applying decision trees generated from training datasets to non-training datasets. Efforts are generally made, during training, to generalize the training to avoid overfitting, but often fail to prevent higher-than-desirable misclassification due to overfitting.

Figure 40:
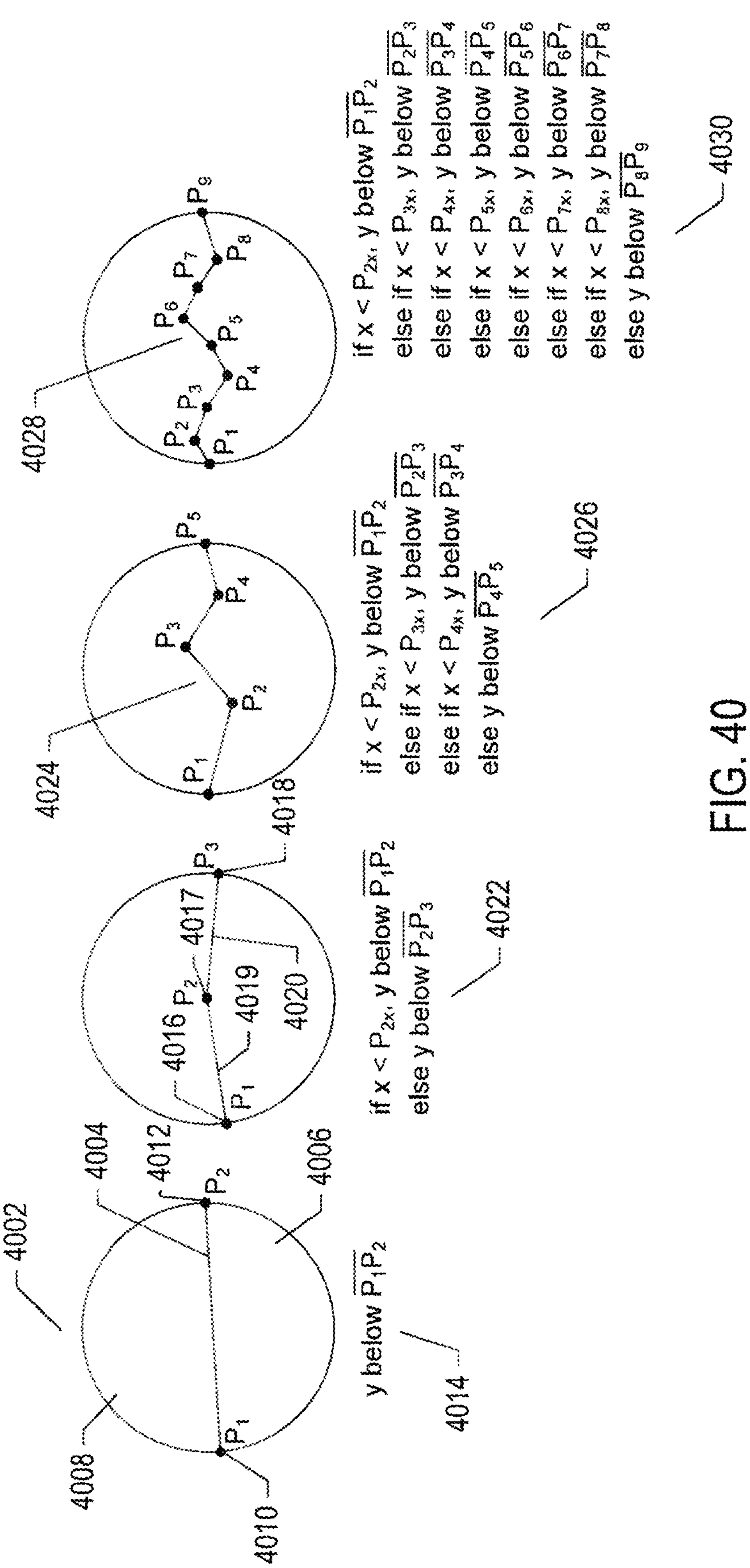
FIG. 40 illustrates an additional problem related to the overfitting problem discussed above with reference to FIG. 39.

FIG. 40 illustrates an additional problem related to the overfitting problem discussed above with reference to FIG. 39. In the example shown in FIG. 40, Venn-diagram-like illustrations similar to those used in FIG. 39, are again used to illustrate the additional problem. In this case, the partitioning contour that partitions positive from negative entries in a dataset is sequentially generated as a set of rules to increasingly closely mirror the actual partitioning contour. Initially, in representation 4002, the partitioning contour is a straight line 4004. The partitioning contour 4004 divides the positive data entries 4006 from the negative data entries 4008. This initial partitioning contour can be represented by two points 4010 and 4012 and a rule 4014 that indicates that positive data entries have a y coordinate below the y coordinates of the points along the straight line between the two points. This example assumes that data entries are associated with two-dimensional coordinates in a coordinate system imposed on the disk-like representation of the dataset. A more exact partitioning contour is represented by three points 4016-4018 and two line segments 4019 and 4020 along with a more complex rule 4022 that indicates that the positive data entries have y coordinates below the line segments between points 4016 and 4017 when the x coordinates of the data entries are less than the x coordinate of point 4017 and otherwise have y coordinates below the line segment connecting points 4017 and 4018. A more exact partitioning contour 4024 is defined by five points and four line segments as well as an even more complex rule 4026, and a final, even more exact partitioning contour 4028 is defined by nine points and eight line segments as well as a very lengthy and complex rule 4030. Thus, as the partitioning of the dataset entries becomes more accurate, the rule that expresses the partitioning generally becomes lengthier and more complex. In an actual rule-based partitioning of a call-trace dataset containing call-trace data entries, rule sets generated as a product of overfitting may contain many subrules involving many different attributes of call traces. Such complex rules may be difficult for human administrators and managers to understand and, for this reason, they provide very little insight with respect to root causes of operational problems and failures. In addition, they may not select problem-associated call traces with a desired level of confidence to overfitting, as discussed above with respect to FIG. 39.

Figure 41:
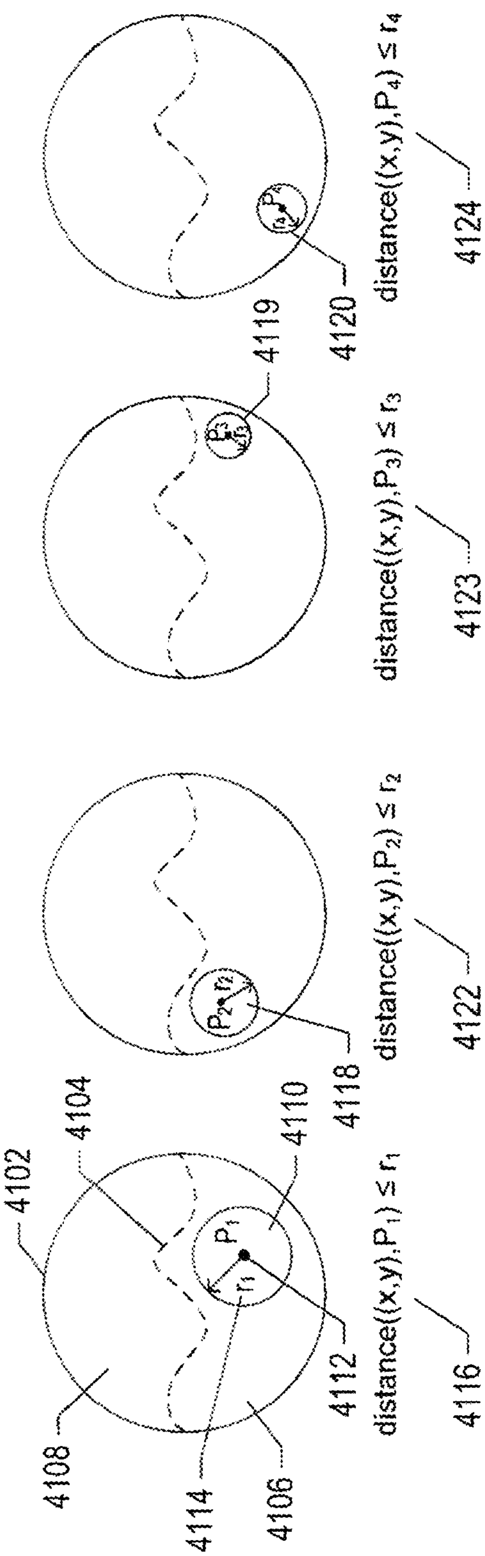
FIG. 41 illustrates an approach used in certain implementations of the currently disclosed methods and systems.

FIG. 41 illustrates an approach used in certain implementations of the currently disclosed methods and systems. FIG. 41, like FIGS. 39-40, discussed above, also uses Venn-diagram-like illustrations to represent partitioning of a dataset into positive and negative entries. In a first Venn-diagram-like illustration 4102, dashed curve 4104 represents the partitioning contour that separates positive entries 4106 from negative entries 4108. In this case, a relatively large region 4110 of the positive entries can be represented by a single point 4112 and a radius 4114. The point 4112 represents the center of the circle with radius 4114. This region of positive entries is described by a relatively simple rule 4116. Each of three additional regions of positive entries 4118-4120 can be represented by different points and radii encoded in three additional simple rules 4122-4124, respectively. None of the rules is a comprehensive representation of the full set of positive entries in the dataset, but, together, the four rules 4116 and 4122-4124 represent a substantial portion of the positive entries in the dataset. Each of the rules is quite simple to understand, stating that the data entries within a disk-shaped region defined by a single point in radius correspond to positive entries. A human administrator or manager could apply each of these rules to a dataset and, when application of one of the rules identifies positive entries with a high level of confidence, the human administrator or manager may gain insight as to the cause of an operational problem or failure related to the entries in the dataset based on an understanding of the rule, such as an understanding that the point in the rule corresponds to some well-defined component or aspect of a distributed application. To be useful, a rule needs to select at least a threshold portion of the positive entries. In addition, a useful rule would select positive entries with high confidence, so that, when the rule is applied to a dataset and selects more than a threshold percentage of the entries, a manager or administrator can assume that the rule then actually explains or partially explains the positive entries and therefore is a possible explanation, or partial explanation, for the operation problem or failure related to the entries in the dataset.

Figure 42A:
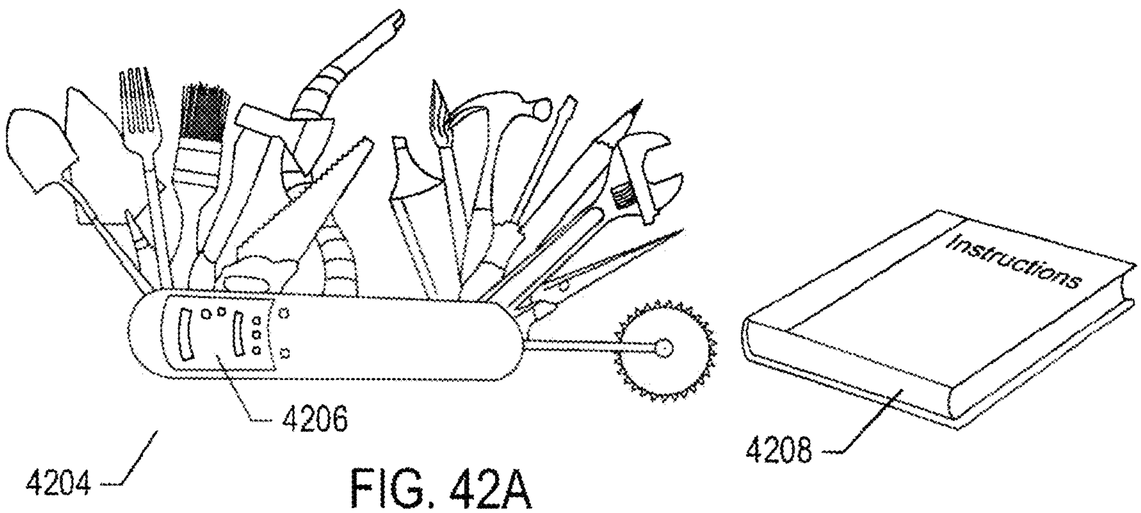
FIGS. 42A-B illustrate an approach taken by the currently disclosed methods and systems.
Figure 42B:
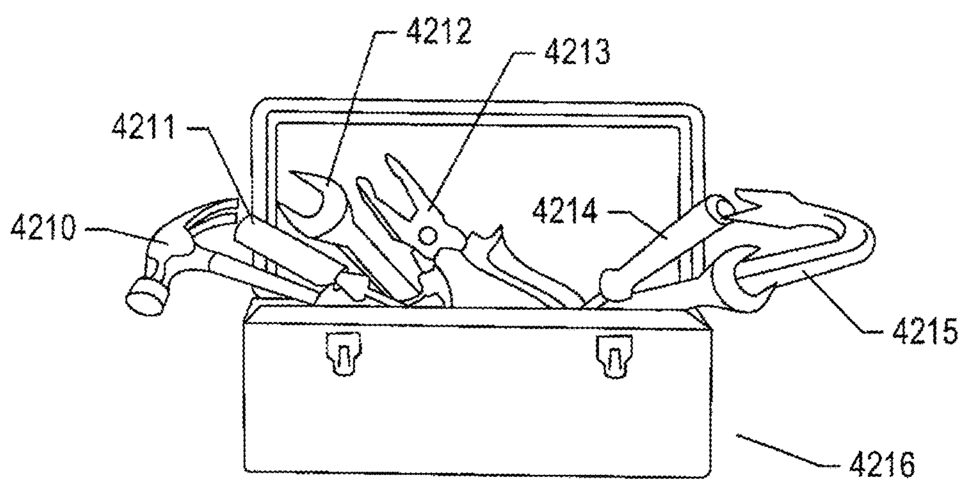

FIGS. 42A-B illustrate an approach taken by the currently disclosed methods and systems. Many of the more complex, automated, machine-learning-based methods for analysis of metric and call-trace datasets in order to identify root causes of operational problems and failures are computationally complex, have high computational overheads, are often difficult to understand, and may be difficult for managers and administrators to apply and to evaluate the results of application. In essence, many of these complex methods are analogous to a complex all-in-one tool 4204, shown in FIG. 42A, that is implemented to allow a user to carry out a large variety of different types of tasks. Unfortunately, such all-in-one approaches may involve complex operational interfaces 4206 that can only be understood by accessing and understanding complex descriptions and instructions 4208. Furthermore, in many cases, the all-in-one tool, when applied to a particular problem, may be significantly more difficult to use than a simpler, traditional tool and may often not produce results as good as produced by the simpler tool. Each of the simple rule-based tools generated by the currently disclosed methods, analogous to traditional tools 4210-4215 in a toolbox 4216, may each have a relatively constrained utility domain, but within that domain, may be highly effective. In addition, each tool is well understood by a potential user. The currently disclosed methods and systems are directed to creating a logical toolbox of simple call-trace-classification-rule tools that may be very effectively employed by users, without the need for complex instructions and interfaces, to address problems in diagnosing root causes of operational efficiencies and failures of distributed applications and other distributed-computer-system-based s stems. A logical toolbox may be implemented as a file or other data-storage entity maintained in a data-storage device.

Figure 43B:
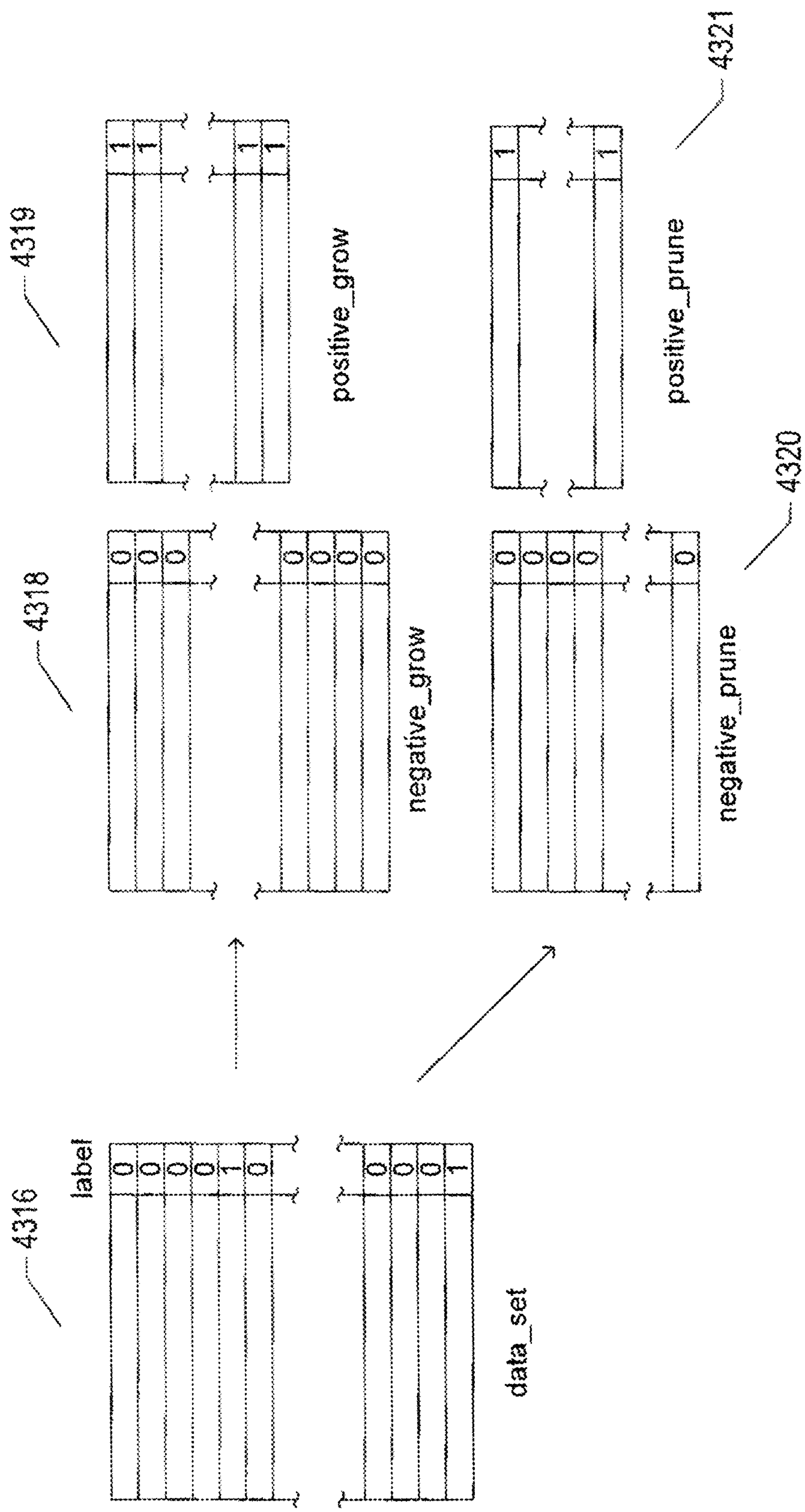

FIGS. 43A-E illustrate an example of generating a simple rule from a call-trace dataset that explains positive and negative call-trace labels in terms of call-trace attributes. The simple rule generated in this example illustrates the types of call-trace-classification rules which the currently disclosed methods and systems are implemented to generate from call-trace datasets for use as diagnostic tools. FIG. 43A shows a small call-trace dataset 4302. Each row in this tabular dataset, such as the first row 4304, is a representation of a particular call trace. In this example, the call traces are represented by a set of attributes and corresponding attribute values. The attributes are represented by capital letters 4306-4313. Each call-trace attribute has a data type that defines the types of values that the attribute of a particular call trace may represent. The values for attributes A, C, D, and H are integer values. The values for attributes B, F, and G are discrete values represented by lower-case letters. The values for attribute E are floating-point values. A special attribute 4314, "Label." represents a label assigned to the call trace. In this example, negative call traces are associated with the label "0" and positive call traces are associated with the label "1." A manager or administrator of a distributed application may wish to analyze a recent set of call traces collected during operation of the distributed application in order to diagnose some sort of emergent operational problem or operational failure. Actual call-trace databases may include thousands, tens of thousands, or more entries collected over even very short periods of time, rendering manual analysis difficult, at best, and generally infeasible. It is for this reason that the automated methods and systems discussed in the previous subsections of this document have been developed. However, as discussed above, the currently disclosed methods and systems do not necessarily seek to generate comprehensive root-cause-explanation tools, but instead generate simple call-trace-classification-rule tools that are readily understood by managers and administrators and that, when correctly classifying, or selecting a significant portion the call traces in a call-trace dataset, provide indications of problem-or-failure-associated components or features of a distributed application that can be more thoroughly investigated in order to identify root causes of operational problems and failures. In the current example, the currently disclosed methods and systems would seek to generate one or more call-trace-classification rules, based on the attribute values of the call traces in the call-trace dataset, that partition the call traces into negatively labeled and positively labeled call traces. The attribute values and conditions included in the one or more simple rules may then point to particular areas of concern for investigation of root causes of an operational problem or failure.

FIG. 43B illustrates a first step taken in certain automated rule-generation procedure. The labeled call-trace dataset 4316 is partitioned into two pairs of datasets: (1) a grow pair of datasets 4318-4319; and (2) a prune pair of datasets 4320-4321. The grow pair of datasets are used to generate a rule consisting of multiple conditions joined together by Boolean AND operations and the prune pair of datasets 4320-4321 are used to prune the initially generated rule, as further discussed below. Each pair of datasets consists of a negative dataset (4318 and 4320) containing negatively labeled call traces and a positive dataset (4319 and 4321) containing positively labeled call traces. As shown in FIG. 43C, call-trace dataset 4302 is randomly partitioned into the two pairs of the datasets, as indicated by the characters "G" and "Pr" in a final column 4322, and the characters "N" and "P" in a penultimate column 4324 indicate the positive or negative labelling of each of the call traces. Note that, in the current discussion, a call-trace-classification rule is intended to select positively labeled call traces from a call-trace dataset with high confidence. When a call-trace-classification rule selects the positively labeled call traces from a call-trace dataset with high confidence, it can be used to partition the dataset into a corresponding positive dataset and negative dataset pair.

Figure 43D:
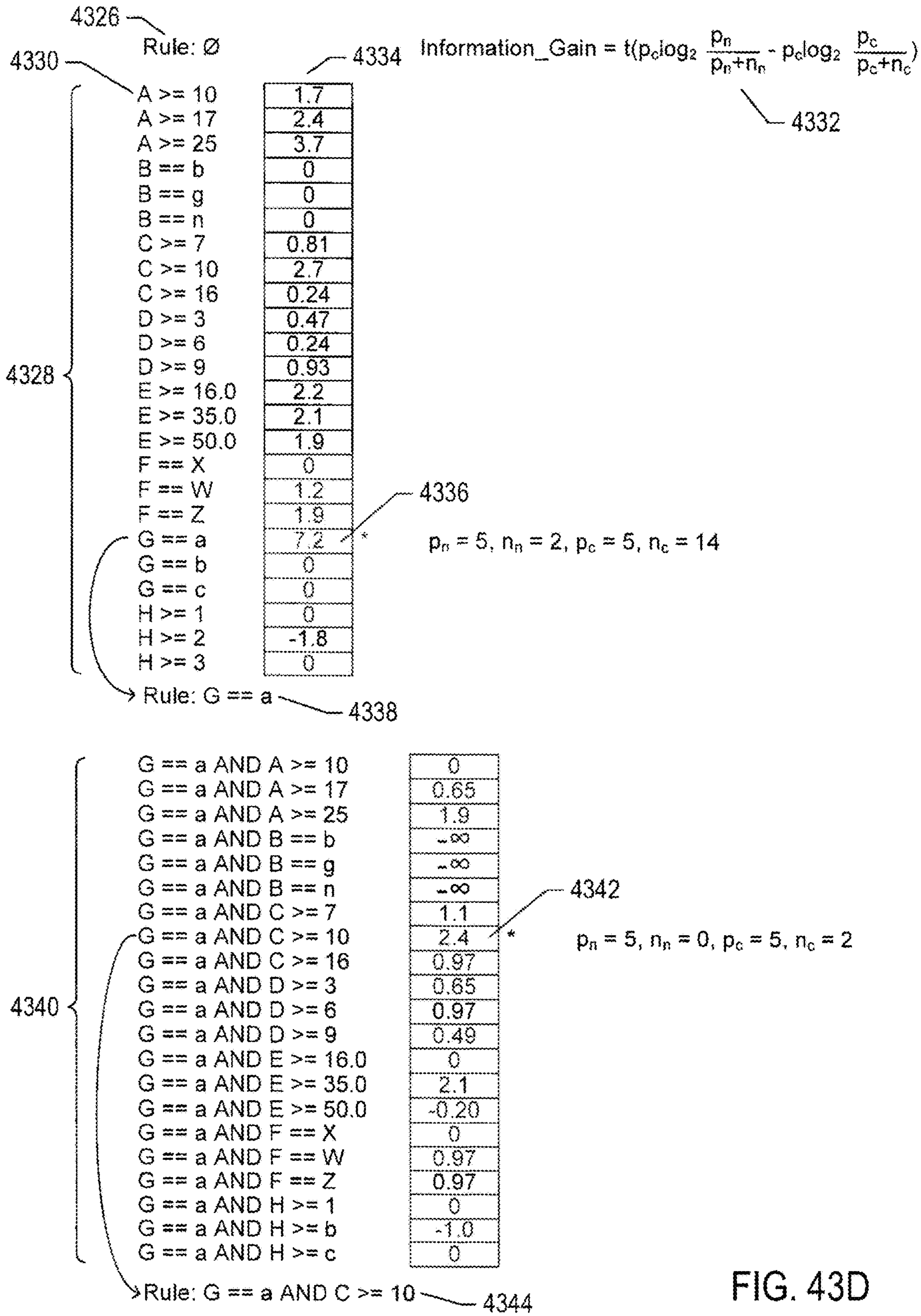

FIG. 43D illustrates a rule-generation process. Initially, a generated call-trace-classification rule Rule contains no conditions 4326. Next, a large set of candidate conditions 4328 is considered for inclusion as the first condition in the generated call-trace-classification rule Rule. The conditions have the form of an attribute followed by a comparison operator and an attribute value. For example, the first candidate condition 4330 is: "A>=10." This condition would evaluate to TRUE for call traces containing values for the call-trace attribute A greater than or equal to 10 and would evaluate to FALSE for values of the call-trace attribute A less than 10. Comparison operators ">=" and "<=" are used in conditions that include attributes with integer and floating-point values while the comparison operator "==" is used for attributes with discrete values, such as attributes that may have a value selected from a generally unordered set of values. Each candidate condition is then evaluated by applying a rule consisting of the candidate condition to the call-trace dataset 4302. Application of a next, new rule to the call-trace dataset generates two values: (1) $p_n$, the number of call traces in the dataset identified as positive by the new rule; and (2) $n_n$, the number of call traces in the dataset identified as negative by the new rule. The method also considers similar values tor the current rule or, in other words, the rule to which an additional condition has been added to generate the new rule; (1) $p_c$, the number of call traces in the dataset identified by the current rule as being positive; and (2) $n_c$, the number of call traces in the dataset identified by the current rule as being negative. Initially, the current rule is the empty rule 4326 and the new rule is a rule with one condition selected from the candidate conditions 4328. The empty rule 4326, when applied to the call-trace dataset, returns a number of call traces equal to the total number of traces in the dataset. The results returned by application of each new rule consisting of one of the candidate conditions are used to compute an information gain for the new rule according to expression 4332. The computed information gains for all of the candidate rules are provided in column 4334. Then, the candidate condition associated with the largest information gain is selected as the first condition for the generated rule. In this example, the highest information gain 4336 is associated with the candidate condition "G==a." Thus, the candidate condition "G==a" is selected as the first condition to include in the nascent rule Rule 4338. Next, a set of second candidate conditions are added to the nascent rule 4338 to generate a second set of candidate rules for evaluation 4340. This evaluation involves applying each of these new candidate rules to the call-trace dataset and determining the information gain provided by each of the new candidate rules. In this example, the highest information gain 4342 is associated with the candidate rule "G==a AND C>=10." Therefore, the nascent call-trace-classification rule now becomes "G'2=a AND C>=10" 4344. This process continues until application of the nascent call-trace-classification rule to the call-trace dataset selects only positively labeled call traces, as is the case for the call-trace-classification rule "G==a AND C>=10."

FIG. 43E illustrates the generation of the rule "G==a AND C<=10" discussed above with reference to FIG. 43D. The grow call-trace dataset 4350 is shown at the left in FIG. 43E. Application of the initial nascent rule containing only the condition "G==a" to the grow call-trace dataset produces result call-trace dataset 4352. The result call-trace dataset 4352 contains all of the positively labeled call traces in the grow call-trace dataset 4350 but also includes two negatively labeled call traces 4354-4355. Application of the rule "G==a AND C>=10" produces result dataset 4360, which contains only the positively labeled call traces of the grow call-trace dataset 4350. Thus, no further conditions need to be added to rule "G==a AND C>=10" because it selects no negatively labeled call traces from the grow call-trace dataset. In many cases, a rule may not select all of the positively labeled call traces from the grow call-trace dataset, in which case additional rules need to be generated in order to fully partition the call-trace dataset into positively and negatively labeled call traces.

Various different metrics can be computed for application of a call-trace-classification rule to a call-trace dataset. Expressions for certain of these metrics are shown, in FIG. 43E, below the grow call-trace dataset 4350. In these expressions, p represents the number of positively labeled call traces selected by the call-trace-classification rule and n represents the number of negatively labeled call traces selected by the call-trace-classification rule. The coverage metric 4362 is the ratio of p to the total number of positively labeled traces in the dataset. Thus, a coverage metric equal to 1.0 indicates that application of a call-trace-classification rule selects all of the positively labeled call traces in a dataset, coverage-metric values less than 1.0 indicate that application of the call-trace-classification rule selects fewer than all of the positively labeled call traces in the dataset, and a coverage metric equal to 0 indicates that application of the call-trace-classification rule selects none of the positively labeled call traces the dataset. The confidence metric 4364 is the ratio of p to the total number of call traces selected by the call-trace-classification rule, n+p. A confidence metric of 1.0 indicates that the call-trace-classification rule selected no negatively labeled call traces and a confidence metric of 0.0 indicates that the call-trace-classification rule selects no positively labeled call traces. The accuracy metric 4366 is the ratio of p+ the number of negatively labeled call traces in the dataset −n to the total number of call traces in the dataset. When the accuracy metric has a value 1.0, the call-trace-classification rule selects exactly all of the positively labeled call traces in the dataset and no negatively labeled call traces in the dataset and when the accuracy metric has a value 0, the call-trace-classification rule selects no positively labeled call traces from the dataset and all of the negatively labeled call traces from the dataset. The values for these three metrics are shown for the two result call-trace datasets 4352 and 4360 in FIG. 43E. Both result call-trace datasets have coverage metrics equal to 1.0. Result call-trace dataset 4352 is associated with confidence and accuracy metrics less than 1.0 while result call-trace dataset 4360 is associated with confidence and accuracy metrics both equal to 1.0. As discussed above, simple call-trace-classification rules sought to be generated by the currently disclosed methods and systems need not provide comprehensive explanations for the positively and negatively labeled call traces in a dataset. Thus, the accuracy associated with these simple call-trace-classification rules is unimportant. However, the confidence associated with the desirable call-trace-classification rules needs to be high because, when the call-trace-classification rule is applied to a call-trace dataset and returns more than a threshold number of call traces, it is assumed that the selected call traces are explained by the call-trace-classification rule and that the call-trace-classification rule therefore provides an indication of problematic or failing distributed-application components. The coverage associated with the desirable call-trace-classification rules is less important than the confidence associated with the desirable call-trace-classification rules, but also needs to be sufficiently large for the call-trace-classification rule to represent a useful generality.

Next, one of many rule-generation methods that can be used to generate call-trace-classification rules for partitioning call-trace datasets is described in a series of control-flow diagrams provided in FIGS. 44-49C. Rule-generation methods include the Reduced Error Pruning ("REP"), Incremental Reduced Error Pruning ("IREP"), and Repeated Incremental Pruning to Produce Error Reduction ("RIPPER") methods. The rule-generation method described with reference to FIGS. 44-49C is based on a version of the RIPPER method. There are many additional types of rule-generation methods that can be used to generate the simple call-trace-classification rules that are accumulated in a logical toolbox by the disclosed methods and systems.

Figure 44:
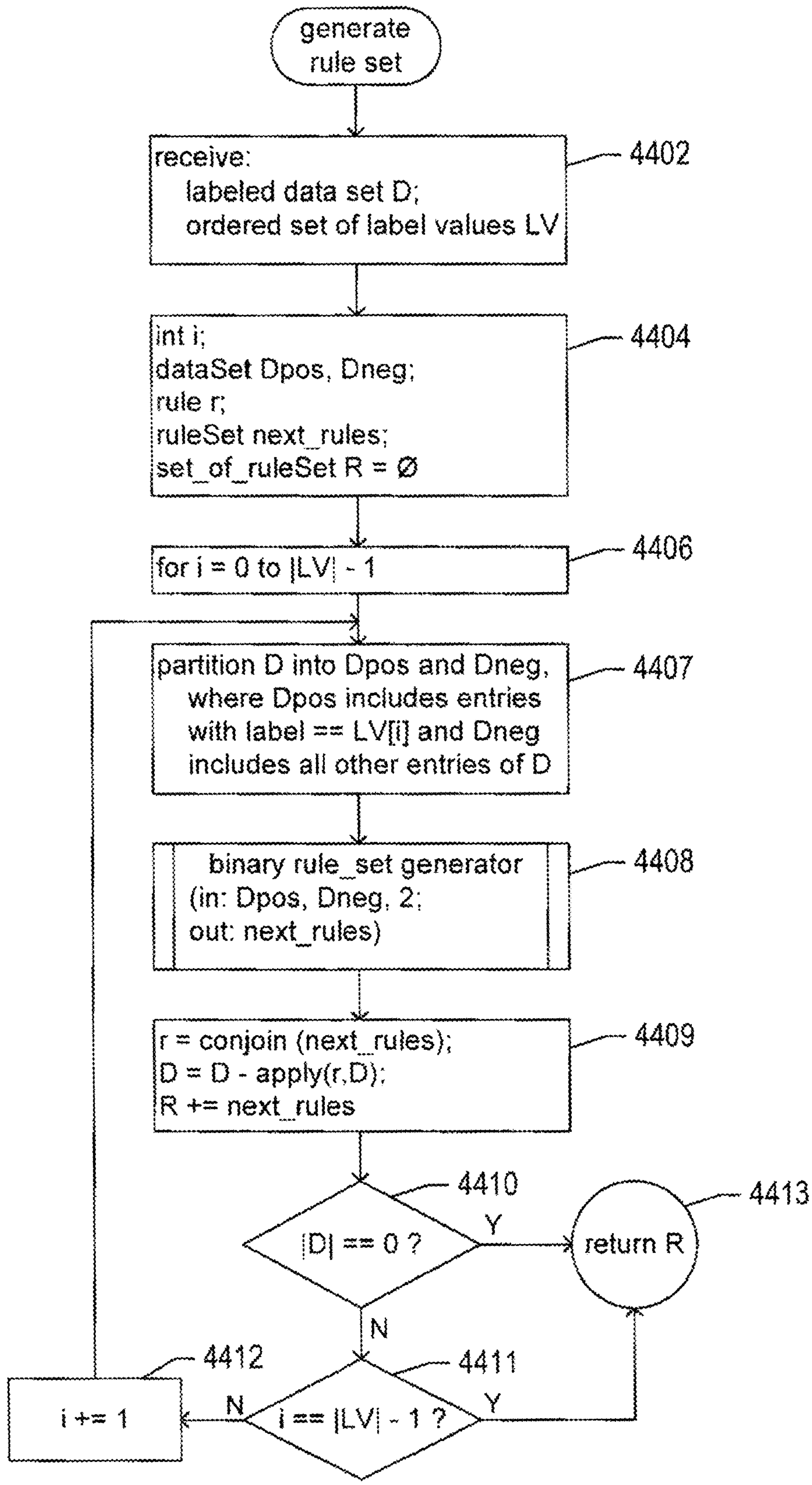
FIG. 44 provides a highest-level control-flow diagram for a routine "generate rule set" that generates a set of rules to explain different label values within a call-trace dataset.

FIG. 44 provides a highest-level control-flow diagram for a routine "generate rule set" that generates a set of rules to explain different label values within a dataset. In the current discussion, as discussed further below, beginning with a discussion of FIG. 50, one implementation of the call-trace service, described above in preceding subsections of this document, automatically generates one or more labels for accumulated call-trace datasets. Each of these one or more labels is then used to generate a rule set that partitions the call-trace dataset into multiple partitions that each corresponds to a different label value. In many cases, as in the example discussed above with reference to FIGS. 43A-E, a label has only two possible label values, one indicating positive call traces and the other indicating negative call traces. These may be referred to as binary labels. However, a label may alternatively be associated with more than two label values. Such labels are referred to as "multi-valued labels." The routine "generate rule set," illustrated in FIG. 44, is a generic rule-generation routine that can be used to generate a rule set for either a particular binary label associated with a dataset or for a multi-valued label associated with a dataset. The routine "generate rule set" describes a generalize rule-generation method that can be used to generate classification rules for any of many different types of labeled datasets, including datasets that contain entries other than call-trace representations.

In step 4402, the routine "generate rule set" receives a labeled dataset D and an ordered set of label values LV for the label attribute of the labeled dataset D. The routine "generate rule set" partitions the labeled dataset D with respect to a single label with label values selected from the set LV. The routine "generate rule set" generates a rule set for partitioning based on either a binary or a multi-valued label.

In step 4404, a set of local variables is declared. The local variables include: (1) i, a loop variable; (2) Dpos and Dneg, dataset variables; (3) r, a local variable that contains a rule; (4) next_rules, a local variable contains a set of rules; and (5) R, a local variable that contains a set of rule sets and that is initialized to the empty set. In the for-loop of steps 4406-4412, a set of rules is generated for each label value in the ordered set of label values LV. The set of label values LV is ordered in increasing order of the number of entries in the received dataset D labeled with the label values. In step 4807, the received dataset D is partitioned by placing the entries associated with the currently considered label value LV[i] into Dpos and placing the entries associated with all other label values into Dneg. In step 4408, a routine "binary rule-set generator" is called to generate a set of rules, output to local variable next rules, that partitions dataset D into Dpos and Dneg. In step 4409, the set of rules returned by the routine "binary rule-set generator" is joined together using AND operators and placed, as a single rule, into the local variable r. The set of entries in dataset D selected by application of rule r is then removed from dataset D. The set of rules_next rules is then added to the set of rule sets R. When the number of entries in dataset D is now equal to 0, as determined in step 4410, the set of rule sets R is returned, in step 4413. Otherwise, when loop variable i is equal to one less than the number of label values in the set of label values LV, as determined in step 1412, the set of rule sets R is returned in step 4413. Otherwise, control flows back to step 4407 for a next iteration of the for-loop of steps 4406-4411 after incrementing the loop variable i in step 4412. For a binary label, the for-loop of steps 4406-4411 iterates only once. The returned set of rule sets R can be used to partition a dataset into multiple partitions, one for each possible label value. In certain of the control-flow diagrams used to illustrate the rule-generation method, it may be assumed that the dataset D contains examples of entries associated with all of the different possible label values.

Figure 45:
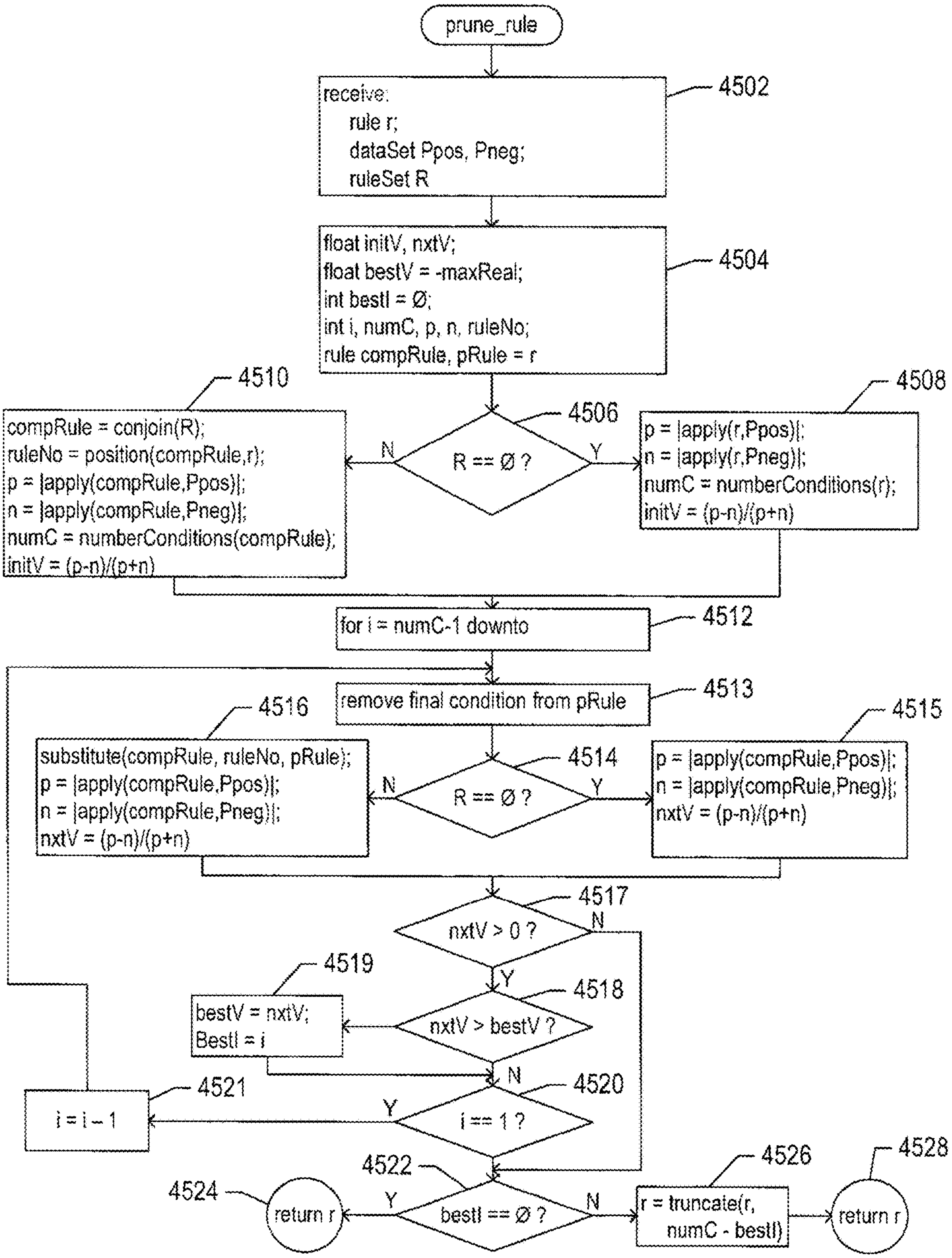
FIG. 45 provides a control-flow diagram for a routine "prune_rule," called by a routine "binary rule-set generator."

FIG. 45 provides a control-flow diagram for a routine "prune_rule," called by the routine "binary rule-set generator," called in step 4408 of FIG. 44. The routine "prune_rule" removes terminal conditions from a newly generated rule in order to simplify the rule. In step 4502, the routine "prune_rule" receives a rule r, two prune datasets Ppos and Pneg, and a rule set R as arguments. In step 4504, the routine "prune_rule" declares the following local variables: (1) initV and nxtV, two floating-point variables; (2) best V, a floating-point variable initialized to a large negative real number; (3) bestI, an integer variable initialized to an invalid integer value; (4) integer variables i, numC, p, n, and ruleNo; and (5) compRule and pRule, two rule variables with pRule initialized to contain a copy of received rule r. When the set of rules R is empty, as determined in step 4506, then, in step 4508, p is set to the number of dataset entries selected by applying rule r to dataset Ppos, n is sent to the number of dataset entries selected by applying rule r to dataset Pneg, numC is set to the number of conditions in rule r, and initV is set to a value computed as the ratio of p−n to p+n. The computed value initV is the ratio of the difference in the number of selected positive and selected negative rules to the total number of selected rules. Clearly, the higher this computed value, the more desirable the rule. Otherwise, the set of rules R is not empty, as determined in step 4506, then, in step 4510, local variable compRule is set to a rule obtained by joining all of the rules in rule set R by AND operators, local variable ruleNo is set to an integer indicating the position of ruler in rule compRule, p is set to the number of dataset entries selected by applying rule compRule to dataset Ppos, n is sent to the number of dataset entries selected by applying rule compRule to dataset Pneg, numC is set to the number of conditions in rule compRule, and initV is set to a value computed as the ratio of p−n to p+n. Then, in the for-loop of steps 4512-4521, the terminal conditions in either rule r or rule compRule are considered. In step 4513, the terminal condition is removed from rule pRule. When the rule set R is empty, as determined in step 4514, a new value nxtV is computed for modified rule pRule in step 4515, similarly to the computation of the value initV in step 4508. Otherwise, in step 4516, a new value nxtV is computed for the rule compRule in which modified pRule is substituted for rule r. When the new value nxtV is less than 0, the for-loop of steps 4512-4521 is terminated, with control flowing to step 4522, discussed below. When nxtV is greater than bestV, as determined in step 4518, bestV is set to nxtV and bestI is set to the current value of loop variable i, in step 4519. The variable bestI is used to keep track of the condition representing the maximum value of the metric nxtV. When loop variable i is equal to the 1, as determined in step 4520, the for-loop of steps 4512-4521 terminates. Otherwise, loop variable i is incremented, in step 4521, and control then flows to step 4513 for an additional iteration of the for-loop of steps 4512-4521, Following termination of the for-loop of steps 4512-4521, when bestI has been set to a value in step 4519, then, in step 4526, rule r is truncated be removing terminal conditions starting from the condition indicated by numC-bestI, and the truncated rule r is returned. Otherwise, received rule r is returned, in step 4524. The routine "prune_rule" thus removes terminal conditions to a point where the computed value nxtV is maximized.

Figure 46:
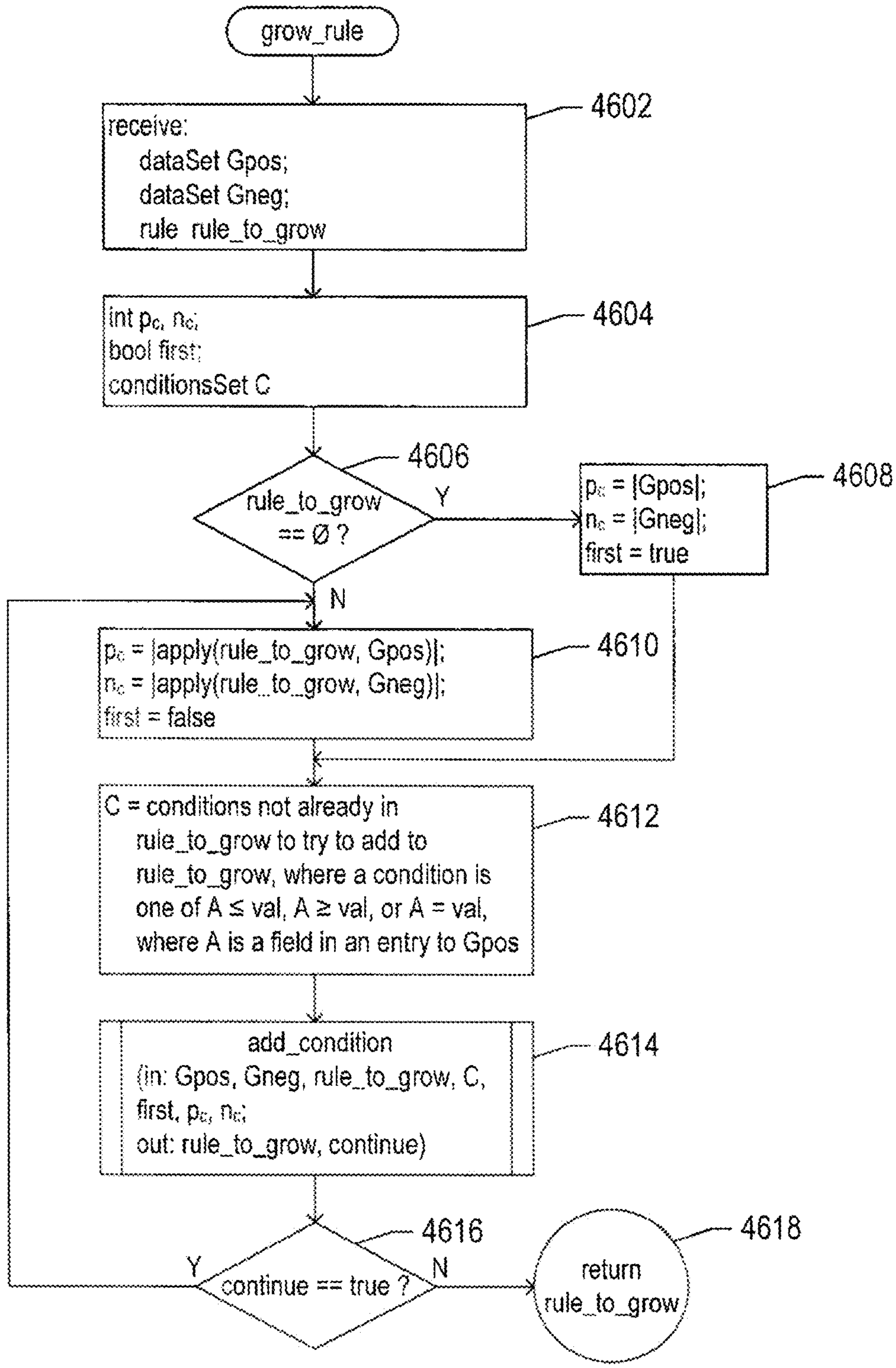
FIG. 46 provides a control-flow diagram for a routine "grow_rule," called by the routine "binary rule-set generator."

FIG. 46 provides a control-flow diagram for a routine "grow_rule," called by the routine "binary rule-set generator." discussed below with reference to FIGS. 49A-C. The routine "grow_rule" generates an entirely new rule, when the argument rule_to_grow contains the empty rule, or adds conditions to a non-empty rule contained in the argument rule_to_grow. In step 4602, the routine "grow_rule" receives, as arguments, two datasets Gpos and Gneg and a rule rule_to_grow. In step 4604, local variables are declared, including local variables: (1) $p_c$ and $n_c$, integer variables that contain the number of positively and negatively labeled rules selected from datasets Gpos and Gneg by a current rule; (2) first, a Boolean variable indicating whether or not a condition is already contained in the rule rule_to_grow: and (3) a set of conditions C. In step 4606, the routine "grow_rule" determines whether or not the received rule rule_to_grow is the empty rule. If so, then, in step 4608, $p_c$ and $n_c$ are set to the number of dataset entries in Gpos and Gneg, respectively, and variable first is set to TRUE. Otherwise, in step 4610, $p_c$ is set to the number of entries selected by the rule rule_to_grow from Gpos, $n_c$ is set to the number of dataset entries selected by the rule rule_to_grow from Gneg, and variable first is set to FALSE. In step 4612, the set of conditions C is initialized to a set of conditions that are not already in rule rule_to_grow that together comprise the candidate conditions for attempting to grow the rule rule_to_grow by one additional condition. In certain implementations, all possible conditions are placed in the set of conditions C. In other implementations, a selected subset of all possible conditions is placed in C. In step 4614, a routine "add_condition" is called to add a next condition to the rule rule_to_grow. The routine "add_condition" returns a Boolean indication of whether the rule can be further grown as well as a possibly modified rule_to_grow. When the routine "add_condition" returns a Boolean value TRUE, as determined in step 4616, control flows back to step 4610 to initiate another attempt to add an additional condition to the rule rule_to_grow. Otherwise, the rule rule to grow is returned, in step 4618. Note that the routine "add_condition" returns a modified version of the rule rule_to_grow when the routine "add_condition" returns a Boolean value TRUE.

Figure 47:
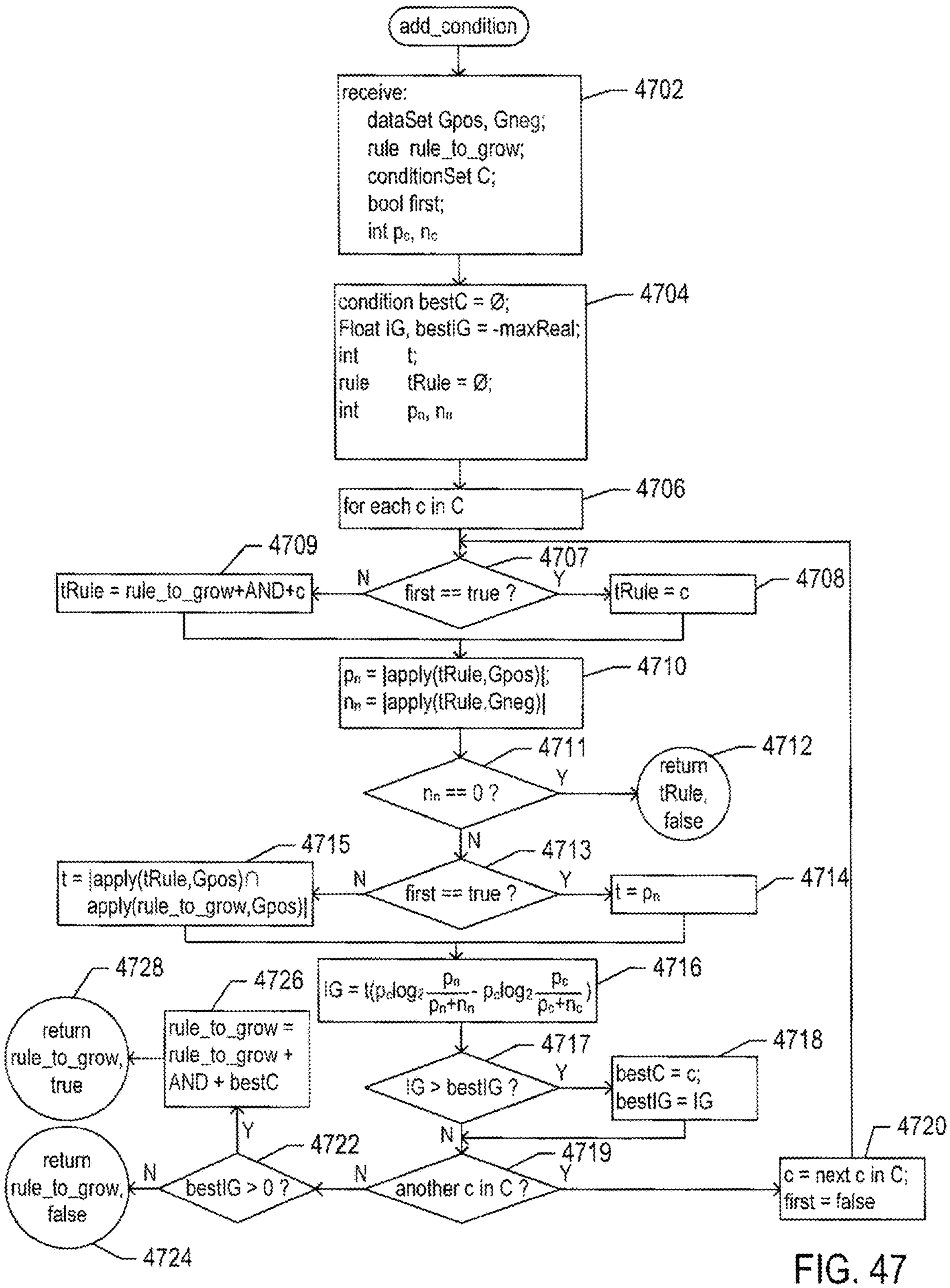
FIG. 47 provides a control-flow diagram for a routine "add_condition," called by the routine "grow_rule."

FIG. 47 provides a control-flow diagram for the routine "add_condition." called by the routine "grow_rule" in step 4614 of FIG. 46. In step 4702, the routine "add_condition" receives, as arguments, two datasets Gpos and Gneg, a rule rule_to_grow, a set of conditions C, a Boolean argument first, and two integer arguments $p_c$ and $n_c$. The values of these arguments are discussed above with reference to FIG. 46. In step 4704, the routine "add_condition" declares the following local variables: (1) bestC, a variable that contains a condition and that is initialized to the empty condition; (2) two floating-point variables IG and bestIG, with variable bestIG initialized to a large negative value; (3) t, and integer variable; (4) tRule, a rule variable initialized to the empty rule; and (5) $p_n$ and $n_n$, both integer variables. In the for-loop of steps 4706-4720, each candidate condition c in the set of conditions C is considered for adding to the received rule rule_to_grow. When there is no condition already in the rule rule_to_grow, as determined in step 4707, the rule tRule is set to the currently considered condition c, Otherwise, the currently considered condition c is added to tRule, in step 4709. In step 4710, $p_n$ is set to the number of dataset entries selected by applying rule tRule to dataset Gpos and $n_n$ is set to the number of entries selected by applying rule tRule to dataset Gneg. When $n_n$ is equal to 0, as determined in step 4711, the routine "add_condition" returns tRule and the Boolean value FALSE. Otherwise, when tRule contains only a single condition, as determined in step 4713, t is set to $p_n$ in step 4714. Otherwise, t is set to the number of dataset entries that are selected both by tRule and rule-to_grow, in step 4715. In step 4716, the information gain for tRule is computed via expression 4332, discussed above with reference to FIG. 43D. When the information gain is greater than the value stored in variable bestIG, as determined in step 4717, bestC is set to c and bestIG is set to the information gain IG, in step 4718. When there is another condition c in the set of conditions C to consider, as determined in step 4719, c is set to the next condition to consider and the variable first is set to FALSE, in step 4720, after which control flows back to step 4707 for another iteration of the for-loop of steps 4706-4720. Following completion of the for-loop of steps 4706-4720, when bestIG is less than or equal to 0, as determined in step 4722, the received rule rule_to_grow is returned along with the Boolean value FALSE, in step 4724. Otherwise, the condition stored in the variable bestC is added to the received rule_to_grow, and the modified rule_to_grow is returned along with the Boolean value TRUE, in step 4728.

Figure 48:
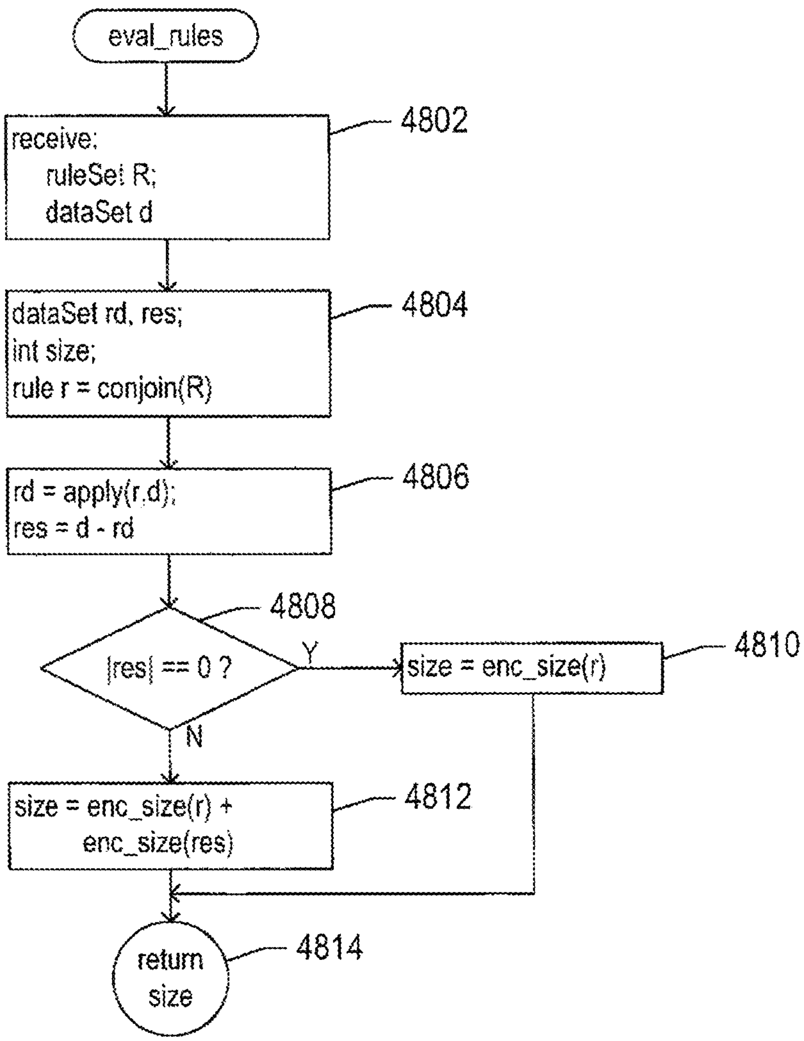
FIG. 48 provides a control-flow diagram for a routine "eval_rule."

FIG. 48 provides a control-flow diagram for a routine "eval_rules," called by the routine "binary rule-set generator," discussed below with reference to FIGS. 49A-C. In step 4802, the routine "eval_rules" receives a rule set R and a dataset d. In step 4804, the routine "eval_rules" declares the following local variables: (1) rd and res, two dataset variables: (2) size, an integer variable: and (3) r, a rule variable that is initialized to a rule formed by joining the rules in the rule set R with AND operators. In step 4806, rd is set to the entries of dataset d selected by rule r and res is set to the set difference between datasets d and rd. When the dataset res contains no entries, as determined in step 4808, the variable size is set to the number of bits needed to encode rule r, in step 4810. Otherwise, the variable size is set to the number of bits needed to encode both rule r and the entries contained in the dataset res, in step 4812. The value contained in local variable size is returned in step 4814. Thus, the routine "eval_rules" calculates the number of bits needed to encode the rule r and any entries in the dataset d not selected by the rule r.

Figure 49A:
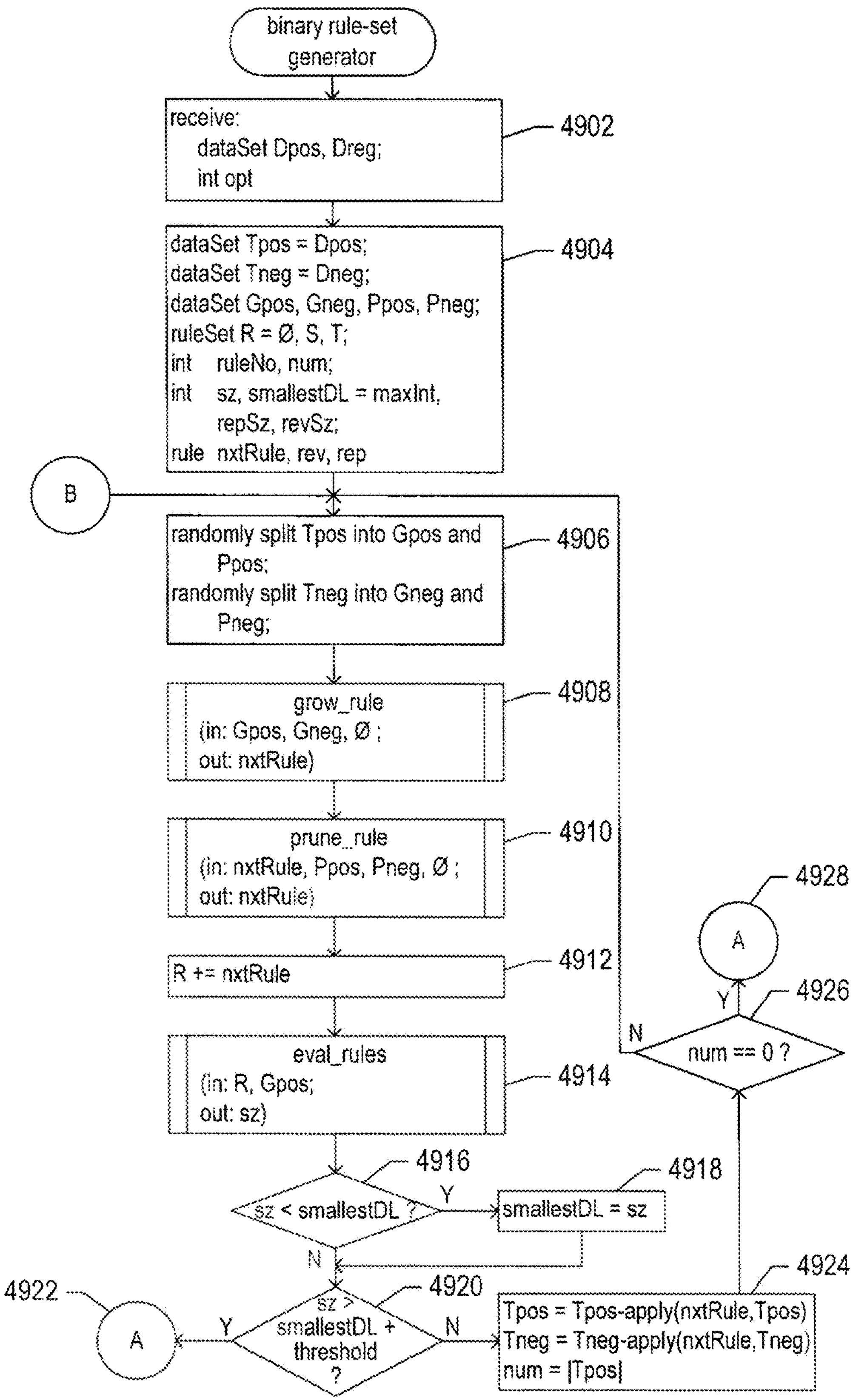
FIGS. 49A-C provide control-flow diagrams for the routine "binary rule-set generator."
Figure 49B:
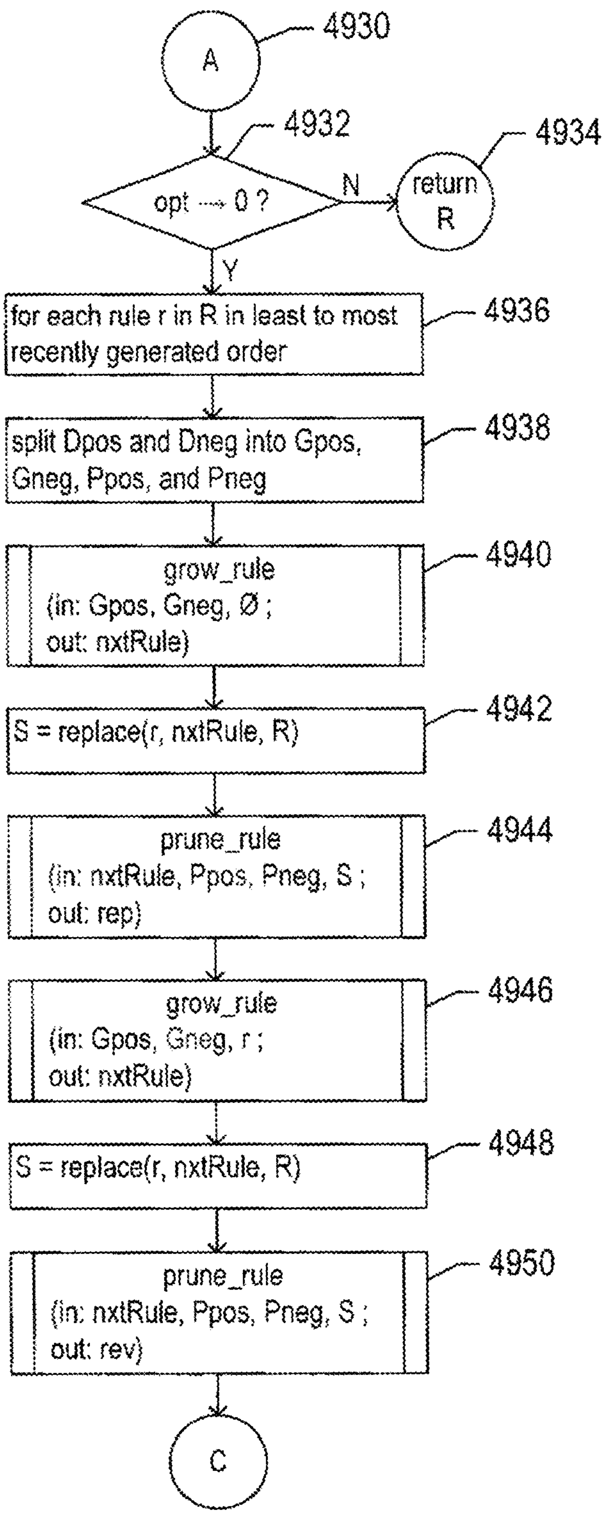
Figure 49C:
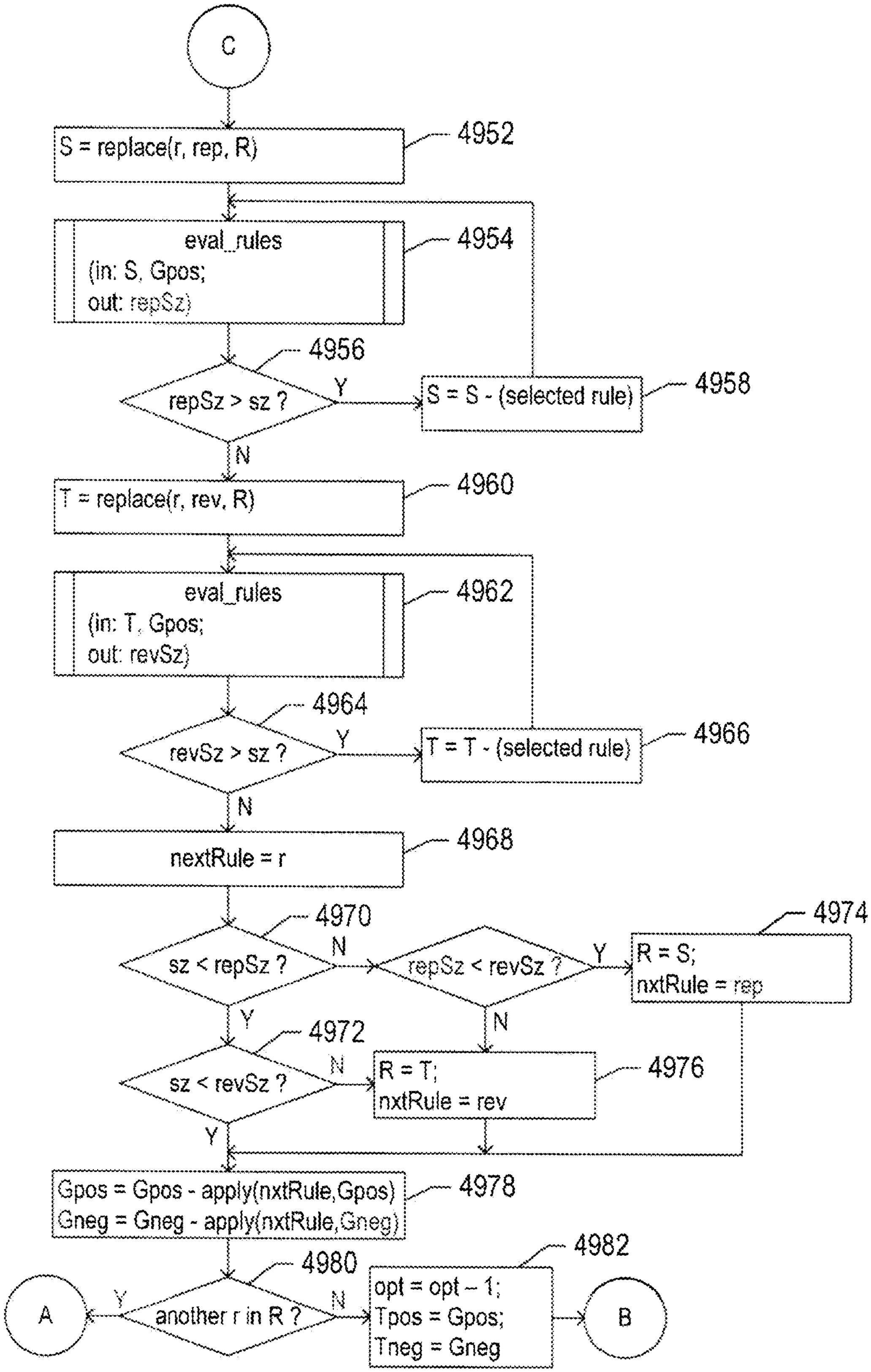

FIGS. 49A-C provide control-flow diagrams for the routine "binary rule-set generator," called in step 4408 of FIG. 44. In step 4902, the routine "binary rule-set generator" receives, as arguments, two datasets Dpos and Dneg and an integer opt. The integer opt indicates whether or not to carry out an additional optimization of the generated rule set, as discussed below. In step 4904, the routine "binary rule-set generator" declares the following local variables: (1) Tpos, a dataset variable initialized to contain the same entries as contained in Dpos; (2) Tneg, a dataset variable initialized to contain the same entries as contained in Dneg; (3) Gpos, Gneg. Ppos. and Pneg, all dataset variables; (4) R, S, and T, rule-set variables with variable R initialized to the empty set: (5) ruleNo and nunz, both integer variables: (6) sz, smallestDL, repSz, and revSz, all integer variables with variable smallestDL set to a large integer value; and (7) nxtRule, rev, and rep, all rule variables. In step 4906, the routine "binary rule-set generator" randomly splits dataset Tpos into two parts and stores the two parts in datasets Gpos and Pos and randomly splits dataset Tneg into two parts and stores the two parts in datasets Gneg and Pneg. In step 4908, the routine "binary rule-set generator" calls the routine "grow-_rule" with input arguments Gpos, Gneg, and an empty rule to generate a next rule. In step 4910, the routine "binary rule-set generator" calls the routine "prune_rule" with arguments nxtRule, Ppos, Pneg, and an empty rule set to prune the rule generated by the routine "grow_rule," called in step 4908. In step 4912, the pruned rule nxtRule is added to rule set R. In step 4914, the routine "binary rule-set generator" calls the routine "eval_rules" to compute an encoding size. When the encoding size is less than the value stored in variable smallestDL, as determined in step 4916, variable smallestDL is set to the computed encoding size in step 4918. When the encoding size is greater than the value stored in smallestDL plus a threshold value, as determined in step 4920, no more rules are added to the rule set and control flows to label A, discussed below, in step 4922. Otherwise, in step 4924, the dataset entries selected by the application of the rule nxtRule to the dataset Tpos are removed from the dataset Tpos and the dataset entries selected by application of the rule nxtRule to the dataset Tneg are removed from the dataset Tneg. In addition, local variable num is set to the number of entries in Tpos. When the number of entries in Tpos is 0, as determined in step 4926, no further rules are generated and control flows to label A, in step 4928. Otherwise control flows back to step 4906 for generation of another rule.

FIG. 49B continues the control-flow diagram of FIG. 49A. Label A 4930 labels step 4932, where control flows from steps 4922 and 4928 in FIG. 49A. When the value stored in local variable opt is less than or equal to 0, as determined in step 4932, the rule set R is returned, in step 4934. Otherwise, in a large for-loop that begins with step 4936, each rule r in rule set R is considered in least-recently-generated to most-recently-generated order. In step 4938, datasets Dpos and Dneg are split into datasets Gpos and Ppos and datasets Gneg and Pneg, respectively. In step 4940, the routine "grow_rule" is called to grow a new rule. In step 4942, the newly grown rule is substituted for currently considered rule r in rule set R to generate rule set S. In step 4944, the routine "prune_rule" is called to prune the rule generated in step 4940, outputting the pruned rule rep. In steps 4946, 4948, and 4950, the routine "binary rule-set generator" again calls the routines "grow_rule," and "prune_rule" in order to generate a new rule obtained by adding additional conditions to currently considered rule r and to then prune the new rule, which is output as rule rev. Continuing to FIG. 49C, rule set S is initialized to contain copies of the rules in rule set R with currently considered rule r replaced by the rule rep, in step 4952. In step 4954, the routine "binary rule-set generator" calls the routine "eval_rules" to determine the encoding size for S. When the encoding size is greater than the encoding size for rule set R, as determined in step 4956, a rule is selected for removal from rule set S and the selected rule is removed, in step 4958. Similarly, in steps 4960-4962, 4964, and 4966, a rule set T is generated by replacing currently considered rule r in rule set R with the rule rev and, if necessary to decrease the encoding size of rule set T, a rule is removed from rule set T. In step 4968, the variable nxtRule is set to currently considered rule r. If the encoding size of rule set R is less than the encoding size of rule set S, as determined in step 4970, and if the encoding size of rule set R is less than the encoding size for rule set T, as determined in step 4972, then variable nxtRule remains set to currently considered rule r. Otherwise, if rule set S has the smallest encoding size, then rule set R is set to rule set S and variable nxtRule is set to rep, in step 4974. Otherwise, rule set R is set to rule set T and variable nxtRule is set to rev, in step 4976. In step 4978, entries of dataset Gpos selected by nxtRule are removed from dataset Gpos and entries in dataset Gneg selected by rule nxtRule are removed from dataset Gneg. When there is another rule r to consider in rule set R, as determined in step 4980, control flows back to step 4932, in FIG. 49B, for another iteration of the for-loop that begins with step 4936. Otherwise, in step 4982, the variable opt is decremented, Tpos is set to Gpos, and Tneg is set to Gneg, and control returns to step 4906 in FIG. 49A for addition of any new rules needed to fully partition Tpos and Tneg.

Figure 50:
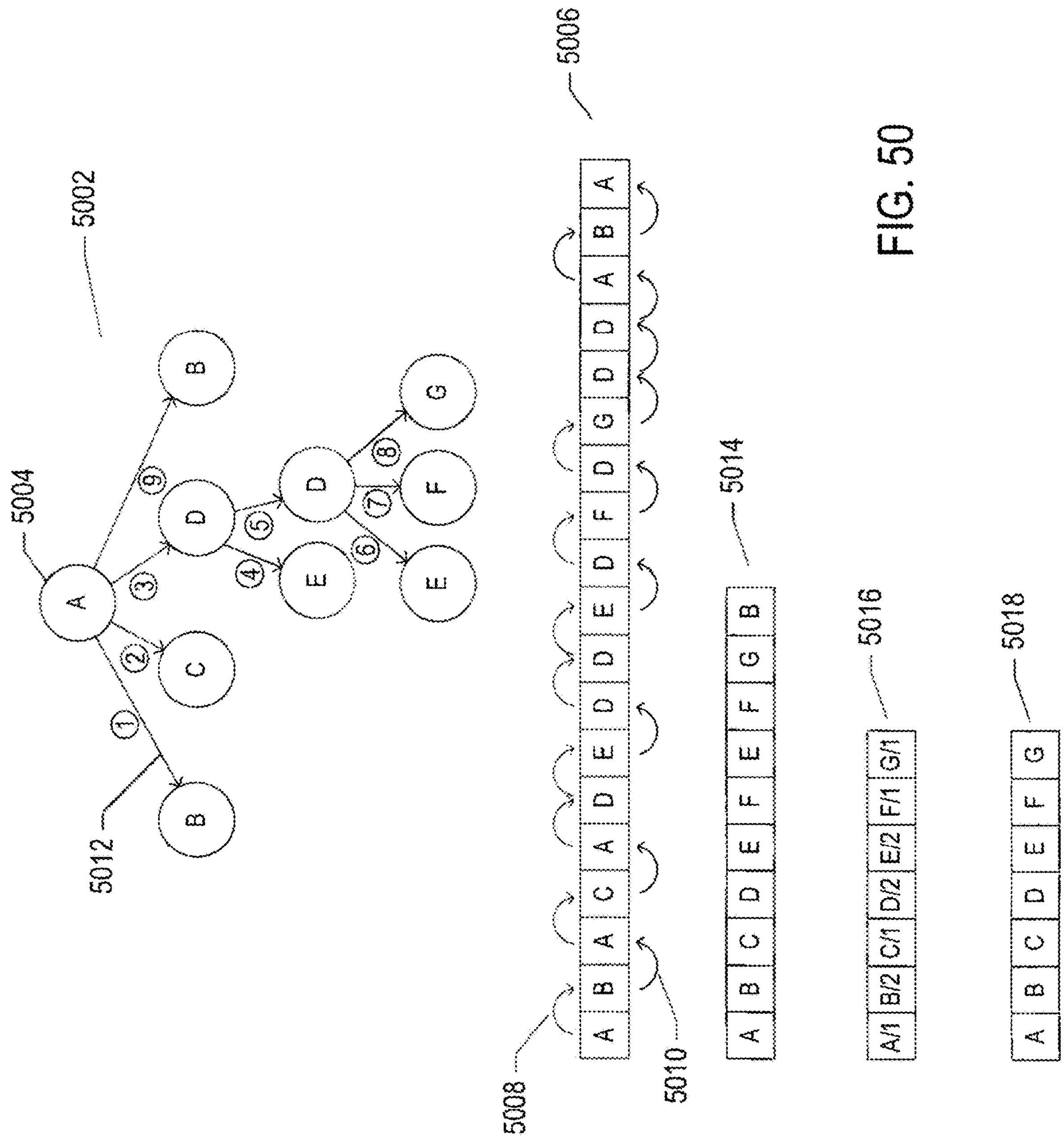
FIG. 50 illustrates generation of a linear call-trace representation, or feature vector, from a call trace.

FIG. 50 illustrates generation of a linear call-trace representation, or feature vector, from a call trace. As discussed above in preceding subsections, a call trace is generically represented as a tree 5002 in which the nodes correspond to spans and edges represent microservice calls. The root node 5004 represents the span that encompasses processing of a call to and entry point of the API of the distributed application. Lower-level nodes represent calls to microservices made by the distributed application during execution of the distributed-application logic corresponding to the entry point. In order to generate a linear call-trace representation, various different methods can be applied to call trace 5002. A representation 5006 that fully retains the information in the tree-like call trace 5002 involves redundant storage of span indications. The curved arrows above the linear representation 5006, such as curved arrow 5008, correspond to edges in the tree-like call-trace representation 5002. Curved arrows below the representation, such as curved arrow 5010, represent oppositely-oriented return edges corresponding to the edges in the tree-like representation of the call graph. Thus, curved arrow 5008 represents edge 5012 in the tree-like representation of the call graph and curved arrow 5010 represents an oppositely oriented return edge corresponding to edge 5012. In a different linear representation of the call-trace 5014, span identifiers corresponding to the nodes visited in a left-to-right, depth-first traversal of the tree-like representation of the call trace are placed, in order, in the linear representation. The tree-like representation of the call trace cannot be regenerated from linear representation 1514, since information has been lost in the process of generating the linear representation. An even more compact linear representation 5016 of the call trace includes only the identifiers of the different spans within the call trace along with a numerical indication of the number of times each span occurs in the call trace. Finally, the most compact linear representation 5018 includes only indications of the different spans within the call trace. In a currently disclosed implementation of the currently disclosed methods and systems, a call-trace representation similar to linear representation 1516 is employed.

Figure 51:
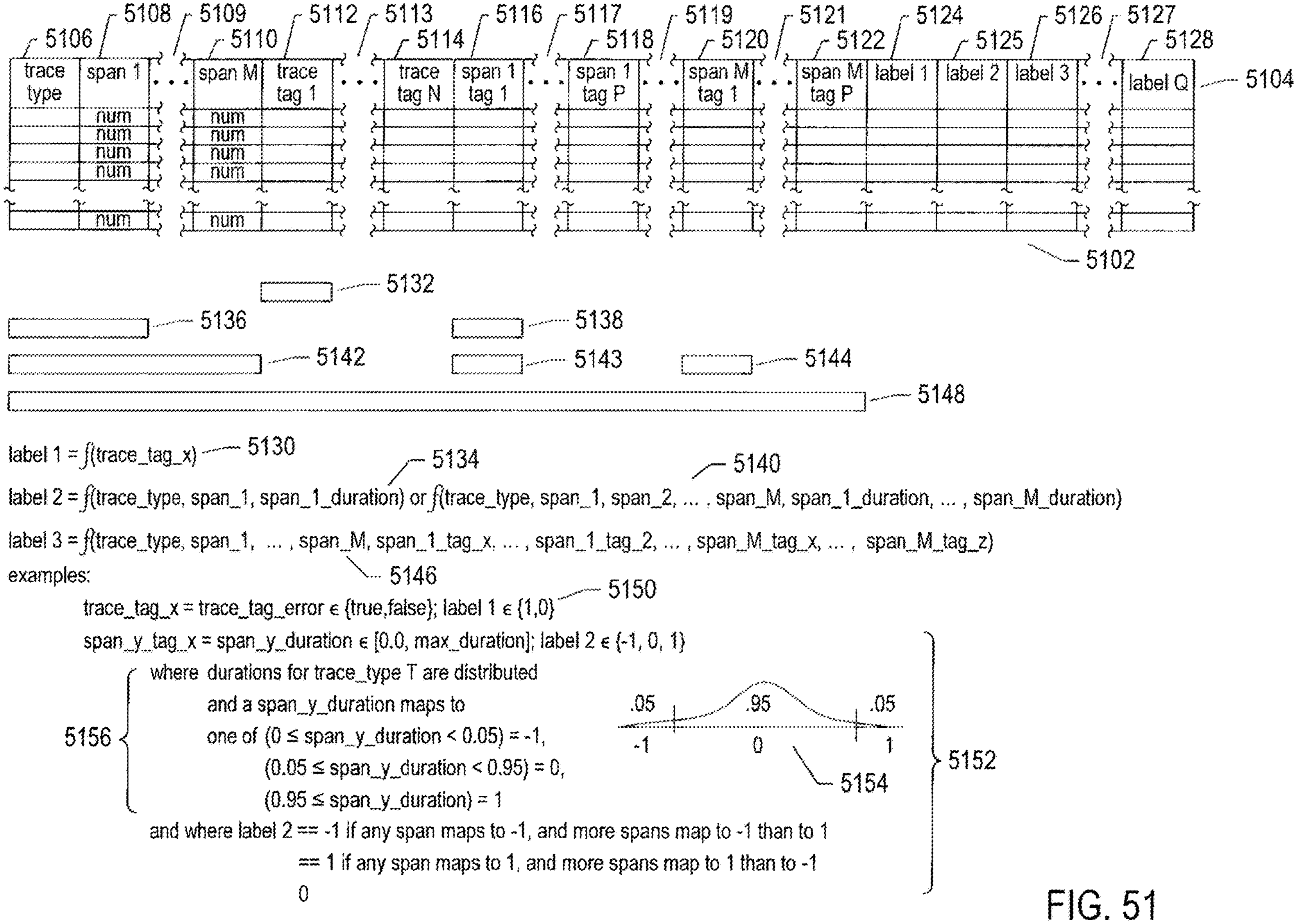
FIG. 51 illustrates a call-trace dataset.

FIG. 51 illustrates a call-trace dataset. The call-trace dataset 5102 is shown in tabular form in FIG. 51, with each row containing a linear call-trace representation. The fields contained in the call-trace representations are shown in an initial header row 5104. These fields include a trace-type field 5106, a field for each of the possible different M spans that may be included in a call trace 5108-5110, a field for each of N different tags, or attributes, that may be associated with the call trace, as a whole 5112-5114, a field for each of P different tags or attributes for each of the M different possible spans 5116-5122, and Q different labels automatically generated for the call traces in the call-trace dataset 5124-5128. The entries in the table contain values for the fields indicated in the header row 5104, with the fields corresponding to the spans 5108-5110 containing the number of instances the spans in the call trace. As with the example call-trace dataset 4302 shown in FIG. 43A, call-trace and span tags or attributes may be associated with an integer data type, a floating point data type, or a discrete data type. The different labels may be either binary labels or multiple-value labels.

A label may represent a different level or complexity of analysis used to generate the label values. For example, a low-complexity analysis may involve consideration of only a single call-trace tag or attribute 5112 in order to generate label values. In this example, the values for the first label, label 1, can be thought of as being computed by a function that takes only a single call-trace tag as an argument 5130, with the single bar 5132 representing the portion of the call traces used to generate label values for label 1. As another example, the values for a second label, label 2, may be generated from a consideration of the trace type and a single attribute of the root span of the call trace, where the values for label 2 can be considered to be generated by a call to a function that takes the trace_type, span_1, and span_1_duration field values as arguments 5134. Bars 5136 and 5138 represent the portions of the call traces used to generate label values for label 2. Alternatively, the values for label 2 may be generated from the trace type, span fields, and one attribute field for each span field, as represented by a function call 5140. Bars 5142-5144 represent the portions of the call traces used to generate label values for label 2 via function 5140. As yet another example, values for a third label, label 3, may be computed as a function of all of the fields in a call trace, as represented by the function call 5146 and by bar 5148. Thus, the computational overheads involved in automatically generating values for the different labels may differ, and the values for the different labels may represent different levels of analytical depth.

In the lower portion of FIG. 51, particular examples of the different analyses corresponding to the different labels are provided. In a first example 5150, the trace tag used for computing values for label 1 may be a general error tag or attribute for call traces, with tag values selected from the two Boolean values TRUE and FALSE. The corresponding values for the label_1 field are selected from the integers 1 and 0. During call-trace collection and storage, the call-trace-service may employ various criteria for automatically generating the trace-tag values. In a second example 5152, the Spanish attributes used in function call 5140 or span-duration attributes include a floating-point representation of the system time consumed by execution of the span. The label values generated for label 2 are selected from the three values −1, 0, and 1. One of these three values are generated, for each span, by determining into which of three portions of the distribution of durations for the span type the duration contained in a duration attribute for the span falls, as indicated by distribution depiction 5154 and expressions 5156. Then, the label-2 field for the call trace is set to −1 if any of the spans in the call trace are associated with value −1 and more spans of the call trace are associated with value −1 than with value 1, is set to 1 if any of the spans in the call trace are associated with value 1 and more spans of the call trace are associated with value 1 than with value −1 and is otherwise set to 0. These are but a few examples of the many different types of computational analyses that may be carried out in order to generate label values for different label types. In general, it is advantageous to automatically generate different labels and corresponding label values with different associated analytical complexities and computational overheads in order to provide a set of simple rules that may be useful for diagnosing operational problems and failures in a distributed application and that can be applied to a dataset with different computational overheads.

Figure 52:
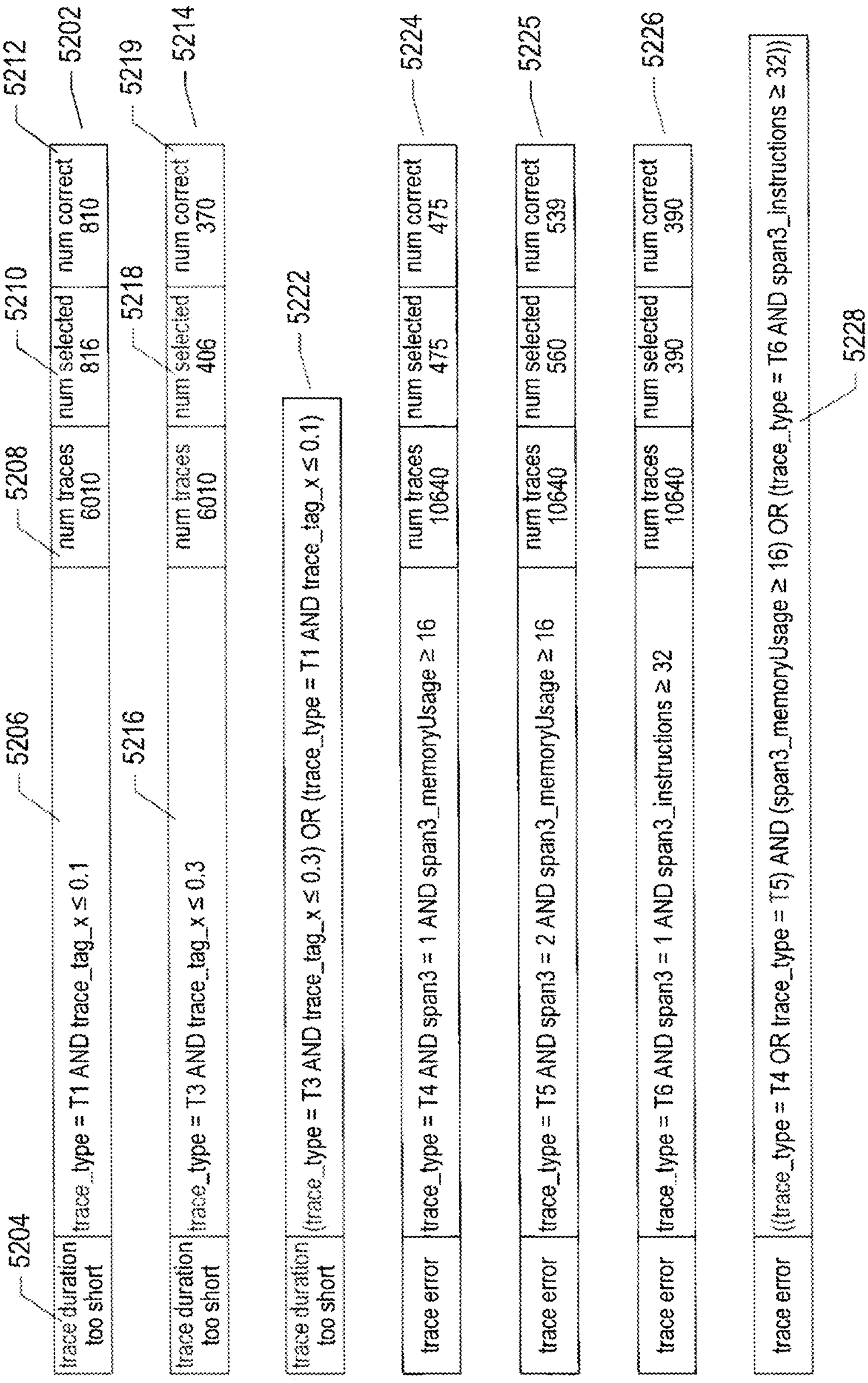
FIG. 52 illustrates hypothetical results of rule generation applied to a call-trace dataset.

FIG. 52 illustrates hypothetical results of rule generation applied to a call-trace dataset. In a first example, a rule 5202 has been generated from a call-trace dataset using a label with values generated from considering span-duration attributes within the call traces in the dataset, as in example 5134 discussed above with reference to FIG. 51. The generated rule 5202 includes an indication of the label value 5204 selected by the rule, a logical expression of the rule 5206, the total number of call traces in the dataset from which the rule was generated 5208, the number of call traces selected by the rule 5210, and the number of selected call traces 5212 associated with the label value 5204. A second generated rule 5214 for the same label includes a different logical expression 5216 and different application statistics 5218-5219. As is apparent from the statistics associated with the two rules 5210, 5212, and 5218-5219, both rules are associated with relatively high confidences. The two generated rules may be combined to produce rule 5222, which may represent a useful, simple-rule tool both for understanding and diagnosing a problem or failure that occurred in a time window including the times at which the call trace in the call-trace dataset were collected and for diagnosing subsequently occurring problems and failures. The rule indicates that when either call traces of type T1 or T3 have root-span duration-tag values less than or equal to 0.1 or 0.3, respectively, an operational problem or failure may be imminent or may have already occurred. A manager or administrator may then determine the distributed-application entry points corresponding to call traces of these types and focus his or her attention on diagnosing problems that occurred during execution of the distributed-application logic corresponding to these entry points. When there are many different entry points associated with the distributed application, the information embodied in rule 5222 may greatly facilitate diagnosis of an operational problem or failure for which rule 522 is applicable. Of course, the manager or administrator would need to first apply the rule to a call-trace dataset containing call traces within a time window associated with the operational problem or failure to determine whether or not the rule selects a sufficient portion of the call traces from the dataset to indicate that the rule may be at least a partial explanation of the operational problem or failure. In general, the call-trace dataset would be collected from a relevant time frame associated with an operational problem or failure and then filtered to include a significant proportion of call traces with one or more attribute values deemed to be indicative of an operational problem or failure so that, when a rule, such as rule 5222, is applied to filtered call-trace dataset, the manager or administrator can easily determine, from the percentage of call traces selected by the rule, Whether the rule represents a possible explanation or is indicative of a possible explanation for the operational problem or failure. Generated rules 5224-5226 provide a second example of rules that may be generated from a dataset considering a label with label values generated from memory-usage and computational-overhead span attributes. These generated rules are combined to form rule 5228, which, when selecting a large fraction of call traces of a call-trace dataset, points to a problem associated with distributed-application entry points corresponding to trace types T4 and T5 involving excessive computational-resource usage during the microservice call or microservice calls associated with span 3. This rule may greatly facilitate diagnosis of operational problems and failures of this type.

Figure 53A:
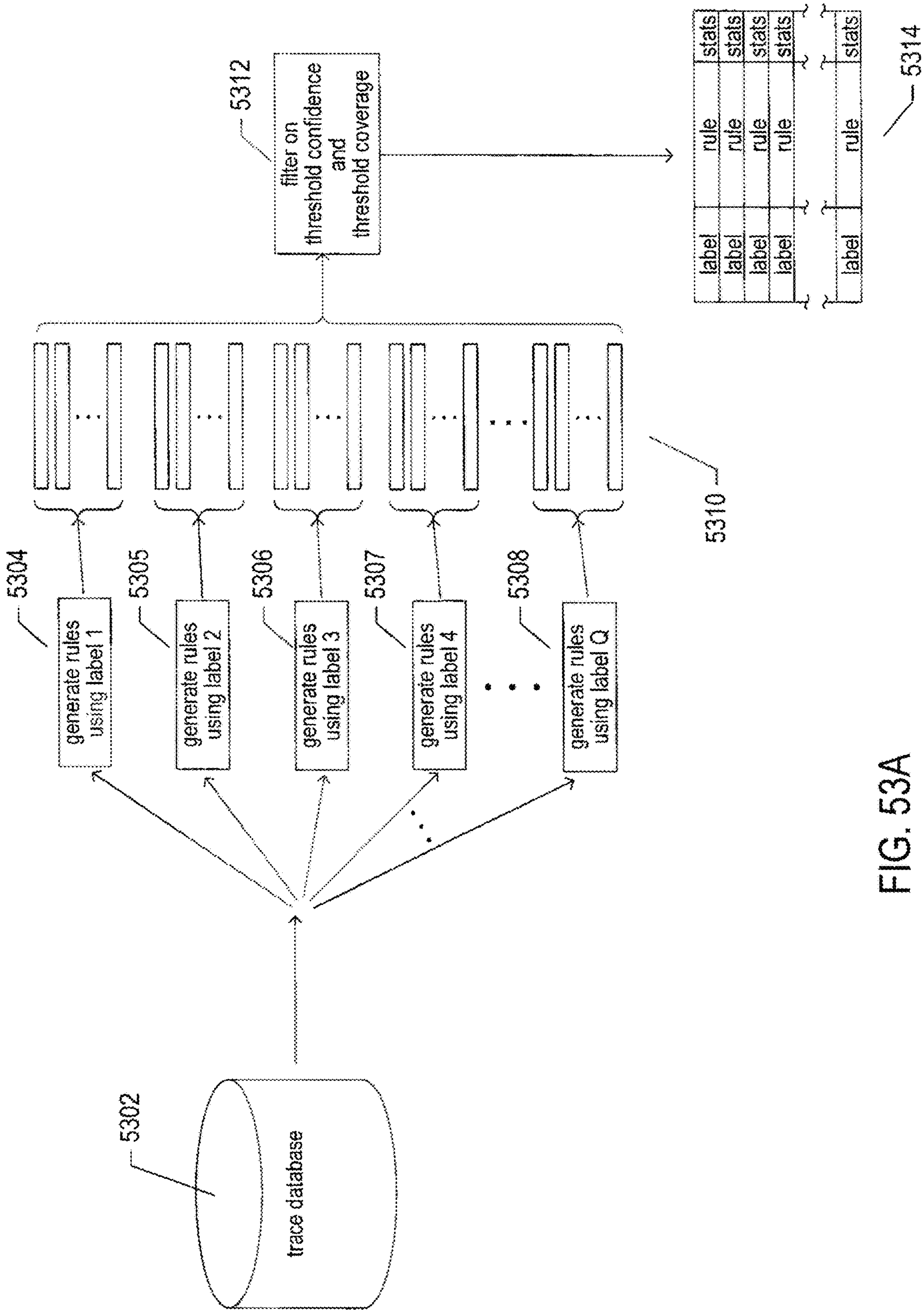
FIGS. 53A-B illustrate the general approach to distributed-application-problem and distributed-application-failure diagnosis represented by the currently disclosed methods and systems.
Figure 53B:
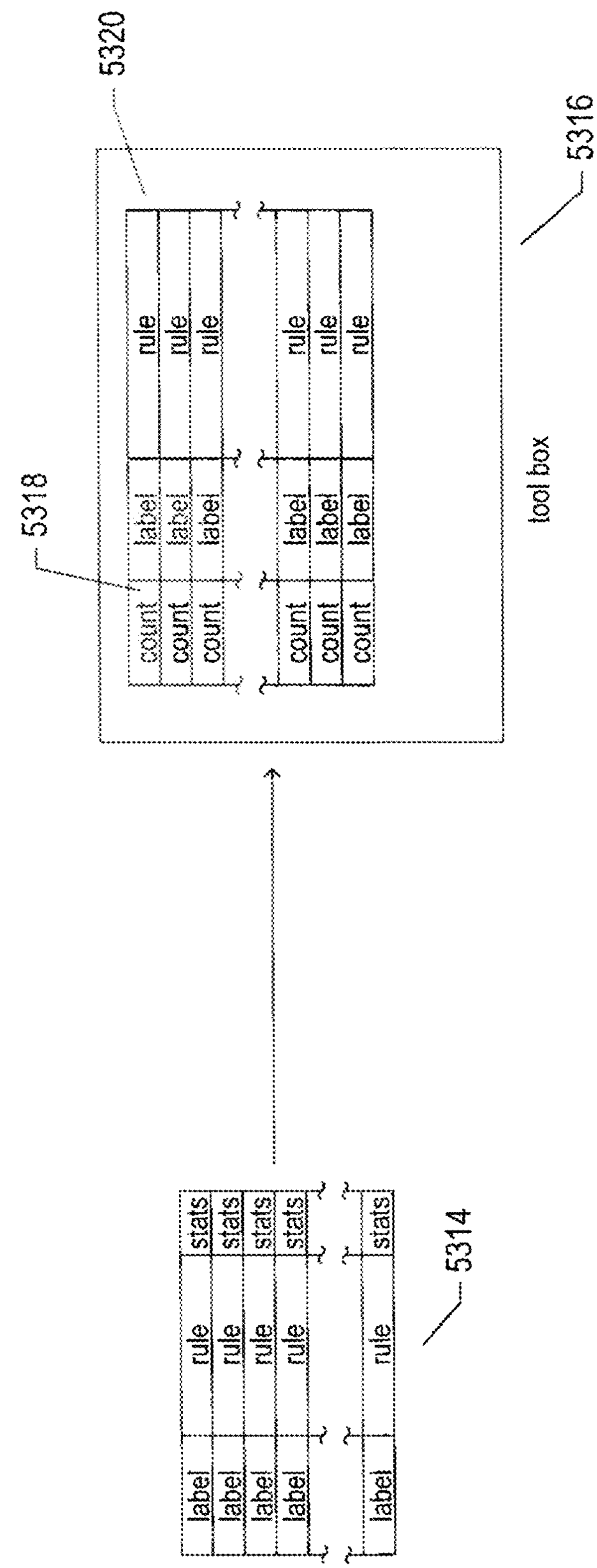

FIGS. 53A-B illustrate the general approach to distributed-application-problem and distributed-application-failure diagnosis represented by the currently disclosed methods and systems. As discussed in preceding subsections, a call-trace-service within a distributed computer system generates and stores call traces in a call-trace database 5302. The call-trace-service may be implemented to automatically associate the call traces with various different labels. Alternatively, one or more labels may be associated with the call traces in a call-trace dataset following extraction of the call-trace dataset from the call-trace database. In general, a call-trace dataset is extracted from the call-trace database by extracting and filtering call traces timestamped within a time window relevant to a detected operational problem or operational failure. Then, the above-described rule-generation methods are employed to generate a rule set from the call-trace dataset for each of the different labels 5304-5308. The rules produced by the rule-generation methods, shown in column 5310, are then filtered with respect to a threshold confidence and a threshold coverage 5312 to generate a set of potentially explanatory rules 5314. As discussed above, the rule-generation methods are designed to generate relatively simple logical rules with relatively high probabilities of at least partially explaining the operational problem or failure with respect to which the call-trace dataset is generated. A set of potentially explanatory rules 5314 can then be used by one or more managers or administrators to facilitate diagnosis of the operational problem or failure. In addition, as illustrated in FIG. 53B, the potentially explanatory rules 5314 can be added to a toolbox 5316 for future use by managers or administrators. The added rules are associated with a count, such as count 5318 associated with rule 5320. This count can be fractionally decremented, over time, in order to detect and remove rules of limited utility. Every time a rule is selected from the toolbox and determined to provide at least a partial explanation for a subsequently occurring operational problem or failure, or when the rule is again attempted to be added to the toolbox, the count is incremented. Periodically, rules in the toolbox with low count values may be purged, so that only rules that have shown significant utility are maintained. Furthermore, the rules may be selected for display to a user based on the count values as well as on other metrics, so that the user can select high-value rules for use in diagnosing subsequently occurring operational problems and failures. The displayed rules may also be ordered by analysis complexity, as discussed above.

Figure 54A:
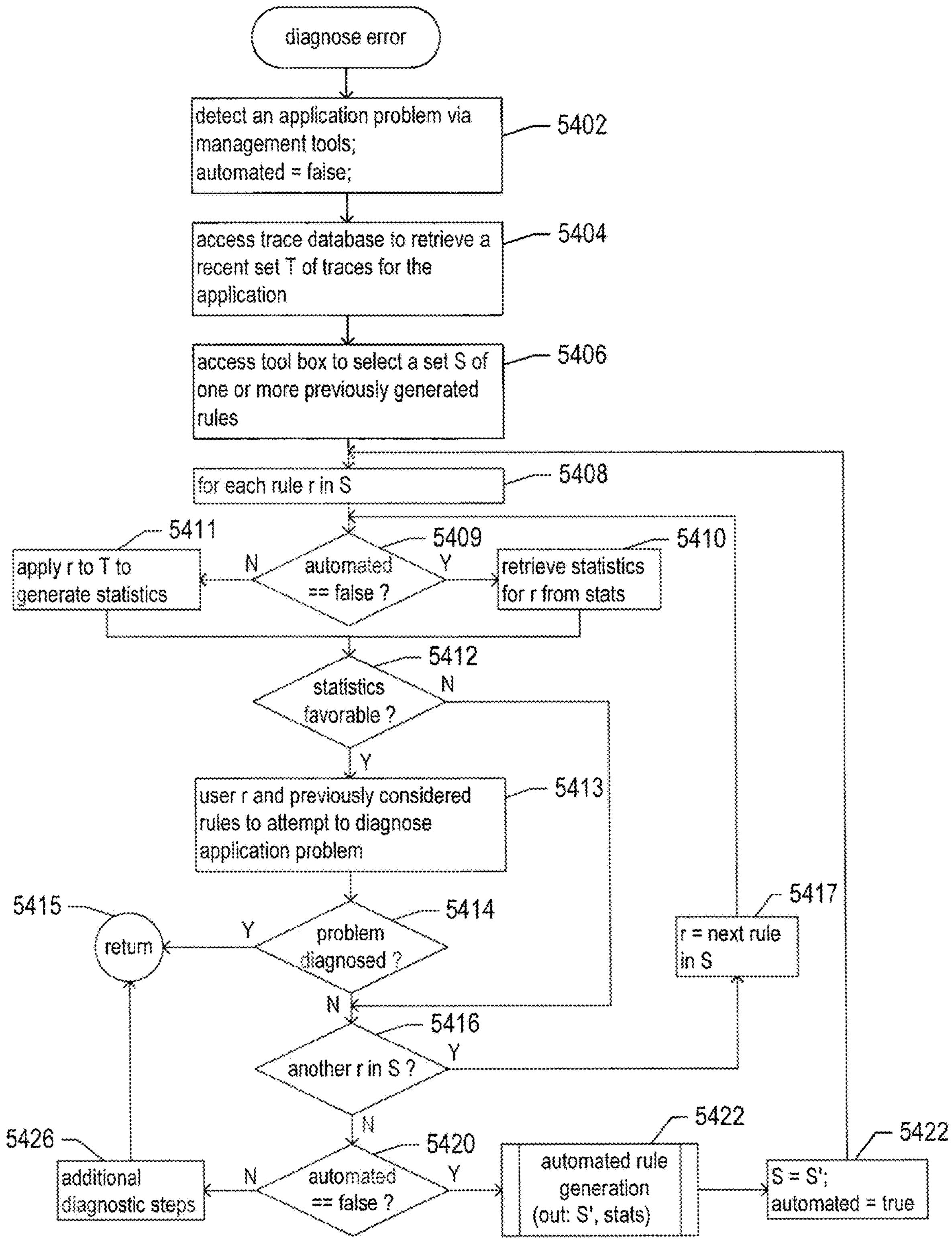
FIGS. 54A-B provide two control-flow diagrams that illustrate use of rules generated by the currently disclosed methods and systems for diagnosing a problem or failure detected in a distributed application.
Figure 54B:
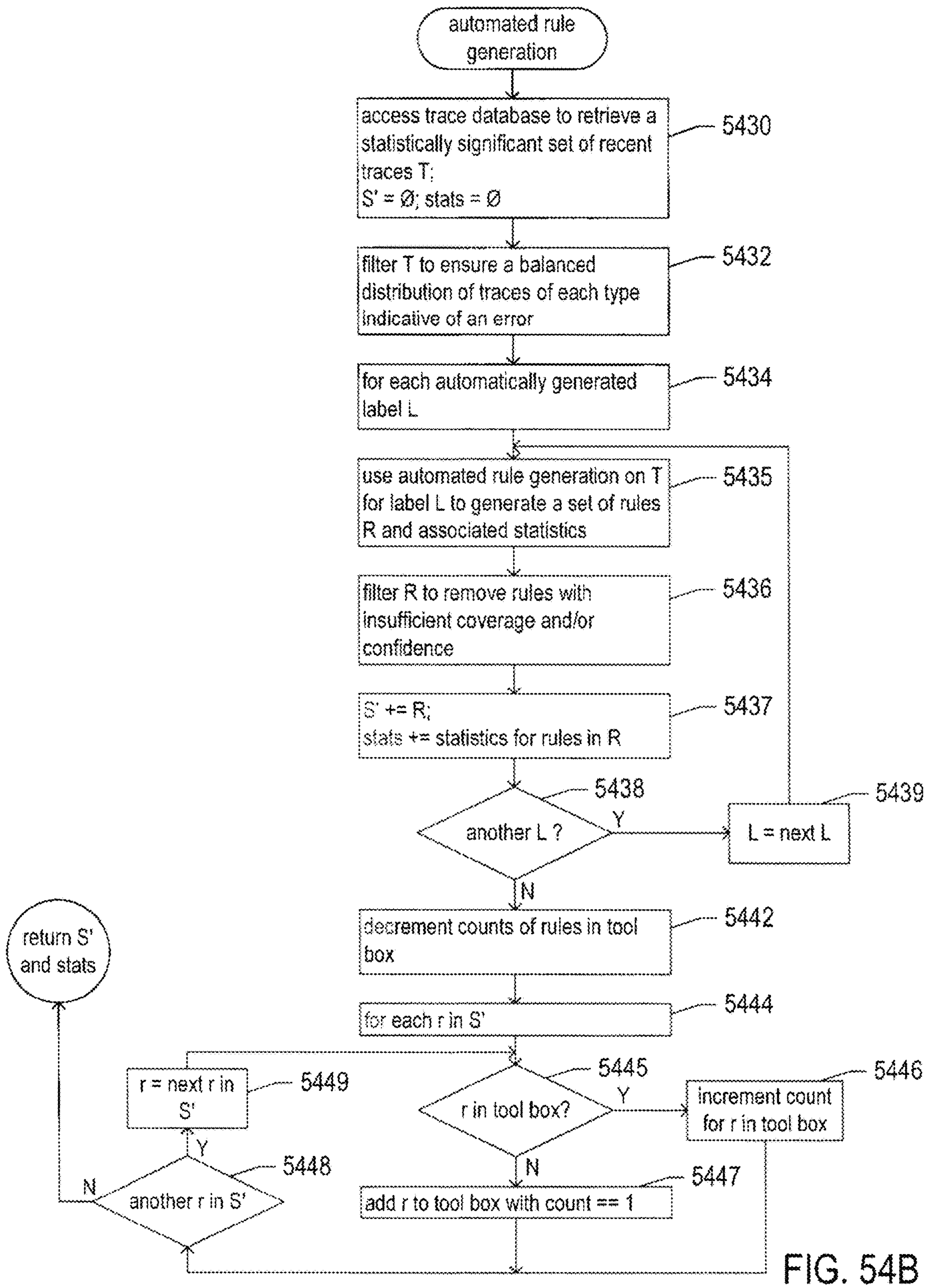

FIGS. 54A-B provide two control-flow diagrams that illustrate use of rules generated by the currently disclosed methods and systems for diagnosing a problem or failure detected in a distributed application. FIG. 54A provides a control-flow diagram for a routine "diagnosed error" that represents a diagnosis approach used by a distributed-application manager or administrator. In step 5402, the manager or administrator detects a distributed-application problem or failure via one or more management tools. A local variable automated is set to FALSE, in this step, to indicate that automated rule generation has not yet been invoked. In step 5404, the manager or administrator accesses the call-trace database to retrieve a recent set T of call traces to use for diagnosing the operational problem or failure. As discussed above, the call traces are generally filtered for problem-or-failure inductiveness before being added to a call-trace dataset used for diagnosis. In step 5406, the manager or administrator accesses the toolbox (5316 in FIG. 53B) to select a set S of one or more previously generated rules that might provide assistance in diagnosing the operational problem or failure. Access to the toolbox is usually provided through a management interface that selects and displays a handful of the historically most useful rules maintained in the toolbox. Then, in the for-loop of steps 5408-5417, the manager or administrator attempts to use each of the selected rules r in set S for diagnosis. In step 5409, local variable automated indicates whether or not automated rule generation has been invoked. If automated rule generation has been invoked, then, in step 5410, statistics for the currently considered rule r are extracted from the rule set produced by automated rule generation (5314 in FIG. 53A). Otherwise, currently considered rule r is applied to the dataset T extracted from the call-trace database in order to generate statistics for the rule. When the statistics associated with the currently considered rule r indicate that the rule is applicable to dataset T or, in other words, when the currently considered rule r selects a significant fraction of the call traces in the dataset T, as determined in step 5412, the manager or administrator attempts to use currently considered r to diagnose the operational problem or failure. If the problem or failure is successfully diagnosed, as determined in step 5014, the routine "diagnosed error" returns, in step 5415. When there is another rule r in the selected set of rules S to consider, as determined in step 5416, loop variable r is set to the next rule for consideration, in step 5417, and control flows back to step 5409 for another iteration of the or-loop of steps 5408-5417. Upon completion of the for-loop of steps 5408-5417, if automated rule generation has not yet been invoked, as determined in step 5420, then automated rule generation is invoked in step 5422 to return a new set of potentially useful rules S'. Rule set S is set to S', in step 5424, and control returns to step 5408 for consideration, by the manager or administrator, of the new rules generated by automated rule generation. Otherwise, the manager or user may employ additional diagnostic steps in step 5426. These may include a variety of different automated, more computationally complex problem-or-failure diagnostic methods, including methods discussed in preceding subsections.

FIG. 54B provides a control-flow diagram for a routine "automated rule generation," invoked in step 5422 of FIG. 54A. In step 5430, the routine "automated rule generation" accesses the call-trace database to retrieve a statistically significant set of recent call traces T and sets local set variables S' and slats to the empty set. In step 5432, the routine "automated rule generation" filters call-trace dataset T to ensure a balanced distribution of traces indicative of an error. In the for-loop of steps 5434-5439, each automatically generated label L associated with the selected call traces is considered. In step 5435, a currently considered label L is used to generate a rule set R and associated statistics from the call-trace dataset. In step 5436, rule set R is filtered to remove rules with insufficient coverage and/or insufficient confidence. In step 5437, rule set R is added to set S' and the statistics associated with the rules in set R are added to the set stats. When there is another automatically-generated label to consider, as determined in step 5438, loop variable L is set to the next label, in step 5439, and control flows back to step 5435 for another iteration of the for-loop of steps 5434-5439. Upon completion of the for-loop of steps 5434-5439, the counts of the rules in the toolbox are fractionally decremented, in step 5442. In the for-loop of steps 5444-5449, each of the rules in set S' are either added to the toolbox, when the rule is not already resident in the toolbox, or, when the rule is resident within the toolbox, the count field for the rule is incremented. Following completion of the for-loop of steps 5444-5449, the routine "automated rule generation" returns the set of rules S' and associated statistics.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. As discussed above, a variety of different rule-generation methods and systems can be used to generate simple explanatory rules from filtered call-trace datasets. Rules may have different forms in different implementations, but generally consist of conditions joined together by Boolean operators. Various types of additional processing can be used to consolidate rules into a smaller set of potentially explanatory rules that can be used for operational-problem-or-failure diagnosis and stored in a toolbox for subsequent use in operational-problem-or-failure diagnosis.

The invention claimed is:

1. A system that generates call-trace-classification rules that are used for diagnosis of operational problems or failures occurring in a distributed application, the system comprising:

one or more processors;

one or more memories; and computer instructions, stored in one or more of the one or more memories that, when executed by one or more of the one or more processors, control the system to extract call traces from a call-trace database as a call-trace dataset, generate one or more labels and corresponding label values for the extracted call traces in the call-trace dataset when the extracted call traces in the call-trace dataset are not automatically labeled by a call-trace service and associate a label value for each label with each extracted call trace in the call-trace dataset, for each label in a set of labels selected from labels associated with the extracted call traces in the call-trace dataset, generate a call-trace-classification-rule set that partitions the extracted call traces in the call-trace dataset according to possible label values corresponding to the label in the set of labels, filter the call-trace-classification-rule set, and add call-trace-classification rules of the filtered call-trace-classification-rule set to a generated set of call-trace-classification rules, display a portion of the call-trace-classification rules in the generated set of call-trace-classification rules for use in diagnosing an operational problem or failure occurring in the distributed application, and store the call-trace-classification rules in the generated set of call-trace-classification rules in a logical toolbox for subsequent use in diagnosing operational problems or failures occurring in the distributed application.

2. The system of claim 1 wherein a call trace in the call-trace dataset includes an attribute value for each attribute in a set of attributes that corresponds to a set of fields within the call trace in the call-trace dataset.

3. The system of claim 2 wherein a labeled call trace in the call-trace dataset includes at least one label field that includes one of the possible label values for a label associated with the at least one label field.

4. The system of claim 3 wherein a call-trace-classification rule is a logical expression that, when applied to one or more attribute values within attribute fields of the call trace in the call-trace dataset, returns a Boolean value indicating whether or not the call trace in the call-trace dataset would be classified as belonging to a set of call traces in the call-trace dataset associated with a particular label value for a particular label.

5. The system of claim 4 wherein a call-trace-classification rule comprises one of:

a single condition; and multiple conditions joined together by Boolean operators.

6. The system of claim 5 wherein a condition comprises an attribute indication, a relational operator, and an attribute value.

7. The system of claim 1 wherein the system extracts call traces from the call-trace database that have timestamps within a time interval associated with a particular operational problem or failure occurring in the distributed application.

8. The system of claim 1 wherein each label in the set of labels corresponds to a set of possible values computed from particular fields in the extracted call trace in the call-trace dataset.

9. The system of claim 8 wherein a binary label represents two different computed values and a multi-value label represents more than two different values.

10. The system of claim 9 wherein the system generates a call-trace-classification-rule set that partitions the extracted call traces in the call-trace dataset according to the possible label values corresponding to the label in the set of labels by:

for each possible label value selected from all but one of the possible label values corresponding to the label in the set of labels, partitioning the call-trace dataset into a grow dataset and a prune dataset; and iteratively generating a new call-trace-classification rule using the grow dataset, pruning the new call-trace-classification rule using the prune dataset, and removing call traces from the grow dataset selected by the new call-trace-classification rule until the grow dataset contains no entries containing the possible label value corresponding to the label in the set of labels.

11. The system of claim 10 wherein a new call-trace-classification rule is generated by:

initializing the new call-trace-classification rule to an empty rule; and iteratively adding a next condition, comprising an attribute indication, a relational operator, and an attribute value, to the new call-trace-classification rule until the new call-trace-classification rule does not select any call traces from the grow dataset containing a label value other than the possible label value corresponding to the label in the set of labels.

12. The system of claim 10 wherein a new call-trace-classification rule is pruned by removing terminal conditions from the new call-trace-classification rule until a metric value associated with the new call-trace-classification rule is maximized.

13. The system of claim 1 wherein the system filters the call-trace-classification-rule set by removing those call-trace-classification rules with coverages less than a threshold coverage and/or with confidences less than a threshold confidence.

14. The system of claim 13 wherein the coverage of a call-trace-classification rule is determined as the ratio of a number of call traces selected by the call-trace-classification rule from a labeled call-trace dataset that contain a possible label value corresponding to the label in the set of labels to a number of call traces in the labeled call-trace dataset that contain the possible label value corresponding to the label in the set of labels.

15. The system of claim 13 wherein the confidence of a call-trace-classification rule is determined as the ratio of a number of call traces selected by the call-trace-classification rule from a labeled call-trace dataset that contain a possible label value corresponding to the label in the set of labels to a number of call traces in the labeled call-trace dataset selected by the call-trace-classification rule.

16. The system of claim 1 wherein a call-trace-classification rule is used to diagnose an operational problem or failure in a distributed application by:

extracting call traces from a call-trace database, as a call-trace dataset, that are timestamped within a time interval associated with the operational problem or failure in the distributed application;

applying the call-trace-classification rule to the call-trace dataset; and when more than a threshold portion of the extracted call traces in the call-trace dataset are selected by the call-trace-classification rule, determining particular components or features of the distributed application related to the call-trace-classification rule as potential causes of the operational problem or failure in the distributed application.

17. A method that generates call-trace-classification rules that are used for diagnosis of operational problems or failures occurring in a distributed application, the method carried out by a computer system having one or more processors, one or more memories, and a data-storage device, the method comprising:

extracting call traces from a call-trace database as a call-trace dataset;

generating one or more labels and corresponding label values for the extracted call traces in the call-trace dataset when the extracted call traces in the call-trace dataset are not automatically labeled by a call-trace service and associating a label value for each label with each extracted call trace in the call-trace dataset;

for each label in a set of labels selected from labels associated with the extracted call traces in the call-trace dataset, generating a call-trace-classification-rule set that partitions the extracted call traces in the call-trace dataset according to possible label values corresponding to the label in the set of labels, filtering the call-trace-classification-rule set, and adding call-trace-classification rules of the filtered call-trace-classification-rule set to a generated set of call-trace-classification rules, displaying a portion of the call-trace-classification rules in the generated set of call-trace-classification rules for use in diagnosing an operational problem or failure occurring in the distributed application; and storing the call-trace-classification rules in the generated set of call-trace-classification rules in a logical toolbox for subsequent use in diagnosing operational problems or failures occurring in the distributed application.

18. The method of claim 17 wherein the computer system generates a call-trace-classification-rule set that partitions the extracted call traces in the call-trace dataset according to the possible label values corresponding to the label in the set of labels by:

for each possible label value selected from all but one of the possible label values corresponding to the label in the set of labels, partitioning the call-trace dataset into a grow dataset and a prune dataset; and iteratively generating a new call-trace-classification rule using the grow dataset, pruning the new call-trace-classification rule using the prune dataset, and removing call traces from the grow dataset selected by the new call-trace-classification rule until the grow dataset contains no entries containing the possible label value corresponding to the label in the set of labels.

19. The method of claim 18 wherein a new call-trace-classification rule is generated by:

initializing the new call-trace-classification rule to an empty rule; and iteratively adding a next condition, comprising an attribute indication, a relational operator, and an attribute value, to the new call-trace-classification rule until the new call-trace-classification rule does not select any call traces from the grow dataset containing a label value other than the possible label value corresponding to the label in the set of labels.

20. A physical data-storage device that stores instructions that, when executed by one or more processors of a computer system, control the computer system to:

extract call traces from a call-trace database as a call-trace dataset;

generate one or more labels and corresponding label values for the extracted call traces in the call-trace dataset when the extracted call traces in the call-trace dataset are not automatically labeled by a call-trace service and associate a label value for each label with each extracted call trace in the call-trace dataset;

for each label in a set of labels selected from labels associated with the extracted call traces in the call-trace dataset, generate a call-trace-classification-rule set that partitions the extracted call traces in the call-trace dataset according to possible label values corresponding to the label in the set of labels, filter the call-trace-classification-rule set, and add call-trace-classification rules of the filtered call-trace-classification-rule set to a generated set of call-trace-classification rules;

display a portion of the call-trace-classification rules in the generated set of call-trace-classification rules for use in diagnosing an operational problem or failure occurring in the distributed application; and store the call-trace-classification rules in the generated set of call-trace-classification rules in a logical toolbox for subsequent use in diagnosing operational problems or failures occurring in the distributed application.

* * * * *